US012675003B2

(12) United States Patent
Bakaraju et al.

(10) Patent No.:    US 12,675,003 B2
(45) Date of Patent:        Jul. 7, 2026

(54) CONTACT LENS FOR MYOPIA WITH OR WITHOUT ASTIGMATISM

(71) Applicants: Nthalmic Holding Pty Ltd, Sydney (AU); Brighten Optix Corp., Taipei City (TW)

(72) Inventors: Ravi Chandra Bakaraju, Sydney (AU); Klaus Ehrmann, Sydney (AU); Darrin Falk, Sydney (AU); Richard I Tsung Wu, Taipei City (TW)

(73) Assignees: Nthalmic Holding Pty Ltd, Sydney (AU); Brighten Optix Corp., Taipei City (TW)

( * ) Notice: Subject to any disclaimer, the term of this patent is extended or adjusted under 35 U.S.C. 154(b) by 581 days.

(21) Appl. No.: 17/799,595

(22) PCT Filed: Dec. 11, 2020

(86) PCT No.: PCT/AU2020/051361
§ 371 (c)(1),
(2) Date: Aug. 12, 2022

(87) PCT Pub. No.: WO2021/159164
PCT Pub. Date: Aug. 19, 2021

(65) Prior Publication Data
US 2023/0123284 A1        Apr. 20, 2023

(30) Foreign Application Priority Data
Feb. 14, 2020    (AU) ................................ 2020900412

(51) Int. Cl.
*G02C 7/04*            (2006.01)
(52) U.S. Cl.
CPC ............. *G02C 7/049* (2013.01); *G02C 7/044* (2013.01); *G02C 2202/02* (2013.01); *G02C 2202/24* (2013.01)

(58) Field of Classification Search
CPC .... G02C 7/049; G02C 7/044; G02C 2202/02; G02C 2202/24; G02C 7/048; G02C 7/041; G02C 2202/12
See application file for complete search history.

(56) References Cited

U.S. PATENT DOCUMENTS 5,408,281 A        4/1995  Zhang
2009/0040458 A1    2/2009  Ye et al.
(Continued)

FOREIGN PATENT DOCUMENTS

EP        0996024 A1 *  4/2000
FR        2936879 A1 *  4/2010    .............. G02C 7/06
(Continued)

OTHER PUBLICATIONS

Extended European search report received in European application No. 20918966.1, mailed on Feb. 27, 2024.
(Continued)

*Primary Examiner* — Bumsuk Won
*Assistant Examiner* — Ray Alexander Dean
(74) *Attorney, Agent, or Firm* — Cognition IP, P.C.; Edward Steakley

(57)                ABSTRACT

The present disclosure relates to contact lenses for use with eyes experiencing eye-length related disorders, like myopia with or without astigmatism. This invention relates to a contact lens for managing myopia with or without astigmatism: wherein the contact lens is configured with an optical zone defined substantially centred about its optical axis to provide a meridionally and azimuthally variant power distribution resulting, at least in part, in a foveal correction of the myopic eye and, at least in part, resulting in a conoid of partial blur at the retina of the myopic eye, serving as a directional cue or an optical stop signal; and a non-optical peripheral carrier zone about the optical zone configured
(Continued)

with a invariant azimuthal thickness distribution, with or without rotation assisting features, to further provide temporally and spatially varying stop signals to decelerate, control, inhibit, or reduce the rate of myopia progression substantially consistent over time.

25 Claims, 68 Drawing Sheets

(56)                References Cited

U.S. PATENT DOCUMENTS

2012/0075579 A1 *   3/2012   Roffman ................ G02C 7/041
                                                351/159.41
2014/0347622 A1    11/2014   Wu
2017/0090216 A1     3/2017   Goto et al.
2021/0048690 A1 *   2/2021   Guillot ................... G02C 7/086

FOREIGN PATENT DOCUMENTS

TW         201938103 A    10/2019
WO        2019152438 A1    8/2019

OTHER PUBLICATIONS

International Search Report & Written Opinion in PCT International Application No. PCT/AU2020/051361 mailed Feb. 12, 2021.

* cited by examiner

801

802

803

CONTACT LENS FOR MYOPIA WITH OR WITHOUT ASTIGMATISM

CROSS-REFERENCE

This application claims priority to Australian Provisional Application Serial No.2020/900412 filed on Feb. 14, 2020, entitled "Contact lens" and is a continuation of the PCT/AU2020/051004 filed on Sep. 23, 2020, entitled "A contact lens solution for myepia management", both of which are incorporated herein by reference in their entirety.

FIELD OF THE INVENTION

The present disclosure relates to contact lenses for use with eyes experiencing eye-length related disorders, like myopia with or without astigmatism.

BACKGROUND

At birth, most human eyes are hyperopic. With age, the eyeball grows towards emmetropia. The eye growth is controlled by a visual feedback mechanism, which is referred to as emmetropisation. The signals that guide the emmetropisation process are initiated at the retina level. The retinal image characteristics are monitored by a biological process that modulate the signal to start or stop, accelerate, or slow eye growth. Derailing from the emmetropisation process results in refractive disorders like myopia and/or astigmatism.

The problem of myopia is increasing at alarming rates and it is predicted that half of the world's population may be myopic by 2050. A simple pair of standard single vision lenses can correct myopia. Although such devices can correct the refractive error, they do not address the underlying cause of the excessive eye growth.

Excessive growth is associated with significant vision threatening conditions like glaucoma, myopic maculopathy, and retinal detachment. There remains a need for specific optical devices for such individuals that not only correct the underlying refractive error but also prevent excessive eye lengthening or progression of myopia.

Definitions

Terms used herein are generally used by a person skilled in the art, unless otherwise defined in the following.

The term "myopic eye" means an eye that is already experiencing myopia, is diagnosed to have a refractive condition that is progressing towards more myopia and has astigmatism of less than 1 DC.

The term "myopic astigmatic eye" means an eye that is either already experiencing myopia, is diagnosed to have a refractive condition that is progressing towards myopia and has astigmatism of equal to or more than 1 DC.

The term "progressing myopic eye" or "progressing myopic astigmatic eye" means an eye with established myopia with or without astigmatism that is diagnosed to be progressing, as gauged by either the change in refractive error of at least −0.25 D/year or the change in axial length of at least 0.1 mm/year.

The term "pre myopic eye" or "an eye at risk of becoming myopic" means an eye, which could be emmetropic or is low hyperopic at the time but has been identified to have an increased risk of becoming myopic based on genetic factors (e.g., both parents are myopic) and/or age (e.g., being low hyperopic at a young age) and/or environmental factors (e.g., time spent outdoors) and/or behavioural factors (e.g., time spent performing near tasks).

The term "optical stop signal" or "stop signal" means an optical signal or directional cue that may facilitate slowing, reversing, arresting, retarding, inhibiting, or controlling the growth of an eye and/or refractive condition of the eye.

The term "spatially varying optical stop signal" means an optical signal or a directional cue, provided at the retina, which changes spatially across the retina of the eye. The term "temporally varying optical stop signal" means an optical signal or a directional cue, provided at the retina, which changes with time. The term "temporally and spatially varying optical stop signal" means an optical signal or a directional cue, provided at the retina, which changes with time and spatially across the retina of the eye.

The term "contact lens" means a finished contact lens to be fit on the cornea of a wearer to affect the optical performance of the eye.

The term "optical zone" or "optic zone" means the region on the contact lens which has the prescribed optical effect. The optical zone may be distinguished to have regions of varying power distribution about the optical centre or the optical axis. The optical zone may be distinguished by front and back optic zone. The front and back optic zones means anterior and posterior surface areas of a contact lens which contribute to the prescribed optical effect, respectively.

An optical zone of the contact lens may be circular or elliptical or of another irregular shape. The optic zones of contact lenses with sphere powers are generally circular. However, introduction of meridionally and azimuthally variant power distributions may lead to non-circular optical zones in certain embodiments, as disclosed herein.

The term "optical centre" or "optic centre" means the geometric centre of the optical zone of the contact lens. The terms geometrical and geometric are essentially the same, as disclosed herein.

The term "optical axis" means the line passing through the optical centre and substantially perpendicular to the plane containing the edge of the contact lens, as disclosed herein.

The term "blend zone" or "blending zone" is the zone that connects or lies between the optical zone and the non-optical peripheral carrier zone of the contact lens. The blend zone may be on the front or the back surface or both surfaces and may be polished or smoothed between the two different adjacent surface curvatures as disclosed herein.

The term "non-optical peripheral carrier zone" is a non-optical zone that connects or lies between the optic zone and the edge of the contact lens. In some embodiments, a blending zone may be used between the optic zone and peripheral carrier zone, as disclosed herein.

The term "through-focus" generally refers to the space-dimension in front and/or behind the retina, usually measured in image space, in millimetres. However, in some embodiments, a surrogate measure of "through-focus" term referred in the object space and measured in Dioptres or Diopters, generally refers to the same thing, as disclosed herein.

The term "radial" means in the direction radiating out from the optical centre to the edge of the optic zone, defined along an azimuthal angle. The phrase "radial spoke" means a spoke radiating outward from the centre to the end of the optic zone, at a predetermined azimuthal angle.

The phrase "radial power distribution" means the one-dimensional power distribution of localised optical power across an arbitrary radial spoke, as disclosed herein.

The phrase "radially invariant power distribution" means an arbitrary radial spoke having a substantially uniform power distribution, as disclosed herein.

The phrase "radially variant power distribution" means an arbitrary radial spoke having a substantially non-uniform power distribution, as disclosed herein.

The term "meridian" means two opposing radial spokes spread across a predetermined azimuthal angle on the optical zone, as disclosed herein.

The phrase "meridional power distribution" means the one-dimensional power distribution of localised optical power across an arbitrary meridian across the optic zone, as disclosed herein.

The phrase "meridionally invariant power distribution" means an arbitrary meridian having a substantially uniform power distribution, as disclosed herein.

The phrase "meridionally variant power distribution" means an arbitrary meridian having a substantially non-uniform power distribution, as disclosed herein.

The phrase "meridional power distribution with mirror symmetry" means an arbitrary meridian having substantially same power distributions across its two opposing radial spokes.

The phrase "meridional power distribution devoid of mirror symmetry" means an arbitrary meridian having two substantially different power distributions across its two opposing radial spokes.

The terms "azimuth or azimuthal angles" mean in the direction along the circumference of the optic zone about the optical axis, defined at an arbitrary radial distance.

The phrase "azimuthal power distribution" means the one-dimensional power distribution of localised optical power across arbitrary azimuthal angles measured at a given radial distance about the optical axis.

The phrase "azimuthally invariant power distribution" means that the azimuthal power distribution has a substantially uniform power distribution, as disclosed herein.

The phrase "azimuthally variant power distribution" means that the azimuthal power distribution has a substantially non-uniform power distribution, as disclosed herein.

The phrase "azimuthal power distribution with mirror symmetry" means that the azimuthal power distribution between 0 and $\pi$ radians is substantially similar to the azimuthal power distribution between $\pi$ and $2\pi$ radians, as disclosed herein.

The phrase "azimuthal power distribution devoid of mirror symmetry" means that the azimuthal power distribution between 0 and $\pi$ radians is substantially different to the azimuthal power distribution between $\pi$ and $2\pi$ radians, as disclosed herein.

The phrase "azimuthal thickness distribution" means the one-dimensional thickness distribution of localised lens thickness across arbitrary azimuthal angles measured or defined at an arbitrary radial distance in the non-optical peripheral carrier zone.

The phrase "azimuthally invariant thickness distribution" means that the azimuthal thickness distribution has a substantially uniform thickness distribution, as disclosed herein.

The phrase "azimuthally variant thickness distribution" means that the azimuthal thickness distribution has a substantially non-uniform thickness distribution, as disclosed herein.

The phrase "periodic azimuthal thickness distribution" means that the azimuthal thickness distribution follows a periodic function or repeating pattern.

The phrase "azimuthal thickness distribution with mirror symmetry" means that the azimuthal thickness distribution between 0 and $\pi$ radians is substantially similar to the azimuthal thickness distribution between $\pi$ and $2\pi$ radians, as disclosed herein.

The phrase "azimuthal thickness distribution devoid of mirror symmetry" means that the azimuthal thickness distribution between 0 and $\pi$ radians is substantially different to the azimuthal thickness distribution between $\pi$ and $2\pi$ radians, as disclosed herein.

The phrase "Peak-To-Valley (PTV) in azimuthal thickness distribution" means the difference between the thickest and thinnest points along the azimuthal thickness distribution between 0 and $2\pi$ radians, defined at an arbitrary radial distance in the non-optical peripheral carrier zone.

The term "ballast" means azimuthally variant thickness distribution devoid of mirror symmetry within the carrier zone for the purpose of maintaining the rotational orientation of a contact lens when placed on an eye.

The term "prism ballast" means a vertical prism used to create a wedge design that will help stabilise the rotation and orientation of a conventional toric contact lens on the eye.

The term "slab-off" means purposeful thinning of the contact lens towards the edge of the inferior and superior periphery of the contact lens in one or more discrete areas to achieve the desired contact lens rotational stabilisation.

The term "truncation" refers to an inferior edge of a contact lens that is designed with a nearly straight line for control over rotational stabilisation of a contact lens.

The term "model eye" may mean a schematic, raytracing, or a physical model eye.

The terms "Diopter", "Dioptre" or "D" as used herein is the unit measure of dioptric power, defined as the reciprocal of the focal distance of a lens or an optical system, in meters, along an optical axis. The term "DS" signifies spherical dioptric power, and the term "DC" signifies cylindrical dioptric power.

The terms "conoid of Sturm" or "interval of Sturm" means the resultant through-focus retinal image formed due to the introduced astigmatism or cylinder power within the optic zone, represented with elliptical blur patterns with sagittal and tangential planes.

The terms "conoid of partial blur" or "interval of partial blur" means the resultant through-focus retinal image formed due to the introduced meridionally and azimuthally variant power distributions within the optic zone, represented with irregular blur patterns with sagittal and tangential planes.

The term "power map" means the two-dimensional power distribution across the optical zone in cartesian or polar coordinates.

The term "back vertex power" means the reciprocal of back vertex focal length over the entire or a specified region over the optical zone, expressed in Dioptres (D).

The terms "SPH" or "Spherical" power means substantially uniform optical power between all meridians of the optic zone.

The terms "CYL", "Cylinder" power means the difference in back vertex powers between the two principal meridians within the optical zone.

The terms "Delta power" means the difference between the maximum and the minimum powers within the pluralities of the meridionally varying power distributions across the optic zone and azimuthally varying power distributions about the optical axis.

The terms or phrases "astigmatic power distribution" or "toric power distribution" may mean that the optical zone has sphero-cylindrical power distribution.

The terms "partial correction" or "partial correction of the eye" mean a correction for the eye in at least one specific region, or at least one meridian, or at least one half-meridian on the retina of the eye.

The term "foveal correction" means a correction for the eye in at least the foveal region on the retina of the eye. The term "sub-foveal region" means the region immediately adjacent to the foveal pit of the retina of an eye. The term "parafoveal region" means the region immediately adjacent to the foveal region of the retina of an eye. The term "sub-macular region" means the region within the macular region of the retina of an eye. The term "paramacular region" means the region immediately adjacent to the macular region of the retina of an eye.

The phrase "rotation assisting features" means a periodic azimuthal thickness distribution with a specific periodicity.

The term "specific fit" means that the non-optical peripheral carrier zone comprises an azimuthal thickness distribution about the optical axis, wherein the azimuthal thickness distribution is configured to be substantially invariant to facilitate substantially free on-eye rotation of the contact lens over time. In some examples, the term "specific fit" includes an azimuthal thickness distribution with rotation assisting features. For the avoidance of doubt, the specific fit referred in this invention means that the non-optical peripheral carrier zone is configured with a thickness profile that is substantially free, or devoid, of any ballast, or prism, or any truncation feature found in standard astigmatic or toric contact lenses of the prior art.

SUMMARY OF THE INVENTION

The detailed discussion on the prior art, and the subject matter of interest in general, is provided here as the background of the present disclosure, to illustrate the context of the disclosed embodiments, and furthermore, to distinguish the advances contemplated by the present disclosure over the prior art. No material presented here should be taken as an acknowledgment that the material mentioned is previously disclosed, known, or part of common general knowledge, on the priority of the various embodiments and/or claims set forth in the present disclosure.

Briefly summarised, all contact lens designs proposed for myopic eyes involve imposition of some level of defocus in the central or peripheral region of the retina. See examples in U.S. Pat. Nos. 6,045,578, 7,025,460, 7,506,983, 7,401, 922, 7,997,725, 7,803,153, 8,690,319, 8,931,897, 8,950,860, 8,998,408, and 9,535,263. The designs of prior art are predominantly aimed at managing myopia with no, or low, magnitudes of astigmatism. Further, although some designs demonstrate an initial burst of treatment or efficacy against progression of myopia, the observed therapeutic benefit is often subdued and fades over time. Accordingly, to advance the field, a lens that caters for myopia, both with and without astigmatism, while offering a stable therapeutic benefit over time is desired. More specifically, a lens that can minimise, attenuate, or eliminate the fading, waning, declining, diminishing, dwindling, or weakening of the therapeutic benefit over time would result in a greater cumulative absolute reduction in axial elongation for a myopic wearer.

This disclosure relates to a contact lens for managing a myopic eye; wherein the contact lens is configured with an optic zone defined substantially about its optical axis, the optic zone is characterised using one or more meridionally and azimuthally variant power distributions, wherein at least one of the meridionally and azimuthally variant power distribution is devoid of mirror symmetry, resulting at least in part, in a foveal correction of the myopic eye and, at least in part, resulting in a conoid of partial blur at the retina of the myopic eye, serving as a directional cue or an optical stop signal; and a non-optical peripheral carrier zone about the optic zone configured with one or more azimuthal thickness distributions; wherein at least one of the azimuthal thickness distribution is substantially invariant to allow for substantially free on-eye rotation to further provide temporally and spatially varying directional cues or optical stop signals to decelerate, ameliorate, control, inhibit, or reduce the rate of myopia progression and maintain the therapeutic benefit substantially constant over time.

In some embodiment of the disclosure, the myopic eye may be a myopic astigmatic eye. In some embodiments, the one or more of the azimuthal thickness profiles may be configured with or without rotation assisting features. In some embodiments, the rotation assisting features further comprises a periodic thickness distribution about the optical axis with a desired periodicity.

Certain embodiments are directed to contact lenses for altering the wavefront properties of incoming light entering a human eye aimed to correct myopia and simultaneously provide a signal that discourages further eye growth.

Certain embodiments are directed to contact lenses for correcting and treating refractive errors, especially myopia, myopia with astigmatism, progressive myopia, or progressive myopia with astigmatism.

In accordance with certain embodiments, the contact lenses of the present disclosure overcome the limitations of the prior art by minimising significant variations that may occur in the visual performance in individuals with myopia with astigmatism.

In accordance with certain embodiments, the contact lenses of the present disclosure are directed to minimise the fading, waning, declining, diminishing, dwindling, or weakening effects on the potency of the treatment and/or potency of the efficacy of myopia management, potency of myopia control, or the treatment effect on progressive myopia, with and without astigmatism, via the introduction of a spatially and temporally varying optical stimulus or directional, without the need of burdening the wearer to switch between different lenses that may offer pulsation of the treatment.

In accordance with certain other embodiments, the introduction of the spatially and temporally varying optical stimulus described here is facilitated by use of a non-optical peripheral carrier zone configured without any dedicated stabilisation platform that are used in the astigmatic or toric lenses of prior art. For avoidance of doubt, the lenses of the current disclosure are free of any kind of stabilisation platforms, including but not limited to a ballast, slab-off, truncation, or similar. Instead, the non-optical peripheral carrier zone of the current disclosure is configured with a substantially invariant azimuthal thickness distribution, with or without assisted rotation features, allowing substantially free rotation that predisposes the contact lens for an increased on-eye rotation of the contact lens.

In accordance with the present disclosure, certain other embodiments are directed to a contact lens for a myopic eye, with or without astigmatism, wherein the contact lens is characterised by a front surface, a back surface, an optical centre, an optical zone around the optical centre, a blending zone, a non-optical peripheral carrier zone around the optical zone; the optical zone characterised by a plurality of meridionally and azimuthally variant power distributions, wherein at least one of the meridionally and azimuthally variant power distributions is devoid of mirror symmetry, and wherein the optic zone, at least in part provides foveal correction and at least in part produces an interval of partial blur on at least a regional part of the retina of the myopic eye, serving as an optical stop signal for the myopic eye; wherein the non-optical peripheral carrier zone is configured to be substantially without any dedicated stabilisation, to facilitate a substantially free rotation of the contact lens on the myopic eye, which offers a continuously changing, or spatially and temporally varying, optical stop signal, on the central and/or peripheral retina of the myopic eye with or without astigmatism.

In some embodiments, the spatially and temporally varying optical stop signal or directional cue includes introduction of a conoid or interval of partial blur. The introduction of the conoid of partial blur may be within sub-foveal, foveal, macular, or para-macular region.

This disclosure postulates that a continuously varying optical stop signal or directional cues at the retina of the myopic eye may facilitate to curtail the weakening effects on the potency and/or efficacy of myopia management.

Certain embodiments are configured with power maps characterised with a plurality of meridionally and azimuthally variant power distributions within the optic zone, wherein only one of the pluralities of the meridionally variant power distributions is configured with mirror symmetry, and none of the azimuthally variant power distributions are configured with mirror symmetry.

Certain other embodiments are configured with power maps characterised with a plurality of meridionally and azimuthally variant power distributions within the optic zone, which are aimed to further overcome minimising the significant variations in the visual performance due to contact lens rotation that may occur in individuals with myopia with significant magnitudes of astigmatism, for example −0.75 DC, −1.00 DC, −1.25 DC, −1.50 DC, −1.75 DC or −2 DC.

Certain other embodiments are configured with power maps that provide, at least, a partial correction for the myopic eye, and at least in part, provide a conoid of partial blur on the retina serving as a directional cue to curtail the rate of progression of myopia.

The non-optical peripheral carrier zone of some embodiments are configured with a plurality of azimuthal thickness distributions such that the plurality of azimuthal thickness distributions, defined with a desired width spanning a range of arbitrary radial distances in the non-optical peripheral carrier zone, are configured invariant to facilitate free on-eye rotation. In some examples, the desired width spanning a range of arbitrary radial distances in the non-optical peripheral carrier zone may be between 4 mm and 6 mm, 4 mm and 7.5 mm, 4.5 mm and 6.5 mm, 4.25 mm and 7 mm, or 4.5 mm and 7.25 mm.

Certain other embodiments are configured with meridionally and azimuthally varying power maps within the optic zone in conjunction with azimuthally invariant thickness distributions within the non-optical peripheral carrier zone such that the contact lens may overcome the limitations of the prior art by providing a spatially and temporally varying stop signal, thus allowing for minimisation of weakening, or decline, or diminishing, of efficacy on myopia progression with time.

In some other embodiments of the present disclosure, a blending zone may be configured between the optic zone and non-optical peripheral zone of the contact lens. In other embodiments, the blending zone between the optic zone and non-optical peripheral zone may be configured to be circular, oval, or elliptical in shape; while in other embodiments it may be configured in any other shape.

In some other embodiments of the present disclosure, a blending zone between the optic zone and non-optical peripheral zone may be at least 0.1 mm, 0.25 mm, 0.5 mm, or 0.75 mm, measured on the semi diameter of the contact lens. In some other embodiments of the present disclosure, a blending zone between the optic zone and non-optical peripheral zone may be between 0.05 mm and 0.1 mm, 0.1 mm and 0.25 mm, 0.1 mm and 0.5 mm, 0.25 mm and 0.75 mm, measured on the semi diameter of the contact lens.

Another embodiment of the present disclosure is directed to a contact lens for at least one of slowing, retarding, or preventing myopia progression, the contact lens comprising a front surface, a back surface, an optic zone, an optical centre about the optic zone, a non-optical peripheral zone about the optic zone, the optical zone configured with a power map characterised by one or more meridionally and azimuthally variant power distributions, wherein at least one of the meridionally and azimuthally variant power distribution is configured to be devoid of mirror symmetry, wherein the power map provides a myopic eye or a myopic astigmatic eye, at least in part, adequate foveal correction, and is further configured to provide to the myopic eye or the myopic astigmatic eye, at least in part, at least a regional conoid or interval of partial blur, serving as an optical stop signal or a directional cue on the central and/or peripheral retina; the non-optical peripheral carrier zone is further configured with rotational assisting features including an azimuthal thickness variation following a periodic function and a periodicity; wherein the periodic function includes a saw-tooth profile, a sinusoidal profile, a sum of sinusoidal profiles, or quasi-sinusoidal profile, and the periodicity is no less than 6 variations across 360° azimuth, i.e. from 0 to $2\pi$ radians; wherein the rotational assisting features facilitates an increased predisposition for on-eye rotation of the contact lens such that a continuously changing, spatially and temporally varying, optical stop signal provides a consistent therapeutic benefit over time for the myopic eye, or the astigmatic myopic eye.

In some embodiments, the periodicity may be configured such that it is no less than 6 variations across 180° azimuth, i.e., from 0 to $\pi$ radians. In some embodiments, the periodic functions may be arranged differently for lenses that suits right eyes and left eyes, taking into account the position of eye lids, action and direction of force acting on the lens due to the eye lids of a wearer.

In some embodiments the power distribution within the optic zone may be configured both meridionally and azimuthally variant but radially invariant, wherein the power distribution along the radial direction remains substantially the same. In some other embodiments the power distribution within the optic zone may be configured both meridionally and azimuthally variant and also radially variant, wherein the power distribution along the radial direction is substantially non-uniform.

In other embodiments, the meridional variation is such that the power distribution is substantially devoid of mirror symmetry about the optical axis. In other embodiments, the azimuthal variation is such that the power distribution is substantially devoid of mirror symmetry about the optical axis. In some variants of the embodiments of the disclosure, only one of the pluralities of the meridionally variant power distributions is configured symmetric and none of the azimuthally varying distributions are configured symmetric.

In some other embodiments, the power distribution within the optic zone may be configured both meridionally and azimuthally variant and also radially variant, wherein the power distribution along the radial direction may be such that it decreases from the centre of the optic zone to the margin of the optical zone and the power distribution along the azimuthal direction may be such that it decreases or increases from 0 to $2\pi$ radians. In some embodiments, the decrease in power distribution along the radial direction may be described using linear, curvilinear, or quadratic functions.

In certain other embodiments, the decrease in power distribution along the radial direction may be different for different azimuthal positions on the optic zone.

In other embodiments, the decrease in power distribution along the azimuthal direction may follow a cosine distribution with reduced frequency, for example, one-sixth (⅙), one-fifth (⅕), one-fourth (¼), one-third (⅓), or half (½) of the normal frequency, which is generally defined with two cosine cycles over 360° or $2\pi$ radians. In other embodiments, the decrease or increase in power distribution along the azimuthal direction may be different for different radial positions on the optic zone.

In accordance with one of the embodiments, the present disclosure is directed to a contact lens for a myopic eye with or without astigmatism. The contact lens comprising a front surface, a back surface, an optic zone with an optical axis, a plurality of meridionally and azimuthally variant power distributions about the optical axis, wherein at least one of the meridionally and azimuthally variant power distributions is configured to provide, at least in part, an adequate correction for the myopic eye with or without astigmatism, and is further configured to provide, at least in part, a temporally and spatially varying stop signal; such that the treatment efficacy to reduce the rate of myopia progression remains substantially consistent over time.

Certain embodiments are directed to contact lenses for at least one of slowing, retarding, or preventing myopia progression, the contact lens comprising: a front surface; a back surface; an optical centre; an optical axis; an optical zone around the optical centre, the optical zone comprises at least a power map; wherein the power map is further characterised by a plurality of meridional power distributions across the optic zone, and a plurality of azimuthal power distributions about the optical axis; wherein at least one of the azimuthal power distributions is configured to be at least partially variant, and at least one of the meridional power distributions are configured to be at least partially variant; and wherein the at least one of the partially variant azimuthal distributions is configured to be devoid of mirror symmetry and the at least one of the partially variant meridional distributions is configured to be devoid of mirror symmetry; and a non-optical peripheral carrier zone about the optical zone, wherein the non-optical peripheral carrier zone comprises one or more azimuthal thickness distributions about the optical axis; wherein the one or more azimuthal thickness distribution is configured to be substantially invariant to facilitate a specific fit on the eye.

Certain embodiments are directed to contact lenses for at least one of slowing, retarding, or preventing myopia progression, the contact lens comprising a power map within the optic zone characterised by a pluralities of meridionally and azimuthally varying power distributions, wherein the pluralities of meridionally and azimuthally varying power distributions result in a delta power within the optic zone, described as the difference between the maximum and minimum of the optical power variations occurring within the optic zone.

Certain embodiments of the present disclosure are directed to contact lenses; wherein the delta power within the power map is at least +1.25 D, at least +1.5 D, at least +1.75 D, at least +2 D, at least +2.25 D, at least +2.5 D, or at least +2.75 D.

In some embodiments of the present disclosure; the delta power within the power map is between 0.5D and 3.5D, 0.75D and 3D, 1D and 2.5D, 1.25D and 2.25D, 1.25D and 1.75D or 1.2D and 2.75D.

In some embodiments of the disclosure, the power map is at least 40%, 50%, 60%, 70%, 80%, 90%, 95% or 100% of the optical zone, while the remainder of the optic zone is configured with substantially spherical correction for the myopic eye.

In some embodiments of the disclosure, the power map is at least 40%, 50%, 60%, 70%, 80%, 90%, 95% or 100% of the optical zone, while the remainder of the optic zone is configured with substantially astigmatic correction for the myopic eye.

In some embodiments, the power map spans at least 3 mm, 4 mm, 5 mm, 6 mm, or 8 mm of the central region of the optical zone. In some other embodiments, the power map may be achieved using the anterior, posterior or both surfaces of the contact lens. In other embodiments, the at least one of the partially variant meridional distributions may be configured to be radially variant or invariant.

Certain embodiments of the present disclosure are directed to contact lenses; wherein the non-optical peripheral carrier zone of the contact lens comprising thickness distributions defined within a selected region along one or more half-meridians are substantially invariant. Wherein the substantial invariance means a variation in thickness distribution along any half-meridian is less than 3%, 5% or 8% of any other half-meridians. The thickness profiles of the contact lenses across the half-meridians may be obtained by using perpendiculars drawn from the tangents at each point on the back surface of the contact lens to the front surface of the contact lens.

Certain embodiments of the present disclosure are directed to contact lenses; wherein the substantial invariance in the thickness distribution is configured such that a thickest point within the non-optical peripheral carrier zone across any one of the half-meridians is within a maximum variation of 5 μm, 10 μm, 15 μm, 20 μm, 25 μm, 30 μm, 35 μm, 40 μm, or 45 μm of the thickest peripheral point of any other half-meridian within the non-optical peripheral carrier zone. Certain embodiments of the present disclosure are directed to contact lenses; wherein the non-optical peripheral carrier zone comprising one or more azimuthal thickness distributions about the optical axis, defined at an arbitrary radial distance in the non-optical peripheral carrier zone, that are substantially invariant. Wherein the substantial invariance means a variation in azimuthal thickness distribution that has a peak-to-valley between 5 μm and 45 μm, or between 10 μm and 45 μm or between 1 μm and 45 μm.

Certain embodiments of the present disclosure are directed to contact lenses; wherein the power map, at least in part, provides a foveal correction for the myopic eye, and at least in part, produces at least a regional conoid, or interval, of partial blur as a directional cue at the retina of the myopic eye. Further, the specific fit offers a temporally and spatially varying stop signal for the myopic eye to substantially control eye growth of the myopic eye.

Certain embodiments of the present disclosure are directed to contact lenses; wherein the specific fit allows a substantially free rotation on the eye; wherein the substantially free rotation is gauged as a rotation of the lens by 180 degrees at least thrice per 8 hours of lens wear, and at least 15 degrees within 1 hour of lens wear. In some other embodiments, wherein the substantially free rotation is gauged as a rotation of the lens by 180 degrees at least thrice per 12 hours of lens wear, and at least 15 degrees within 2 hours of lens wear Certain embodiments of the present disclosure are directed to contact lenses; wherein the specific fit includes azimuthal thickness distribution that is configured with at least one rotation assisting feature; wherein the at least one rotation assisting feature comprises an azimuthal thickness distribution that is represented using a periodic function with a periodicity; wherein the periodic function is a saw-tooth profile, a sinusoidal profile, a sum of sinusoidal profiles, or a quasi-sinusoidal profile and the periodicity of the periodic function is no less than 6 across 360° azimuth, from 0 to 2π and the rate of thickness change is different for the increase than for the decrease; where the maximum thickness variation within the at least one rotation assisting feature is between 5 μm to 40 μm.

Certain embodiments of the present disclosure are directed to contact lenses; wherein the at least one rotation assisting feature of the contact lens allows for increased rotation of the contact lens on the myopic eye, gauged as a rotation of the contact lens by 180 degrees at least thrice per 4 hours of lens wear, and at least 15 degrees within 30 minutes of lens wear.

In some examples, the contact lenses of the present disclosure may be configured such that at least one rotation assisting feature is configured to increase rotation on the eye and in combination with the at least partially variant meridional and azimuthal power distribution, the lens offers a temporally and spatially varying stop signal for the myopic eye such that the efficacy of the directional signal remains substantially consistent over time.

Other embodiments presented in this disclosure are directed to the ongoing need for enhanced optical designs and contact lenses that may inhibit the progression of myopia, while providing reasonable and adequate visual performance to the wearer for a range of activities that the wearer may undertake as a daily routine. Various aspects of the embodiments of the present invention disclosure address such needs of a wearer.

Figure 24A:
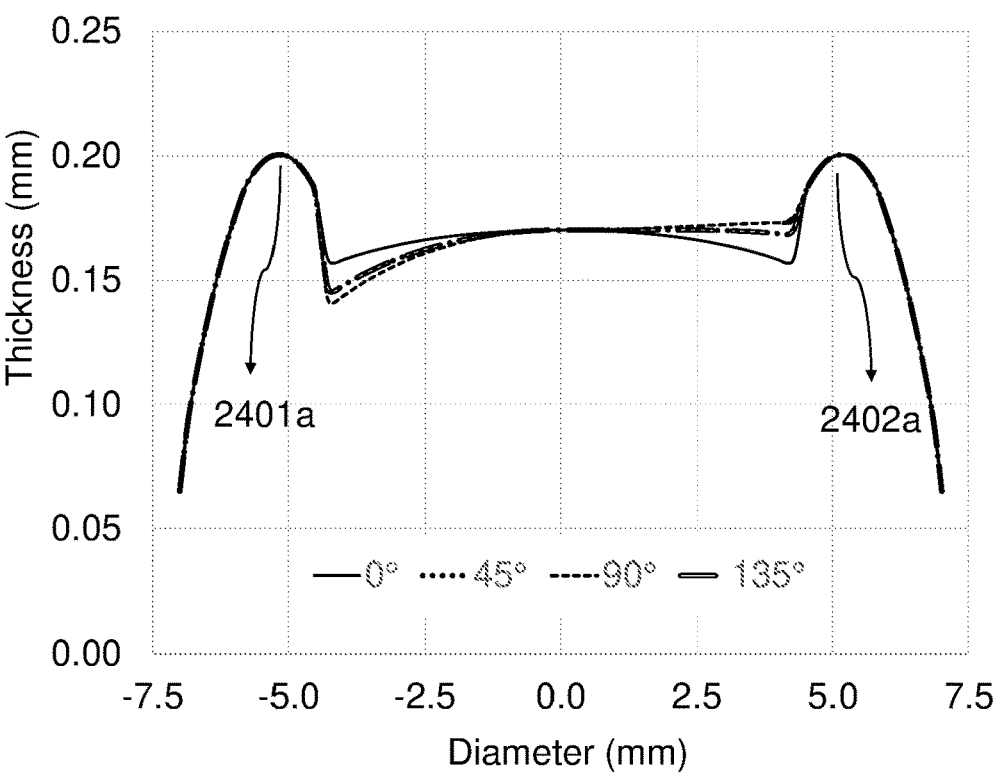
FIG. 24a illustrates the thickness distribution across the whole contact lens of the embodiment described in FIG. 23 with a substantially radially invariant, meridionally and azimuthally variant power distribution along four sample representative meridians, namely 0°, 45°, 90° and 135°.

23 and FIG. 24*a* along four sample radial distances 4.25 mm, 4.75 mm, 5.5 mm, and 6.5 mm within the non-optical peripheral zone.

Figure 23:
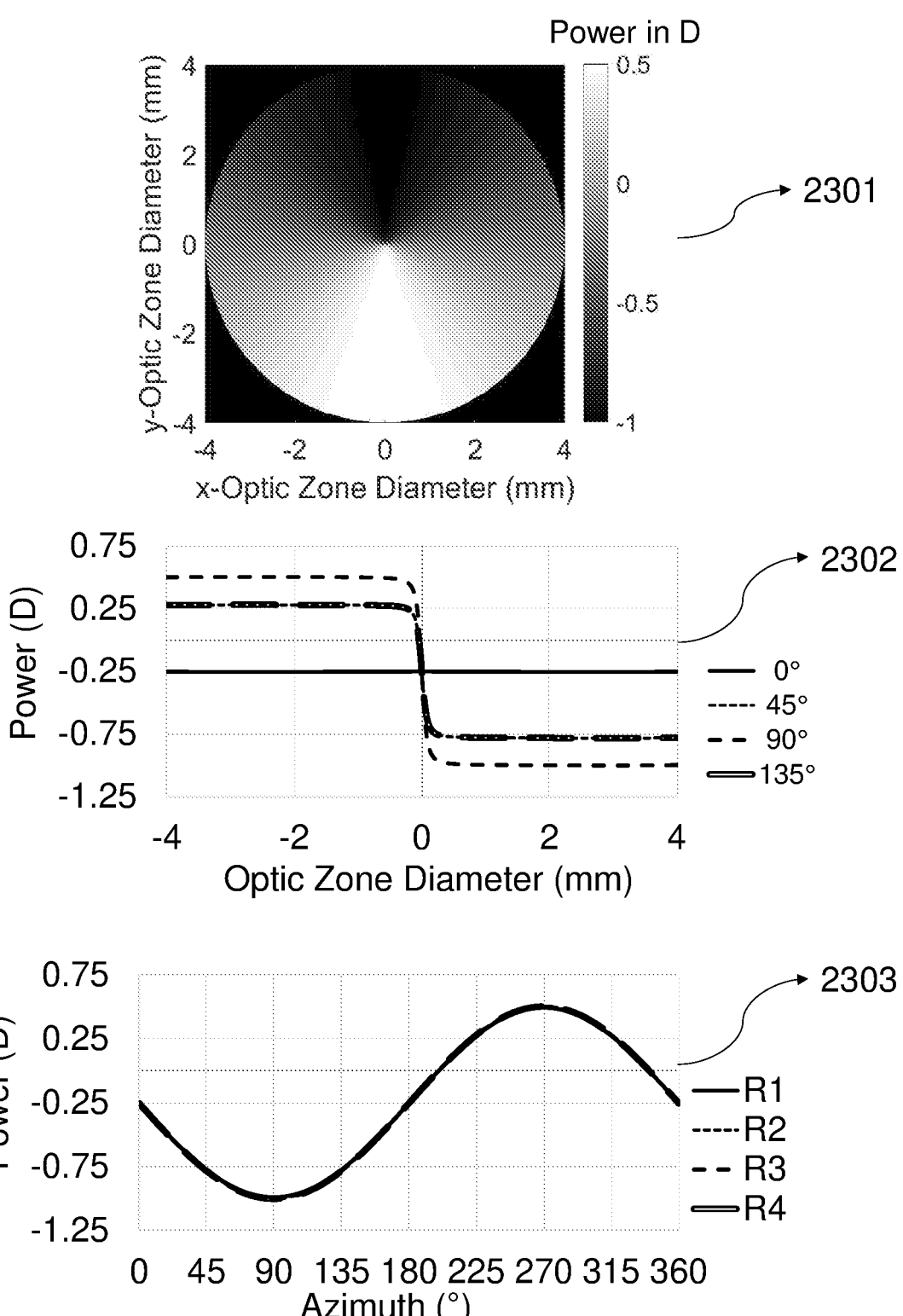
FIG. 23 illustrates the power distribution (i.e., power map, power as a function of optic zone diameter and power as a function of azimuth) within the optical zone of a contact lens embodiment of the present invention with a substantially radially invariant, meridionally and azimuthally variant power distribution (power: −1 DS/+1.5 D, Half-Frequency Cosine Lens (1)).
Figure 24B:
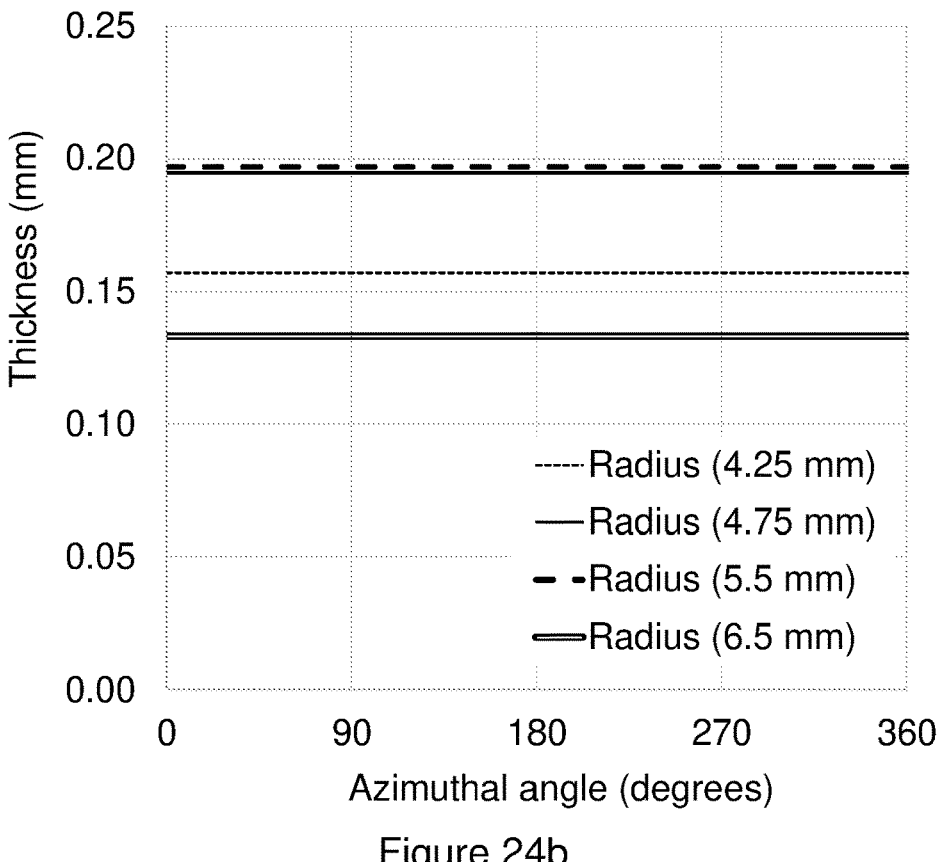
FIG. 24b illustrates the thickness distribution as a function of azimuthal angle of the contact lens described in FIG.
Figure 25:
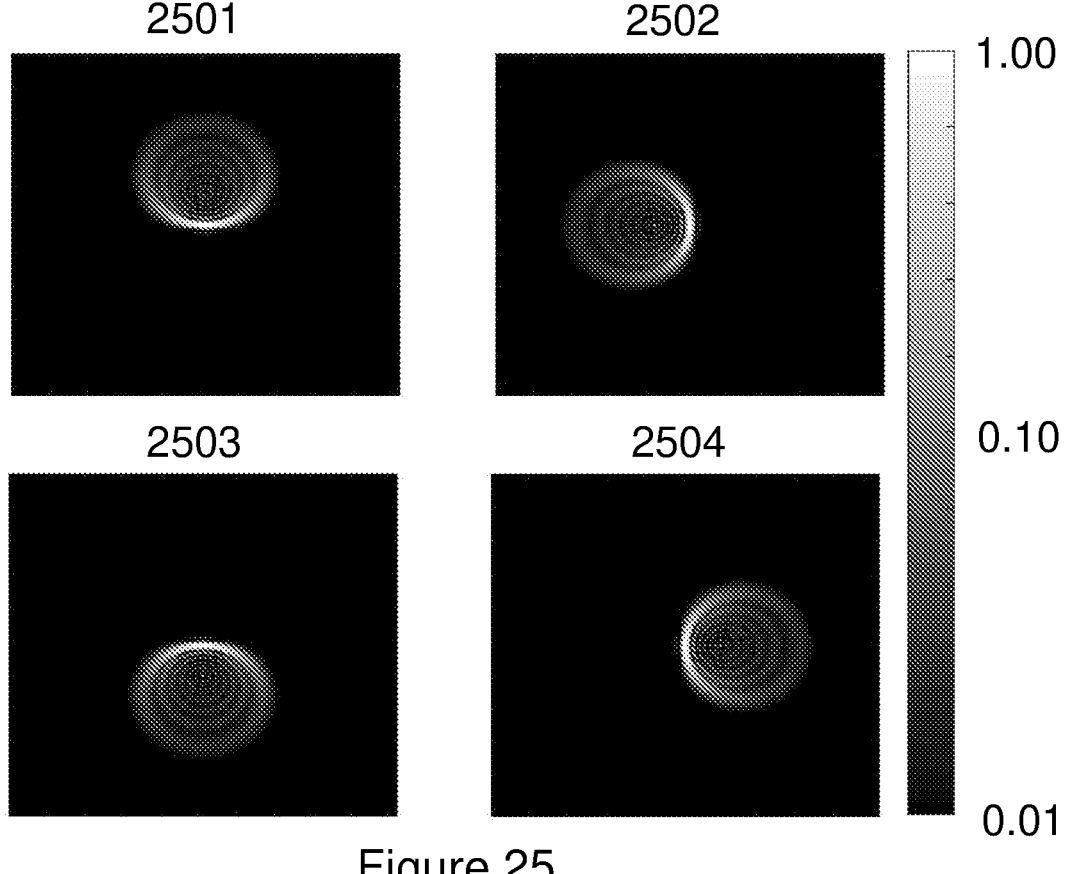

FIG. 25 illustrates the temporally and spatially varying signal due to contact lens rotation (i.e., 0°, 90°, 180° and) 270° depicted as on-axis point spread functions at the retinal plane, when the incoming light with a visible wavelength (589 nm) and a vergence of 0 D, is incident on a model eye with −1 DS of myopia corrected with the contact lens embodiment described in FIGS. 23 and 24.

Figure 26A:
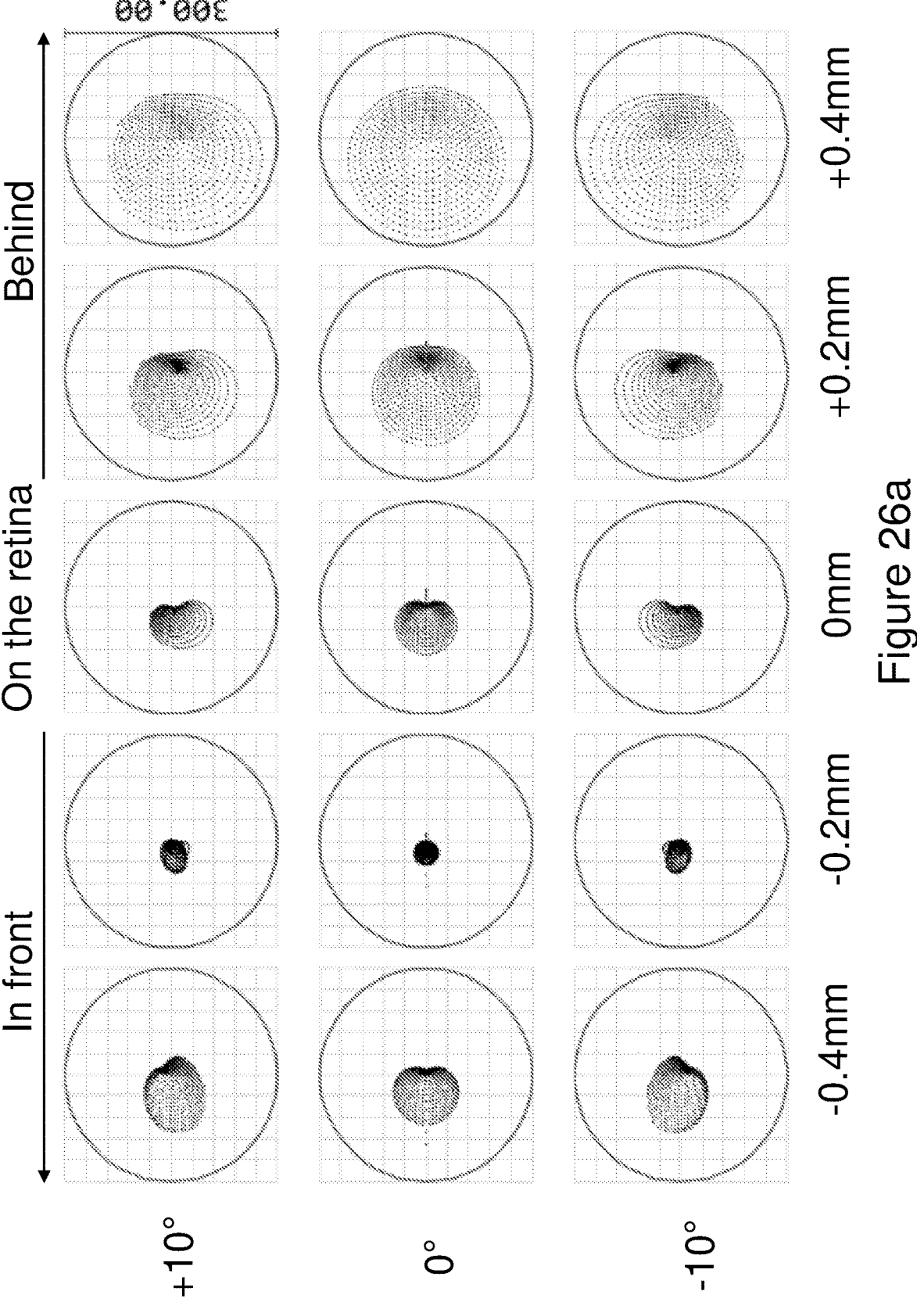
Figure 26B:
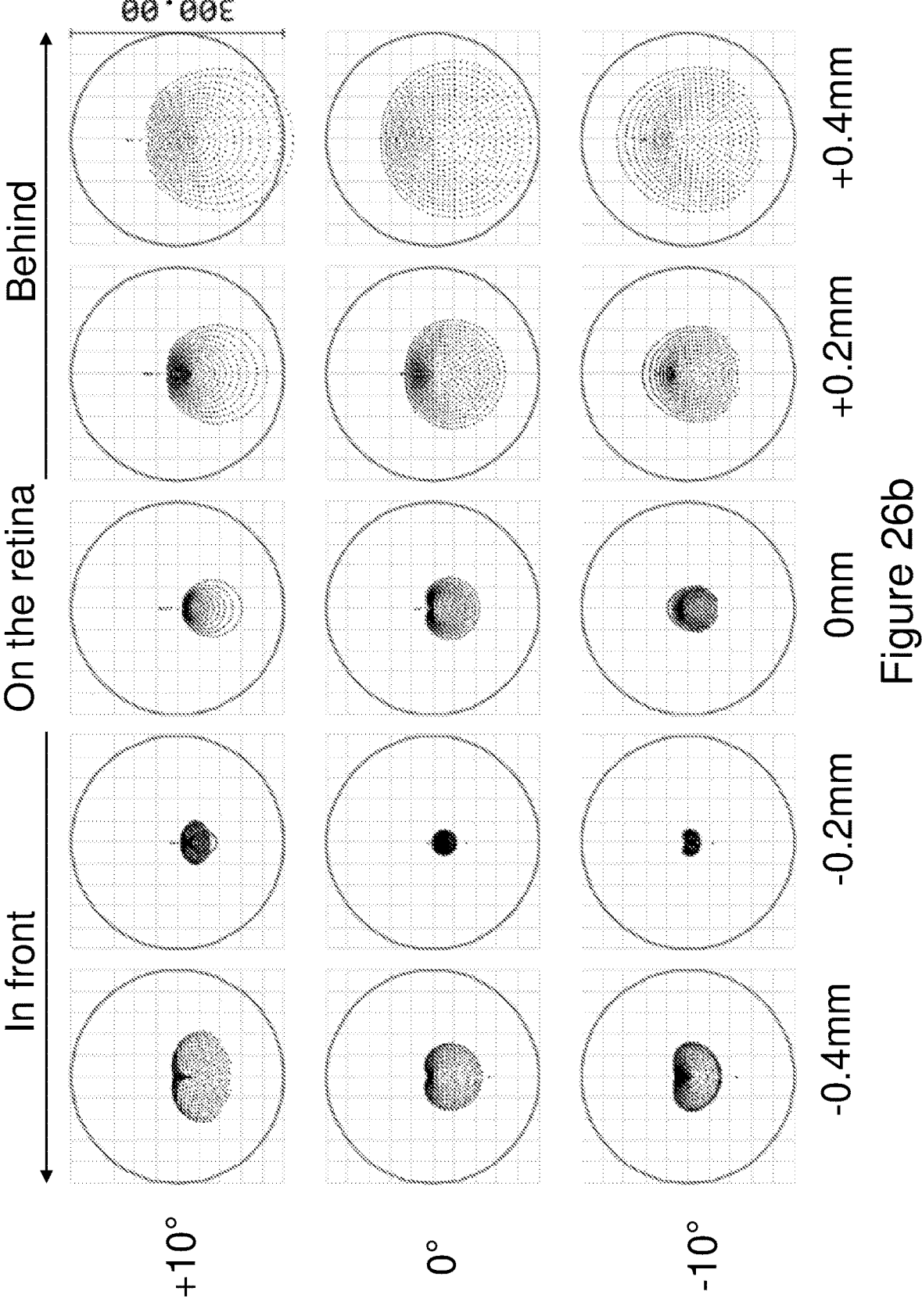

FIGS. 26*a* and 26*b* illustrate the temporally and spatially varying signal due to contact lens rotation (i.e., 90° and) 180° depicted as wide-view through-focus geometric spot analysis, when the incoming light with a visible wavelength (589 nm) and a vergence of 0 D, is incident on a model eye with −1 DS of myopia corrected with the contact lens embodiment described in FIGS. 23 and 24.

Figure 27:
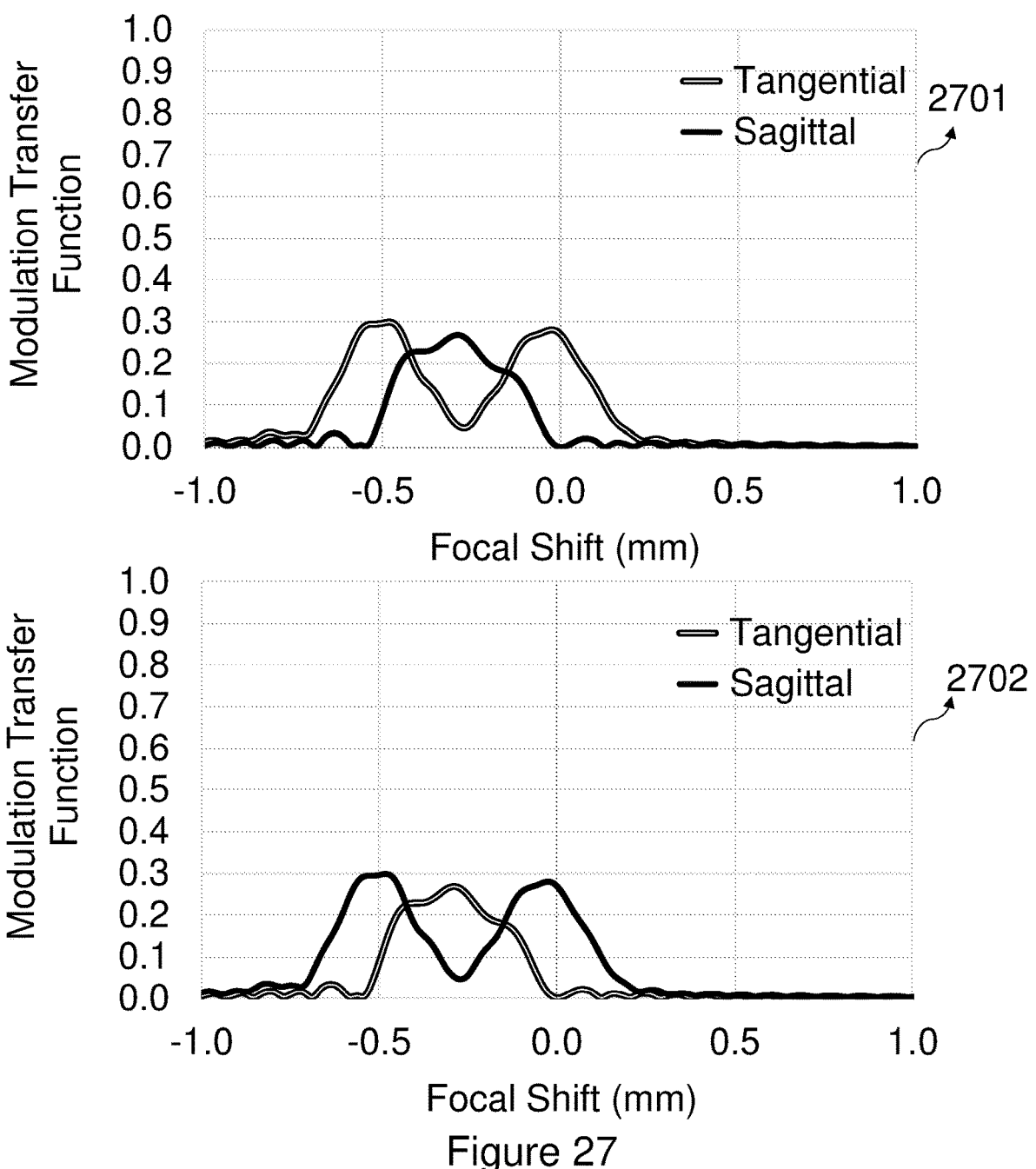

FIG. 27 illustrates the retinal signal (conoid of partial blur) depicted as on-axis, through-focus, modulation transfer function for the tangential and sagittal meridians, which were computed when the incoming light with a visible wavelength (589 nm) and a vergence of 0 D, is incident on a model eye with −1 DS of myopia corrected with the contact lens embodiment described in FIGS. 23 and 24, wherein the meridian with the power of −0.25 D of the contact lens was located at 0° and 90°.

Figure 28:
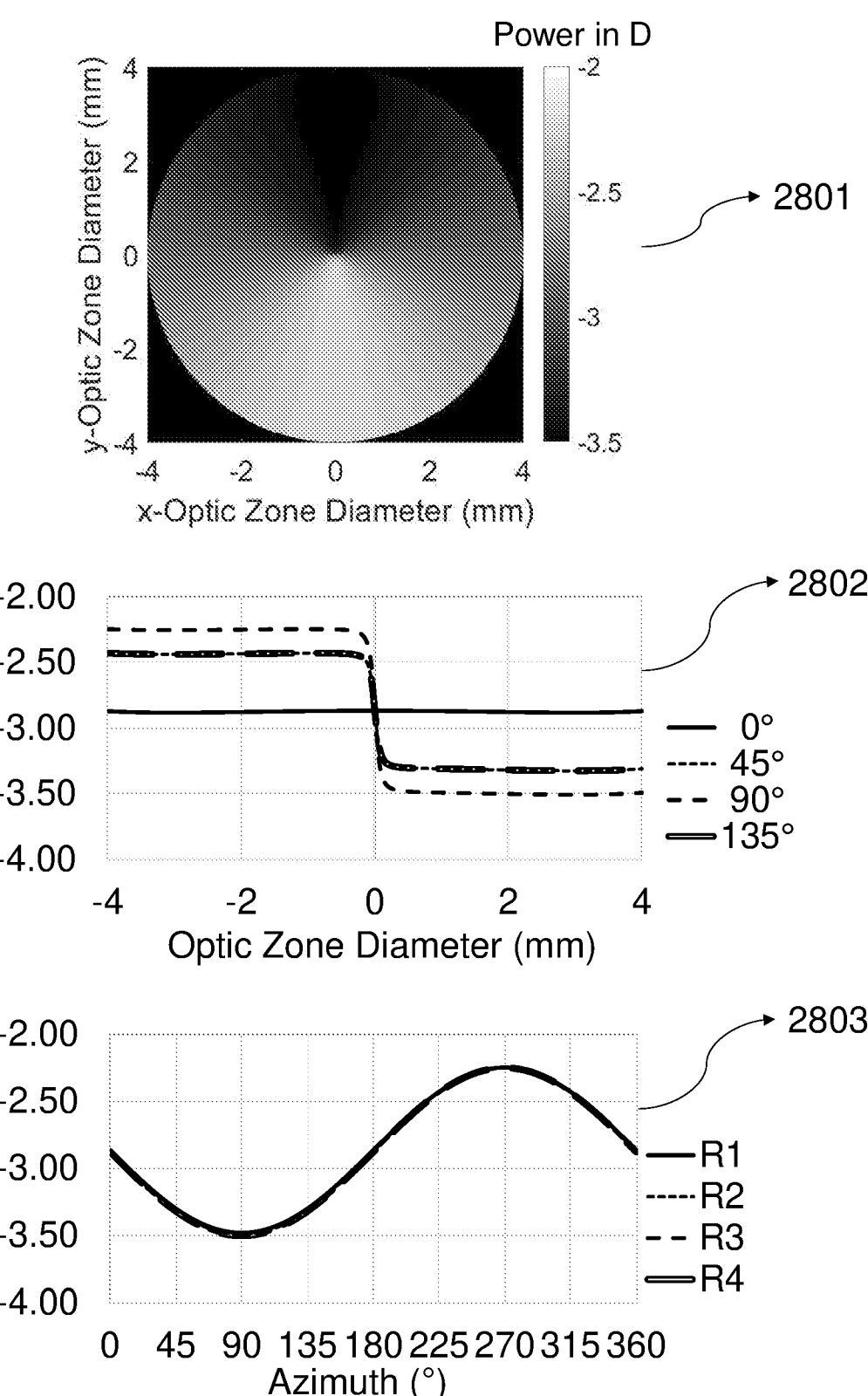

FIG. 28 illustrates the power distribution (i.e., power map, power as a function of optic zone diameter and power as a function of azimuth) within the optical zone of a contact lens embodiment of the present invention with a substantially radially invariant, meridionally and azimuthally variant power distribution (power: −3.5 DS/+1.25 D, Half-Frequency Cosine Lens (2)).

Figure 29A:
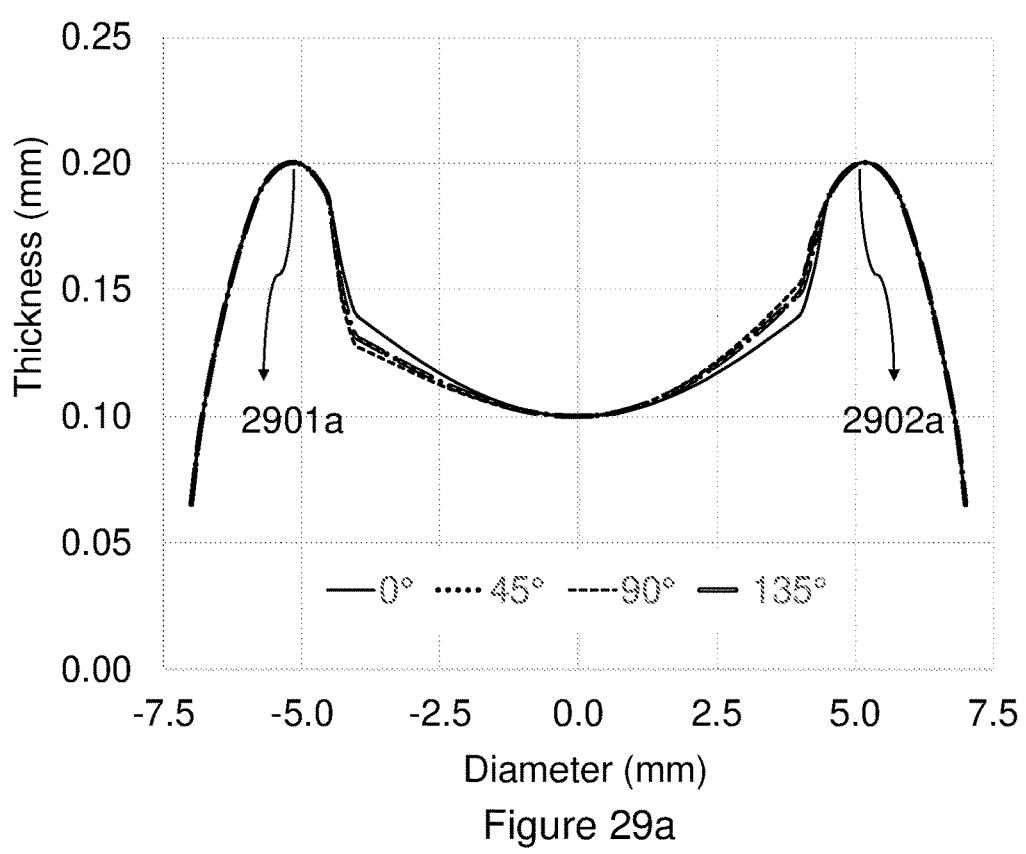

FIG. 29*a* illustrates the thickness distribution across the whole contact lens of the embodiment described in FIG. 28 with a substantially radially invariant, meridionally and azimuthally variant power distribution along four sample representative meridians 0°, 45°, 90° and 135°.

Figure 29B:
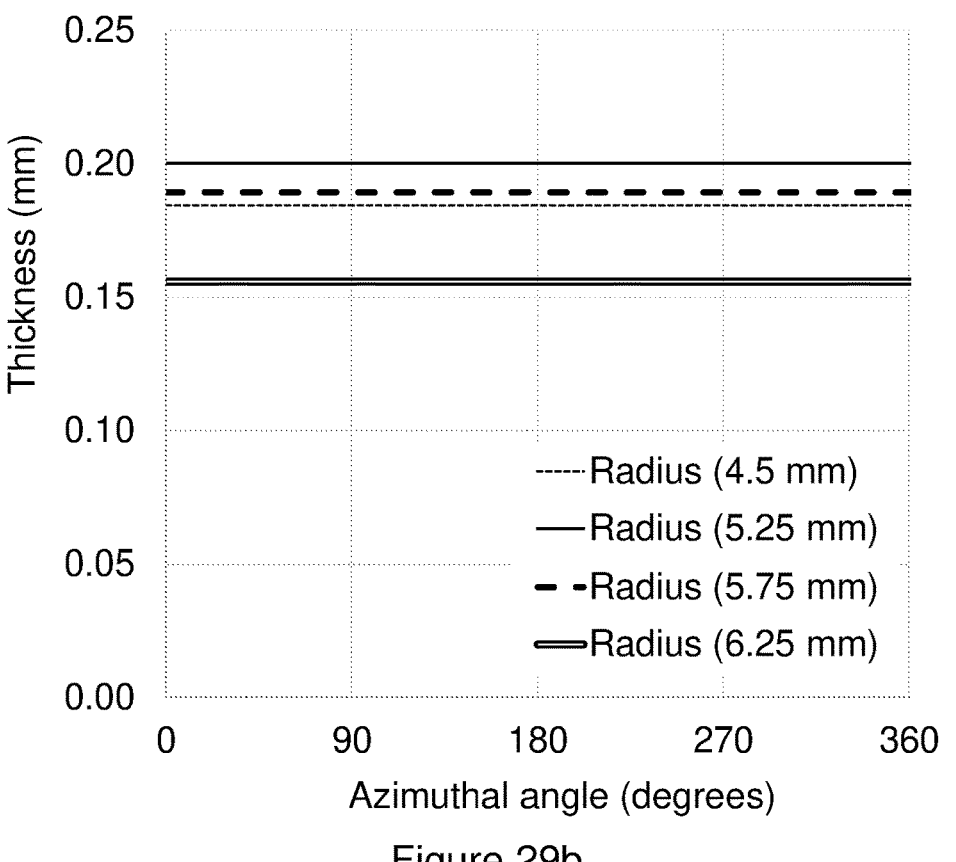

FIG. 29*b* illustrates the thickness distribution as a function of azimuthal angle of the contact lens described in FIG. 28 and FIG. 29*a* along four sample radial distances 4.5 mm, 5.25 mm, 5.75 mm, and 6.25 mm within the non-optical peripheral zone.

Figure 30:
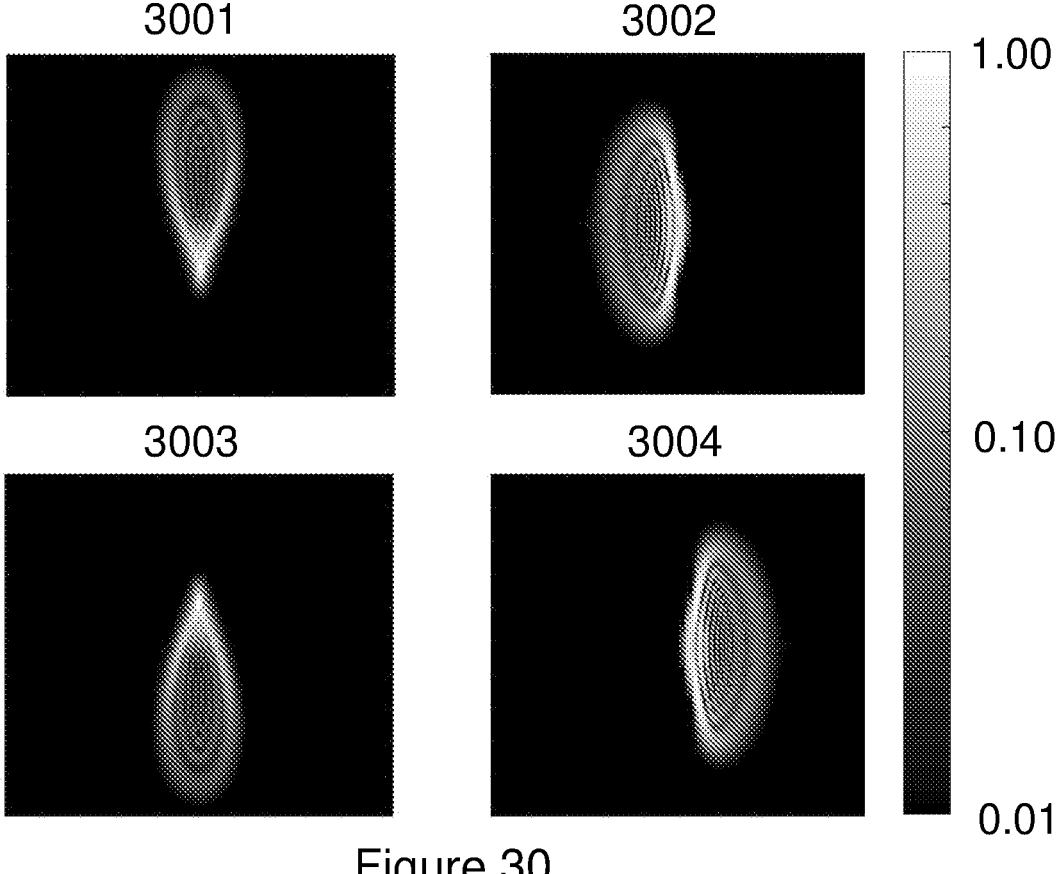

FIG. 30 illustrates the temporally and spatially varying signal due to contact lens rotation (i.e., 0°, 90°, 180° and) 270° depicted as on-axis point spread functions at the retinal plane, when the incoming light with a visible wavelength (589 nm) and a vergence of 0 D, is incident on a model eye with −4 DS of myopia and +1 DC×90° of astigmatism corrected with the exemplary contact lens embodiment described in FIGS. 28 and 29.

Figure 31A:
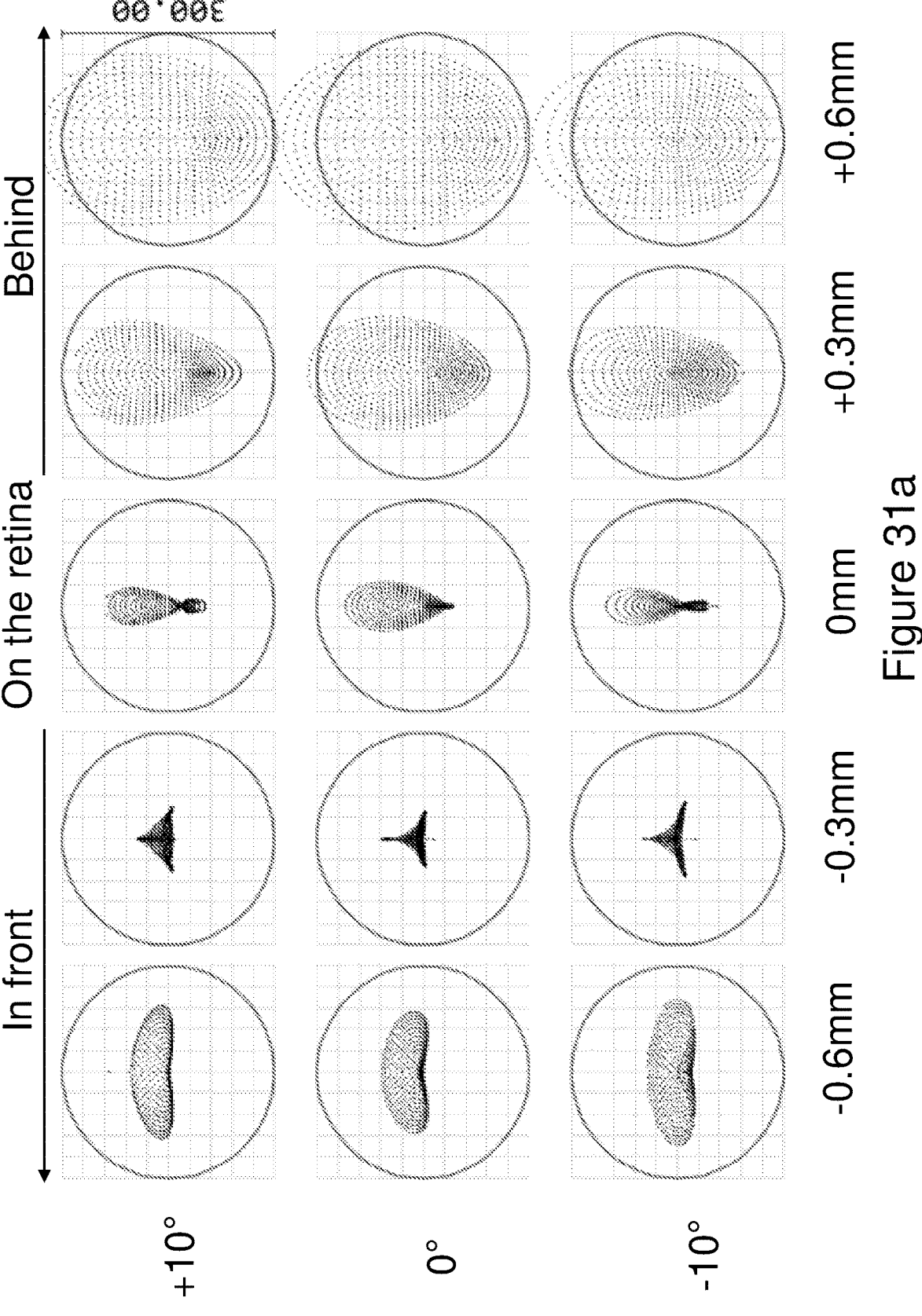
Figure 31B:
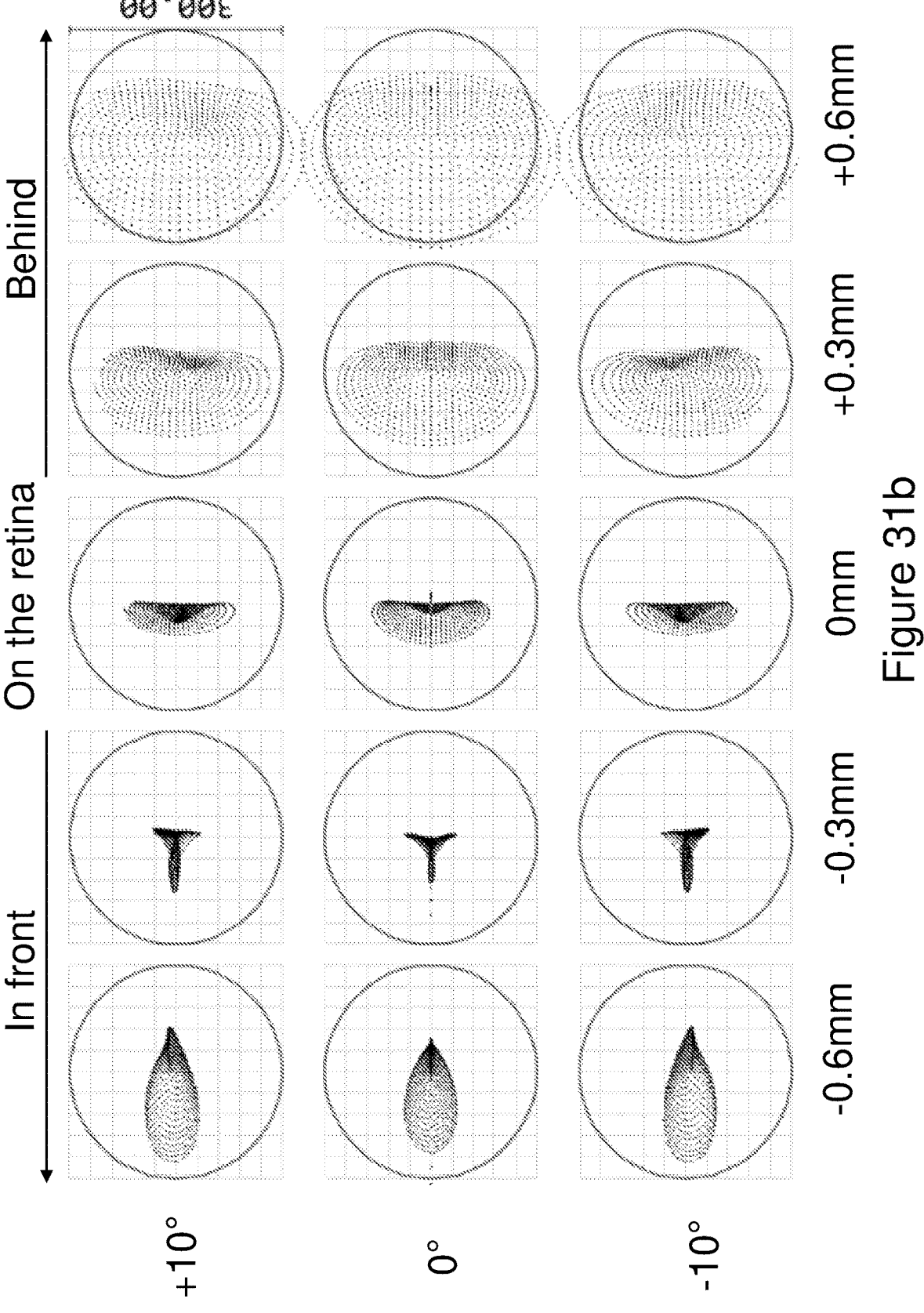

FIGS. 31*a* and 31*b* illustrate the temporally and spatially varying signal due to contact lens rotation (i.e., 0° and) 90° depicted as wide-view through-focus geometric spot analysis, when the incoming light with a visible wavelength (589 nm) and a vergence of 0 D, is incident on a model eye with −4 DS of myopia and +1DC×90° of astigmatism corrected with the contact lens embodiment described in FIGS. 28 and 29.

Figure 32:
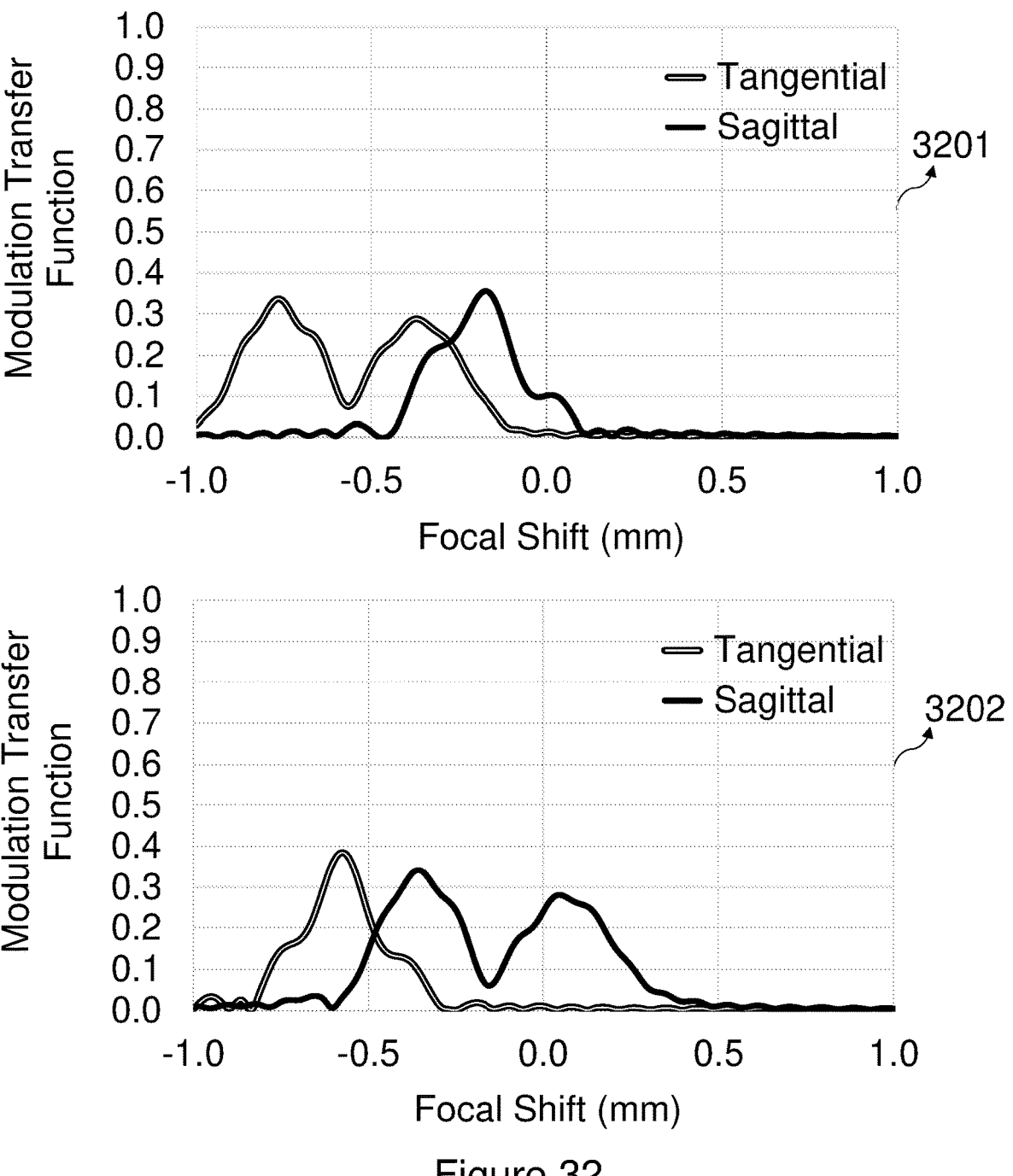

FIG. 32 illustrates the retinal signal (conoid of partial blur) depicted as on-axis, through-focus, modulation transfer function for the tangential and sagittal meridians, which were computed when the incoming light with a visible wavelength (589 nm) and a vergence of 0 D, is incident on a model eye with −4 DS of myopia and +1 DC×90° of astigmatism corrected with the contact lens embodiment described in FIGS. 28 and 29, wherein the meridian with the power of −2.9 D of the contact lens was located at 0° and 90°.

Figure 33:
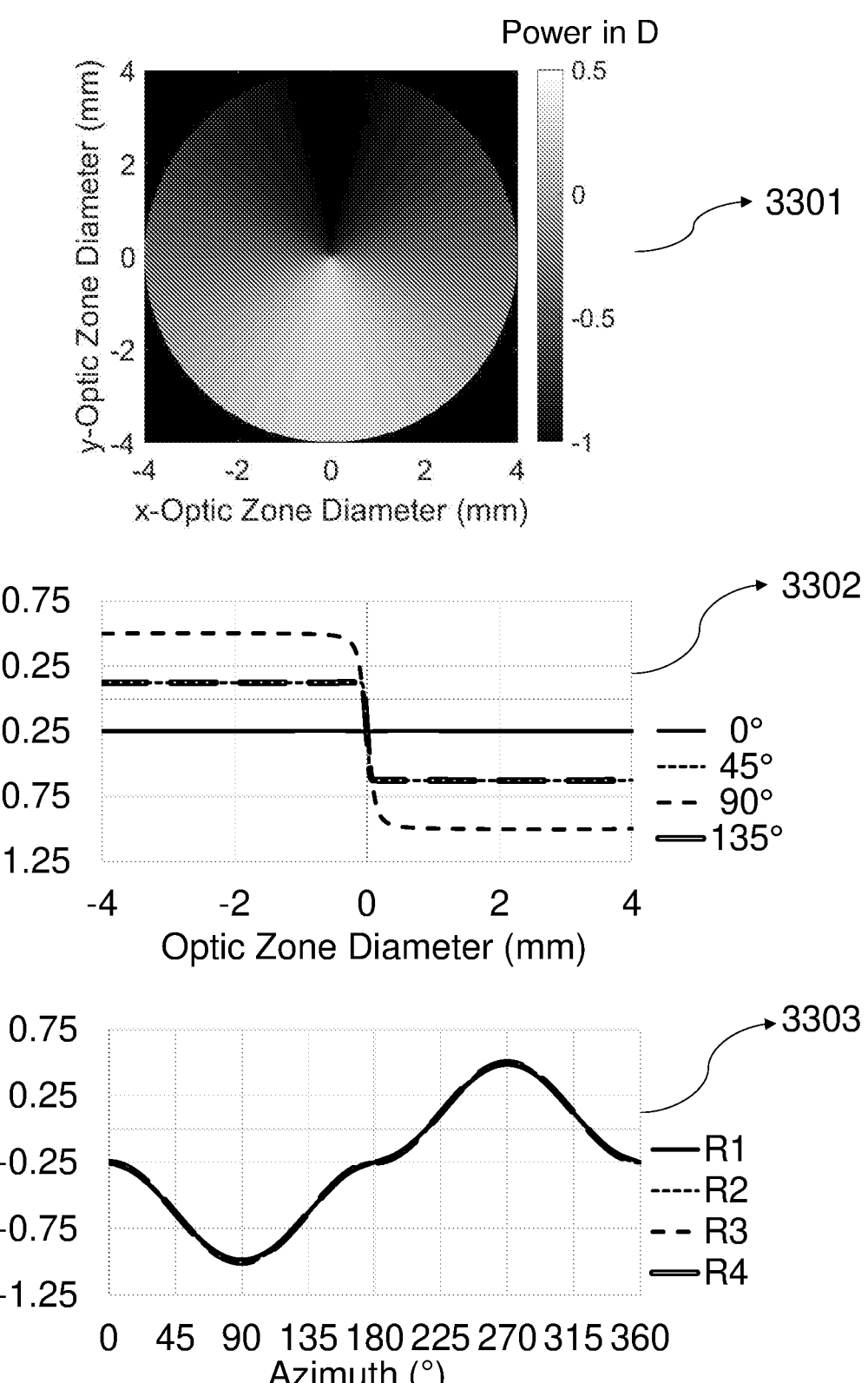

FIG. 33 illustrates the power distribution (i.e., power map, power as a function of optic zone diameter and power as a function of azimuth) within the optical zone of a contact lens embodiment of the present invention with a substantially radially invariant, meridionally and azimuthally variant power distribution (power: −1 DS/+1.5 D, Flipped-Half-Quasi Cosine Lens (1)).

Figure 34A:
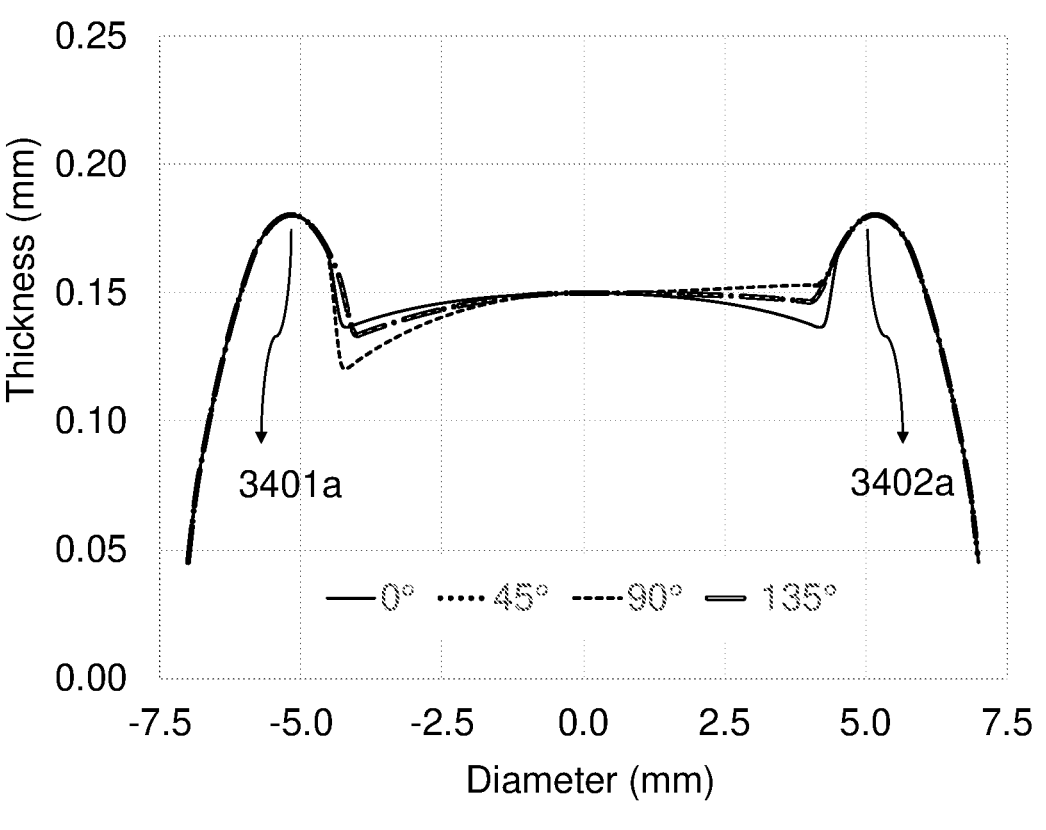

FIG. 34*a* illustrates the thickness distribution across the whole contact lens of the embodiment described in FIG. 33 with a substantially radially invariant, meridionally and azimuthally variant power distribution along four sample representative meridians, namely 0°, 45°, 90° and 135°.

Figure 34B:
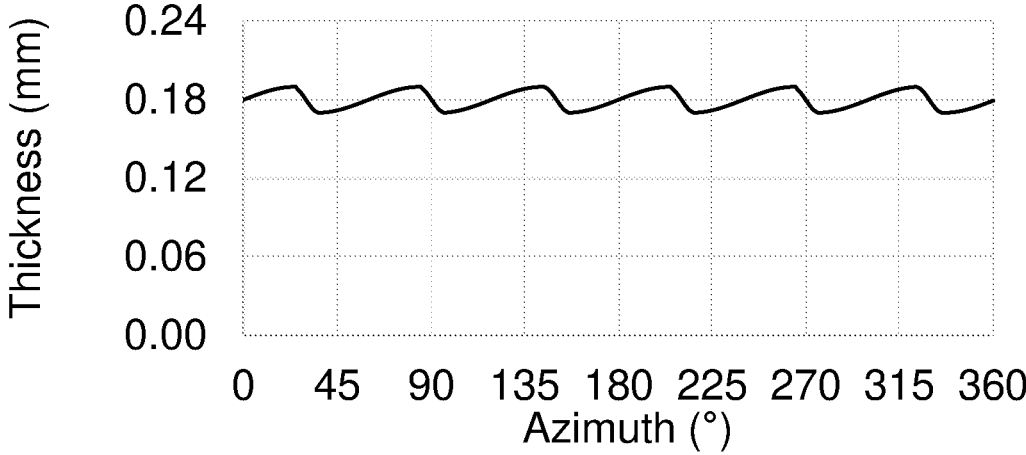

FIG. 34*b* illustrates the thickness distribution as a function of azimuthal angle of the contact lens described in FIG. 33 and FIG. 34*a* along a radial distance of 5.5 mm within the non-optical peripheral zone.

Figure 35:
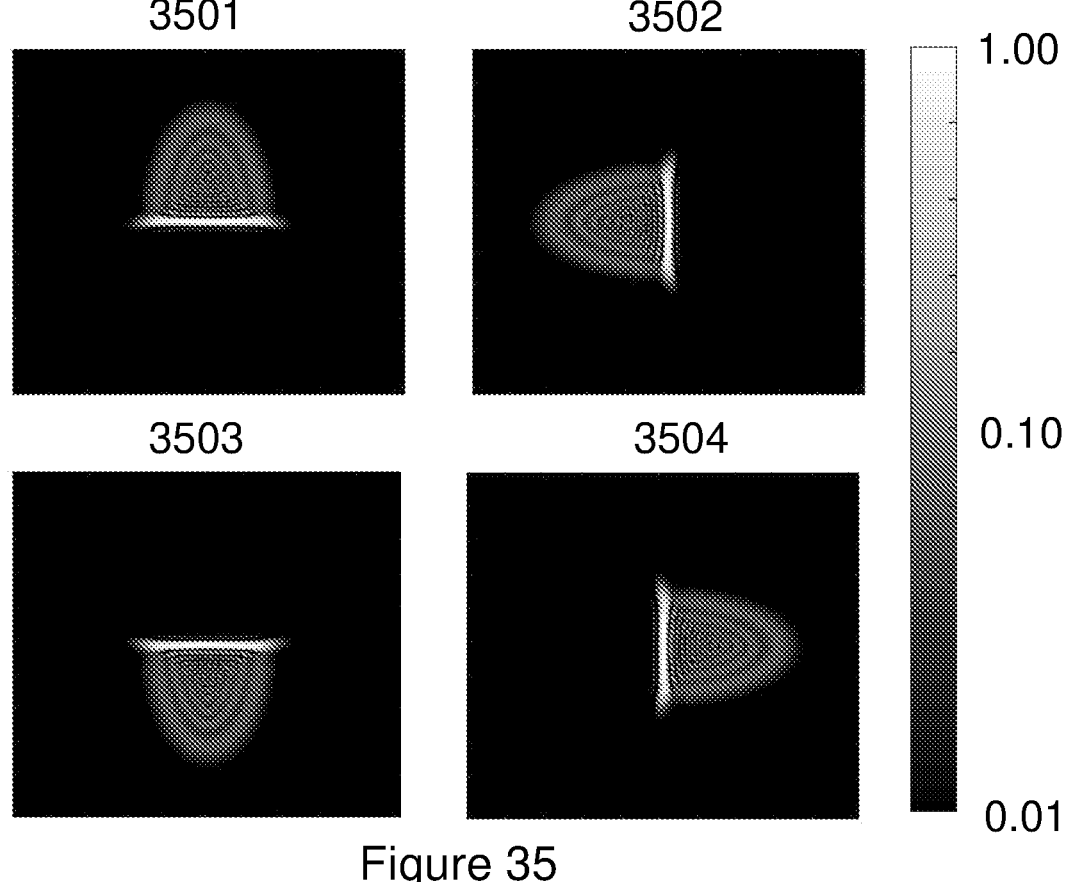

FIG. 35 illustrates the temporally and spatially varying signal due to contact lens rotation (i.e., 0°, 90°, 180° and) 270° depicted as on-axis point spread functions at the retinal plane, when the incoming light with a visible wavelength (589 nm) and a vergence of 0 D, is incident on a model eye with −1 DS of myopia corrected with the contact lens embodiment described in FIGS. 33 and 34.

Figure 36A:
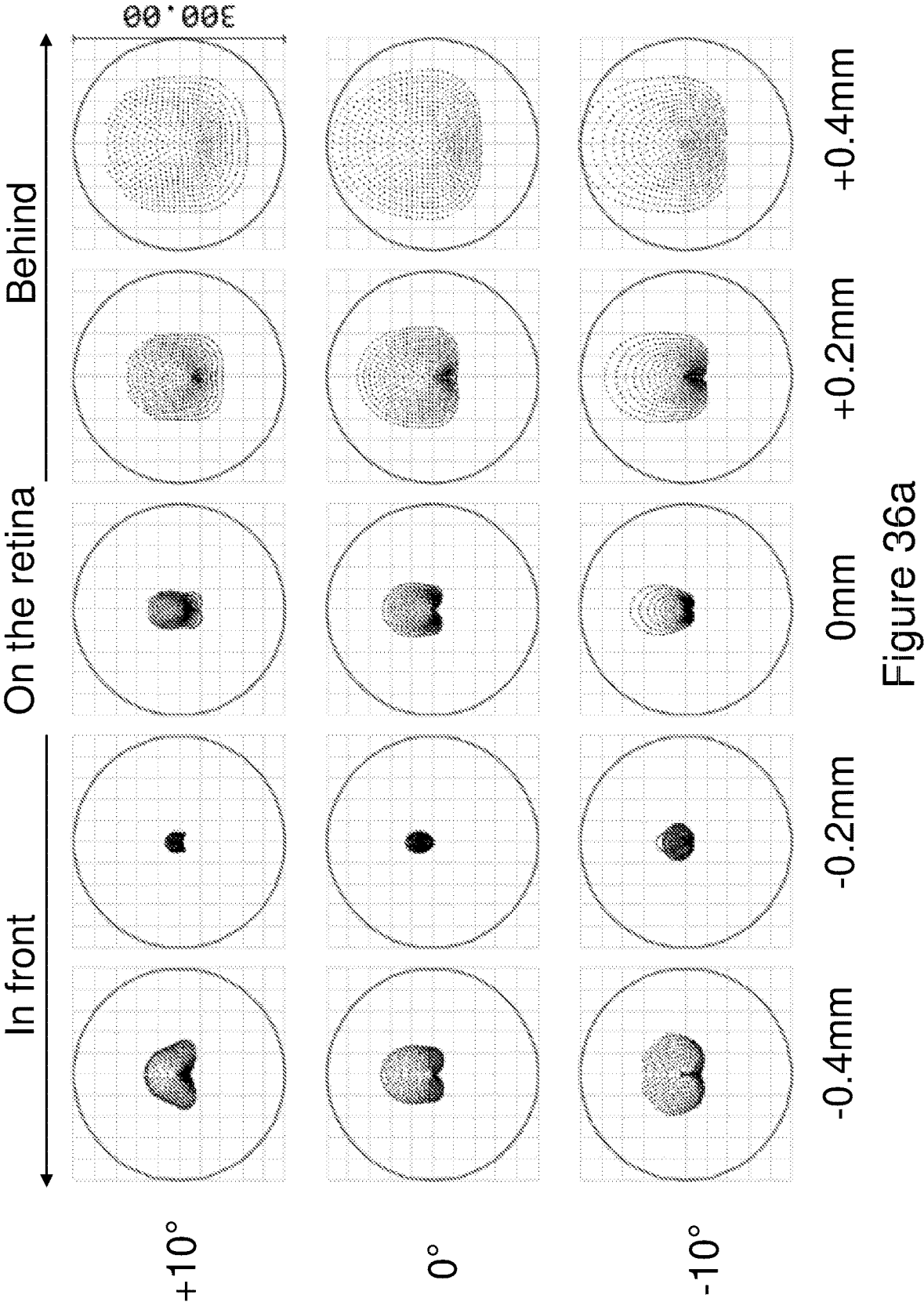
Figure 36B:
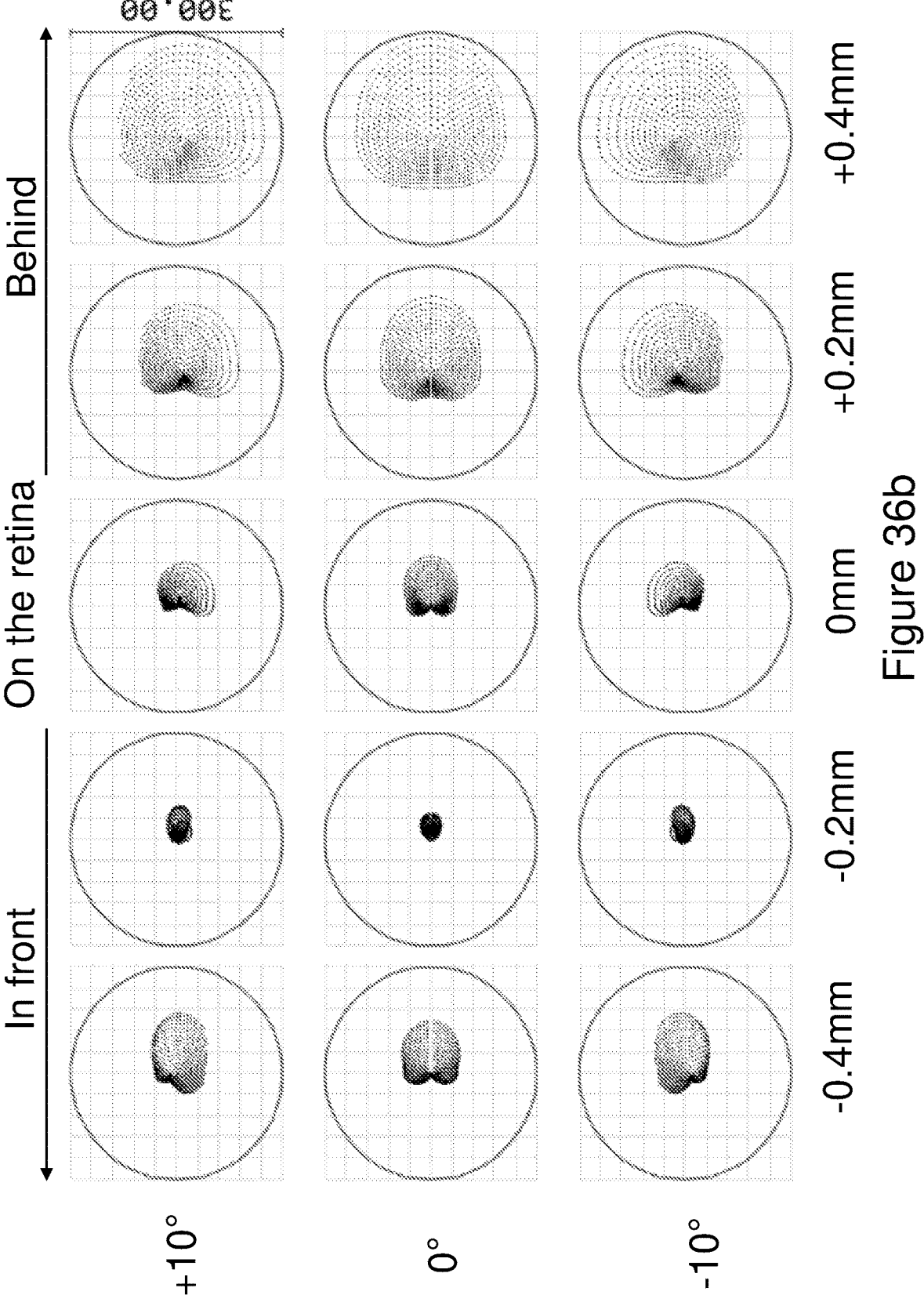

FIGS. 36*a* and 36*b* illustrate the temporally and spatially varying signal due to contact lens rotation (i.e., 0° and) 270° depicted as wide-view through-focus geometric spot analysis, when the incoming light with a visible wavelength (589 nm) and a vergence of 0 D, is incident on a model eye with −1 DS of myopia corrected with the contact lens embodiment described in FIGS. 33 and 34.

Figure 37:
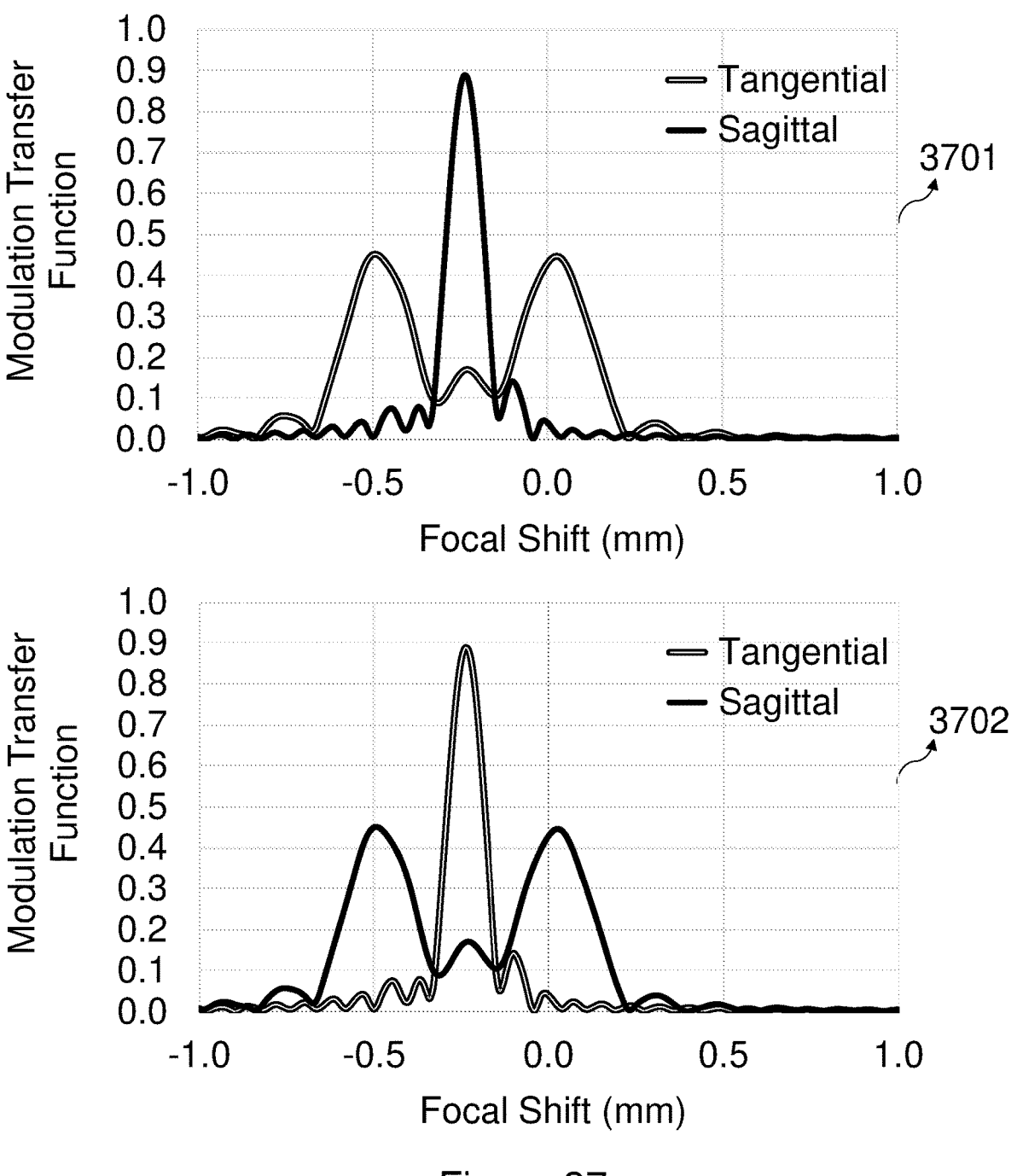

FIG. 37 illustrates the retinal signal (conoid of partial blur) depicted as on-axis, through-focus, modulation transfer function for the tangential and sagittal meridians, which were computed when the incoming light with a visible wavelength (589 nm) and a vergence of 0 D, is incident on a model eye with −1 DS of myopia corrected with the contact lens embodiment described in FIGS. 33 and 34, wherein the meridian with the power of −0.25 D of the contact lens was located at 0° and 90°.

Figure 38:
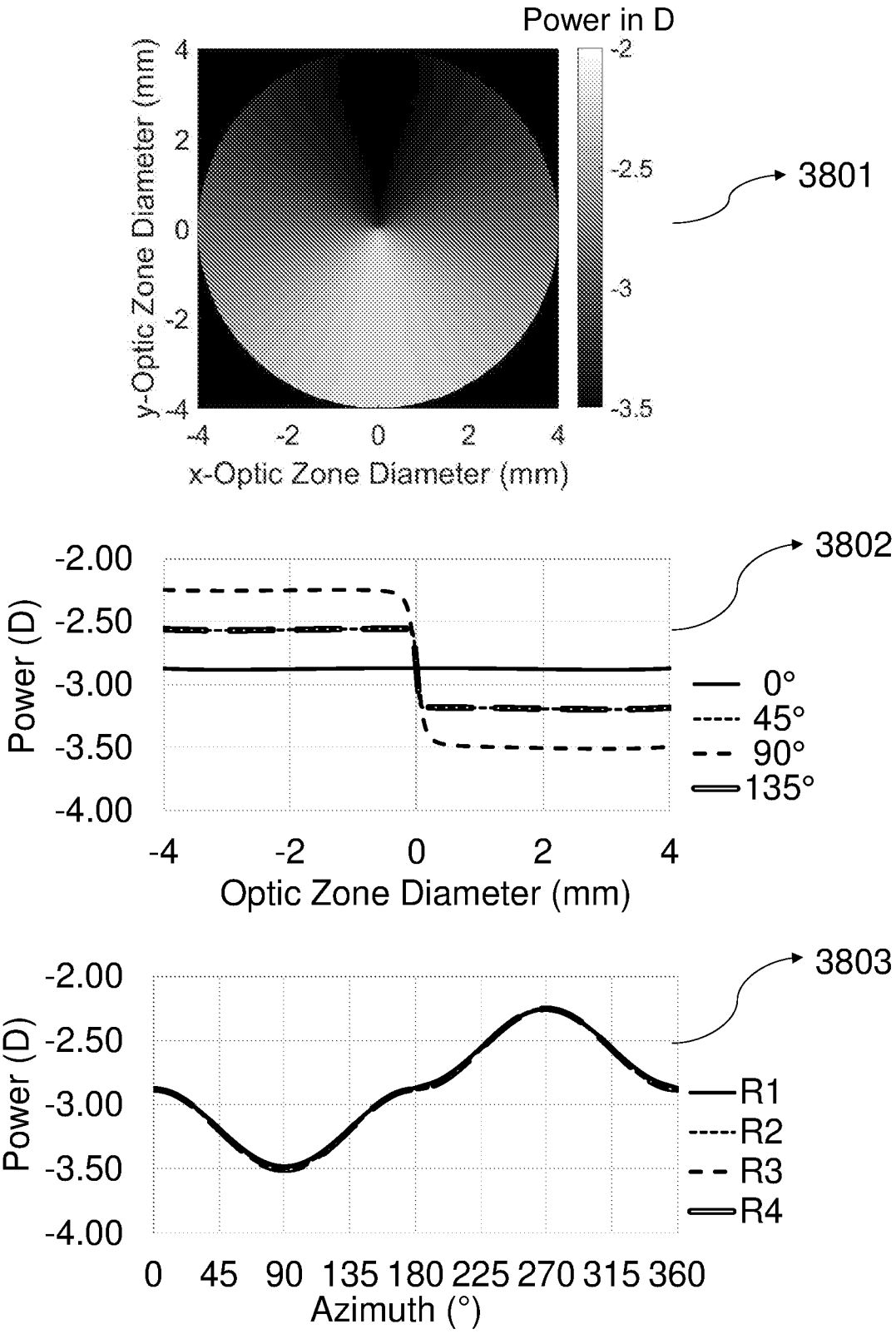

FIG. 38 illustrates the power distribution (i.e., power map, power as a function of optic zone diameter and power as a function of azimuth) within the optical zone of another contact lens embodiment of the present invention with a substantially radially invariant, meridionally variant, azimuthally variant power distribution (power: −3.5 DS/+1.25 D, Flipped-Half-Quasi Cosine Lens (2)).

Figure 39A:
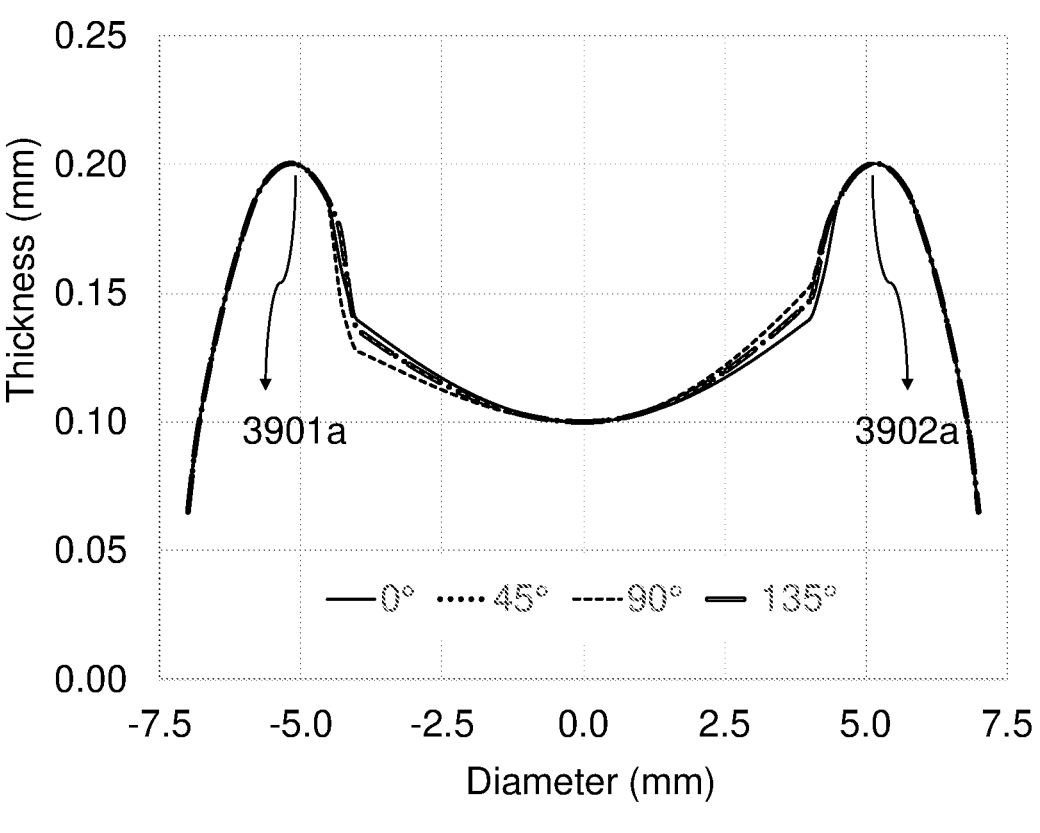

FIG. 39*a* illustrates the thickness distribution across the whole contact lens of the embodiment described in FIG. 38 with a substantially radially invariant, meridionally and azimuthally variant power distribution along four sample representative meridians 0°, 45°, 90° and 135°.

Figure 39B:
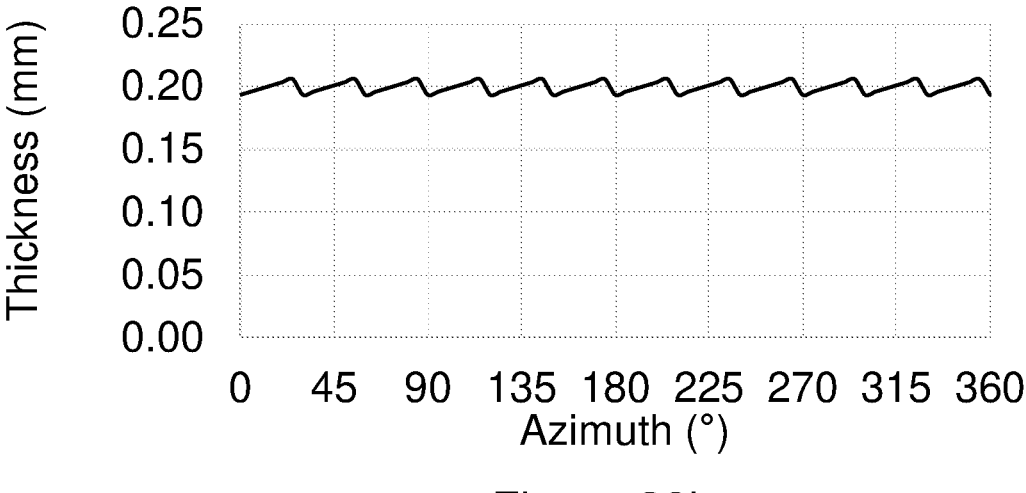

FIG. 39*b* illustrates the thickness distribution as a function of azimuthal angle of the contact lens described in FIG. 38 and FIG. 39*a* along a radial distance of 5.8 mm within the non-optical peripheral zone.

Figure 40:
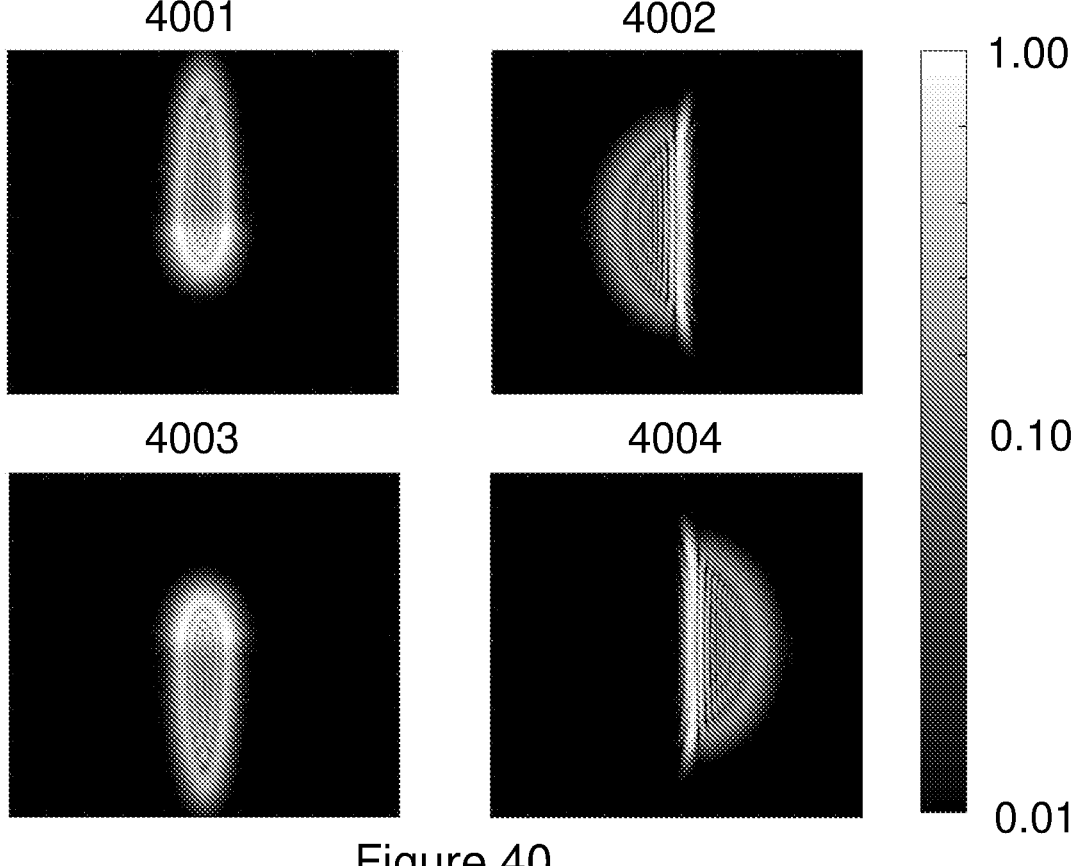

FIG. 40 illustrates the temporally and spatially varying signal depicted due to contact lens rotation (i.e., 0°, 90°, 180° and) 270° as on-axis point spread functions at the retinal plane, when the incoming light with a visible wavelength (589 nm) and a vergence of 0 D, is incident on a model eye with −4 DS of myopia and +1 DC×90° of astigmatism corrected with the exemplary contact lens embodiment described in FIGS. 38 and 39.

Figure 41A:
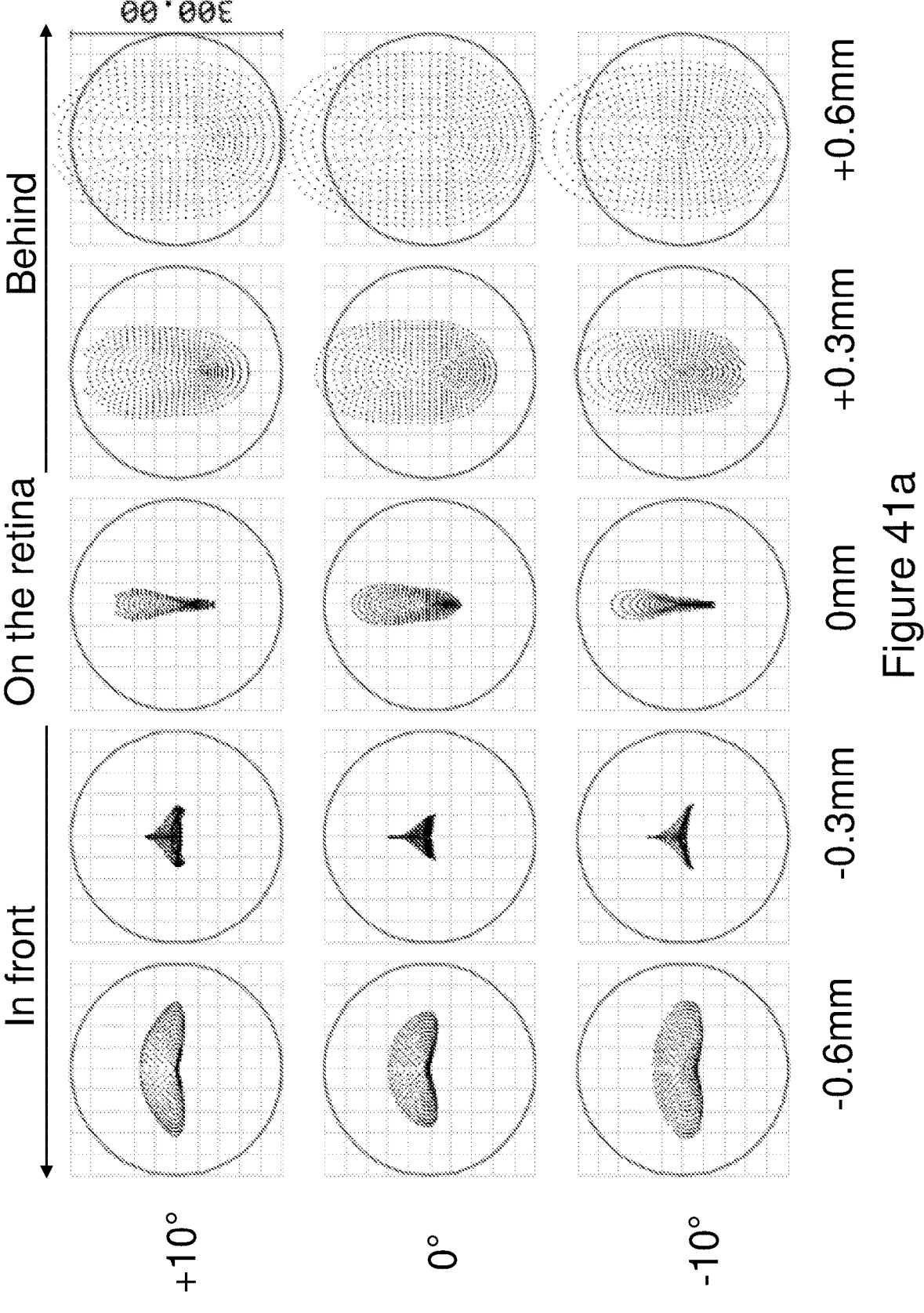
Figure 41B:
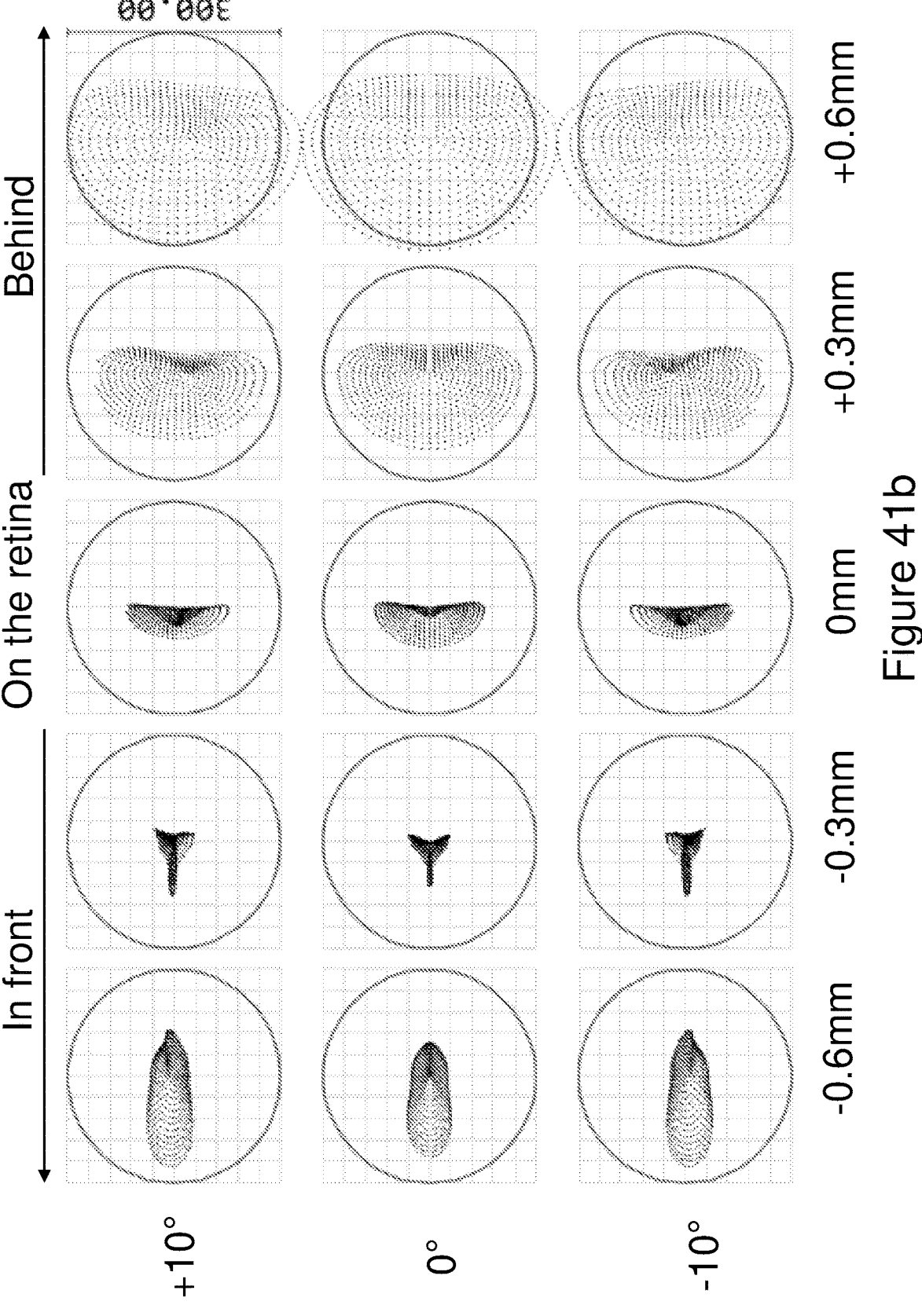

FIGS. 41*a* and 41*b* illustrate the temporally and spatially varying signal due to contact lens rotation (i.e., 0° and) 90° depicted as wide-view through-focus geometric spot analysis, when the incoming light with a visible wavelength (589 nm) and a vergence of 0 D, is incident on a model eye with −4 DS of myopia and +1DC×90° of astigmatism corrected with the contact lens embodiment described in FIGS. 38 and 39.

Figure 42:
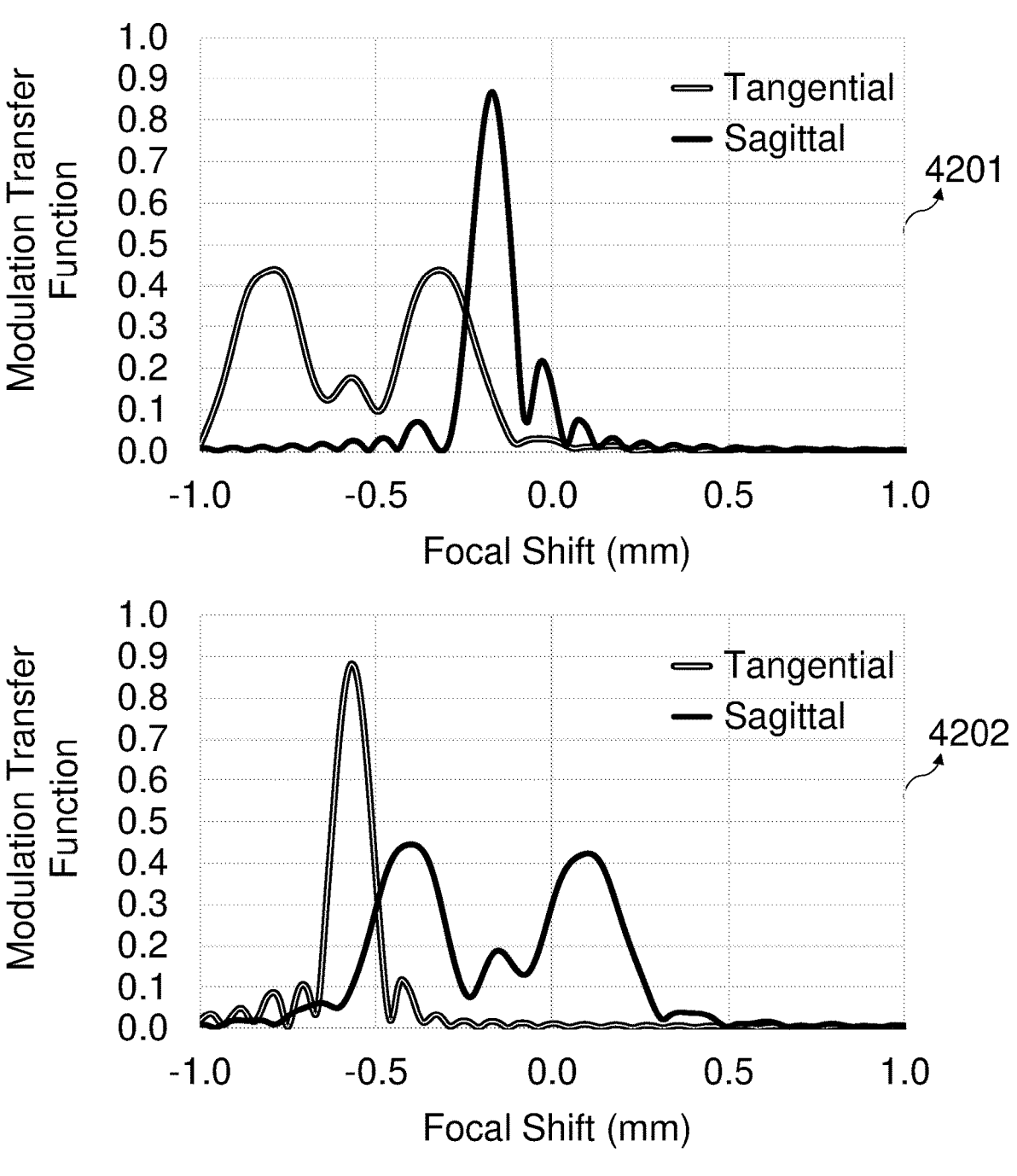

FIG. 42 illustrates the retinal signal depicted as on-axis, through-focus, modulation transfer function for the tangential and sagittal meridians, which were computed when the incoming light with a visible wavelength (589 nm) and a vergence of 0 D, is incident on a model eye with −4 DS of myopia and +1 DC×90° of astigmatism corrected with the contact lens embodiment described in FIGS. 38 and 39, wherein the meridian with the power of −2.9 D of the contact lens was located at 0° and 90°.

Figure 43:
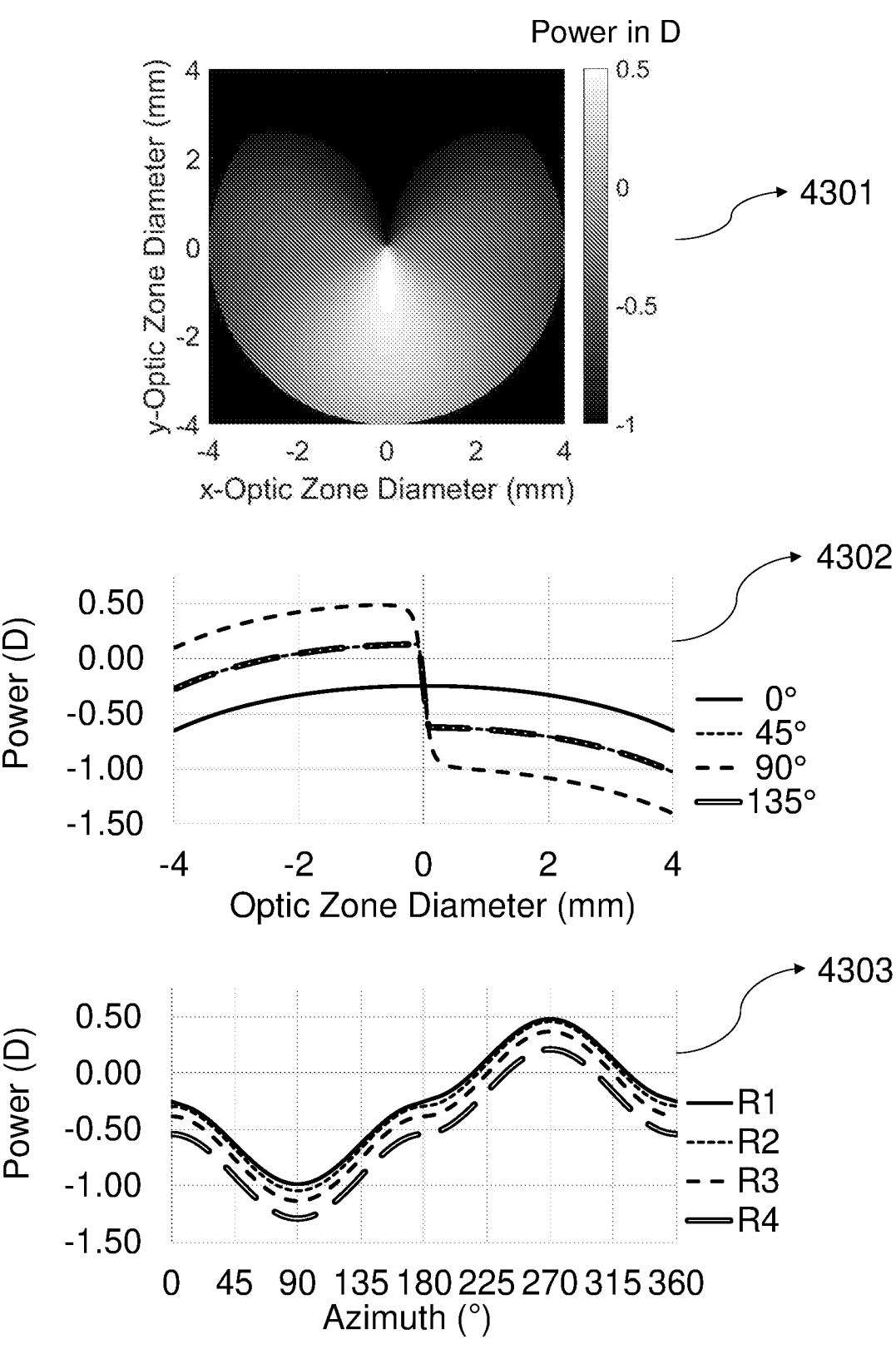

FIG. 43 illustrates the power distribution (i.e., power map, power as a function of optic zone diameter and power as a function of azimuth) within the optical zone of another contact lens embodiment of the present invention with a substantially radially, meridionally and azimuthally variant power distribution (power: −1 DS/+1.5 D, Flipped-Half-Quasi Cosine Lens (with negative spherical aberration) (1)).

Figure 44:
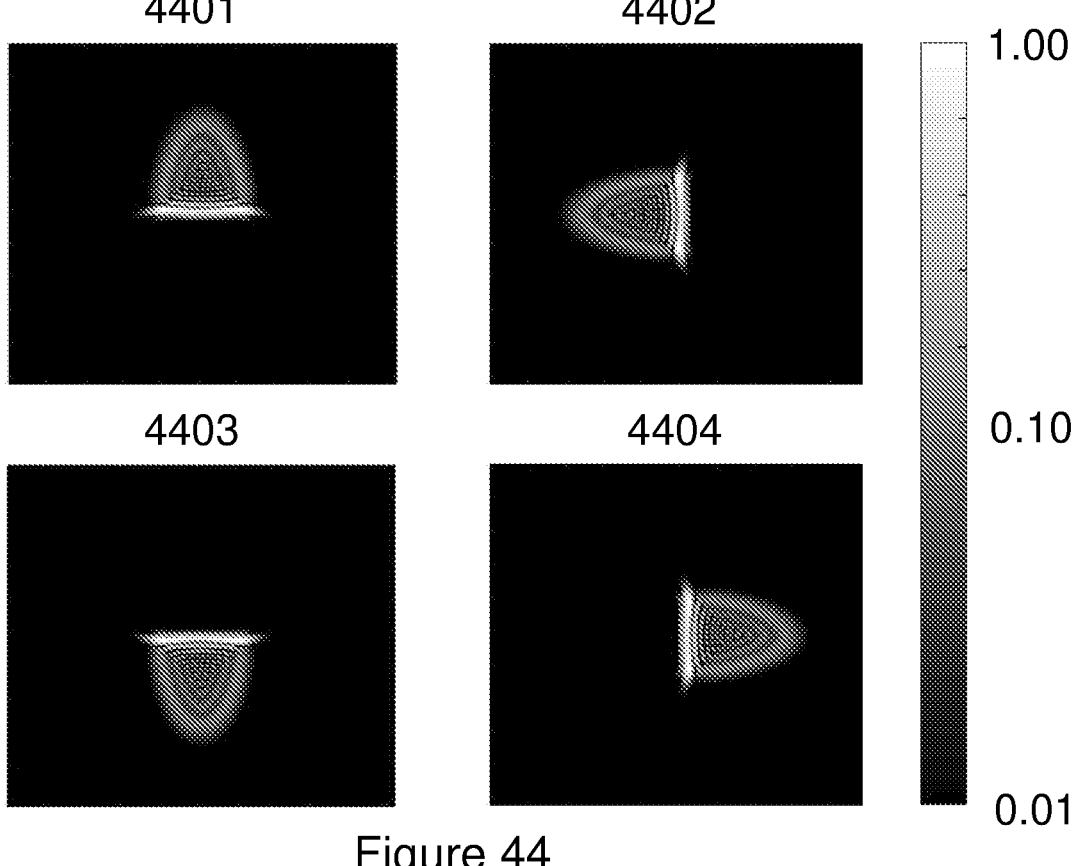

FIG. 44 illustrates the temporally and spatially varying signal depicted due to contact lens rotation (i.e., 0°, 90°, 180° and) 270° as on-axis point spread functions at the retinal plane, when the incoming light with a visible wavelength (589 nm) and a vergence of 0 D, is incident on a model eye with −1 DS of myopia corrected with the exemplary contact lens embodiment described in FIG. 43.

Figure 45A:
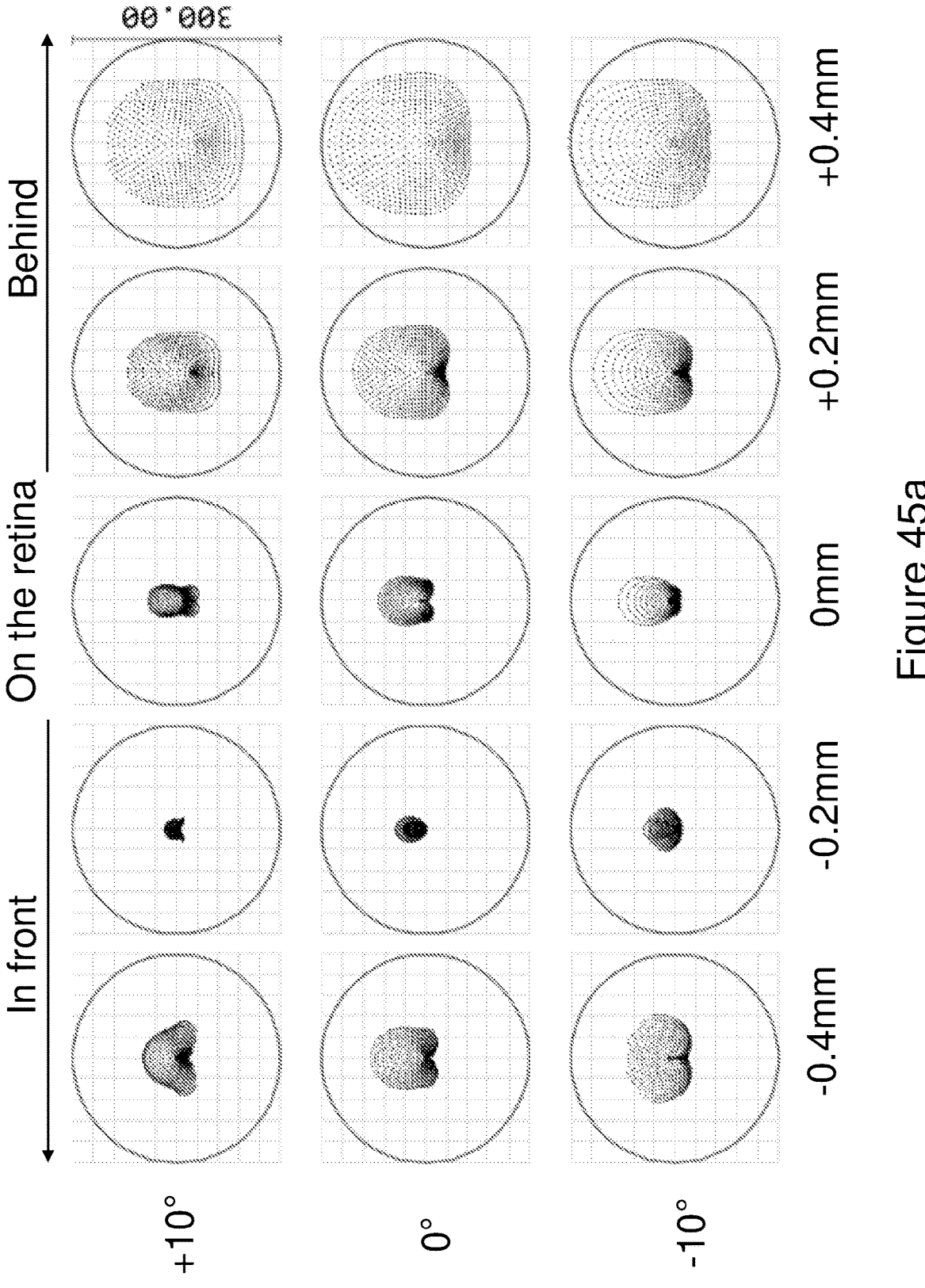
Figure 45B:
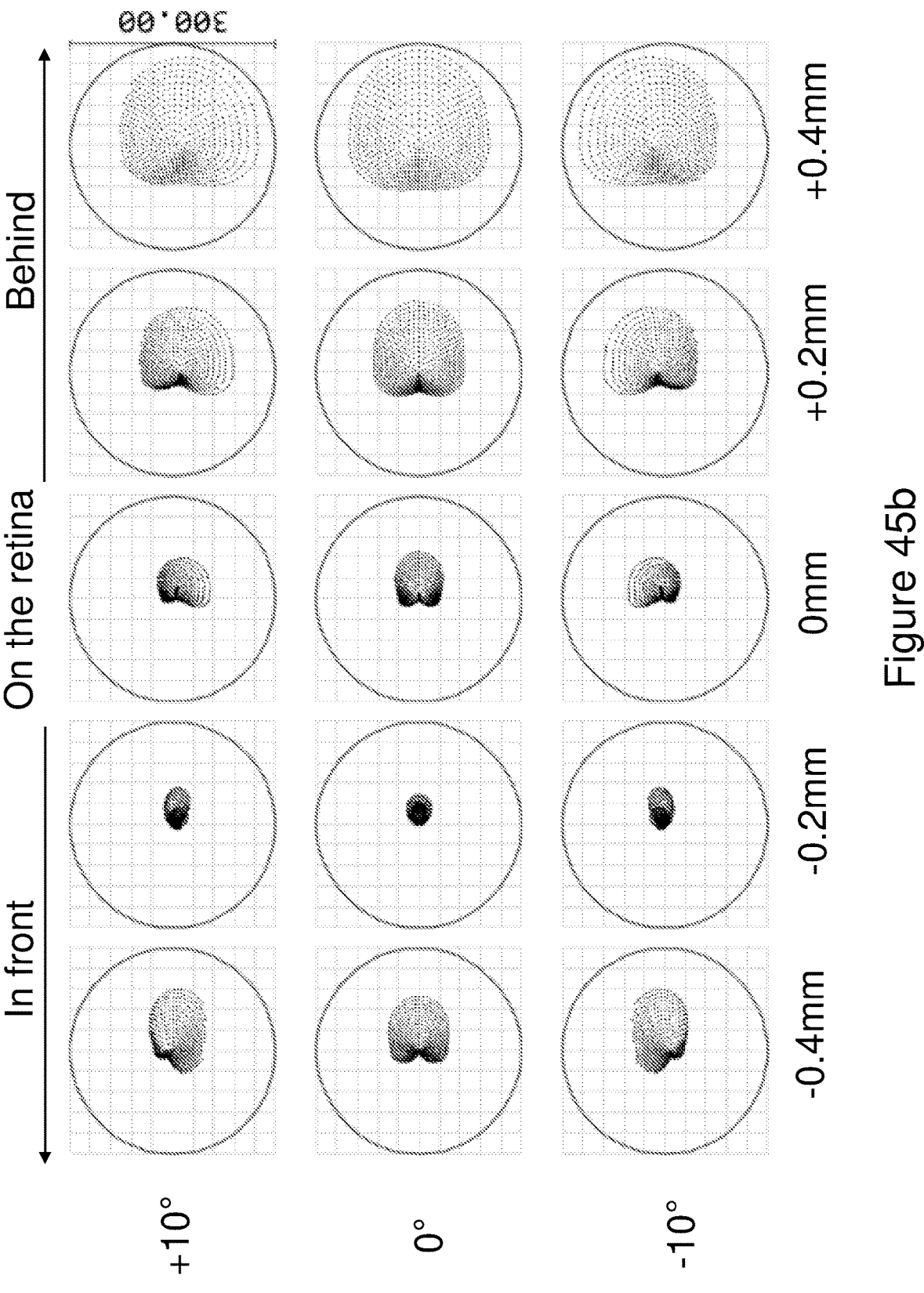

FIGS. 45*a* and 45*b* illustrate the temporally and spatially varying signal due to contact lens rotation (i.e., 0° and) 270° depicted as wide-view through-focus geometric spot analysis, when the incoming light with a visible wavelength (589 nm) and a vergence of 0 D, is incident on a model eye with −1 DS of myopia corrected with the contact lens embodiment described in FIG. 43.

Figure 46:
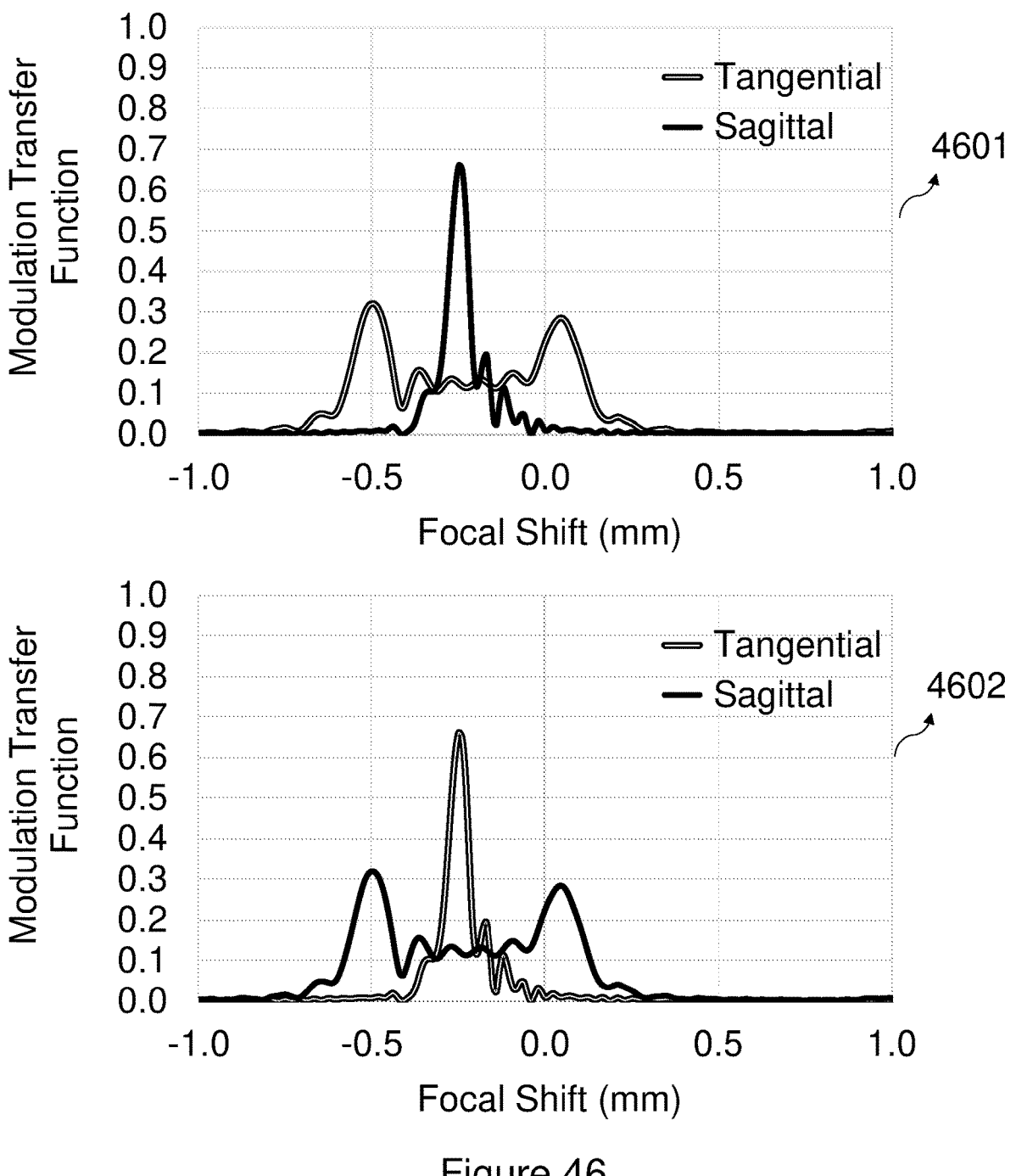

FIG. 46 illustrates the retinal signal depicted as on-axis, through-focus, modulation transfer function for the tangential and sagittal meridians, which were computed when the incoming light with a visible wavelength (589 nm) and a vergence of 0 D, is incident on a model eye with −1 DS of myopia corrected with the contact lens embodiment described in FIG. 43, wherein the meridian with the power of −0.65 D at a radial distance of +4 mm of the contact lens was located at 0° and 90°.

Figure 47:
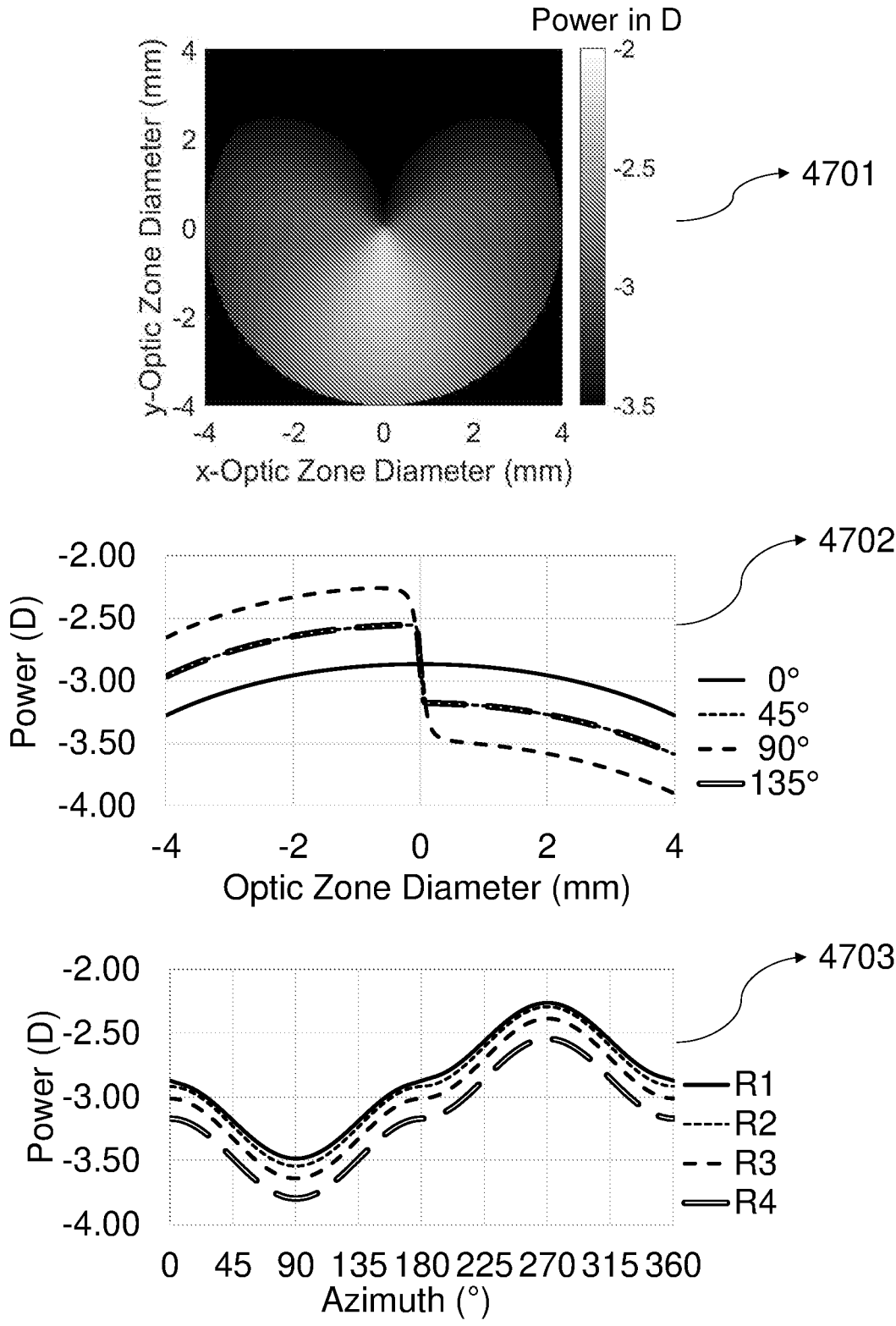

FIG. 47 illustrates the power distribution (i.e., power map, power as a function of optic zone diameter and power as a function of azimuth) within the optical zone of another contact lens embodiment of the present invention with a substantially radially invariant, meridionally variant, azimuthally variant power distribution (power: −3.5 DS/+1.25 D, Flipped-Half-Quasi Cosine Lens (with negative spherical aberration) (2)).

Figure 48:
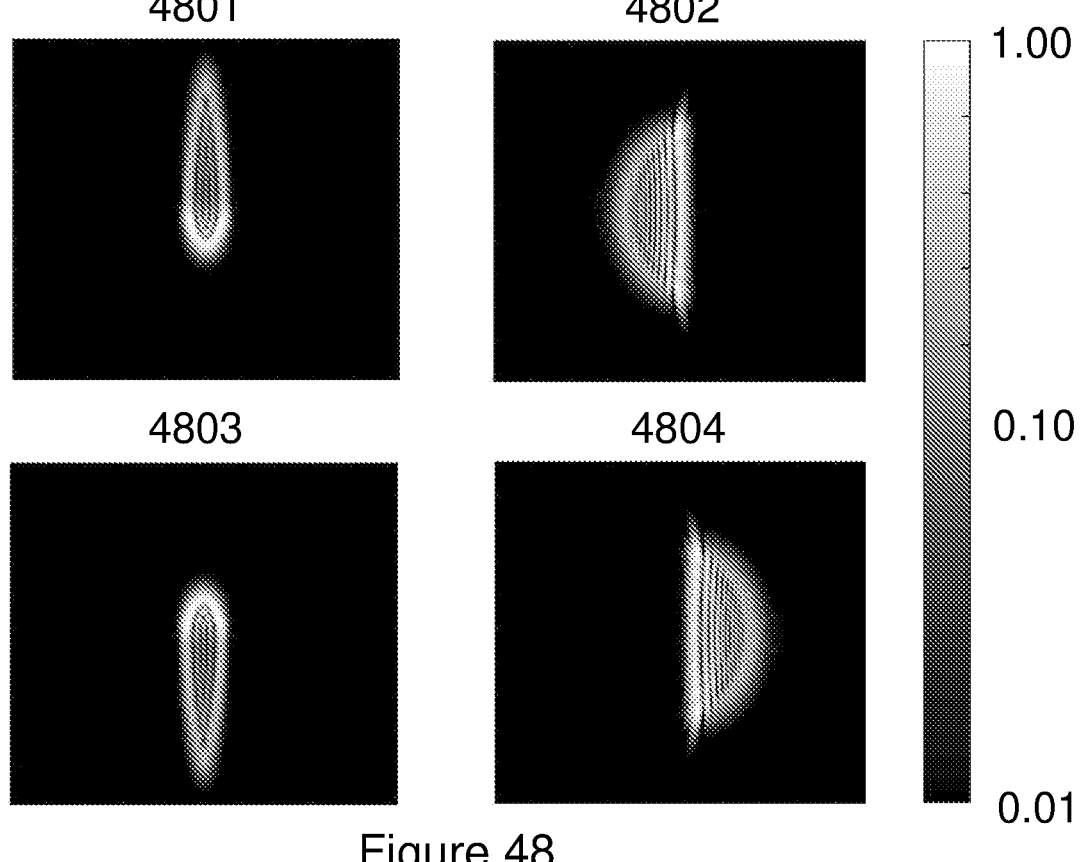

FIG. 48 illustrates the temporally and spatially varying signal depicted due to contact lens rotation (i.e., 0°, 90°, 180° and) 270° as on-axis point spread functions at the retinal plane, when the incoming light with a visible wavelength (589 nm) and a vergence of 0 D, is incident on a model eye with −4 DS of myopia and +1 DC×90° of astigmatism corrected with the exemplary contact lens embodiment described in FIG. 47.

Figure 49A:
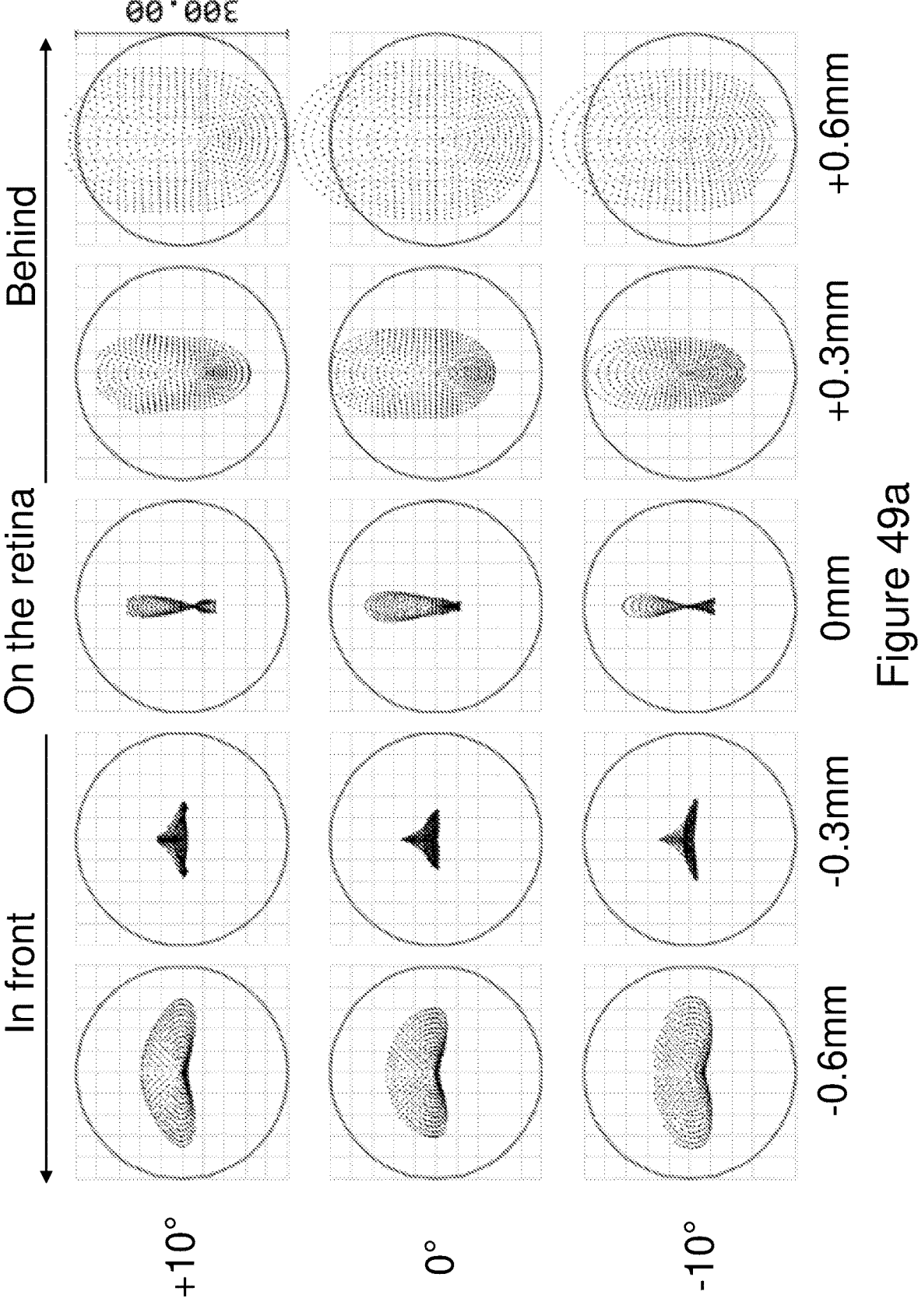
Figure 49B:
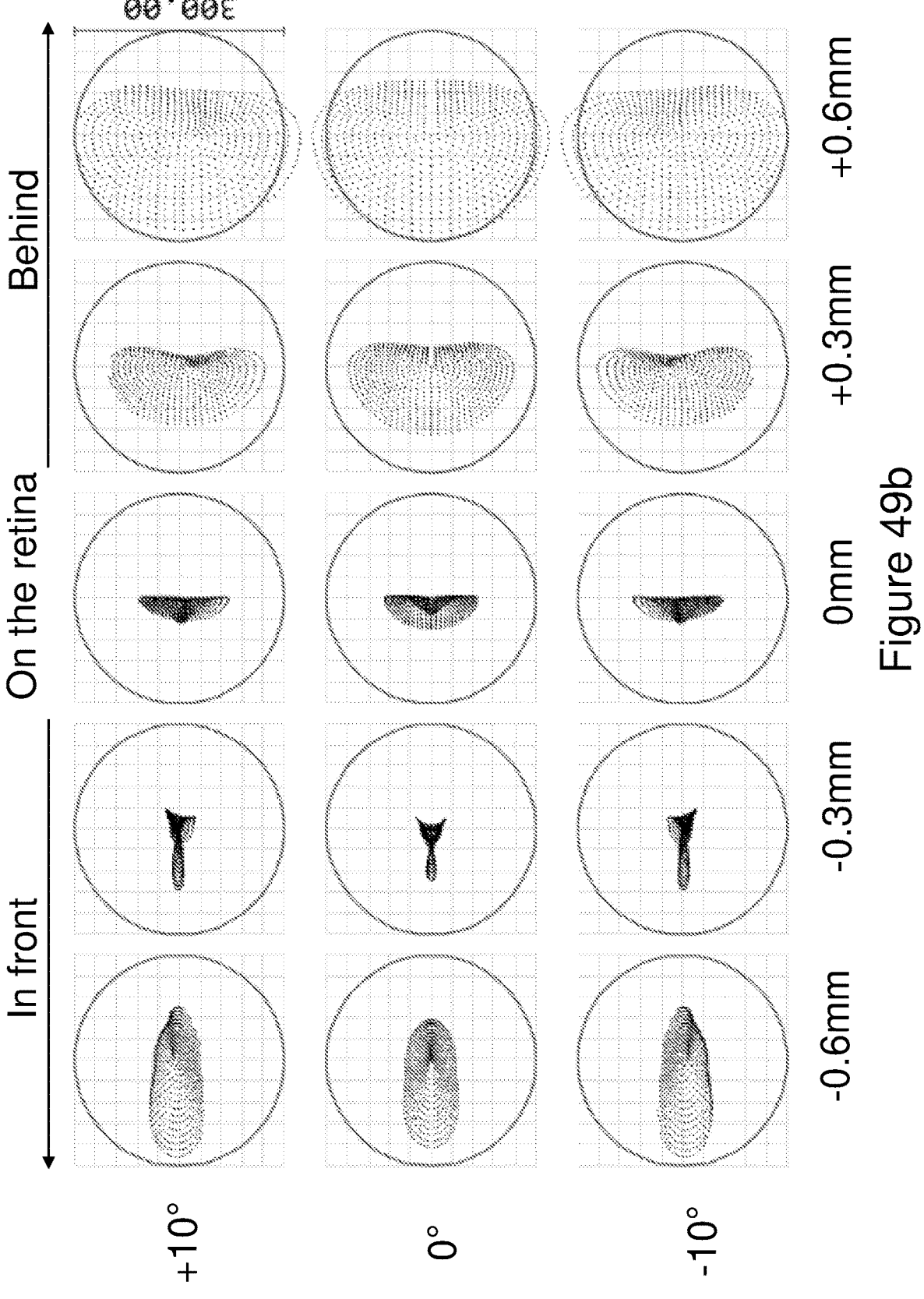

FIGS. 49*a* and 49*b* illustrate the temporally and spatially varying signal due to contact lens rotation (i.e., 0° and) 90° depicted as wide-view through-focus geometric spot analysis, when the incoming light with a visible wavelength (589 nm) and a vergence of 0 D, is incident on a model eye with −4 DS of myopia and +1 DC×90° of astigmatism corrected with the contact lens embodiment described in FIG. 47.

Figure 50:
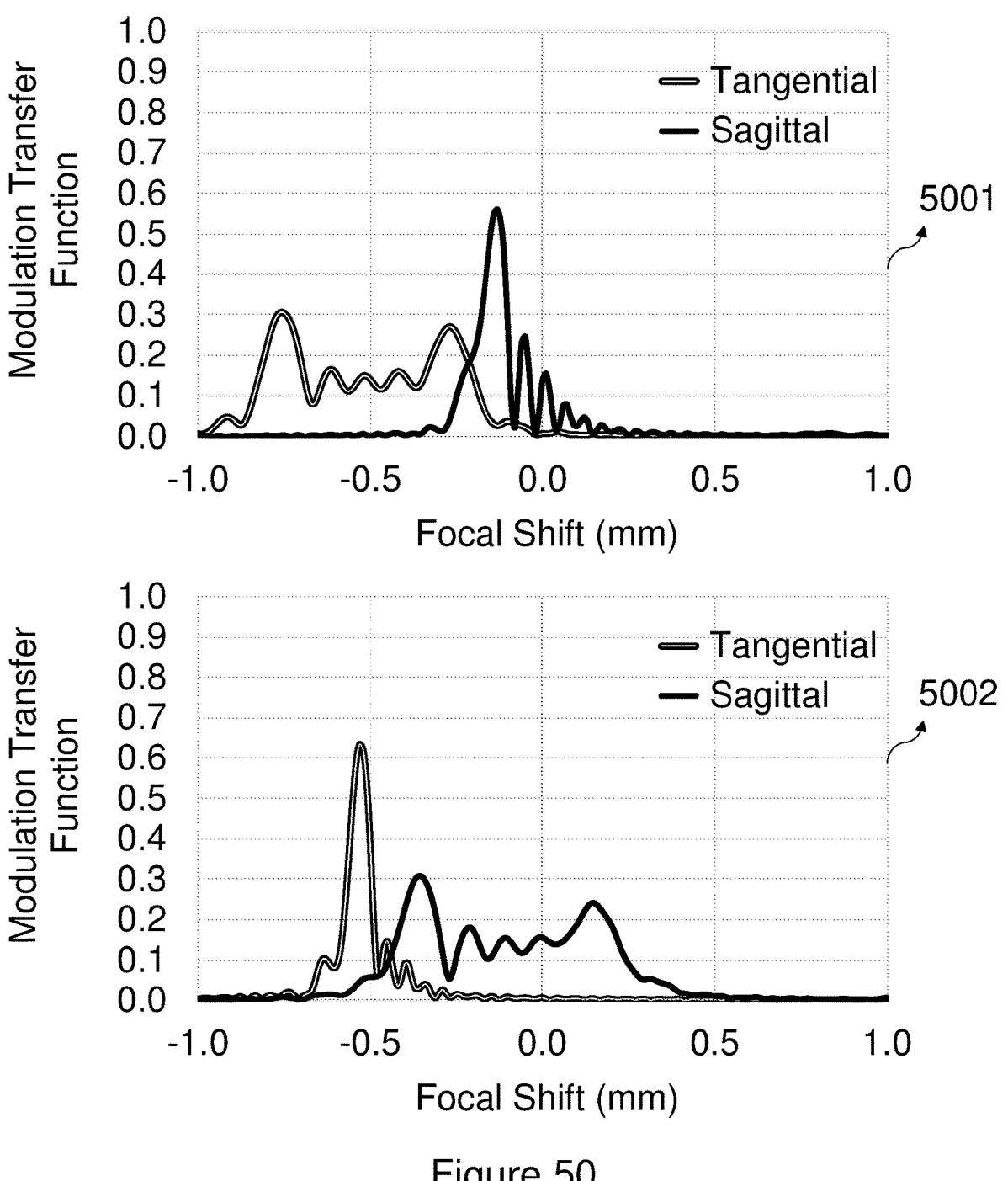

FIG. 50 illustrates the retinal signal depicted as on-axis, through-focus, modulation transfer function for the tangential and sagittal meridians, which were computed when the incoming light with a visible wavelength (589 nm) and a vergence of 0 D, is incident on a model eye with −4 DS of myopia and +1 DC×90° of astigmatism corrected with the contact lens embodiment described in FIG. 47 wherein the meridian with the power of −3.3 D at a radial distance of +4 mm of the contact lens was located at 0° and 90°.

Figure 51:
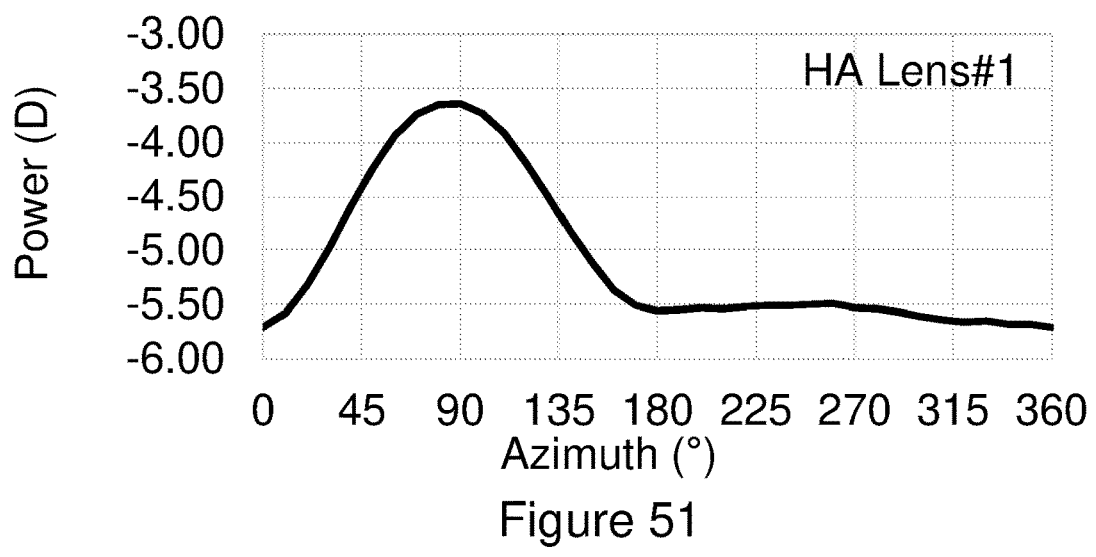

FIG. 51 illustrates the measured azimuthal power profile of a Hemi-Area prototype contact lens embodiment of the present disclosure (HA Lens #1) with the label or prescription power of −5.5 DS/+2 D. The manufactured lens HA Lens #1 is a variant of the contact lens embodiment described in FIG. 13 of the present disclosure.

Figure 52:
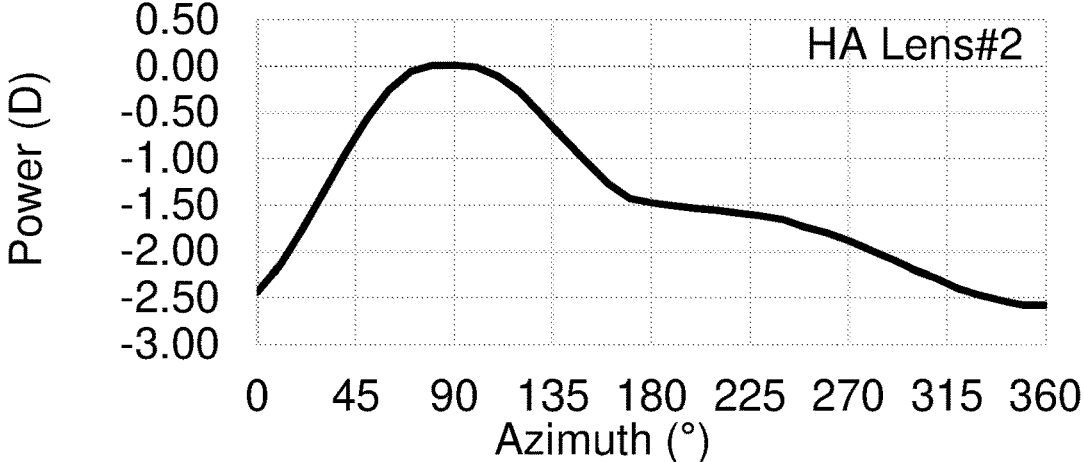

FIG. 52 illustrates the measured azimuthal power profile of another embodiment of the present disclosure, Hemi-Area prototype contact lens (HA Lens #2) with the label or prescription power of −2 DS/+2 D. The manufactured lens HA Lens2 is another variant of a combination of the contact lens embodiments described in FIGS. 13 and 47 of the present disclosure.

Figure 53:
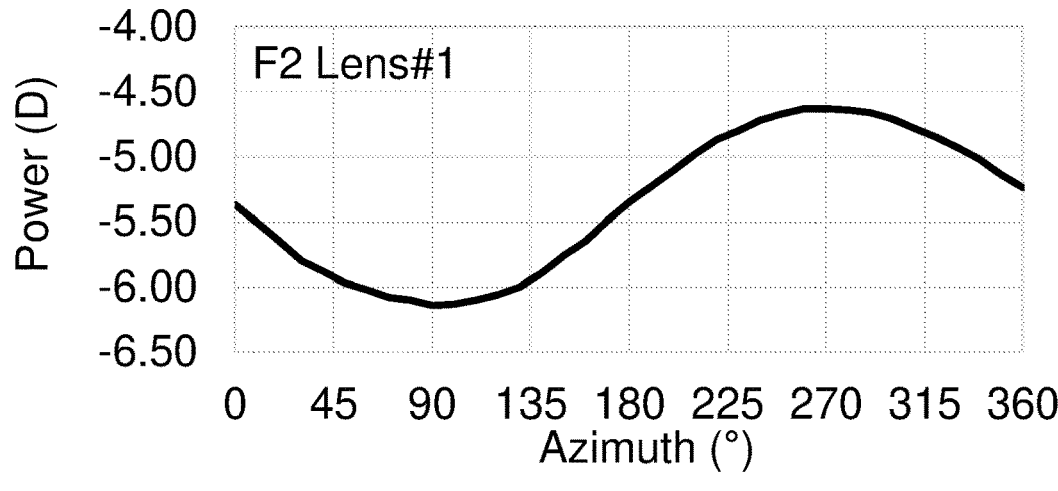

FIG. 53 illustrates the measured azimuthal power profile of another embodiment of the present disclosure, a Half-Frequency Cosine prototype contact lens (F2 Lens #1) with the power of −5.5 DS/+1.5 D. The manufactured lens F2 Lens #1 is a variant of a contact lens embodiment described in FIG. 23.

Figure 54:
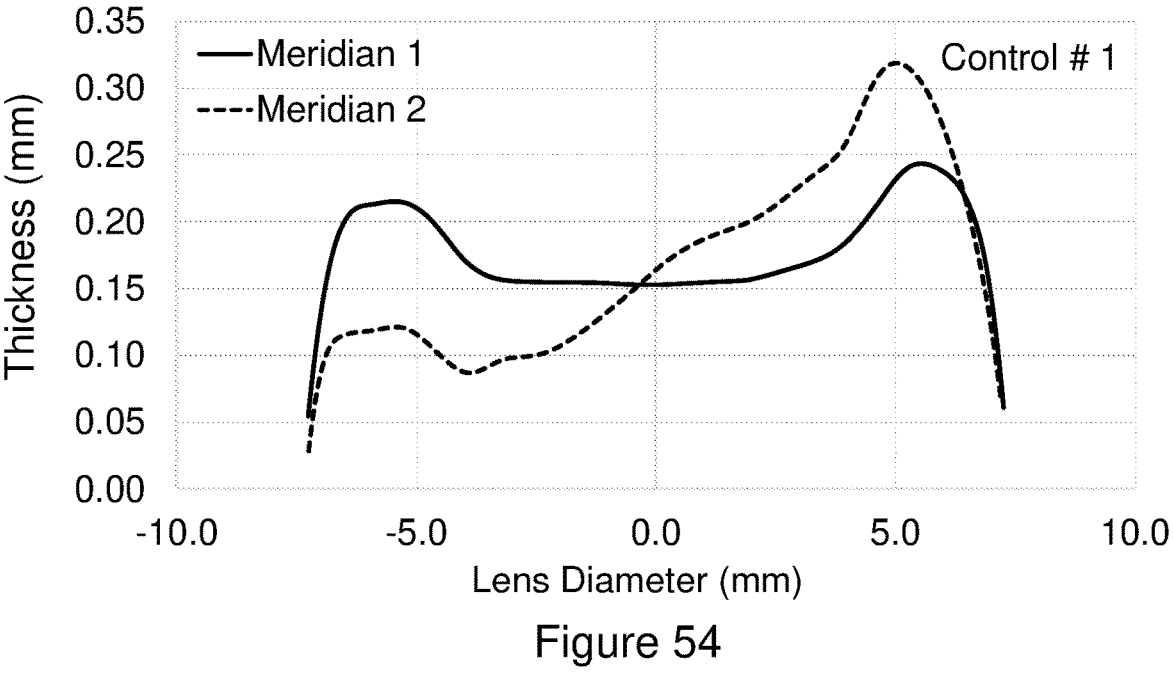

FIG. 54 illustrates the measured thickness profiles, depicted along the lens diameter, of the two principal meridians (vertical and horizontal) of a commercially available toric contact lens of the prior art with dedicated stabilisation (Control #1).

Figure 13:
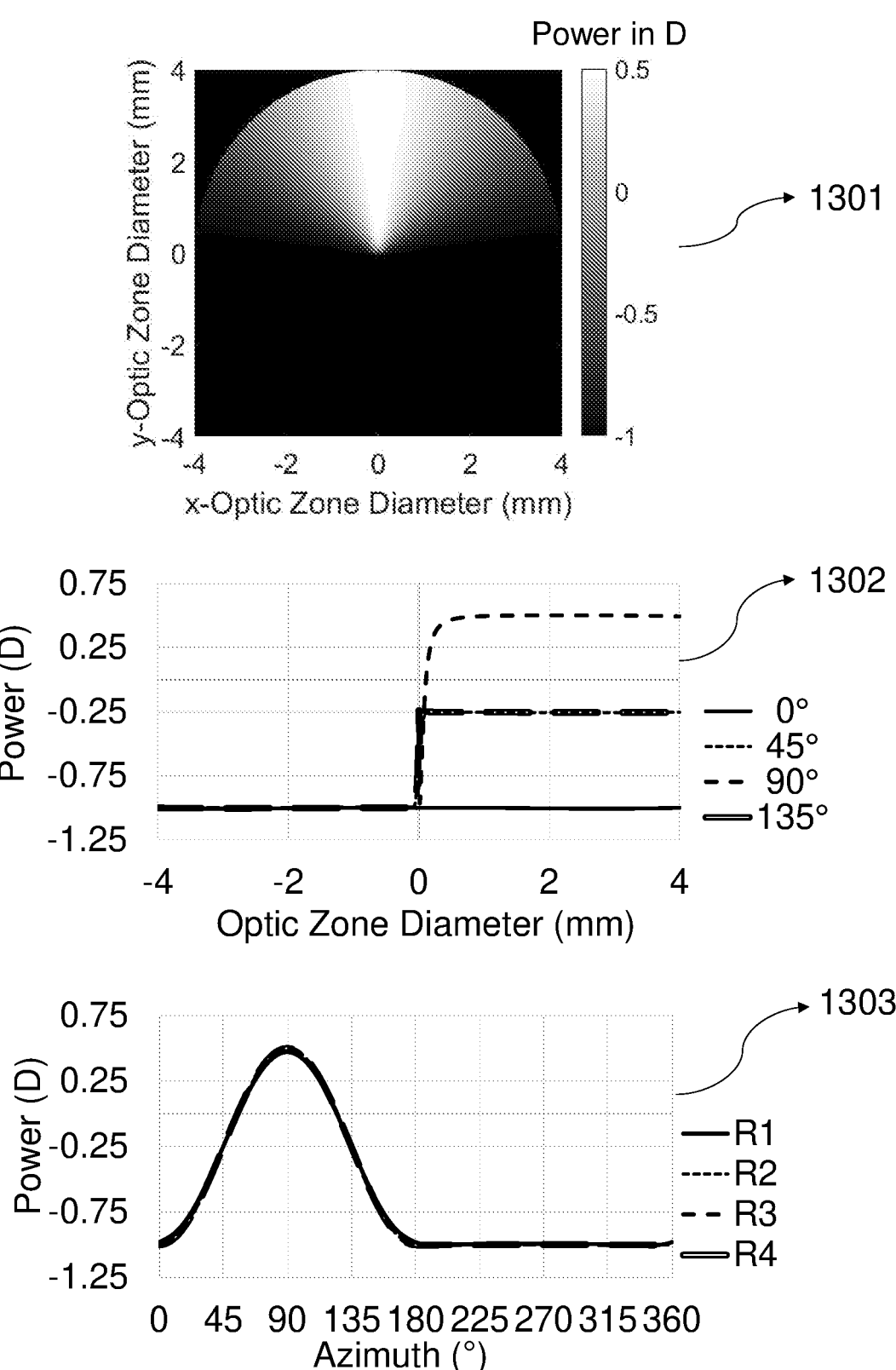
FIG. 13 illustrates the power distribution (i.e., power map, power as a function of optic zone diameter and power as a function of azimuth) within the optical zone of a contact lens embodiment of the present disclosure with a substantially radially invariant, meridionally and azimuthally variant, power distribution (power: −1 DS/+1.5 D, Hemi-Area Lens).
Figure 55:
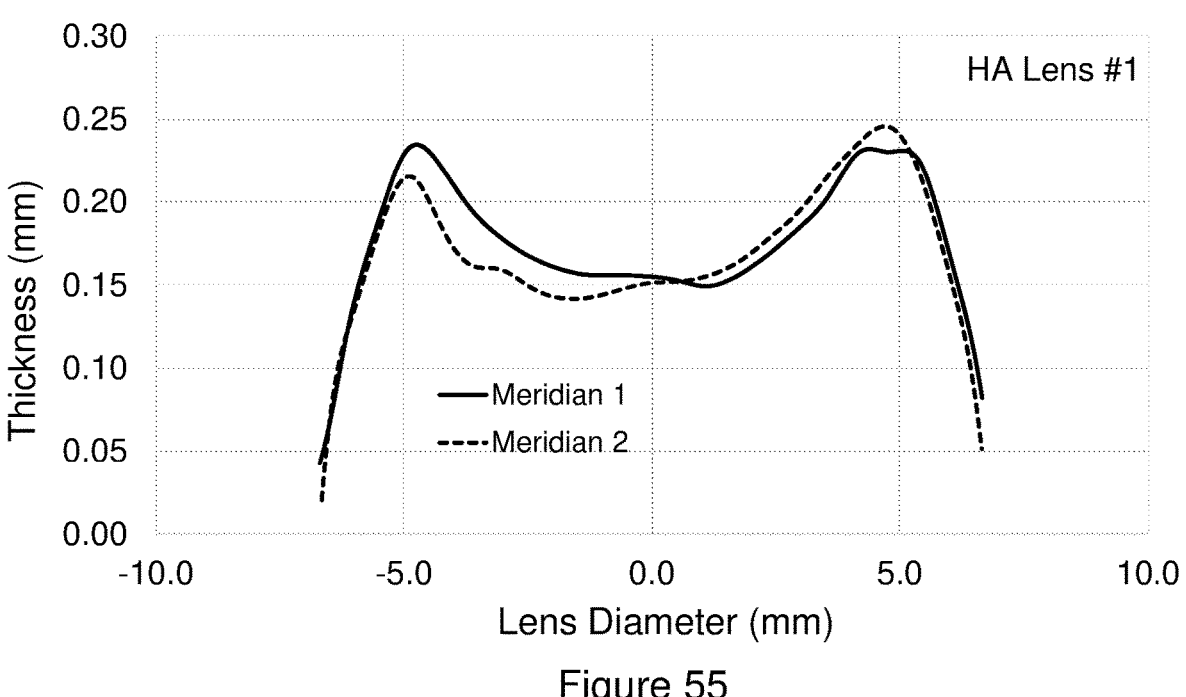

FIG. 55 illustrates the measured thickness profile of the prototype contact lens HA Lens #1 which is a variant of a contact lens embodiment described in FIG. 13. The thickness profile of HA Lens #1 is depicted as a function of lens diameter.

Figure 56:
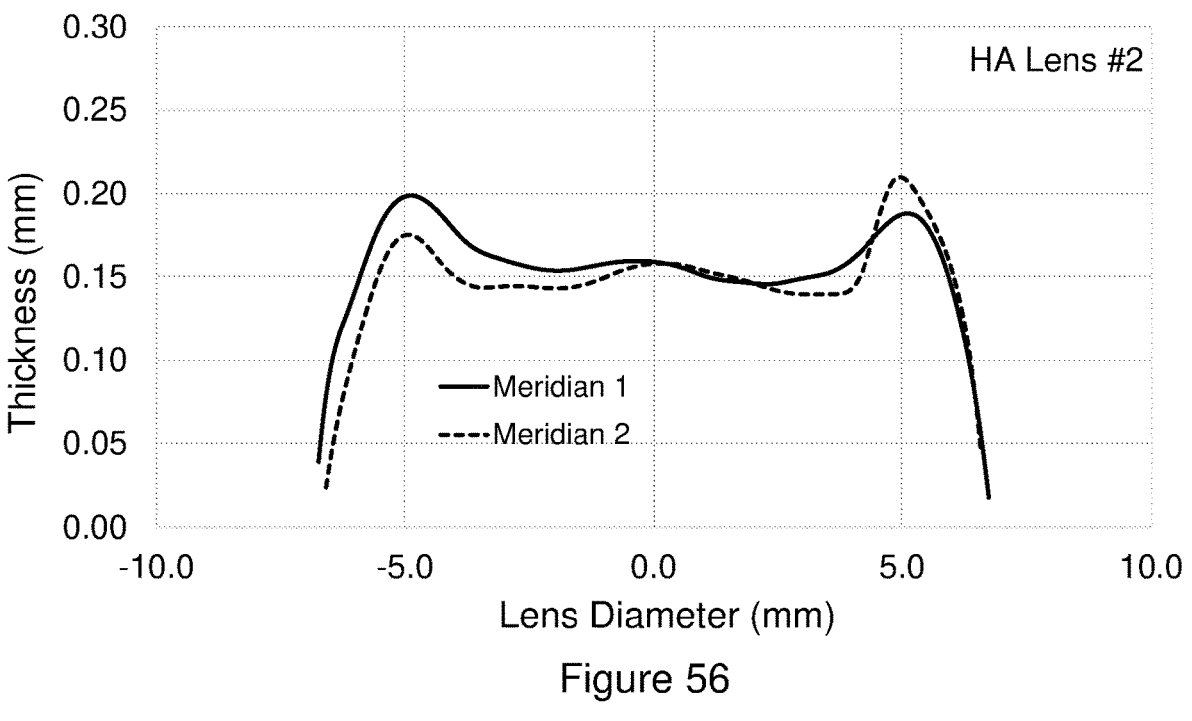

FIG. 56 illustrates the measured thickness profile of the prototype contact lens HA Lens #2, which is a variant of a combination of contact lens embodiments described in FIGS. 13 and 47. The thickness profile of HA Lens #2 is depicted as a function of lens diameter.

Figure 57:
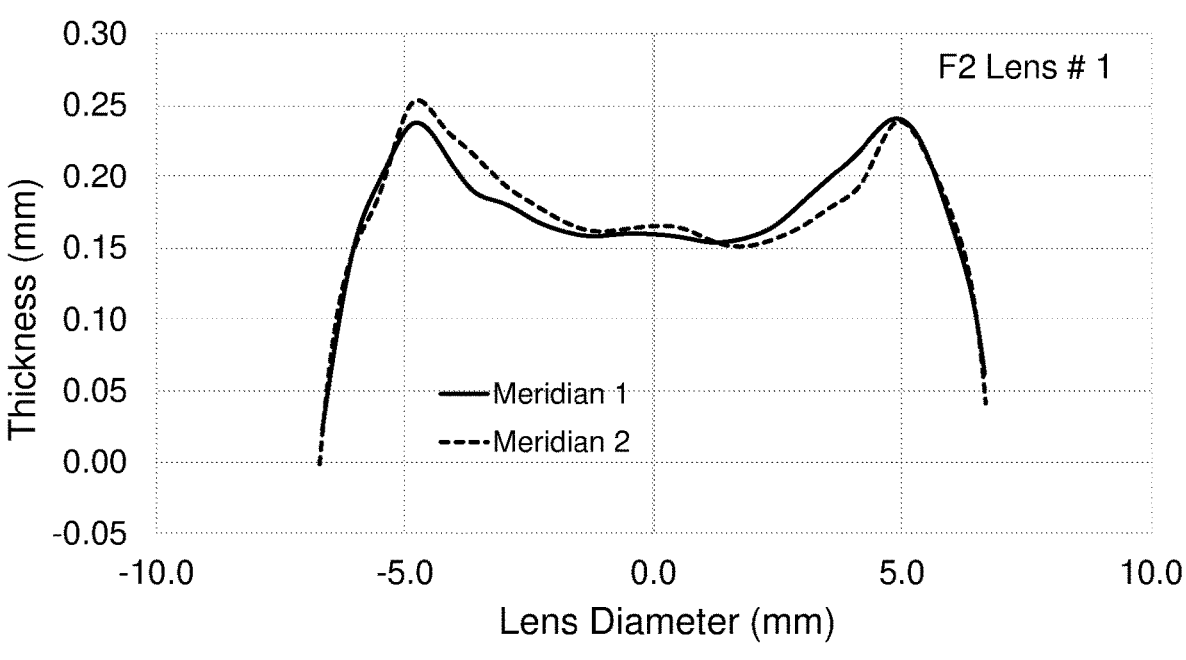

FIG. 57 illustrates the measured thickness profile of the prototype contact lens F2 Lens #1 which is a variant of a contact lens embodiment described in FIG. 23. The thickness profile of F2 Lens #1 is depicted as a function of lens diameter.

Figure 58:
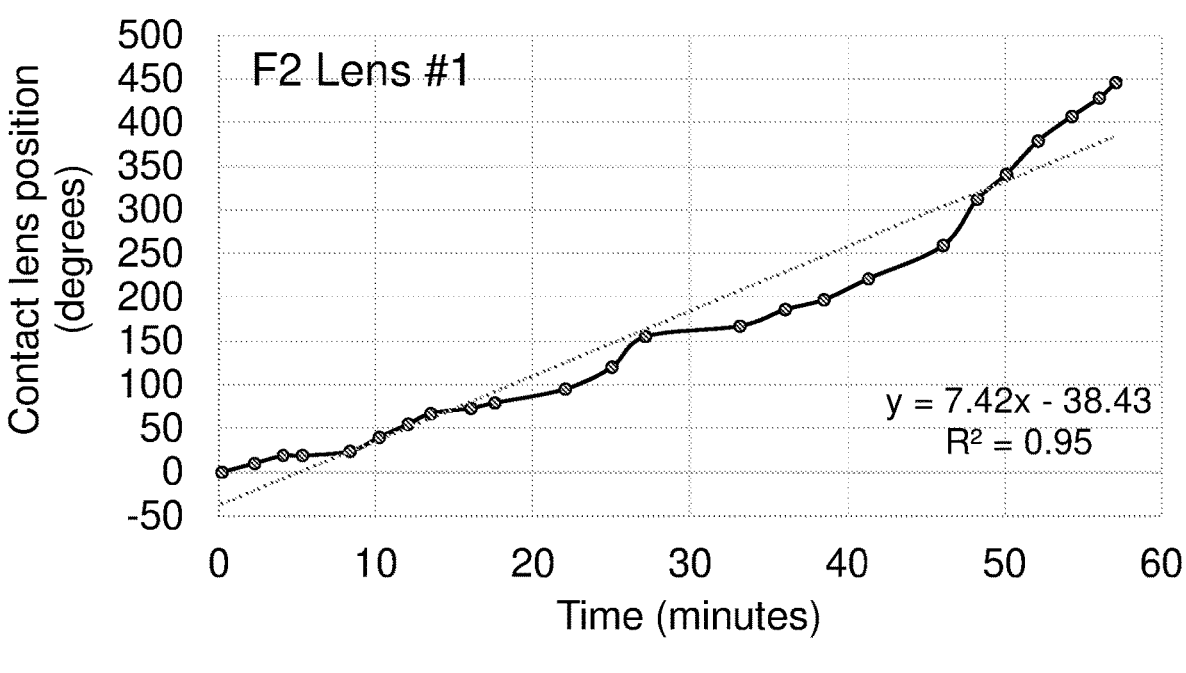

FIG. 58 shows the measured azimuthal position of the F2 Lens #1 when worn on eye over time, i.e., after approximately 60 minutes of lens wear. The contact lens embodiment F2 Lens #1 is designed with a substantially invariant azimuthal thickness profile within the non-optical peripheral carrier zone allowing for substantially free on-eye rotation of the contact lens.

Figure 59:
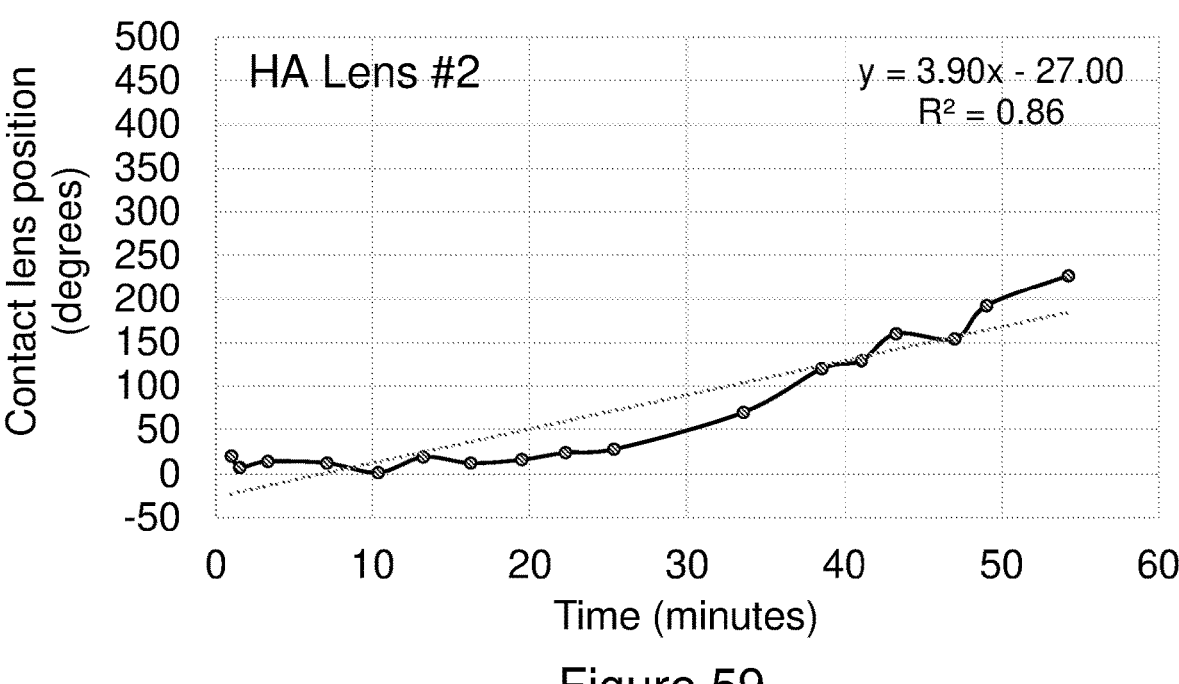

FIG. 59 shows the measured azimuthal position of the HA Lens #2 when worn on eye over time, i.e., after approximately 60 minutes of lens wear. The contact lens embodiment HA Lens #2 is designed with a substantially invariant azimuthal thickness profile within the non-optical peripheral carrier zone allowing for substantially free on-eye rotation of the contact lens.

Figure 60:
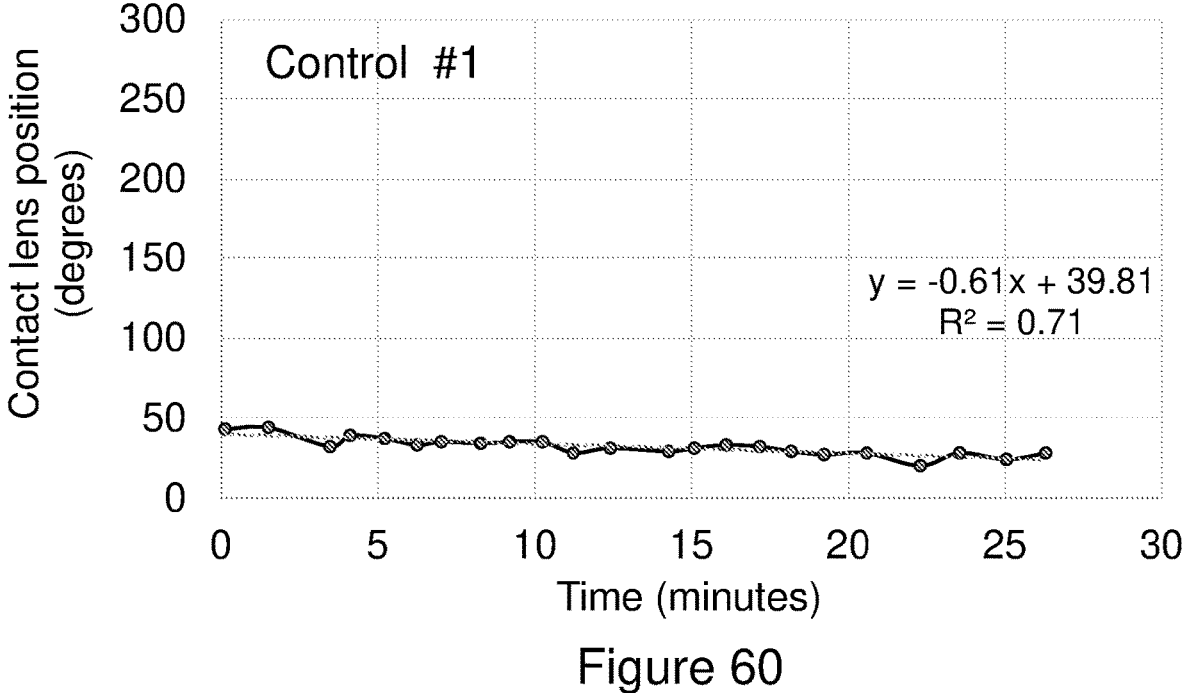

FIG. 60 shows the measured azimuthal position of one commercially available toric contact lens of the prior art (Control #1) when worn on eye over time, i.e., after approximately 30 minutes of contact lens wear. The control toric contact lens of the prior art is designed with a dedicated stabilisation zone within the non-optical peripheral carrier zone allowing the lens to minimally rotate when fitted on eye. This is in complete contrast to all the embodiments of the current disclosure.

DETAILED DESCRIPTION

In this section, the present disclosure will be described in detail with reference to one or more embodiments, some are illustrated and supported by accompanying figures. The examples and embodiments are provided by way of explanation and are not to be construed as limiting to the scope of the disclosure. The following description is provided in relation to several embodiments that may share common characteristics and features of the disclosure. It is to be understood that one or more features of one embodiment may be combined with one or more features of any other embodiments which may constitute additional embodiments.

The functional and structural information disclosed herein is not to be interpreted as limiting in any way and should be construed merely as a representative basis for teaching a person skilled in the art to employ the disclosed embodiments and variations of those embodiments in various ways. The sub-titles and relevant subject headings used in the detailed description section have been included only for the ease of reference of the reader and in no way should be used to limit the subject matter found throughout the invention or the claims of the disclosure. Further, the sub-titles and relevant subject headings should not be used in construing the scope of the claims or the claim limitations.

Risk of developing myopia or progressive myopia may be based on one or more of the following factors: genetics, ethnicity, lifestyle, excessive near work, etc. Certain embodiments of the present disclosure are directed towards a person at a risk of developing myopia or progressive myopia with or without astigmatism.

To date, some optical designs have been proposed to control the rate of myopia progression. Some characteristic features of designs for retarding the rate of myopia progression include some degree of relative positive power related to the prescription power, usually distributed rotationally symmetric around the optical axis of the contact lens. Some inherent weaknesses of prior art are described herein. Existing designs based on simultaneous images often compromise the quality of vision at various distances. This side effect is attributed to significant levels of simultaneous defocus, significant amounts of spherical aberration, or drastic change in power.

Given the influence of compliance of contact lens wear on the efficacy, significant reduction of visual performance may promote poorer compliance thus resulting in poorer efficacy. Accordingly, what is needed are designs for the correction of myopia and retardation of progression, without causing at least one or more of the shortcomings discussed herein. Other solutions will become apparent as discussed herein.

The efficacy of the designs in the prior art are established through randomised control clinical trials. The duration of these clinical trials range between 6 months and 3 years and the reported efficacy with prior art lenses range between 20% and 50%, when compared to the single vision control lenses.

A simple linear model of emmetropisation suggests that the magnitude of a stop-signal would accumulate over time.

In other words, the accumulated stop-signal depends on the total magnitude of exposure and not its temporal distribution. A striking observation in all clinical trials is the fact that almost all the slowing effect on the rate of progression occurs in the first 6 to 12-months.

So, a more faithful model of emmetropisation to line up with the clinical results suggests that there may be a delay before the stop-signal builds, then saturation occurs with time followed by a decay in the effectiveness of the stop-signal. In light of this clinical observation, there is clearly a need in the art for a contact lens that avoids or minimises this saturation effect by providing a temporally and spatially varying stop-signal to retard the rate of myopia progression, without the need of burdening the wearer to switch between different lenses.

PCT/AU2020/051004 and PCT/AU2020/051006 have contemplated designs to overcome such limitations around the decay of effectiveness of stop signal observed with prior art lenses.

While the proposed lenses of PCT/AU2020/051004 and PCT/AU2020/051006 are suitable for eyes with simple myopic refractive error, they impose a few limitations on the eyes burdened with myopia and astigmatism.

One or more of the following advantages are found in one or more of the disclosed devices and/or methods of contact lens designs. A contact lens device or method providing a stop-signal to retard the rate of eye growth or stop the eye growth (or the state of refractive error) of the wearer's eye based on spatially and temporally varying directional cues or optical signals. A contact lens device providing a temporally and spatially varying stop-signal for increasing the effectivity of managing progressive myopia with or without astigmatism. A contact lens device that is not solely based on either positive spherical aberration which suffers from the potential visual performance degradation for the wearer. A contact lens device that overcomes the limitations of prior art lenses with rotationally symmetric power distribution across the optic zone by minimising significant variations that may occur in the visual performance when fitted to individual eyes with myopia with and without astigmatism.

The following exemplary embodiment is directed to methods of modifying the incoming light through a contact lens system that offers spatially and temporally varying directional cues or optical stop signals at the retinal plane of the corrected eye.

This may be achieved by using a meridionally and azimuthally varying power distribution within the optic zone configured to be substantially devoid of mirror symmetry, in conjunction with a substantially invariant azimuthal thickness distribution within the non-optical peripheral optical zone of a contact lens; to provide at least in part, a foveal correction for myopia, with or without astigmatism, and to further provide, at least in part, a regional conoid of partial blur as a directional cue or optical stop signal at the retinal level to reduce the rate of myopia progression. The substantially invariant azimuthal thickness profile of the peripheral non-optical zone of the contact lens embodiments of this disclosure may be configured with or without additional rotational assisting features to facilitate the directional cues obtained with a contact lens to remain substantially spatially and temporally variant.

Figure 1A:
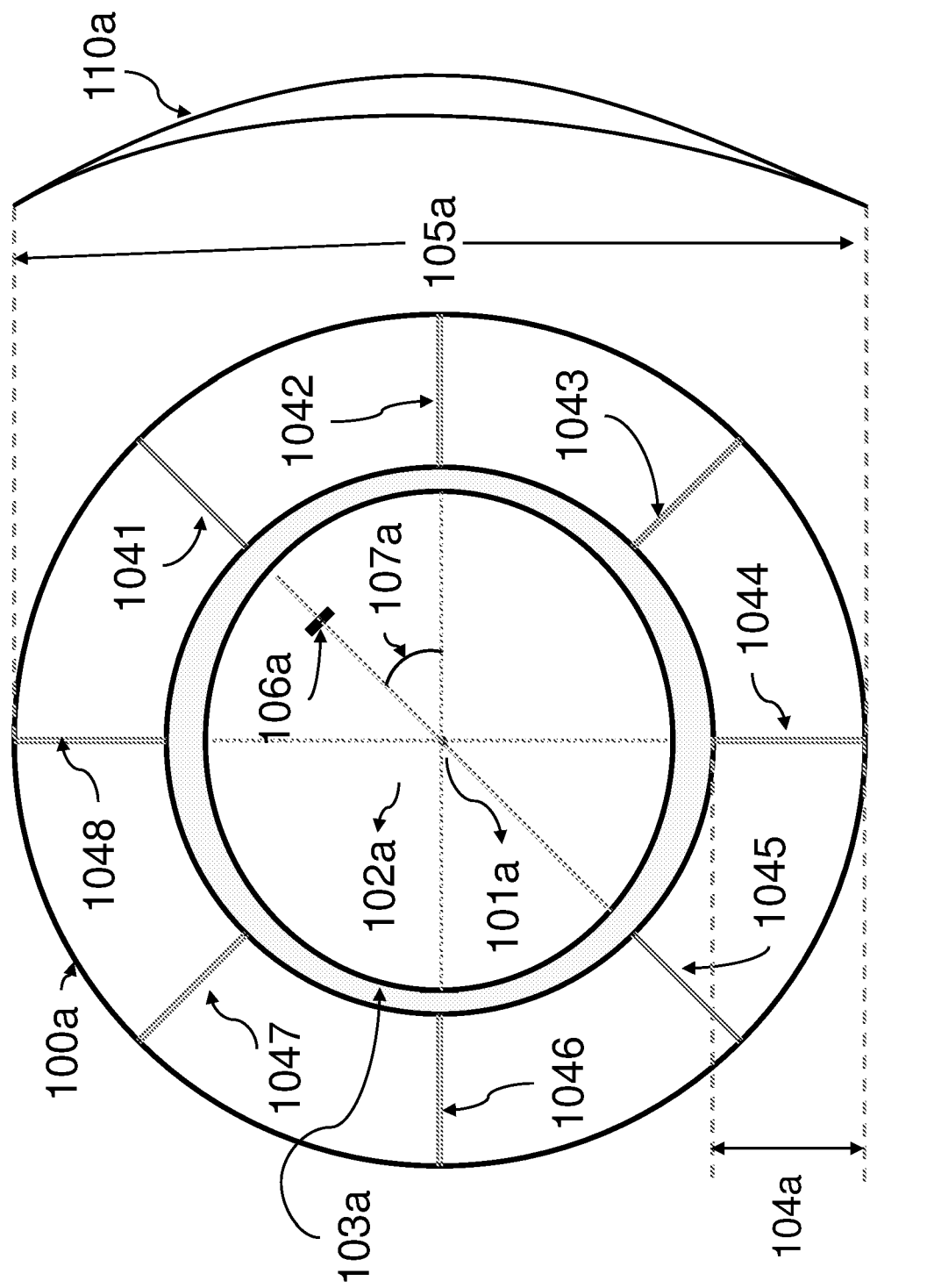
FIG. 1a illustrates the frontal view and cross-sectional view of a contact lens embodiment of the present disclosure. The frontal view further illustrates the optic centre, the optic zone, the blending zone, and the non-optical peripheral carrier zone comprising at least eight (8) cross-sections along arbitrary half-meridians, configured with substantially similar thickness, according to certain embodiments of the disclosure.

FIG. 1a shows the frontal view (100a) and cross-sectional view (110a) of an exemplary contact lens embodiment, not to scale. The frontal view of the exemplary contact lens embodiment further illustrates an optic centre (101a), an optic zone (102a), a blend zone (103a), a non-optical peripheral carrier zone (104a) and a lens diameter (105a).

The meridionally and azimuthally variant power distribution within the optical zone (102a) of the contact lens embodiment (100a) is configured using meridional (106a) and azimuthal (107a) power distribution functions.

In this exemplary example, the carrier zone (104a) is further depicted as eight (8) cross-sections along arbitrary half-meridians 1041 to 1048. In this exemplary example, the lens diameter is approximately 14 mm, the optic zone (101a) is elliptical and is approximately 8 mm along the horizontal diameter and approximately 7.5 mm along the vertical diameter, the blend zone (103a) is approximately 0.25 mm wide in the horizontal meridian and approximately 0.38 mm wide in the vertical meridian and the symmetrical non-optical peripheral carrier zone (104a) is approximately 2.75 mm wide.

The eight (8) cross-sections along arbitrary half-meridians (1041-1048) of the peripheral carrier zone (104a) have the same or substantially similar thickness profiles. In another variant of FIG. 1a, the non-optical peripheral carrier zone is configured with a thickness profile that assists with contact lens rotation, according to certain embodiments of the disclosure.

In certain embodiments, the differences in the thickness profiles along the eight (8) cross-sections along arbitrary half-meridians (1041 to 1048) may be configured to achieve the desired on-eye rotation about the optical centre of the lens. For example, a preferred on-eye rotation can be achieved by keeping the thickness profile substantially invariant across all half meridians within the non-optical peripheral carrier zone.

For example, the thickness profiles of the eight (8) representative cross-sections (1041 to 1048) may be configured such that the each of the eight (8) representative cross-section thickness profiles are substantially identical. In another example, the representative cross-sections (1041 to 1048) may be configured such that the thickness profiles of any one arbitrary representative cross-section is within 1%, 2%, 3%, 4%, 5%, 6%, 7%, 8%, 9% or 10% variance from any other representative cross section for any given distance from the centre of the lens.

In one example, the thickness profile of the representative cross-section 1041 is within 3%, 5%, 7% or 9% variance of the thickness profile of the radial cross-section 1047, measured at any given distance from the centre of the lens. In another example, the thickness profile of the representative cross-section 1043 is within 4%, 6% or 8% variance of the thickness profile of the representative cross-section of 1046 measured at any given distance from the centre of the lens.

In yet another example, the thickness profiles of the representative cross-sections (for example 1041 to 1048) may be configured such that the thickness profiles of any of the representative cross-sections are within 4%, 6%, 8%, or 10% variation of the average of all representative cross-sections measured over a defined width spanning a range of arbitrary radial distances in the non-optical peripheral carrier zone.

To ascertain if the manufactured lens' thickness profiles are close to their lens' nominals, for example, 1041 to 1048, the thickness profiles of the contact lenses across the half-meridians may be obtained by using perpendiculars drawn from the tangents at each point on the back surface of the contact lens to the front surface of the contact lens.

In some examples, the peak thickness measured in one cross-section of an arbitrary half-meridian may be compared with the peak thickness measured at the corresponding point in another cross-section of another half-meridian of the non-optical peripheral carrier zone. In some examples, the peak thickness measured at a range of points along one cross-section of an arbitrary half-meridian may be compared with the peak thickness measured over a range of corresponding points along another cross-section of the non-optical peripheral carrier zone. In some embodiments, the difference in the peak thicknesses between one or more representative cross-sections may be no greater than 10 μm, 20 μm, 30 μm, 40 μm, or 50 μm. In some embodiments, the difference in the peak thicknesses between one or more perpendicular radial cross-sections may be no greater than 10 μm, 20 μm, 30 μm, 40 μm, or 50 μm.

In some examples, the number of representative cross-section samples of the non-optical peripheral carrier zone used to characterise the contact lens of the present disclosure may be at least 4, at least 6, at least 8, at least 10, at least 12, at least 16, at least 18, at least 24, at least 32 or at least 36.

In this exemplary contact lens embodiment (100a), the optic zone has a meridionally and azimuthally variant power distribution, wherein the meridionally varying power distribution is devoid of mirror symmetry, which, at least in part, provides correction for a −3 DS myopic eye, and wherein the meridionally and azimuthally variant power distribution with a delta power of +1.25 D, at least in part, induces or introduces a conoid, or an interval, of partial blur serving as a directional cue or an optical stop signal at the retina of the eye. In some other examples of the present disclosure, the sphere power of the contact lens to correct and manage myopic eyes may be between −0.5 DS to −12 DS and the desirable delta power to induce or introduce the desired conoid or interval of partial blur as a directional cue or an optical stop signal at the retina of the myopic eye may range between +0.75 D to +2.5 D. In some embodiments, the myopic eye may be with or without significant magnitudes of astigmatism, for example −0.75DC, −1DC, −1.25DC, −1.5DC, −1.75DC or −2DC.

Figure 1B:
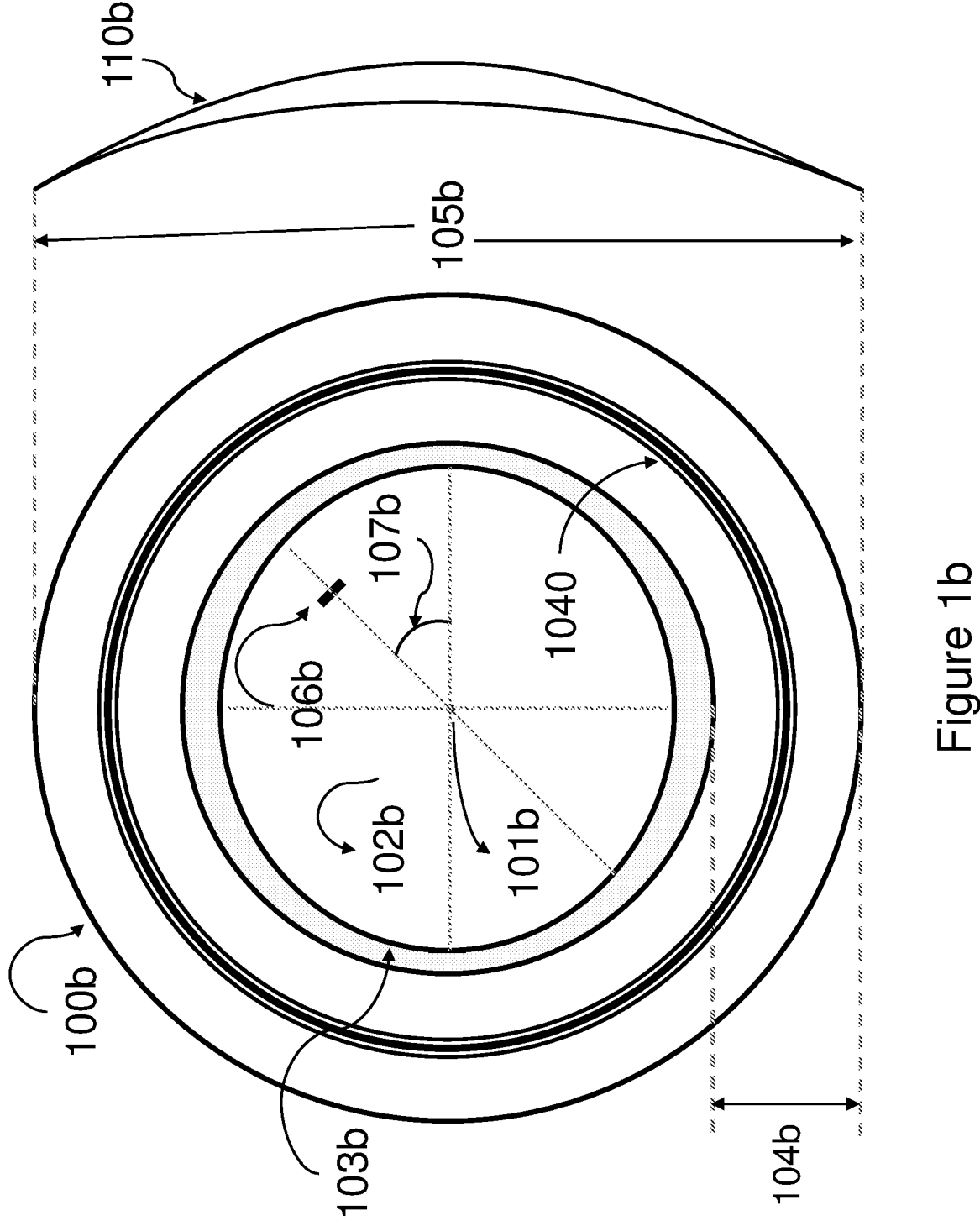
FIG. 1b illustrates the frontal view and cross-sectional view of another contact lens embodiment of the present disclosure. The frontal view further illustrates the optic centre, the optic zone, the blending zone, and the non-optical peripheral carrier zone comprises an azimuthal thickness distribution configured substantially invariant, or configured with a periodic profile with defined periodicity, such that the non-optical peripheral carrier zone predisposes, or assists with, contact lens rotation, according to certain embodiments of the disclosure.

FIG. 1b illustrates the frontal view (100b) and cross-sectional view (110b) of another contact lens embodiment of the present disclosure. The frontal view further illustrates the optic centre (101b), the optic zone (102b), the blending zone (103b), a lens diameter (105b) and the non-optical peripheral carrier zone (104b) with an azimuthal thickness distribution (1040) configured substantially invariant, or with a periodic profile with defined periodicity, such that the non-optical peripheral carrier zone predisposes, or assists with, contact lens rotation, according to certain embodiments of the disclosure. The meridionally and azimuthally variant power distribution within the optical zone of the contact lens embodiment (100b) is configured using meridional (106b) and azimuthal (107b) power distribution functions described herein.

The thickness profiles of the manufactured lenses may be measured by using perpendiculars drawn from the tangents at each point on the back surface of the contact lens to the front surface of the contact lens at each point in the non-optical peripheral carrier zone. The measured thickness profiles at each point in the non-optical peripheral carrier zone may also be plotted as a function of azimuthal angles defined at any arbitrary radial distance within the non-optical peripheral carrier zone to provide an azimuthal thickness distribution.

In some examples the azimuthal thickness distribution may be measured or compared at any arbitrary radial distance within the non-optical peripheral carrier zone. In other examples, the azimuthal thickness profiles may be measured or compared by averaging measurements across a range of arbitrary radial distances within the non-optical peripheral carrier zone.

In some examples of variants of FIG. 1*b*, one or more azimuthal thickness distributions about the optical axis, defined at an arbitrary radial distance in the non-optical peripheral carrier zone, may be configured to be substantially invariant. The substantial invariance in such instance means a variation in azimuthal thickness distribution that has a peak-to-valley between 5 μm and 50 μm, 10 μm and 40 μm, or between 15 μm and 35 μm.

Figure 2A:
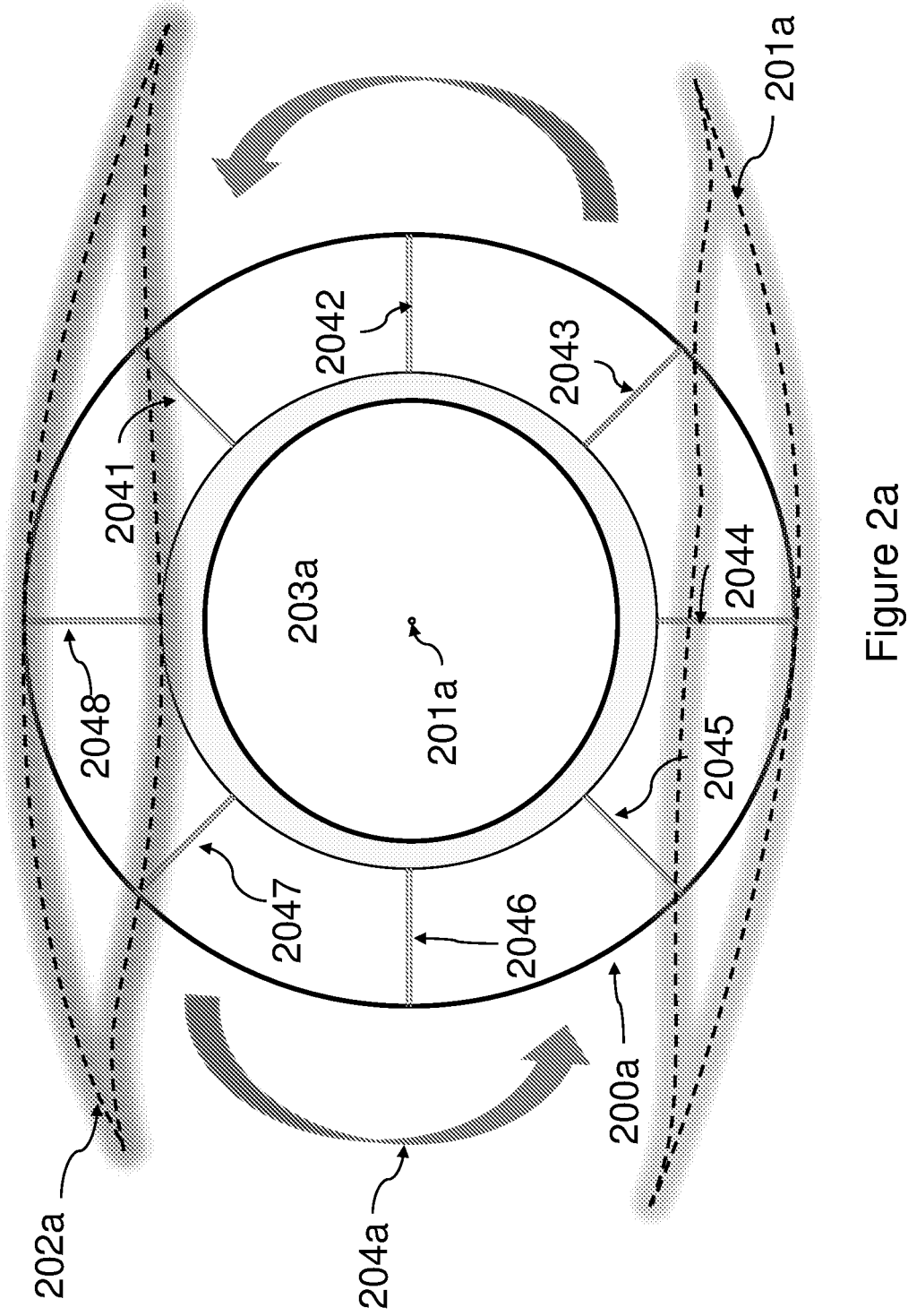
FIG. 2a illustrates the frontal view of another contact lens embodiment of the present disclosure, which illustrates a potential for a substantially free rotation with natural blink action due to the non-optical peripheral carrier zone comprising at least eight (8) cross-sections along arbitrary half-meridians, configured with substantially similar thickness, according to certain embodiments of the disclosure.

FIG. 2*a* shows the frontal view of the exemplary contact lens embodiment (200*a*). This figure diagrammatically illustrates the effects of eyelids, lower (201*a*) and upper (202*a*) on the orientation of the contact lens embodiment (200*a*), particularly the optical zone (203*a*) defined about the optic centre (201*a*). In this exemplary example, the non-optical peripheral carrier zone is depicted as eight (8) representative cross-sections (2041 to 2048) of arbitrary half-meridians. In this exemplary example, the lens diameter is approximately 14.2 mm, the optic zone is approximately 8 mm in diameter, the blend zone is approximately 0.125 mm wide (horizontally) and 0.25 mm wide (vertically) and the symmetrical carrier zone is approximately 2.9 mm (horizontally) and 2.75 mm wide (vertically).

Due to the natural blink facilitated by the combined action of the lower (201*a*) and upper (202*a*) eyelids, the contact lens (200*a*) may rotate on or around about the optical centre (201*a*). This may lead to the orientation and location of the optical signal or stimulus, i.e., regional conoid or interval of partial blur, imposed by the optical zone (203*a*), defined substantially centred about the optical centre or the optical axis, to vary with blink providing substantially free or assisted rotation (204*a*), resulting in a temporally and spatially varying stimulus to reduce the rate of progression in a myopic or a myopic astigmatic wearer; wherein the virtue of a spatial and temporally varying stimulus provides the desired effectiveness of managing myopia which remains substantially consistent over time.

Figure 2B:
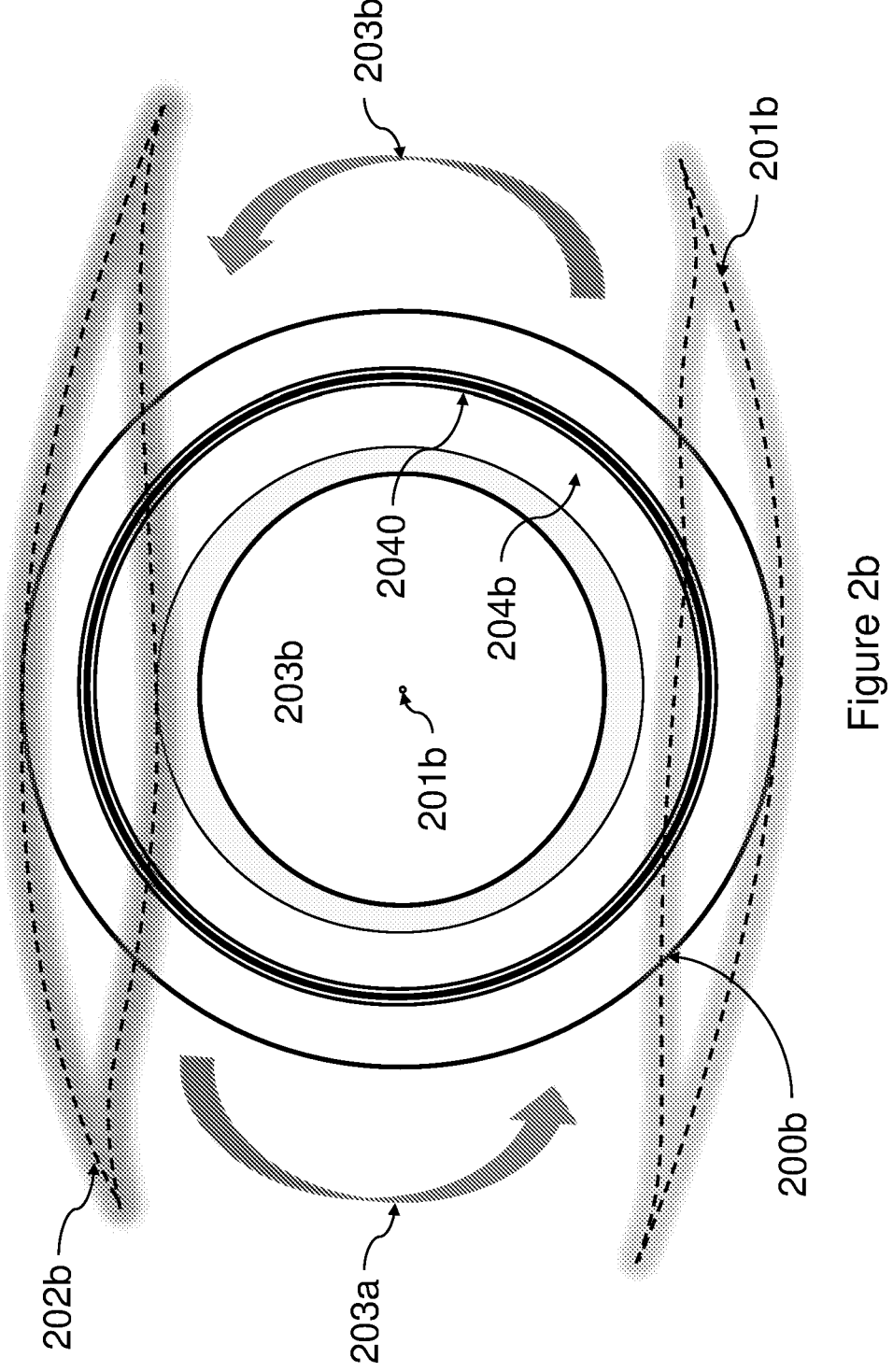
FIG. 2b illustrates the frontal view of another contact lens embodiment of the disclosure, which illustrates a potential for a substantially free rotation or rotation assisting contact lens substantially around the optical centre due to the non-optical peripheral carrier zone comprises an azimuthal thickness distribution configured substantially invariant, or configured with a periodic profile with defined periodicity, such that the non-optical peripheral carrier zone predisposes, or assists with, contact lens rotation, according to certain embodiments of the disclosure.

FIG. 2*b* illustrates the frontal view of another contact lens embodiment (200*b*) of the disclosure. This figure diagrammatically illustrates the effects of eyelids, lower (201*b*) and upper (202*b*) on the orientation of the contact lens embodiment (200*a*), which illustrates a potential for a substantially free rotation or rotation assisting contact lens substantially around the optical centre (201*b*) due to the non-optical peripheral carrier zone (204*b*) with an azimuthal thickness distribution (2040) configured substantially invariant, defined with or without a periodic profile with a specific periodicity, that may predispose, or assist with, the contact lens rotation (203*a* and 203*b*), according to certain embodiments of the disclosure.

In some embodiments, for example, as described with reference to FIGS. 1 and 2, the contact lens is designed to exhibit substantially free rotation, or a predisposition to increase in rotation due to the rotation assisting feature, at least under the influence of natural blinking action. For example, throughout a day of lens wear, preferably over 6 to 12 hours, the eyelid interaction will dispose the contact lens to be oriented in a large number of different orientations or configurations on the eye. This results in a temporally and spatially varying optical signal or stimulus to reduce the rate of progression in a myopic or a myopic astigmatic wearer; wherein the virtue of a spatial and temporally varying stimulus provides the desired effectiveness of managing myopia which remains substantially consistent over time.

Due to the meridionally and azimuthally variant power distribution in the optic zone configured substantially about the optical centre of the said contact lens, in conjunction with the substantially invariant azimuthal thickness distribution configured in the non-optical peripheral zone, the resultant regional conoid or interval of partial blur at the retina level of the wearer may be configured to vary spatially and temporally, allowing for minimising the reduction of treatment efficacy as a function of time.

In some embodiments, the surface parameters of the contact lens embodiment, for example, the back-surface radius and/or asphericity may be tailored to an individual eye such that a desired on-eye rotation of the contact lens may be achieved. For example, the said contact lens may be configured to at least 0.1 mm, 0.2 mm, or 0.3 mm flatter than the radius of curvature of the flattest meridian of the cornea of the eye to increase the occurrences of on-eye rotation during lens wear.

In other examples or variants of FIG. 2*b*, the azimuthal thickness profile of the non-optical peripheral carrier zone may follow be configured using a sawtooth-like profile to assist with the rotation of the contact lens. For example, the number of teeth contemplated over full $2\pi$ radians may be at least 6, at least 8, at least 10, at least 12 or at least 14. The number of teeth is to be no less than 6 to avoid a preferential orientation on eye. In some examples, the amplitude of any individual tooth of the selected array of teeth, the teeth angles and/or direction of the teeth may be selected to provide at least 10%, 20%, 30%, 40% or 50% more rotation compared to the design configured with a substantially invariant azimuthal thickness profile configured within non-optical peripheral carrier zone. In some variants of FIG. 2*b*, the azimuthal thickness profile of the non-optical peripheral carrier zone may follow a sinusoidal, a quasi-sinusoidal profile.

For such profiles, the azimuthal thickness profile within the non-optical peripheral carrier zone is not uniform. Furthermore, while contemplating rotation assisting features of the current disclosure, the azimuthal thickness variation may also vary as a function radial distance within the non-optical peripheral carrier zone. For example, towards the outer edge of the contact lens and towards the front optic zone diameter, the contemplated sawtooth pattern may be reduced to blend in with a uniform edge thickness. In some other embodiments, the contact lens may be designed to have a rotation of fewer than 20 degrees within 1 hour of lens wear and less than 180 degrees once per day. It will be appreciated that this contact lens may be still capable of producing a temporally and spatially varying stop signal by a mere random orientation of the lens which is governed by the orientation of the contact lens at the time of insertion on any given day.

Table 1 differentiates the designs I and II of the present disclosure from a range of prior art contact lens designs, including commercially available designs, encompassing single vision, bifocal, multifocal and standard toric or astigmatic lenses. The abbreviations VAR, SYM and PTV in Table 1 stand for variance, symmetry, and peak-to-valley, respectively. As can be seen from the table, the two differentiating elements that isolate the disclosed designs from the prior art largely rely on the meridional and azimuthal variance of power profiles of the optic zone and azimuthal invariance of the thickness profiles of the non-optical peripheral carrier zone.

TABLE 1

Power and thickness description of various contact lens designs.

| Lens | Optic zone Power distribution | | | | | Non-Optical Peripheral Zone Thickness | | |
| | Meridional | | Radial | Azimuthal | | Azimuthal | | |
| Types | VAR | SYM | VAR | VAR | SYM | VAR | SYM | PTV |
| --- | --- | --- | --- | --- | --- | --- | --- | --- |
| Single vision | NO | YES | YES / NO | NO | YES | NO | YES | <10 μm |
| Bifocal and multifocals | NO | YES | YES | NO | YES | NO | YES | <10 μm |
| Toric lenses | NO | YES | NO | YES | YES | YES | NO | >100 μm |
| Disclosed Designs I | YES | NO | YES / NO | YES | NO | NO | YES | <10 μm |
| Disclosed Designs II | YES | NO | YES / NO | YES | NO | YES | YES | 10 μm to 40 μm. |

All rotationally symmetric lens designs, for example, single vision, bifocal and multifocal designs, have optic zones characterised with meridionally and azimuthally invariant power distributions and further configured with azimuthally invariant thickness distributions of the non-optical peripheral carrier zone (<10 μm).

Unlike the rotationally symmetric single vision, bifocal and multifocal designs of Table 1, the optic zone of the conventional/standard astigmatic or toric lenses are characterised by azimuthally variant but meridionally invariant power profile, combined with azimuthally variant thickness distribution of the non-optical peripheral carrier zone (>100 μm). The significantly large peak-to-valley of at least 100 μm or more in the azimuthal thickness distribution of a standard toric or astigmatic lens is virtue of the design. For a toric or astigmatic lens to correct the underlying astigmatism of the eye, the toric or astigmatic portion of the optic zone should be in alignment with the astigmatic axis of the eye and furthermore the lens should not rotate significantly on eye to avoid any potential detriment in visual performance. To not allow any free rotation of the eye, standard toric or astigmatic lenses of prior art are designed with dedicated stabilisation zones, for example a ballast, a prism, slab-off or truncation. These dedicated stabilisation zones are the reason for large magnitudes of peak-to-valley (>100 μm) observed in toric or astigmatic contact lenses.

For avoidance of doubt, the lenses of the current disclosure are free of any kind of stabilisation platforms, including but not limited to a ballast, slab-off, truncation, or similar. Instead, the non-optical peripheral carrier zone of the current disclosure is configured with a substantially invariant azimuthal thickness distribution, with or without assisted rotation features, allowing substantially free rotation that predisposes the contact lens for an increased on-eye rotation of the contact lens.

Specific structural and functional details disclosed in these figures and examples are not to be interpreted as limiting, but merely as a representative basis for teaching a person skilled in the art to employ the disclosed embodiments in numerous other variations. A specific schematic model eye chosen for illustrative purposes to demonstrate the effects of the embodiments of the present disclosure. This should not be construed as limiting to the scope of the invention. For example, a person skilled in the art may use other schematic raytracing model eyes like Liou-Brennan, Escudero-Navarro instead of the model eye configuration used in the current disclosure. For example, one may alter the parameters of the cornea, lens, retina, ocular media, or combinations thereof, to aid further simulation of the embodiments disclosed herein or variations thereof.

The examples provided in this specification have used model eyes with −1 DS and −4 DS of myopia, with and without +1 DC of astigmatism, to disclose the present invention. The same disclosure can be extended to other degrees of myopia and/or astigmatism, for example, −2 DS, −3 DS, or −6 DS of myopia and/or 0.5 DC, 0.75 DC or 1.25 DC of astigmatism. The astigmatism may be configured using positive cylinder notation, for example +1.25 DC, or using negative cylinder notation, for example −1.25 DC. In the example embodiments, reference was made to a specific monochromatic wavelength of 589 nm. In other examples, the lens designer may draw an extension to other visible wavelengths between 420 nm and 760 nm.

Certain embodiments of the present disclosure are directed to contact lenses that may provide a temporally and spatially varying, in other words varying substantially in a retinal location, substantially over time, stop signal to the progressing myopic eye, achieved with the help of the natural on-eye rotation of the contact lens occurring due to the natural blink action. This temporally and spatially varying stop-signal may minimise the implicit saturation and/or fading effects of efficacy that are observed with the lenses of prior art.

Certain embodiments of the present disclosure are directed to contact lenses that may provide a spatially and temporally variant stop signal to the progressing myopic eye with or without astigmatism no matter in which orientation the contact lens is worn, or inserted, by the wearer. In some embodiments of the present disclosure, the stop signal may be configured using an meridionally and azimuthally variant power distribution. The meridionally and azimuthally variant power distribution may be further configured using a radial invariant power distribution about the optic centre of the contact lens. In some other embodiments, the meridionally and azimuthally variant power distribution may be configured using a substantially radially invariant power distribution. In certain embodiments of the present disclosure, the meridionally and azimuthally variant power distribution within the optic zone of the contact lens may be configured using a radially invariant, meridionally variant profile across the entire optic zone and an azimuthally variant profile across a selected substantially partial area of the optic zone on the contact lens while the rest of the area is configured with an azimuthally invariant power distribution.

In some embodiments the contemplated or selected partial area of the azimuthally variant profile may be 25%, 30%, 35%, 40%, 45%, or 50% of the total area of the optic zone on the contact lens. In some other embodiments the contemplated or selected partial area of the azimuthally variant profile may be between 20% and 30%, 30% and 50%, 15% and 45% of the total area of the optic zone on the contact lens.

In certain embodiments of the present disclosure, the meridionally and azimuthally variant power distribution within the optic zone of the contact lens may be configured using a radially variant power distribution across substantially the entire optic zone; wherein the variance in the radial dimension is configured such that the power increases or decreases from the centre of the optic zone to the margin of the optical zone and the variance in the azimuthal dimension is configured such that the power decreases from 0 to $2\pi$ radians.

In some contact lens embodiments of the present disclosure, the decrease in power distribution along the radial direction may be described using linear, curvilinear, or quadratic functions.

the decrease in power distribution along the azimuthal direction may be the same across substantially all radial positions on the optic zone.

In certain embodiments, the meridionally and azimuthally variant power distribution may be configured such that the power distribution is the sum of, the base sphere prescription, and product of the radial or meridional and azimuthal power distribution functions. In some embodiments, the power distribution function of the optic zone may be radially invariant but meridionally and azimuthally variant. In some embodiments, the power distribution function of the optic zone is meridionally and azimuthally variant and further configured radially variant. In some other embodiments, the power distribution function of the contact lens may be radially invariant and azimuthally invariant for substantially 10%, 20%, 30%, 40%, or 50% of the area of the optical zone of the contact lens and azimuthally variant over the remainder area of the optic zone.

Schematic model eyes were used for simulation of the optical performance results of the exemplary embodiments of the current disclosure. The prescription parameters of the schematic model eyes used for optical modelling and simulation of the performance are tabulated in Tables 2 and 3.

TABLE 2

| | | | | | Semi | |
| | | Radius | Thickness | Refractive | Diameter | Conic |
| Type | Comment | (mm) | (mm) | Index | (mm) | Constant |
| --- | --- | --- | --- | --- | --- | --- |
| | Prescription of a schematic myopic model eye with prescription of −1 DS. | | | | | |
| Standard | | Infinity | Infinity | | 0 | 0 |
| Standard | Start | Infinity | 5 | | 4 | 0 |
| Standard | Anterior Cornea | 7.75 | 0.55 | 1.376 | 5.75 | −0.25 |
| Standard | Posterior Cornea | 6.4 | 3 | 1.334 | 5.5 | −0.4 |
| Standard | Pupil | Infinity | 0.45 | 1.334 | 5 | 0 |
| Standard | Anterior Lens | 10.8 | 3.8 | 1.423 | 4.5 | −4.798 |
| Standard | Posterior Lens | −6.25 | 16.924 | 1.334 | 4.5 | −4.101 |
| Standard | Retina | −12 | 0 | | 10 | 0 |

In certain other embodiments of the present disclosure, the decrease in power distribution along the radial direction may be different for different azimuthal positions on the optic zone.

In other embodiments, the decrease in power distribution along the azimuthal direction may follow a cosine distribution with reduced frequency, for example in some embodiments it may be one-sixth (⅙), one-fifth (⅕), one-fourth (¼), one-third (⅓), or half (½), of the normal frequency contemplated in a toric or astigmatic prior art lens. The term normal frequency contemplated in a toric or an astigmatic prior art lens can be observed or seen in FIGS. 3 and 8.

In other embodiments of the present disclosure, the decrease in power distribution along the azimuthal direction may be different for different radial positions on the optic zone. In yet another embodiment of the present disclosure, The prescription offers two model eyes, one with −1 DS of myopia without astigmatism and the other with −4 DS of myopia with +1 DC×90° astigmatism, defined at 6 mm pupil and a wavelength of 589 nm. The prescription described in Tables 2 and 3 should not be construed as an imperative method to demonstrate the effect with the contemplated exemplary embodiment. It is just one of many methods that may be used by the person skilled in the art for optical simulation purposes. In other examples, a lens designer may also alter the parameters of the individual parameters of the model eye; for example, the cornea, lens, retina, media, or combinations thereof, to aid a better simulation of the effect being described.

To demonstrate the effects of other embodiments, other schematic model eyes like Atchison, Escudero-Navarro, Liou-Brennan, Polans, Goncharov-Dainty may also be used instead.

TABLE 3

Prescription of a schematic myopic model eye with a prescription of −4 DS/+1 DC × 90.

| Type | Comment | Radius (mm) | Thickness (mm) | Refractive Index | Semi Diameter (mm) | Conic Constant |
|---|---|---|---|---|---|---|
| Standard | | Infinity | Infinity | | 0 | 0 |
| Standard | Start | Infinity | 5 | | 4 | 0 |
| Biconic | Anterior Cornea Y | 7.75 | 0.55 | 1.376 | 5.75 | −0.25 |
| | Anterior Cornea X | 7.89 | | | | −0.25 |
| Standard | Posterior Cornea | 6.4 | 3 | 1.334 | 5.5 | −0.4 |
| Standard | Pupil | Infinity | 0.45 | 1.334 | 5 | 0 |
| Standard | Anterior Lens | 10.8 | 3.8 | 1.423 | 4.5 | −4.798 |
| Standard | Posterior Lens | −6.25 | 16.924 | 1.334 | 4.5 | −4.101 |
| Standard | Retina | −12 | 0 | | 10 | 0 |

Figure 3:
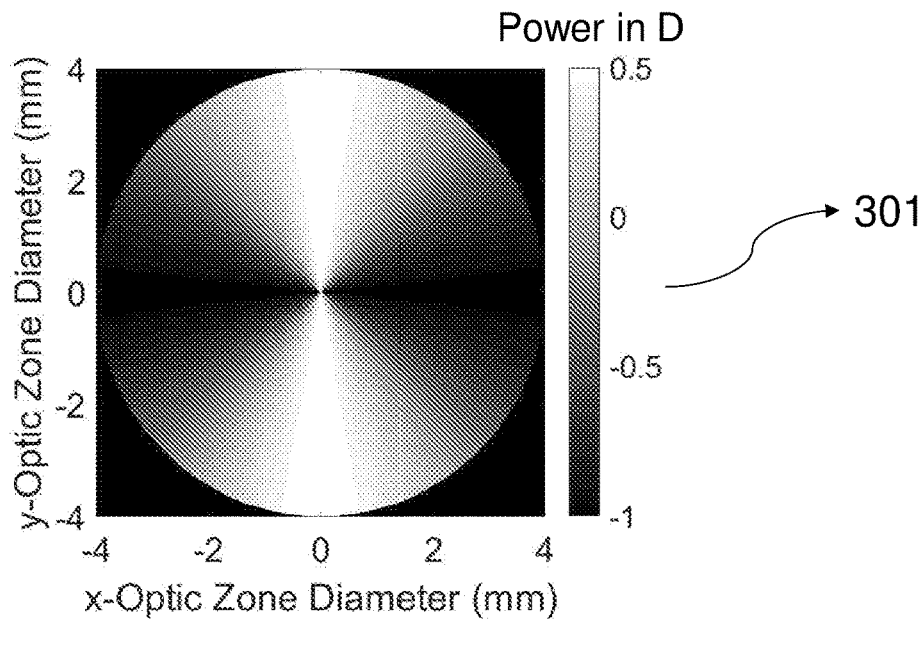
FIG. 3 illustrates the power distribution (i.e., power map, power as a function of optic zone diameter and power as a function of azimuth) within the optical zone of a standard toric or astigmatic contact lenses (power:−1 DS/+1.5 DC) configured using standard sphero-cylindrical power distribution.
Figure 3:
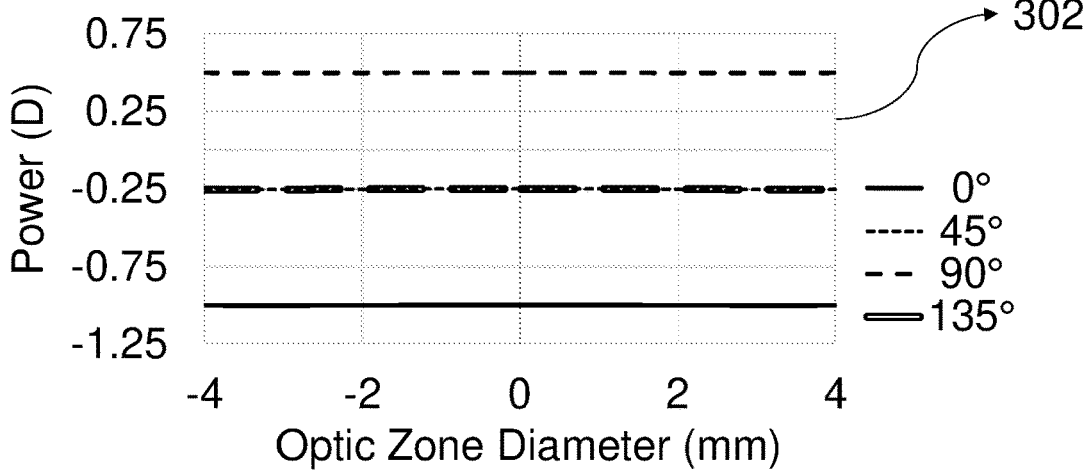
Figure 3:
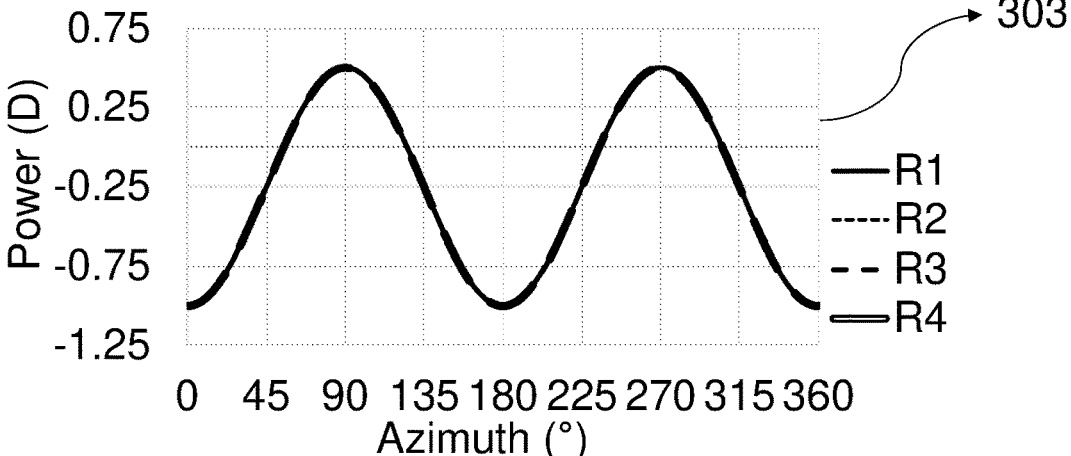

FIG. 3 illustrates the power map distribution (301) within the optical zone of one standard toric or astigmatic contact lens, its corresponding power profiles as a function of optic zone diameter for four representative sample meridians 0°, 45°, 90° and 135° (302), and its corresponding power profiles as a function of azimuth for four representative sample radial positions R1, R2, R3 and R4 (303) with radial distances of 0.5, 1.5, 2.5 and 3.5 mm, respectively.

The toric or astigmatic lens is configured using a standard sphero-cylindrical power distribution function, wherein one principal meridian (vertical meridian) 90° has a power of approximately +0.5 D, the other principal meridian (horizontal meridian) 0° has a power of approximately −1 D and the oblique meridians 45° and 135° have a power of approximately −0.25 D. The difference between the two principal meridians is the cylinder power, which in this contact lens example is 1.5 DC. The power distribution of the toric or astigmatic lens is mirror-symmetrical, as it has a radially and meridionally invariant power distribution that follows a cosine function with normal frequency (i.e., two cosine cycles over 360°). The term normal frequency contemplated in a standard toric or an astigmatic prior art lens can be observed or seen in FIG. 3.

Figure 4A:
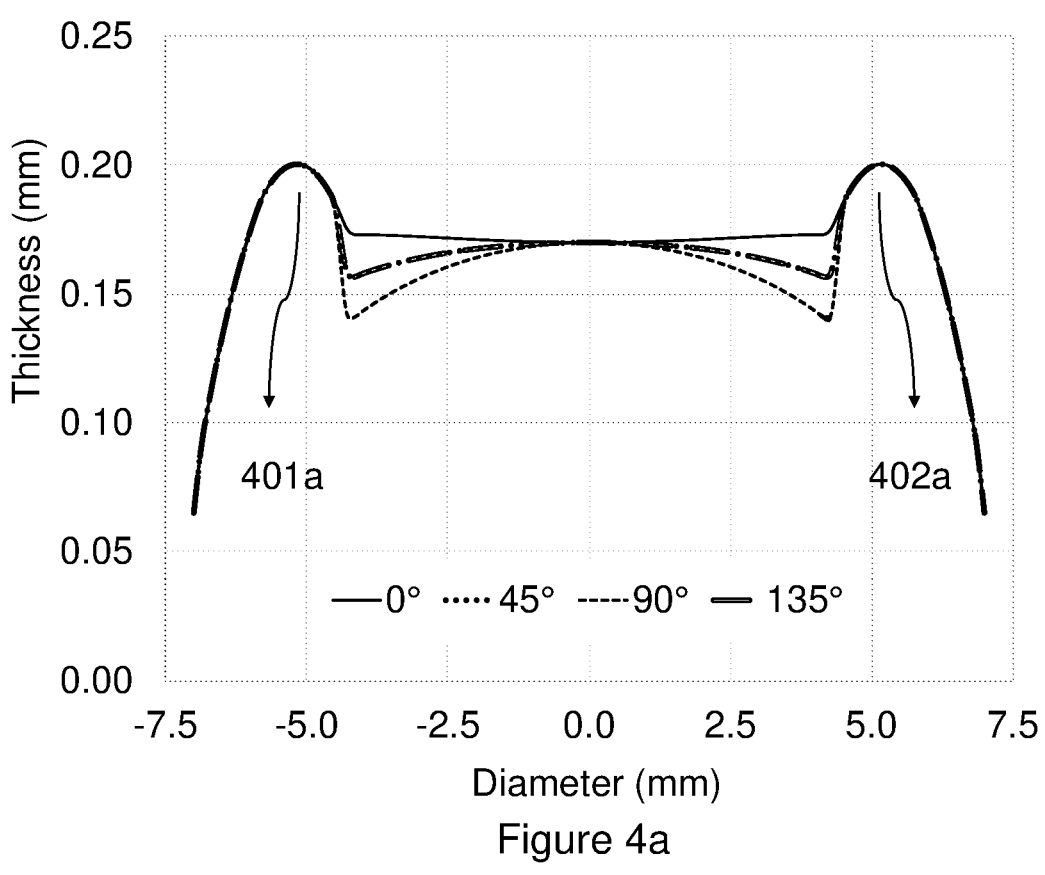
FIG. 4a illustrates the thickness distribution across the whole contact lens described in FIG. 3 with an astigmatic power distribution along four sample representative meridians, namely 0°, 45°, 90°, 135°.

FIG. 4a showcases the thickness profile across the contact lens diameter of the toric or astigmatic contact lens described in FIG. 3 along four representative sample meridians, namely 0°, 45°, 90° and 135°. As can be seen in cross sections 401a and 402a of FIG. 4a, the non-optical peripheral carrier zone of the contact lens has a substantially rotationally symmetric non-optical peripheral carrier zone.

This design, as previously disclosed in PCT Application Number PCT/AU2020/051004, facilitates the substantially free rotation on or around the optical centre of the contact lens, due to the natural blink facilitated by the combined action of the upper and lower eyelids. This in turn leads to the astigmatic or line stimulus imposed by the optical zone to vary with blink, resulting in a temporally and spatially varying stimulus to reduce the rate of progression in a myopic wearer; such that the astigmatic directional cues and the efficacy to reduce the progression of eye growth remains substantially consistent over time.

Figure 4B:
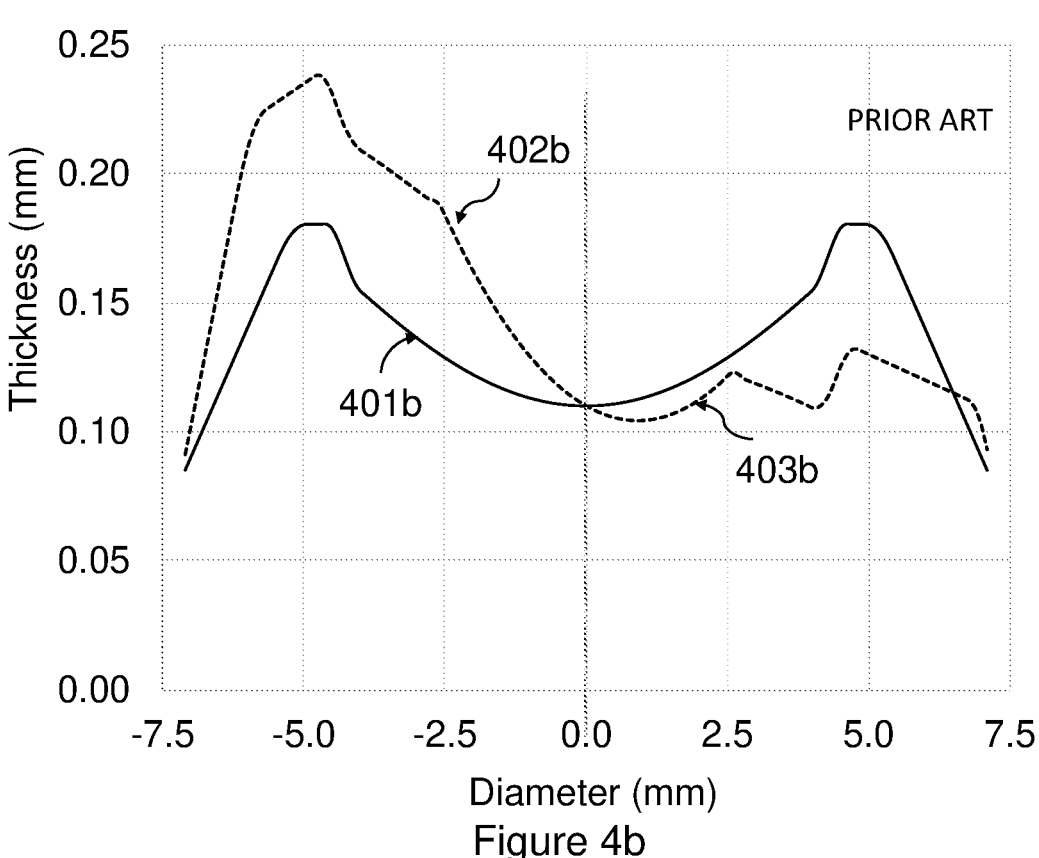
FIG. 4b illustrates the thickness distribution across the whole contact lens of a toric contact lens of the prior art configured with an astigmatic power distribution along two principal meridians 0° and 90°.

FIG. 4b illustrates the thickness distribution across the whole contact lens of a toric contact lens of prior art with an astigmatic power distribution along the two principal meridians 0° and 90°. The prior art toric lens of FIG. 4b has a prism-ballast stabilisation zone. The thickness profiles of the vertical and horizontal meridians of a prism ballast lens, which is typical of lenses of the prior art with a cylinder power of approximately 1.5 DC.

The horizontal section (401b) is symmetrical, while the vertical section has a thick inferior (402b) and a thin superior (403b) part to provide a stable orientation when fitted to an eye. The steep thickness curvature in the vertical section and the flat thickness curvature in the horizontal meridian match the required corneal astigmatism and this provides good vision for an astigmatic eye along any meridian.

Figures 4C, 4D:
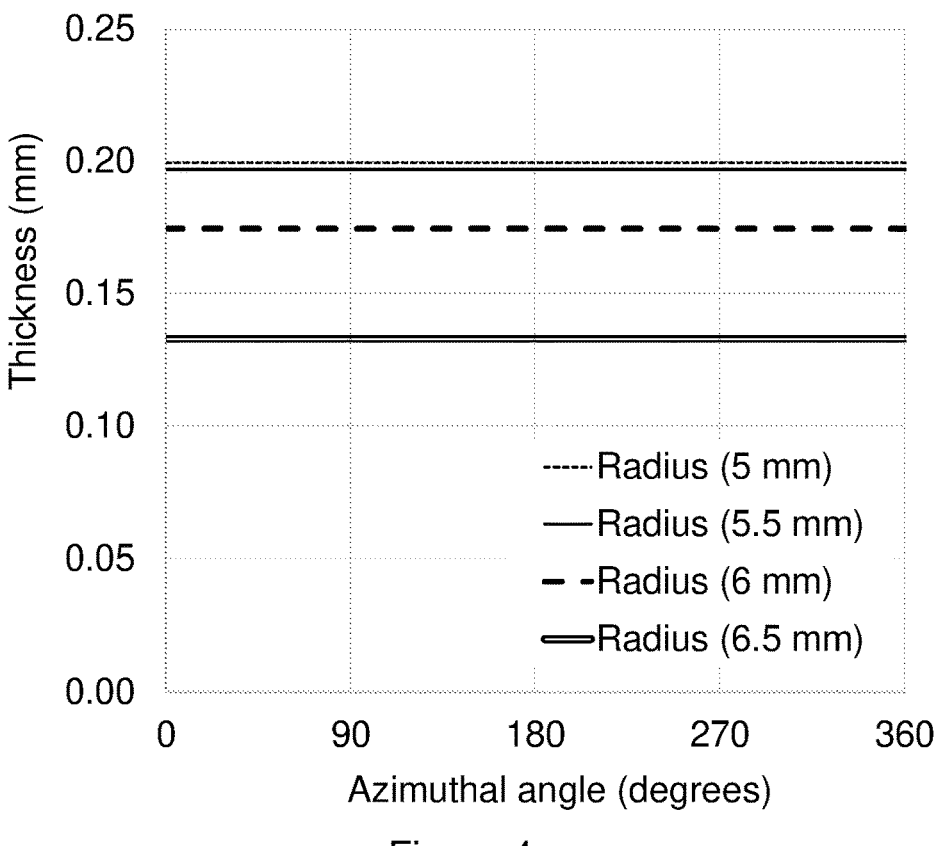
FIG. 4c illustrates the thickness distribution as a function of azimuthal angle of the contact lens described in FIG. 3 and FIG. 4a along four sample radial distances 5 mm, 5.5 mm, 6 mm, and 6.5 mm within the non-optical peripheral zone.
FIG. 4d illustrates the thickness distribution as a function of azimuthal angle of a toric contact lens of the prior art with prism ballast stabilisation method described along 5.5 mm radial distance within the non-optical peripheral zone.

FIG. 4c illustrates the thickness distribution as a function of azimuthal angle of the contact lens described in FIG. 3 and FIG. 4a along four sample radial distances 5 mm, 5.5 mm, 6 mm, and 6.5 mm within the non-optical peripheral zone. As can be seen from FIG. 4c, independent of radial distance the thickness of the contact lens is substantially invariant as a function of azimuthal angle with a peak-to-valley of <5 μm. Furthermore, the maximum observed difference between the thickness at various representative radial positions within the non-optical peripheral zone is approximately about 0.07 mm.

Conversely, FIG. 4d illustrates the thickness distribution as a function of azimuthal angle of a toric contact lens of prior art, which shows a substantially asymmetric azimuthal thickness distribution, wherein the thickness difference between the 90° and 270° azimuthal angles, peak-to-valley (PTV) of the azimuthal thickness distribution is about 0.155 mm at a radial distance of 5.5 mm, resulting in the desired stabilisation of the toric prior art contact lens.

Figure 5:
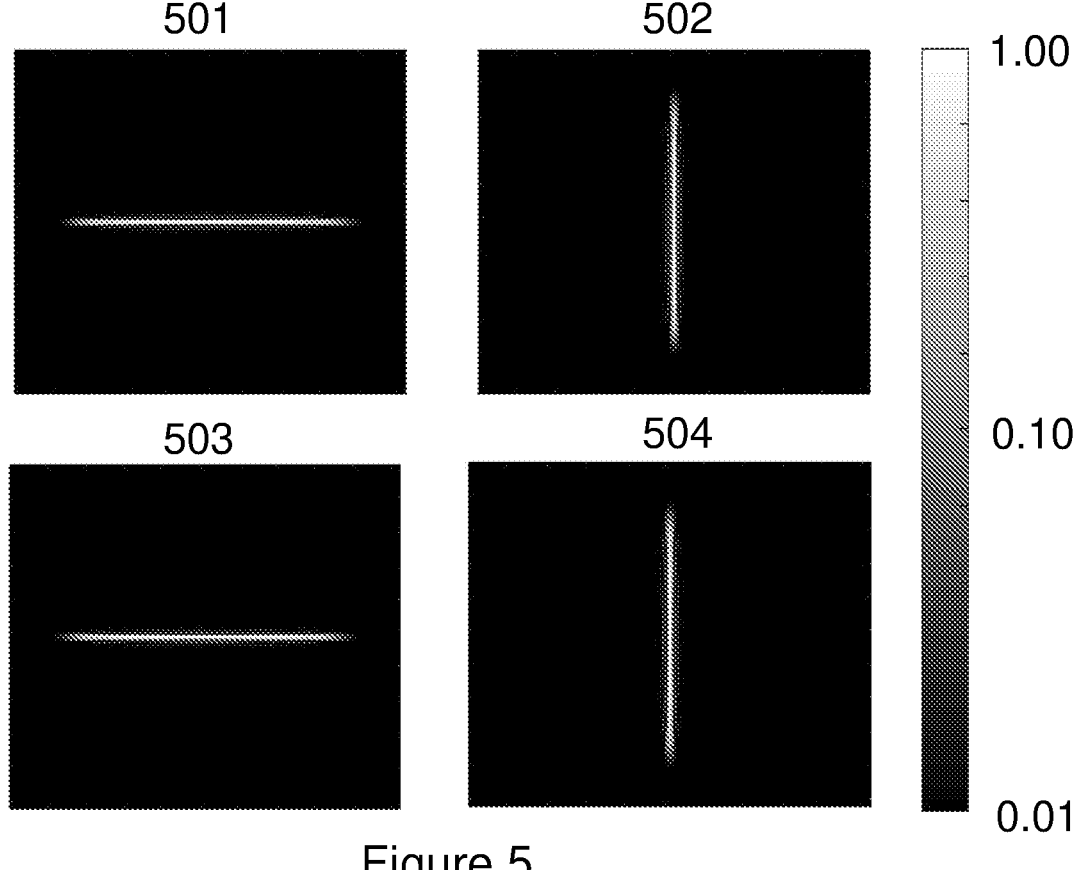
FIG. 5 illustrates the temporally and spatially varying signal due to contact lens rotation (i.e., 0°, 90°, 180° and) 270° depicted as on-axis point spread functions at the retinal plane, when the incoming light with a visible wavelength (589 nm) and a vergence of 0 D, is incident on a model eye with −1 DS of myopia corrected with the contact lens described in FIGS. 3, 4a and 4c.

When the incoming light of a visible wavelength (589 nm) of vergence 0 D, is incident on the schematic eye with −1 DS of myopia, whose prescription is described in Table 2, corrected with the toric lens described in FIGS. 3, 4a and 4c, the resultant on-axis temporally and spatially varying point spread functions at the retinal plane are illustrated in FIG. 5, wherein the lens had rotated on eye by 0° (501), 90° (502), 180° (503) and 270° (504) over time.

In this example FIG. 5 and other examples within the present invention, the performance was analysed at 6 mm pupil. The proposed method of analysis may be extended to obtain simulations at other pupils, including but not limited to 2, 3, 4, 5, 6 mm or any other pupil between 2 and 7 mm or other lens rotations including but not limited to 30°, 60°, 120°, 150° or any other lens rotation.

Figure 6A:
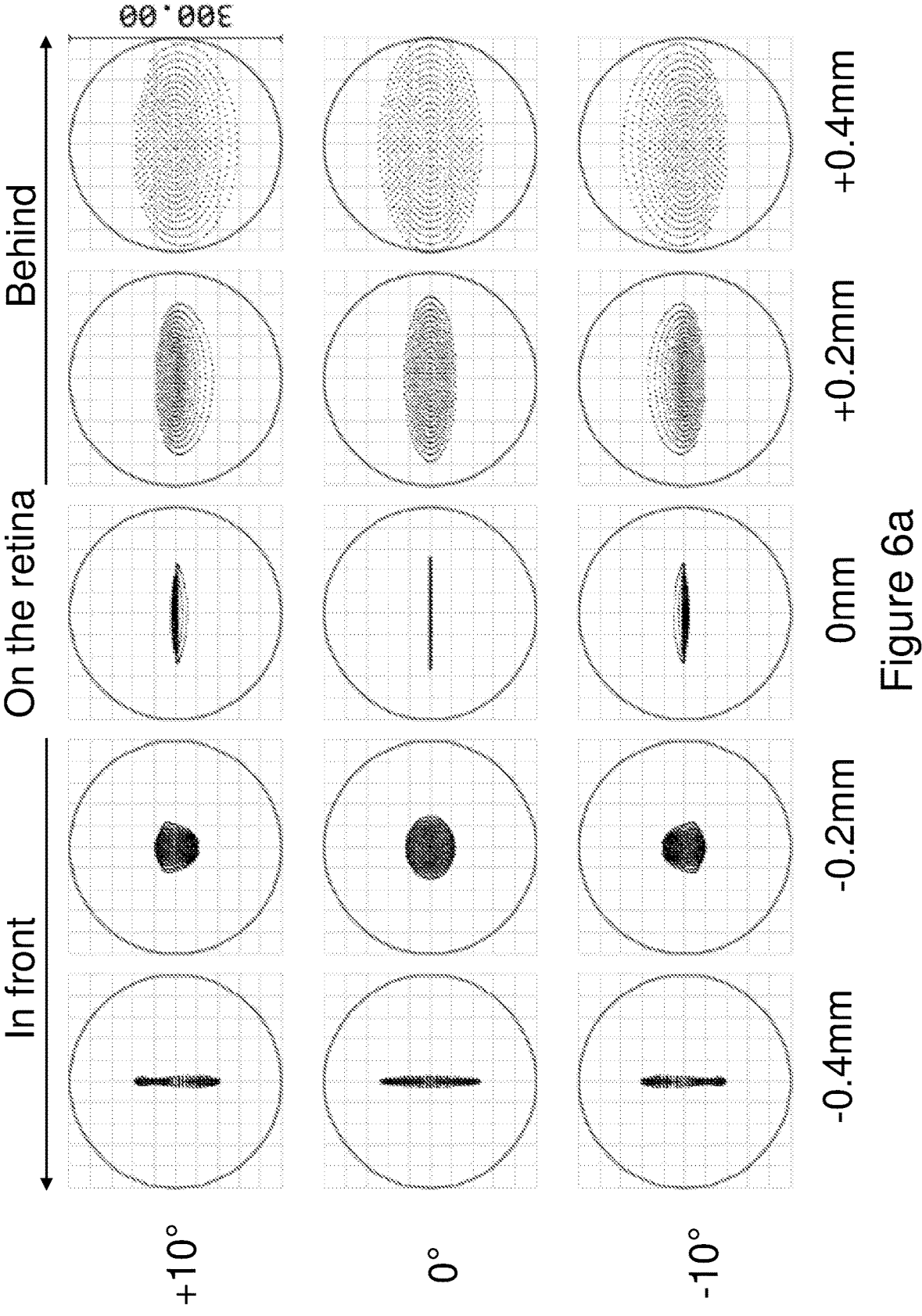
FIGS. 6a and 6b illustrate the temporally and spatially varying optical signal due to contact lens rotation (i.e., 0° and) 90° depicted as wide-view through-focus geometric spot analysis at the retinal plane, when the incoming light with a visible wavelength (589 nm) and a vergence of 0 D, is incident on a −1 DS myopic model eye corrected with the contact lens described in FIGS. 3, 4a and 4c.
Figure 6B:
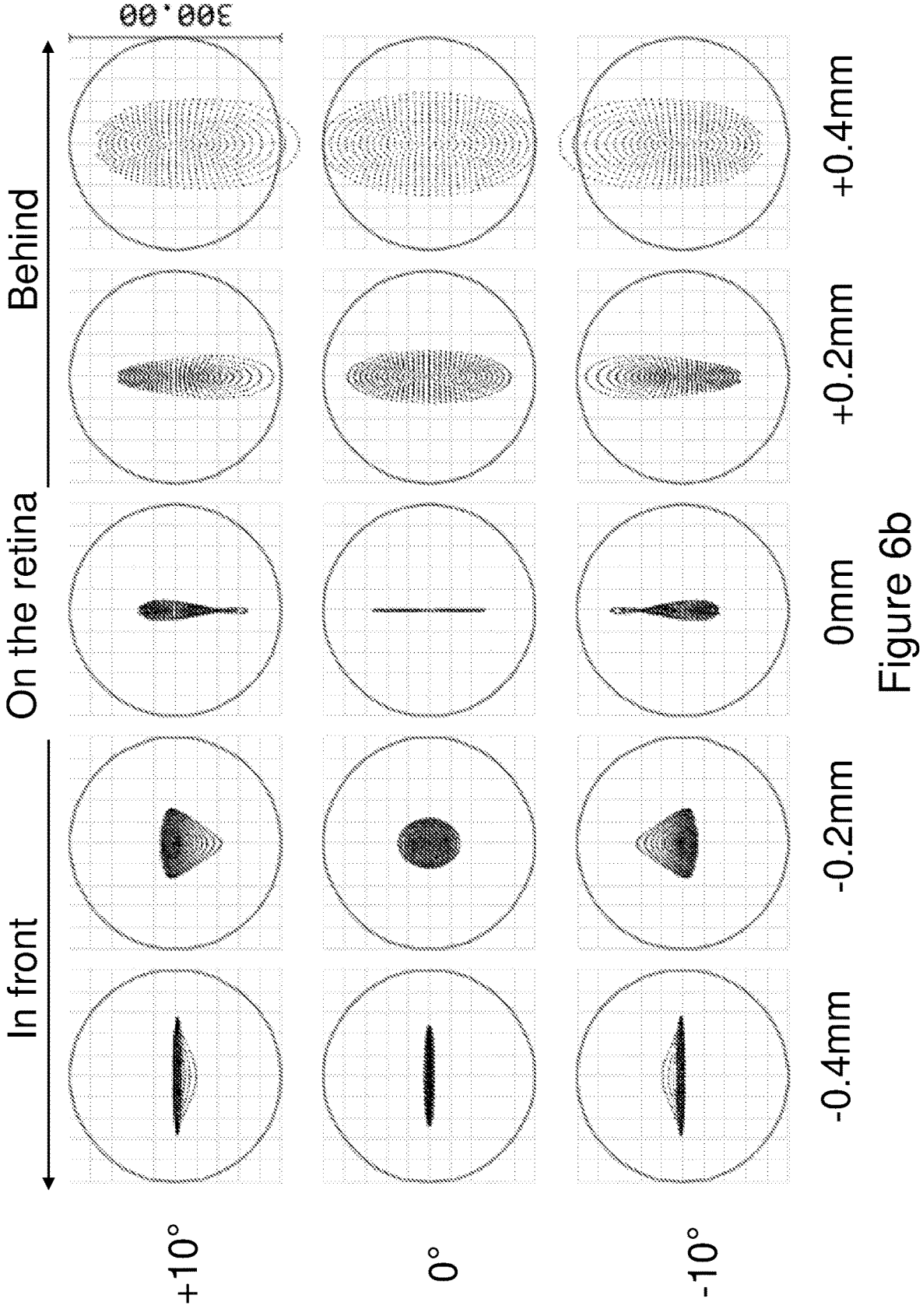

FIGS. 6a and 6b illustrate the wide-angle (i.e., +10° visual field), temporally and spatially varying signal for two different azimuthal contact lens positions when worn on eye, i.e., wherein the flat principal meridian of the contact lens embodiment (FIGS. 3, 4*a* and 4*c*) is located at 0° and 90°, respectively. The through-focus geometric spot diagrams of FIGS. 6*a* and 6*b* emulate the on-eye rotation of the contact lens resulting in a spatially and temporally varying optical stop signal.

The through-focus geometric spot analysis about the retinal plane is computed at five locations, i.e., from −0.4 to +0.4 mm in 0.2 mm steps; wherein the retinal locations −0.4 mm and −0.2 mm are in front of the retina; the retinal location 0 mm is on the retina; and the retinal locations +0.2 mm and +0.4 mm are behind the retina. As can be seen, the through-focus image montage between-0.4 and 0 mm forms a conoid or interval of Sturm having elliptical blur patterns encompassing tangential and sagittal planes and a circle of least confusion. Behind the retina (+0.2 and +0.4 mm), the elliptical blur patterns increase in size.

In this example FIGS. 6*a* and 6*b*, off-axis angles of 10° in the inferior and superior fields have been used to describe the performance over a wider field of view. A lens designer may extend the simulations to other field angles, including but not limited to 5°, 10°, 15° or 20° of field in horizontal, vertical or any oblique field angles. Further, a person skilled in the art may extend the simulations to other lens rotations including but not limited to 20°, 50°, 130°, 160° or any other lens rotation. In these examples FIGS. 6*a* and 6*b* and other examples within the present invention, the performance was analysed at a monochromatic wavelength of 589 nm. A lens designer may extend the simulations to other wavelengths, including but not limited to 555 nm, 586 nm, or 591 nm. In certain other examples, one may use a plurality of wavelengths to demonstrate the chromatic effects of such contact lenses. All such extensions are considered within the scope and spirit of the current invention.

Figure 7:
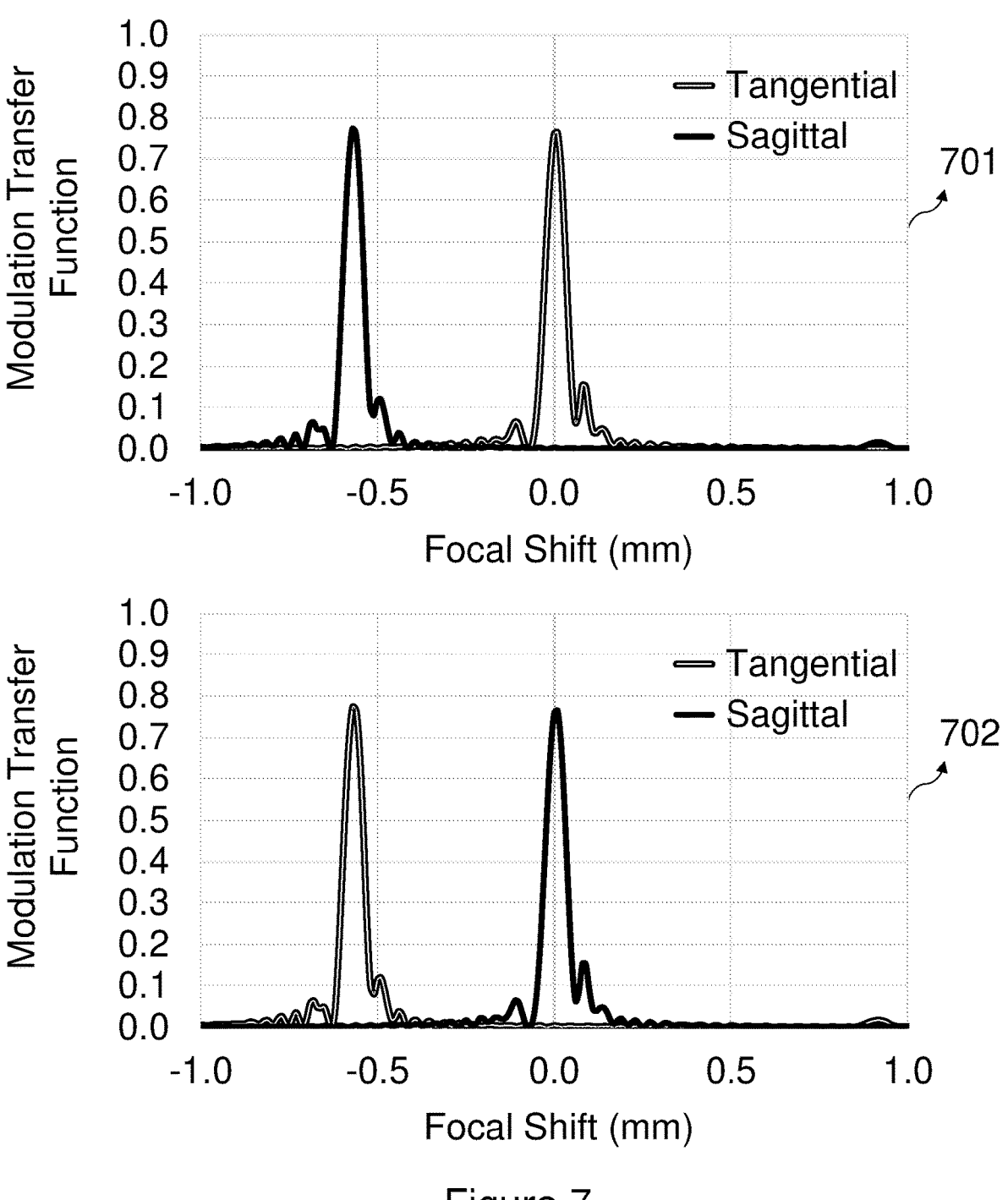
FIG. 7 illustrates the retinal signal (conoid of Sturm) depicted as on-axis, through-focus, modulation transfer function for the tangential and sagittal meridians, which were computed when the incoming light with a visible wavelength (589 nm) and a vergence of 0 D, is incident on a model eye with −1 DS of myopia corrected with the contact lens described in FIGS. 3, 4a and 4c, wherein the flat principal meridian of the contact lens was located at 0° and 90°.

When the incoming light of a visible wavelength (589 nm) of vergence 0 D, is incident on the schematic model eye with −1 DS of myopia, whose prescription is described in Table 2, is corrected with the exemplary contact lens embodiment described in FIGS. 3, 4*a* and 4*c*, the retinal signal depicted as on-axis, through-focus, modulation transfer function for the tangential and sagittal meridians is illustrated in FIG. 7. To assess the difference in performance with contact lens rotation over time, the modulation transfer function was computed for two azimuthal contact lens locations, i.e., wherein the flat principal meridian (−1 D) of the contact lens when worn on eye was located at 0° (701) and at 90° (702). In this example, the modulation transfer functions 701 and 702 show that the difference between the tangential and sagittal meridians was independent of the azimuthal contact lens location with the difference in focal shift being approximately 0.6 mm. In other words, the depth of the conoid or interval of Sturm remains constant as a function of on-eye contact lens rotation.

The PCT with the Application Number PCT/AU2020/051004 discloses the toric or astigmatic lens with a substantially rotationally symmetric peripheral carrier zone as described in FIGS. 3, 4*a* and 4*c* and the performance of the example lens described in FIGS. 5, 6 and 7. As can be seen from the optical modelling results, the desired temporally and spatially varying signal is achieved with such designs. Although the contemplated design described in FIGS. 3, 4*a* and 4*c* offers the desirable temporally and spatially varying stimulus when fitted on an eye with simple myopia, this may not be the case when such a lens is fit on an eye with both myopia and astigmatism. The interaction of the astigmatic or toric power profile in the example contact lens with inherent astigmatism within a myopic eye could potentially work unfavourably against the design principles of a temporally and spatially variant stop signal. The effects of such interactions are described with the next example.

Figure 8:
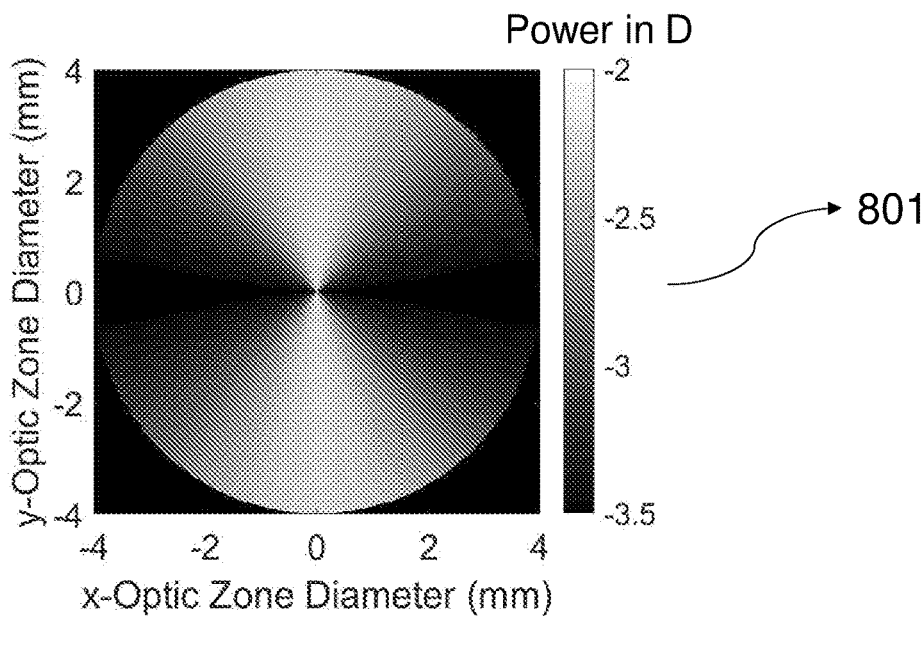
FIG. 8 illustrates the power distribution (i.e., power map, power as a function of optic zone diameter and power as a function of azimuth) within the optical zone of yet another standard toric or astigmatic contact lens (power: −3.5 DS/+ 1.25 DC) configured using standard sphero-cylindrical power distribution.
Figure 8:
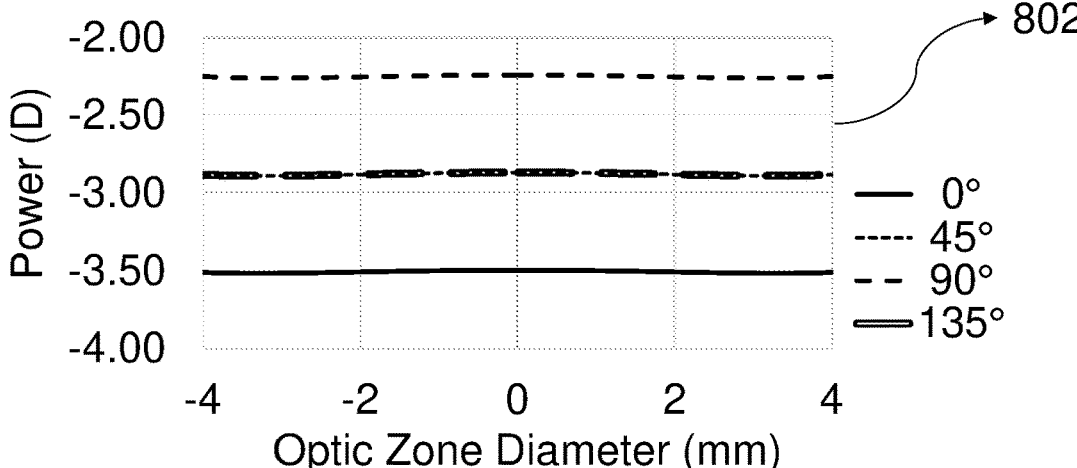
Figure 8:
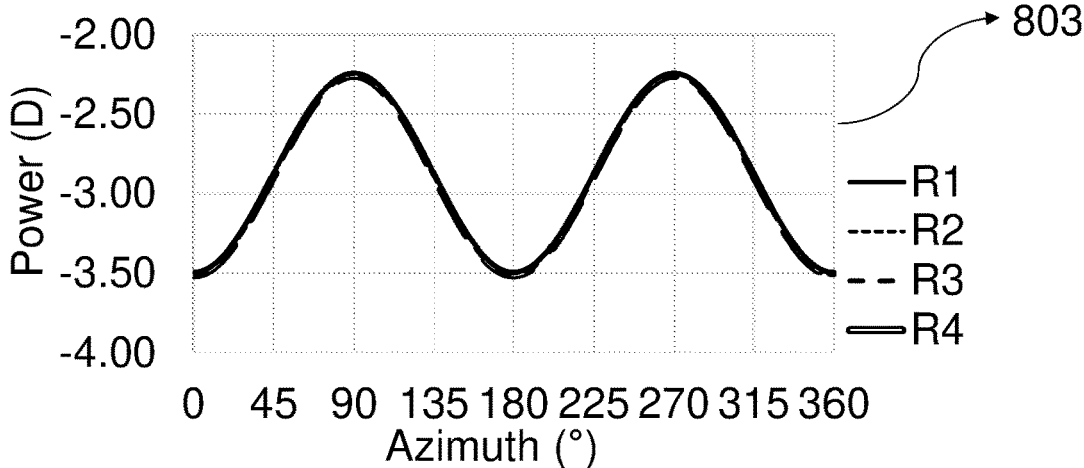

FIG. 8 illustrates the power map distribution (801) within the optical zone of one of the toric or astigmatic contact lenses, its corresponding power profiles as a function of optic zone diameter for four representative sample meridians 0°, 45°, 90° and 135° (802), and its corresponding power profiles as a function of azimuth for four representative sample radial positions R1, R2, R3 and R4 (803) with radial distances of 0.5, 1.5, 2.5 and 3.5 mm, respectively.

The toric or astigmatic lens is configured using a standard sphero-cylindrical power distribution function, wherein one principal meridian (vertical meridian) 90° has a power of approximately −2.25 D, the other principal meridian (horizontal meridian) 0° has a power of approximately −3.5 D and the oblique meridians 45° and 135° have a power of approximately −2.9 D. The difference between the two principal meridians is the cylinder power, which in this exemplary embodiment is 1.25 DC. The power distribution of the toric or astigmatic lens is symmetrical as it has a radially and meridionally invariant power distribution that follows a cosine function with normal frequency, which results in an azimuthally varying power distribution with two axes of mirror-symmetry (i.e., two cosine cycles over) 360°. The term normal frequency contemplated in a standard toric or an astigmatic prior art lens can be observed or seen in FIG. 8.

Figure 9A:
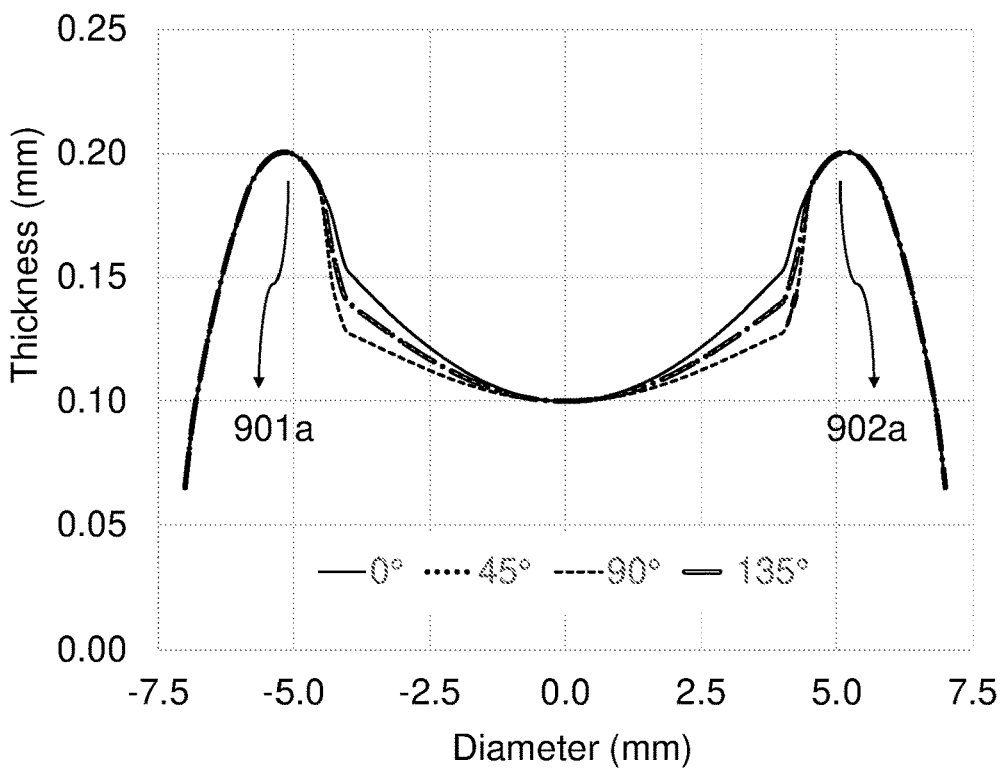
FIG. 9a illustrates the thickness distribution across the whole contact lens described in FIG. 8 with an astigmatic power distribution along four sample representative meridians, namely 0°, 45°, 90°, 135°.

FIG. 9*a* showcases the thickness profile across the contact lens diameter of the of the example described in FIG. 8 with an astigmatic power distribution along four representative sample meridians 0°, 45°, 90° and 135°. As can be seen in cross sections 901*a* and 902*a* of FIG. 9, the non-optical zone of the lens has a substantially rotationally symmetric peripheral carrier zone. This design, as previously disclosed in PCT Application Number PCT/AU2020/051004, facilitates the substantially free rotation on or around about the optical centre of the contact lens, due to the natural blink facilitated by the combined action of the upper and lower eyelids.

This in turn leads to the astigmatic or line stimulus imposed by the optical zone to vary with blink, resulting in a temporally and spatially varying stimulus to reduce the rate of progression in a myopic wearer; such that the astigmatic directional cues and the efficacy to reduce the progression of eye growth remains substantially consistent over time.

Figure 9B:
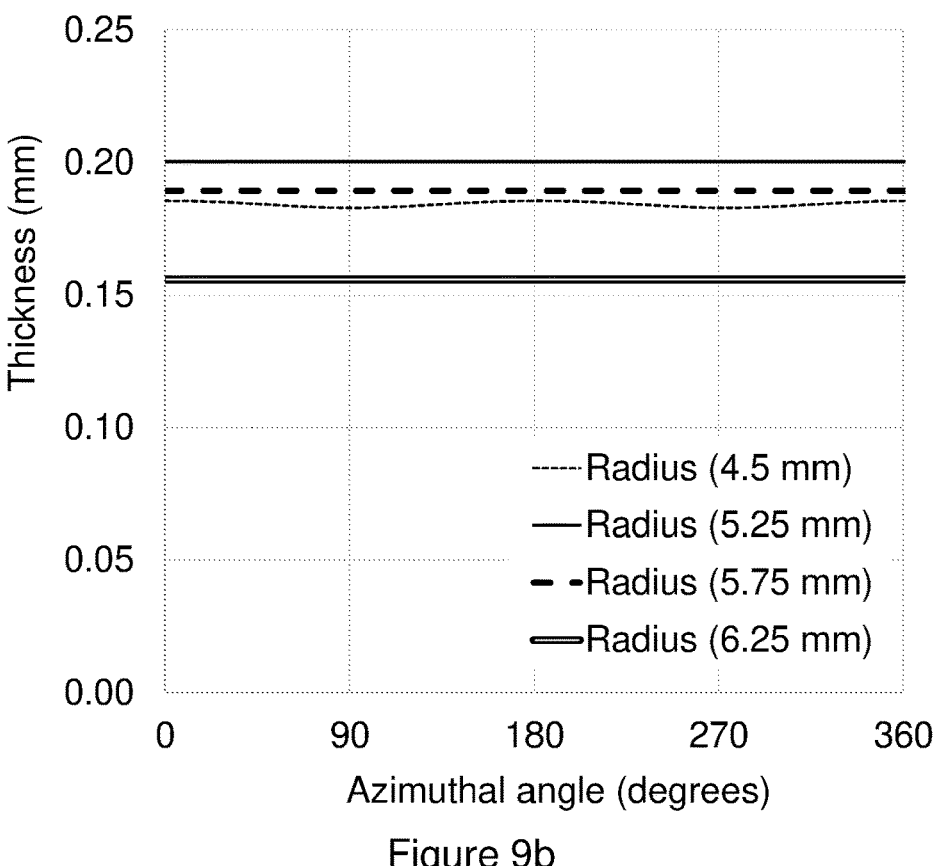
FIG. 9b illustrates the thickness distribution as a function of azimuthal angle of the contact lens described in FIG. 8 and FIG. 9a along four sample radial distances 4.5 mm, 5.25 mm, 5.75 mm, and 6.25 mm within the non-optical peripheral zone.

FIG. 9*b* illustrates the thickness distribution as a function of azimuthal angle of the contact lens described in FIG. 8 and FIG. 9*a* along four sample radial distances 4.5 mm, 5.25 mm, 5.75 mm, and 6.25 mm. As can be seen from FIG. 9*b*, independent of radial distance the thickness of the contact lens is substantially invariant as a function of azimuthal angle with a peak-to-valley of <10 μm. Furthermore, the maximum difference in thickness between the different radii is about 0.04 mm.

Figure 9C:
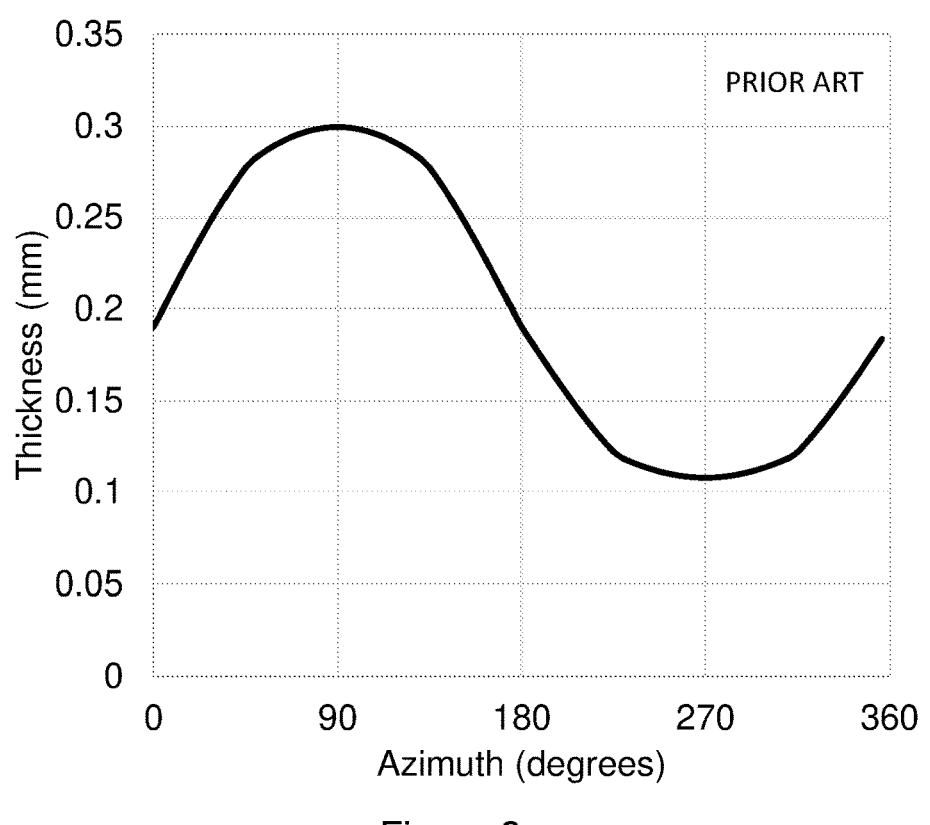
FIG. 9c illustrates the thickness distribution as a function of azimuthal angle of a toric contact lens of the prior art with prism ballast stabilisation method along 5.5 mm radial distance within the non-optical peripheral zone.

Conversely, FIG. 9*c* illustrates the thickness distribution as a function of azimuthal angle of another toric contact lens example of prior art, which shows a sinusoidal thickness variation as a function of azimuth wherein the thickness difference between the 90° and 270° azimuthal angles, peak-to-valley (PTV) of the azimuthal thickness distribution is about is about 0.19 mm at a radial distance of 5.5 mm, resulting in stabilisation of the toric prior art contact lens.

Figure 10:
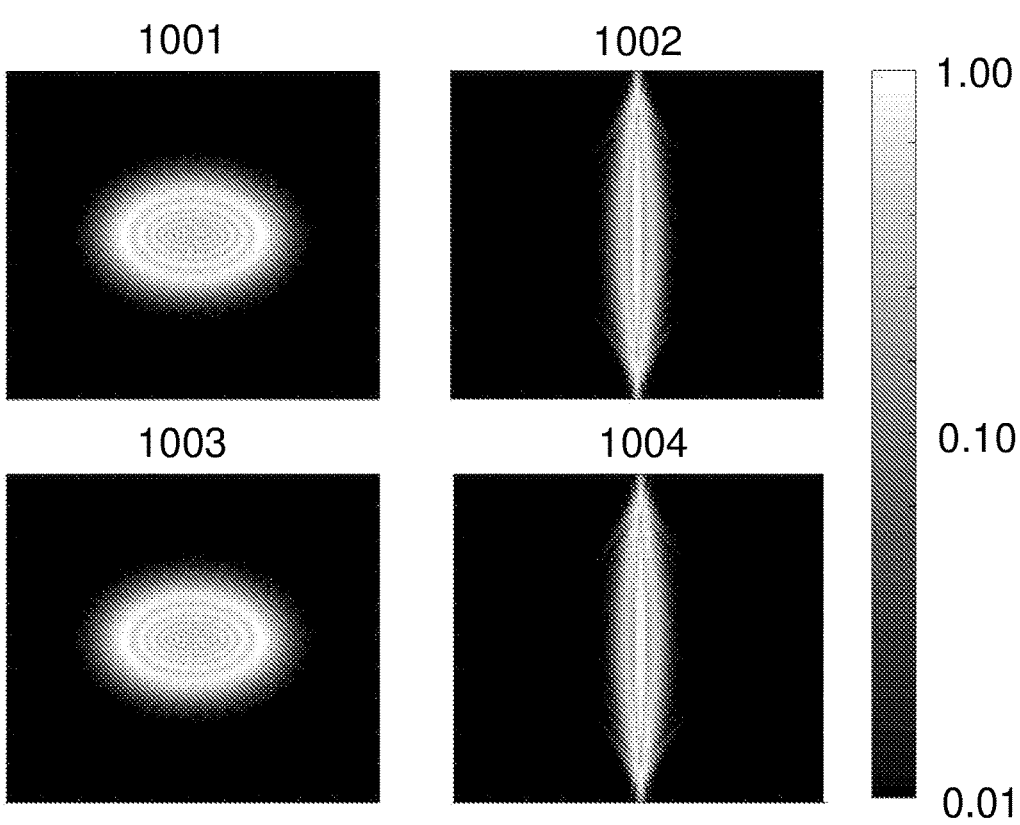
FIG. 10 illustrates the temporally and spatially varying signal depicted due to contact lens rotation (i.e., 0°, 90°, 180° and) 270° as on-axis point spread functions at the retinal plane, when the incoming light with a visible wavelength (589 nm) and a vergence of 0 D, is incident on a model eye with −4 DS of myopia and +1 DC×90° of astigmatism corrected with the contact lens embodiment described in FIGS. 8, 9a and 9b.

When the incoming light of a visible wavelength (589 nm) of vergence 0 D, is incident on the schematic eye with a prescription of −4 DS/+1 DC×90 is corrected with the toric lens described in FIG. 8, FIGS. 9*a* and *b*, the resultant on-axis temporally and spatially varying point spread functions at the retinal plane are illustrated in FIG. 10, wherein the lens had rotated on eye by 0° (1001), 90° (1002), 180° (1003) and 270° (1004) over time.

Figure 11A:
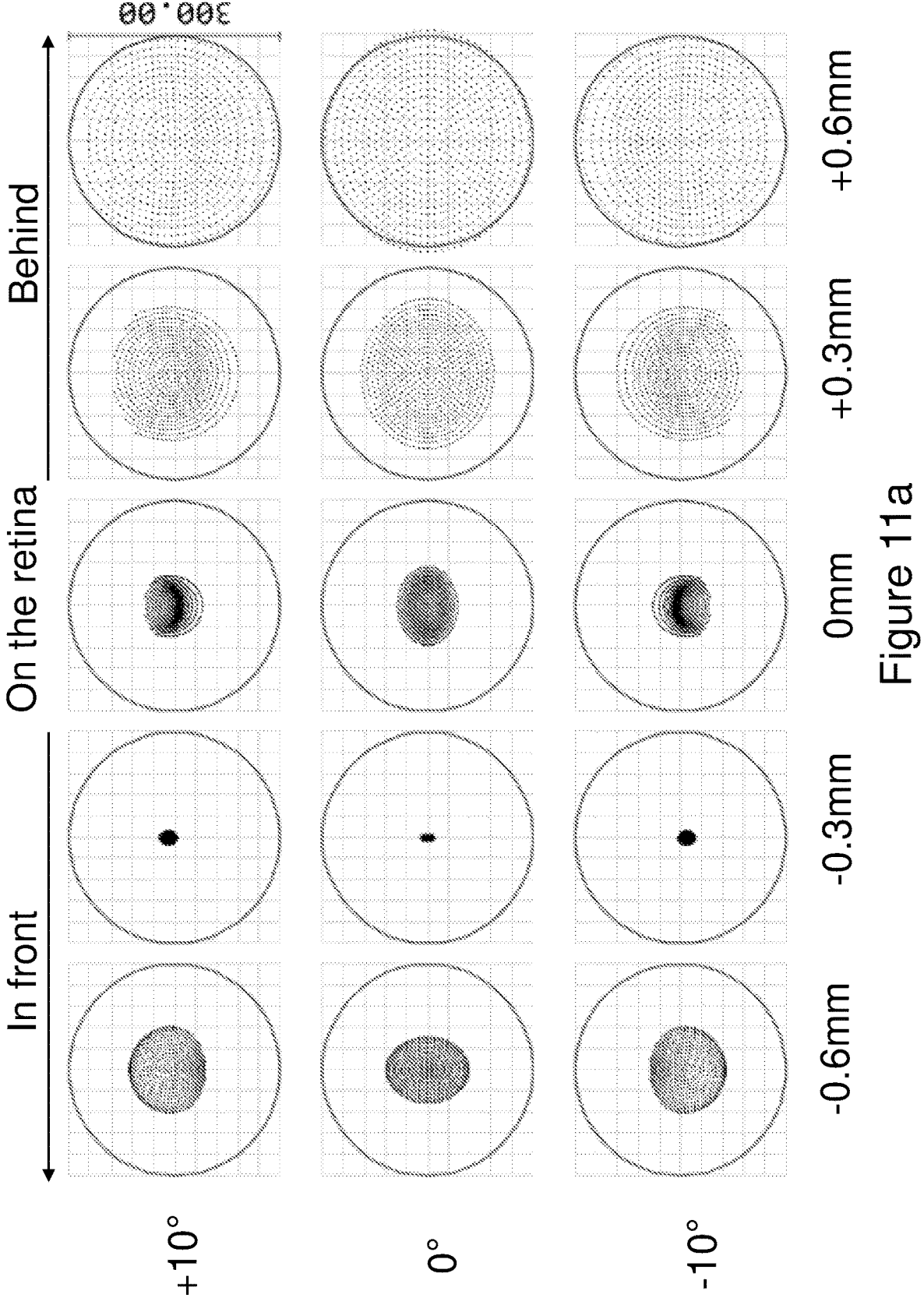
FIGS. 11a and 11b illustrate the temporally and spatially varying signal due to contact lens rotation (i.e., 0° and) 90° depicted as wide-view through-focus geometric spot analysis at the retinal plane, when the incoming light with a visible wavelength (589 nm) and a vergence of 0 D, is incident on a model eye with −4 DS of myopia and +1 DC×90° of astigmatism corrected with the contact lens described in FIGS. 8, 9a and 9b.
Figure 11B:
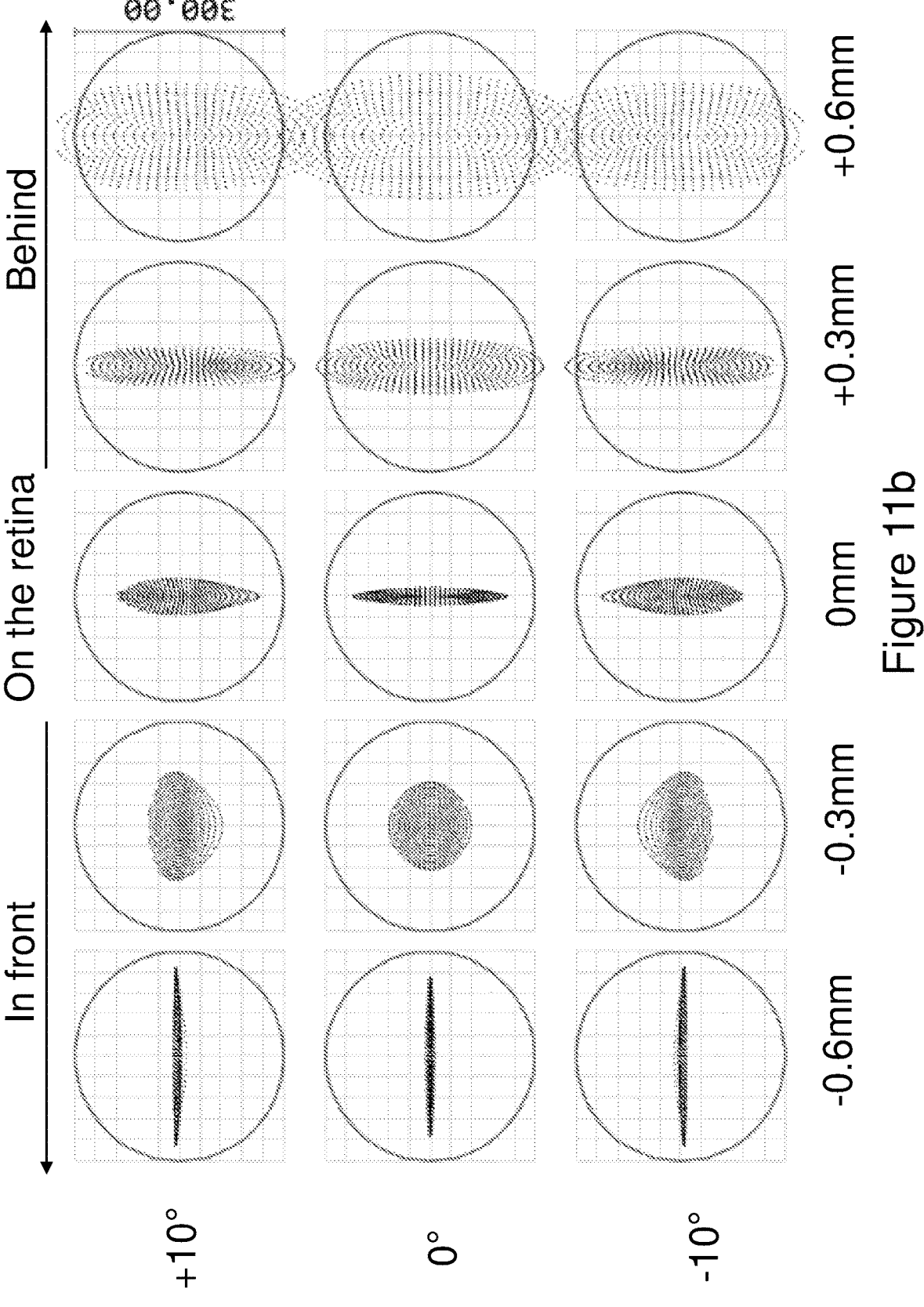

FIGS. 11*a* and 11*b* illustrate the wide-angle (i.e., +10° visual field), temporally and spatially varying signal, for two different azimuthal contact lens locations on eye, i.e., wherein the flat principal meridian (−3.5 D) of the contact lens embodiment (FIGS. 8 and 9) is located at 0° and 90°, respectively. The through-focus geometric spot diagrams of FIGS. 11*a* and 11*b* emulate the on-eye rotation of the said contact lens resulting in a spatially and temporally varying optical stop signal. The through-focus geometric spot analysis about the retinal plane is computed at five locations, i.e., from −0.6 to +0.6 mm in 0.3 mm steps; wherein the retinal locations −0.6 mm and −0.3 mm are in front of the retina; the retinal location 0 mm is on the retina; and the retinal locations +0.3 mm and +0.6 mm are behind the retina.

Figure 12:
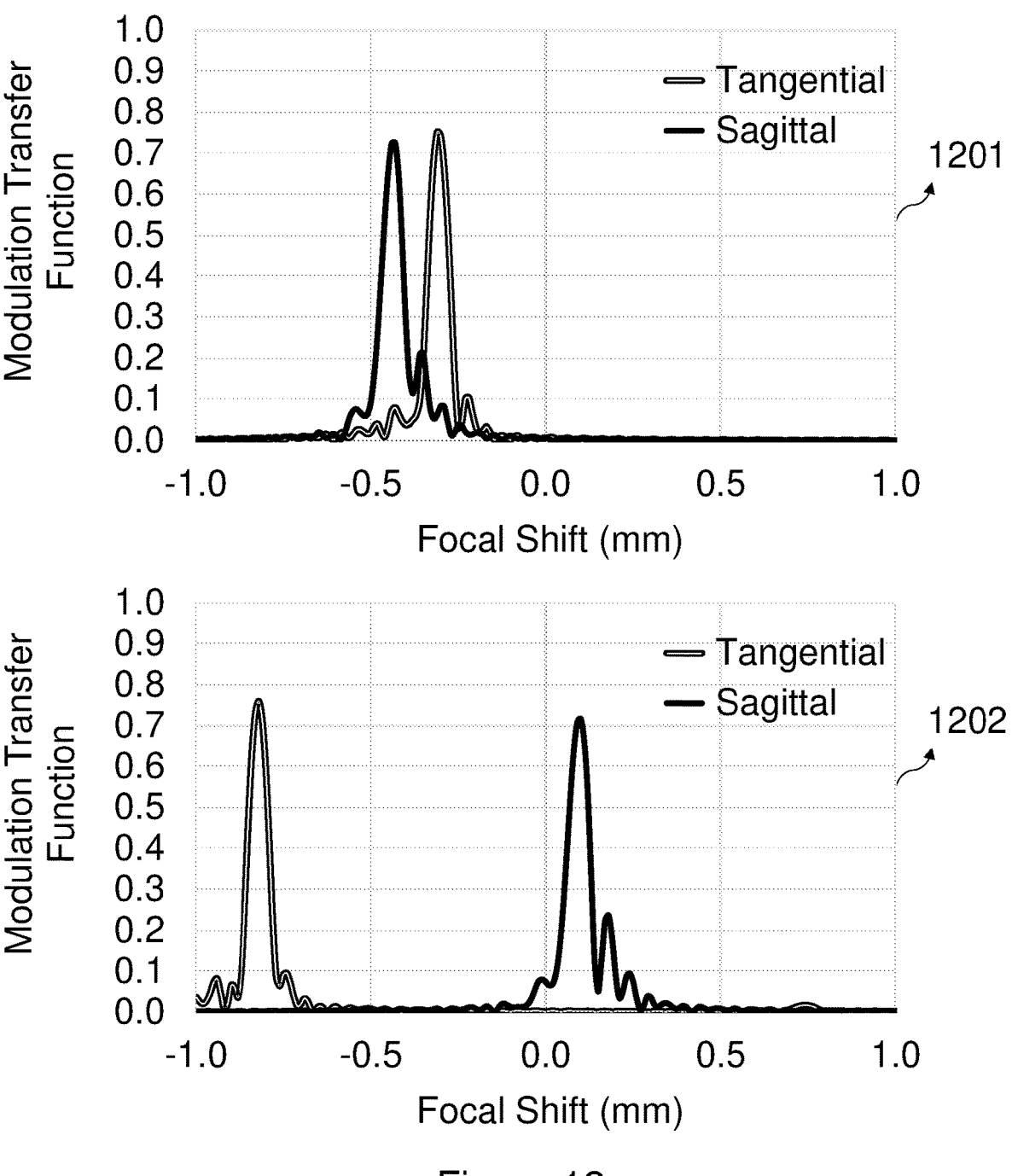
FIG. 12 illustrates the retinal signal (conoid of Sturm) depicted as on-axis, through-focus, modulation transfer function for the tangential and sagittal meridians, which were computed when the incoming light with a visible wavelength (589 nm) and a vergence of 0 D, is incident on a model eye with −4 DS of myopia and +1 DC×90° of astigmatism corrected with the contact lens described in FIGS. 8, 9a and 9b, wherein the flat principal meridian of the contact lens was located at 0° and 90°.

As can be seen, in this example where the myopic astigmatic eye is corrected with the toric contact lens (FIG. 8 and FIGS. 9*a* and *b*) the elliptical blur patterns vary in size and shape for the different lens rotations. This results in changes to visual performance as the contact lens rotates. When the incoming light of a visible wavelength (589 nm) of vergence 0 D, is incident on the schematic model eye with a prescription of −4 DS/+1 DC×90 (Table 3), is corrected with the toric lens described in FIG. 8 and FIGS. 9*a* and *b*, the retinal signal depicted as on-axis, through-focus, modulation transfer function for the tangential and sagittal meridians is illustrated in FIG. 12.

To assess the difference in performance with contact lens rotation over time, the modulation transfer function was computed for two azimuthal contact lens locations, i.e., wherein the flat principal meridian (−3.5 D) of the contact lens when worn on eye was located at 0° (1201) and at 90° (1202). These two scenarios provide the best and worst combinations for the assessment of the interaction between the eye's astigmatism and the cylinder power of the toric contact lens.

In this example, the modulation transfer functions 1201 and 1202 show that the distances between the tangential and sagittal meridians were different between the two azimuthal contact lens locations. When the flat principal meridian of the contact lens (−3.5 D) was located at 0° when worn on eye (1201), the astigmatism of the eye was almost corrected as the distance between the tangential and sagittal meridians was only approximately 0.1 mm. However, when the flat principal meridian of the contact lens (−3.5 D) was located at 90° when worn on eye (1202), the astigmatism of the eye increased and the distance between the tangential and sagittal meridians was approximately 0.9 mm.

In other words, the depth of the conoid or interval of Sturm varies as a function of on-eye contact lens rotation which is caused due to the interactions between the cylinder power of the contact lens and the astigmatism of the eye.

The expansion or collapsing of the depth of the conoid or interval of Sturm as a function of contact lens rotation may cause significant visual disturbances for the astigmatic myopic wearer. It is desirable to minimise significant variations in the expansion and collapsing of the depth of the conoid or interval of Sturm as a function of lens on-eye rotation.

As can be seen from the simulations described in the FIG. 12, the difference in distance between the tangential and sagittal meridians for the two azimuthal contact lens locations 1201 and 1202 is about 0.8 mm. This is considerably large and may cause significant variation in the visual performance for a lens wearer. Although temporal variation underpins the strategy of combatting progressive myopia as disclosed herein, significant variation may invite the problem of poor compliance that are often observed with other prior lens designs.

It is desirable to overcome such limitations especially for eyes with myopia and astigmatism. Various disclosed embodiments of the current invention resolve the problem by minimising the variation when the contemplated designs are worn by individuals with myopia and astigmatism, which become apparent through the following embodiment examples that follow.

FIG. 13 illustrates the power map distribution (1301) within the optical zone of an embodiment contact lens of the present disclosure, its corresponding power profiles as a function of optic zone diameter for four representative sample meridians 0°, 45°, 90° and 135° (1302), and its corresponding power profiles as a function of azimuth for four representative sample radial positions R1, R2, R3 and R4 (1303) with radial distances of 0.5, 1.5, 2.5 and 3.5 mm, respectively.

While the contact lens embodiment of the present invention has a radially invariant and azimuthally variant power distribution (power: −1 DS/+1.5 D, Hemi-Area Lens) in one hemi-area of the optic zone, in the other hemi-area of the optic zone it has a spherical power distribution (−1 DS). As can be seen in 1302 and 1303, the power distribution in the hemi-area defined by the azimuthal angle of 0° to 180° varies between approximately −1 D, −0.25 D and +0.5 D for the 0°, 45°/135° and 90° meridians, respectively, resulting in a delta power of approximately 1.5 D. The power in the other hemi-area remains constant at approximately −1 D.

Figure 14A:
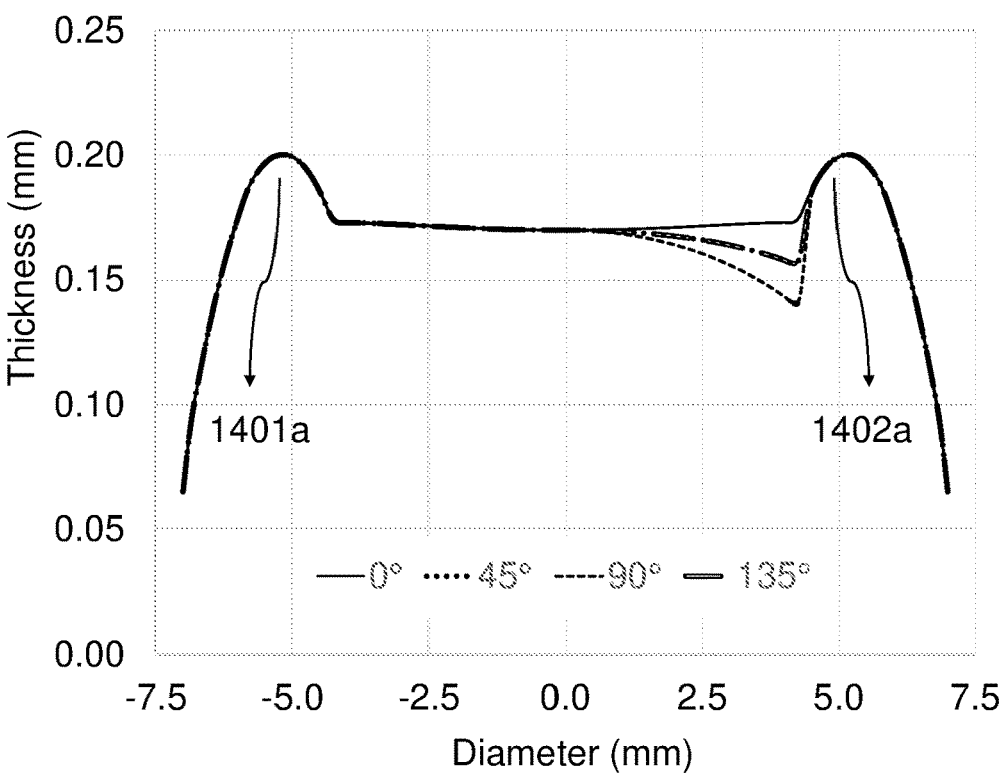
FIG. 14a illustrates the thickness distribution across the whole contact lens of the embodiment described in FIG. 13 with a substantially radially invariant, meridionally and azimuthally variant, power distribution along four sample representative meridians, namely 0°, 45°, 90° and 135°.

FIG. 14*a* showcases the thickness profile of the Hemi-Area Lens example described in FIG. 13 with a radially invariant, meridionally and azimuthally variant power distribution along four representative sample meridians 0°, 45°, 90° and 135°. As can be seen in cross sections 1401*a* and 1402*a* of FIG. 14*a*, the non-optical zone of the lens has a substantially rotationally symmetric peripheral carrier zone.

This design facilitates the substantially free rotation on or around about the optical centre of the contact lens, due to the natural blink facilitated by the combined action of the upper and lower eyelids. This in turn leads to the stimulus imposed by the optical zone of the Hemi-Area lens design to vary with blink, resulting in a temporally and spatially varying stimulus to reduce the rate of progression in a myopic wearer; such that the efficacy to reduce the progression of eye growth remains substantially consistent over time.

Figure 14B:
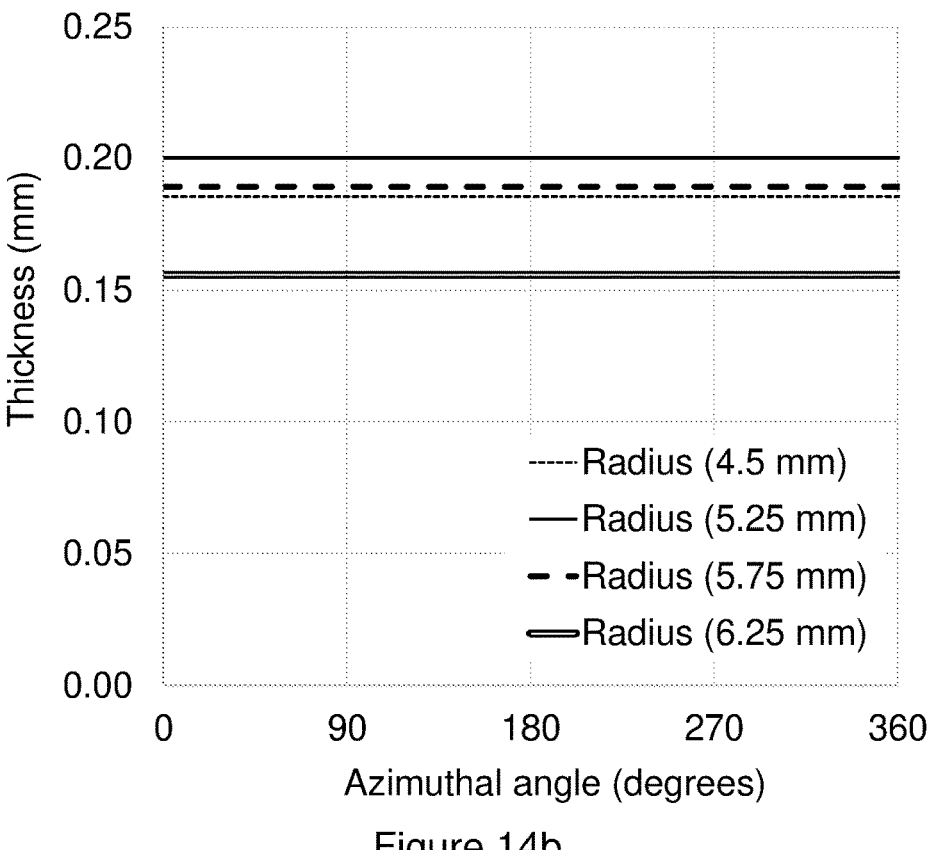
FIG. 14b illustrates the thickness distribution as a function of azimuthal angle of the contact lens described in FIG. 13 and FIG. 14a along four sample radial distances 4.5 mm, 5.25 mm, 5.75 mm, and 6.25 mm within the non-optical peripheral zone.

FIG. 14*b* illustrates the thickness distribution as a function of azimuthal angle of the contact lens described in FIG. 13 and FIG. 14*a* along four sample radial distances 4.5 mm, 5.25 mm, 5.75 mm, and 6.25 mm within the non-optical peripheral zone.

As can be seen from FIG. 14*b*, independent of radial distance the thickness of the contact lens is substantially invariant as a function of azimuthal angle with a peak-to-valley of <5 µm. Furthermore, the maximum difference in thickness between the different radii is about 0.04 mm.

Figure 15:
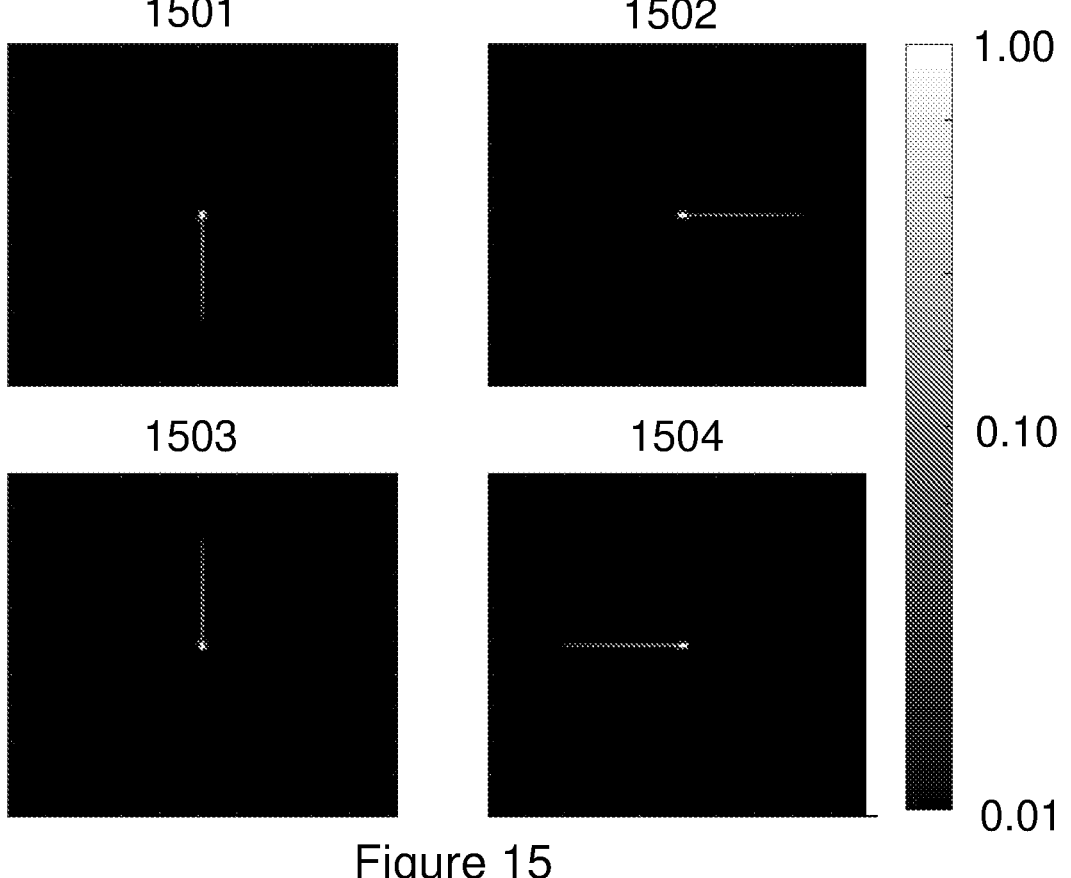
FIG. 15 illustrates the temporally and spatially varying signal due to contact lens rotation (i.e., 0°, 90°, 180° and) 270° depicted as on-axis point spread functions at the retinal plane, when the incoming light with a visible wavelength (589 nm) and a vergence of 0 D, is incident on a model eye with −1 DS of myopia corrected with the contact lens embodiment described in FIGS. 13 and 14.

When the incoming light of a visible wavelength (589 nm) of vergence 0 D, is incident on the schematic eye with −1 DS of myopia, whose prescription is described in Table 2, is corrected with the exemplary contact lens described in FIGS. 13 and 14*b*, the resultant on-axis temporally and spatially varying point spread functions at the retinal plane are illustrated in FIG. 15, wherein the lens had rotated on eye by 0° (1501), 90° (1502), 180° (1503) and 270° (1504) over time.

Figure 16A:
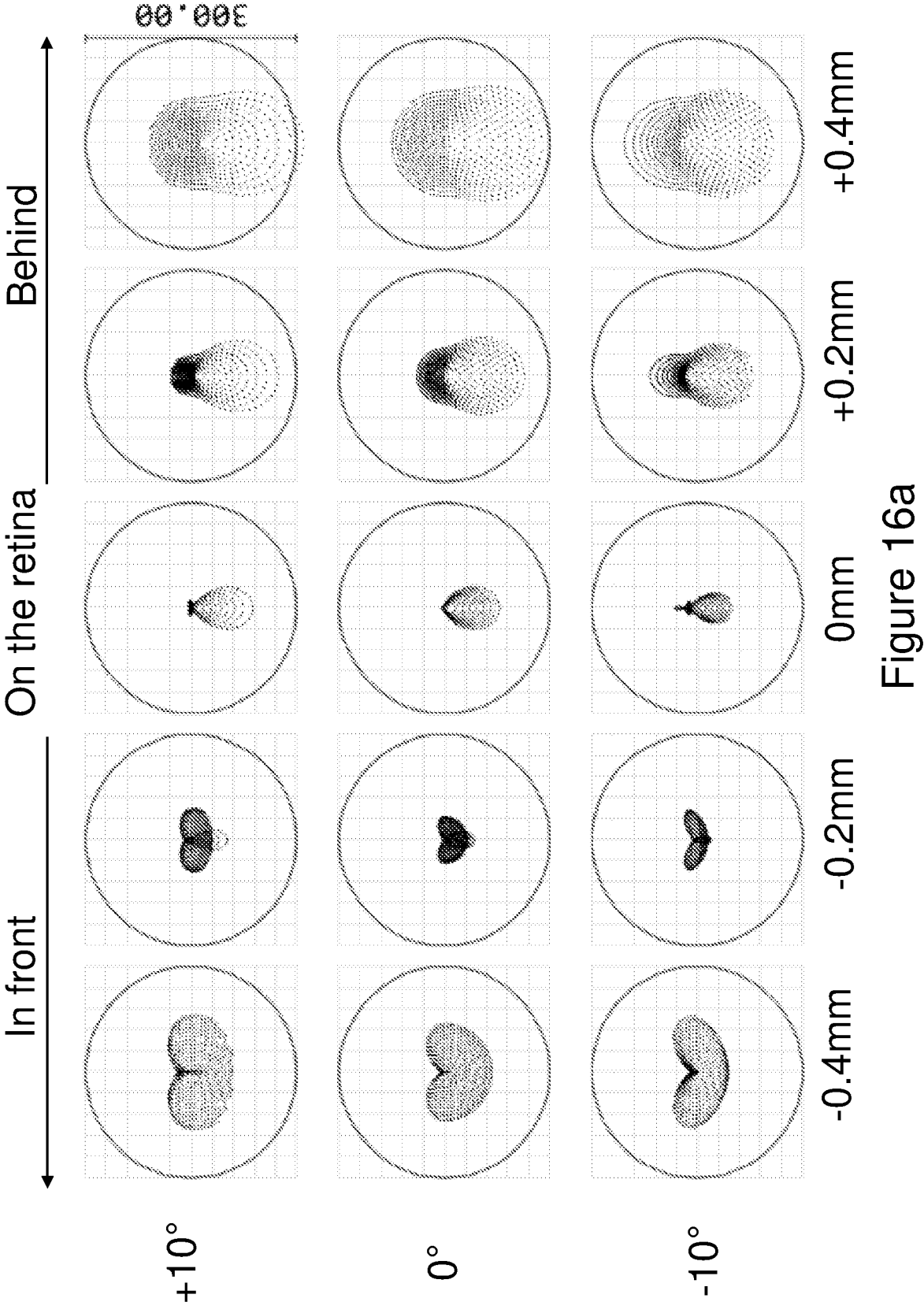
FIGS. 16a and 16b illustrate the temporally and spatially varying signal due to contact lens rotation (i.e., 0° and) 270° depicted as wide-view through-focus geometric spot analysis, when the incoming light with a visible wavelength (589 nm) and a vergence of 0 D, is incident on a model eye with −1 DS of myopia corrected with the contact lens embodiment described in FIGS. 13 and 14.
Figure 16B:
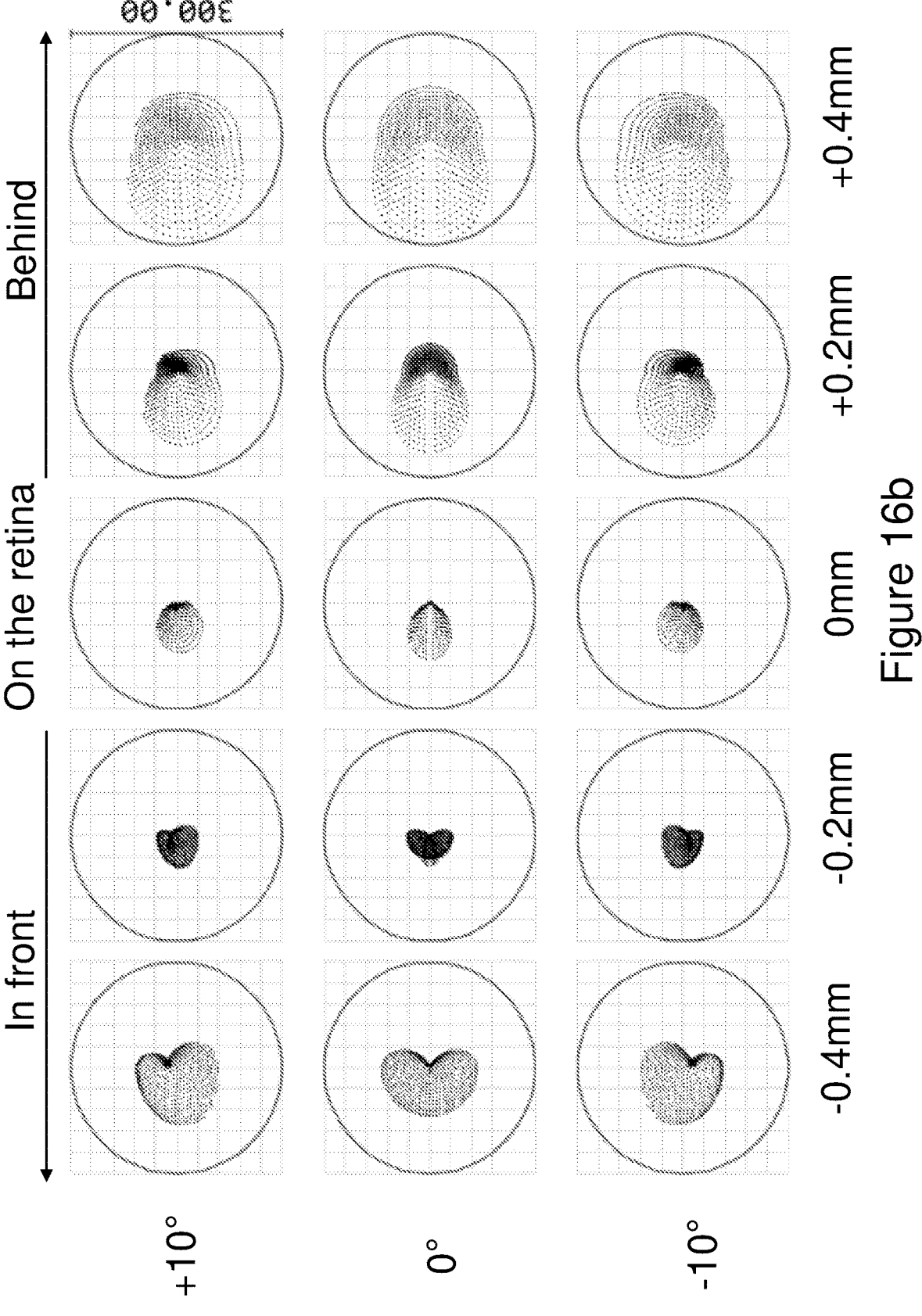

FIGS. 16*a* and 16*b* illustrate the wide-angle (i.e., +10° visual field), temporally and spatially varying signal for two different azimuthal contact lens positions when worn on eye, i.e., wherein the meridian with the power of −1 D (as shown in 1302 along) 0° of the contact lens embodiment (FIGS. 13 and 14) is located at 0° and 90°, respectively.

The through-focus geometric spot diagrams of FIGS. 16*a* and 16*b* emulate the on-eye rotation of the said contact lens resulting in a spatially and temporally varying optical stop signal. The resulting through-focus retinal image is referred to as the conoid or interval of partial blur which provides at least a partial correction to the myopic eye and at least partially provides a spatially and temporally varying optical stop signal or stimulus.

The through-focus geometric spot analysis about the retinal plane is computed at five locations, i.e., from −0.4 to +0.4 mm in 0.2 mm steps; wherein the retinal locations −0.4 mm and −0.2 mm are in front of the retina; the retinal location 0 mm is on the retina; and the retinal locations +0.2 mm and +0.4 mm are behind the retina.

Unlike seen in FIGS. 6*a* and 6*b* for the toric lens through-focus image montage where the blur patterns change in size (i.e., focus) and direction between the two azimuthal contact lens locations, the patterns in FIGS. 16*a* and 16*b* for the exemplary Hemi-Area contact lens embodiment only change in direction. This results in the visual performance being less affected by contact lens rotation with the Hemi-Area lens than with the toric lens.

Figure 17:
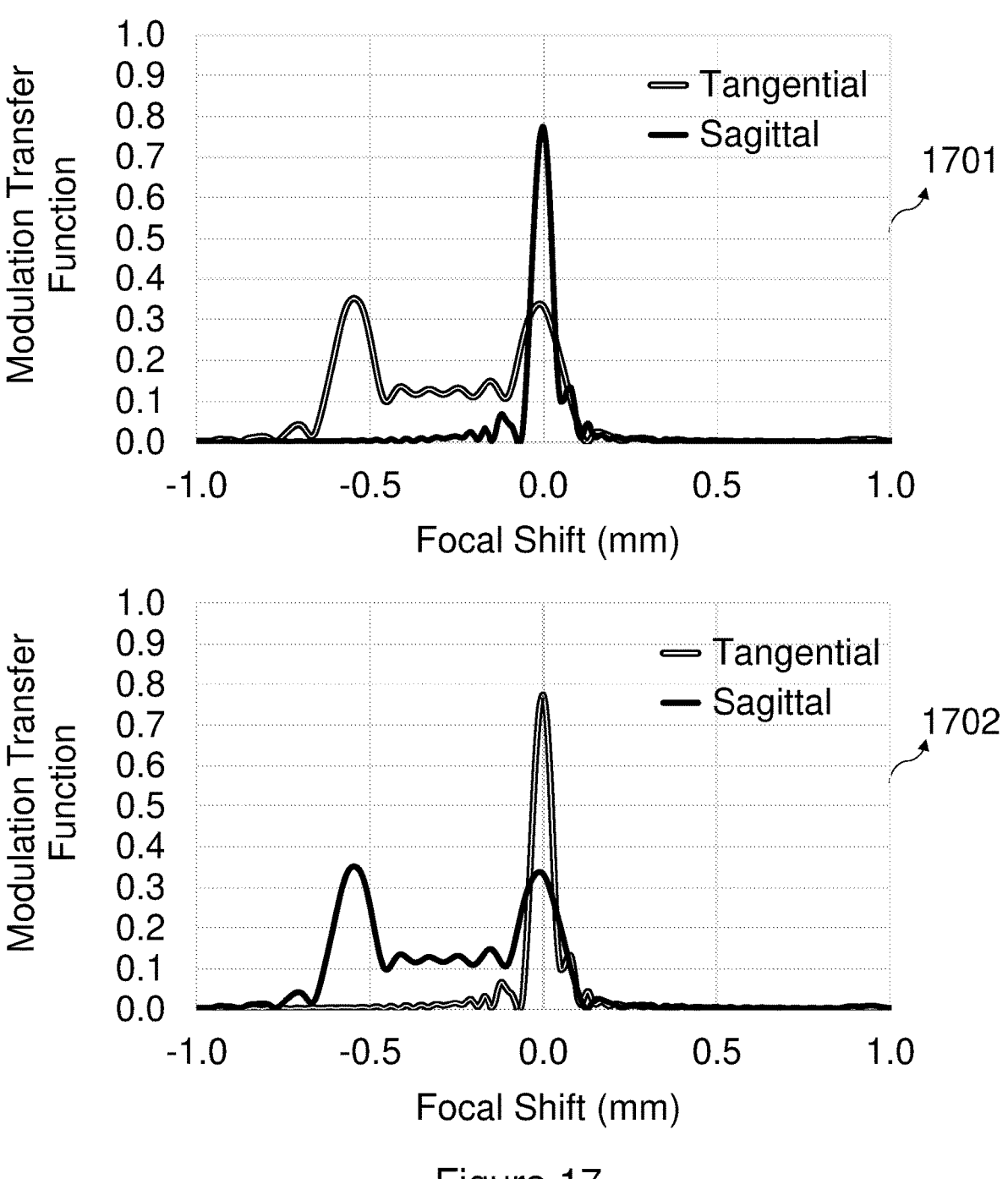
FIG. 17 illustrates the retinal signal (conoid of partial blur) depicted as on-axis, through-focus, modulation transfer function for the tangential and sagittal meridians, which were computed when the incoming light with a visible wavelength (589 nm) and a vergence of 0 D, is incident on a model eye with −1 DS of myopia corrected with the contact lens embodiment described in FIGS. 13 and 14, wherein the meridian with the power of −1 D of the contact lens was located at 0° and 90°.

When the incoming light of a visible wavelength (589 nm) of vergence 0 D, is incident on the schematic model eye with −1 DS of myopia, whose prescription is described in Table 2, is corrected with the exemplary contact lens described in FIGS. 13 and 14*b*, the retinal signal depicted as on-axis, through-focus, modulation transfer function for the tangential and sagittal meridians is illustrated in FIG. 17.

To assess the difference in performance with contact lens rotation over time, the modulation transfer function was computed for two azimuthal contact lens locations, i.e., wherein the principal meridian (−1 D as shown in 1302 along) 0° of the contact lens when worn on eye was located at 0° (1701) and at 90° (1702).

In this example, the modulation transfer functions 1701 and 1702 show that the difference between the tangential and sagittal meridians was independent of the azimuthal contact lens location with the difference in focal shift being approximately 0.5 mm. This difference in focal shift is smaller when compared to that of the toric contact lens shown in FIG. 7, which again indicates that visual performance is less affected by contact lens rotation with the Hemi-Area lens than with the toric prior art lens. In this example, the depth of the conoid or interval of partial blur remains constant as a function of on-eye contact lens rotation.

Figure 18:
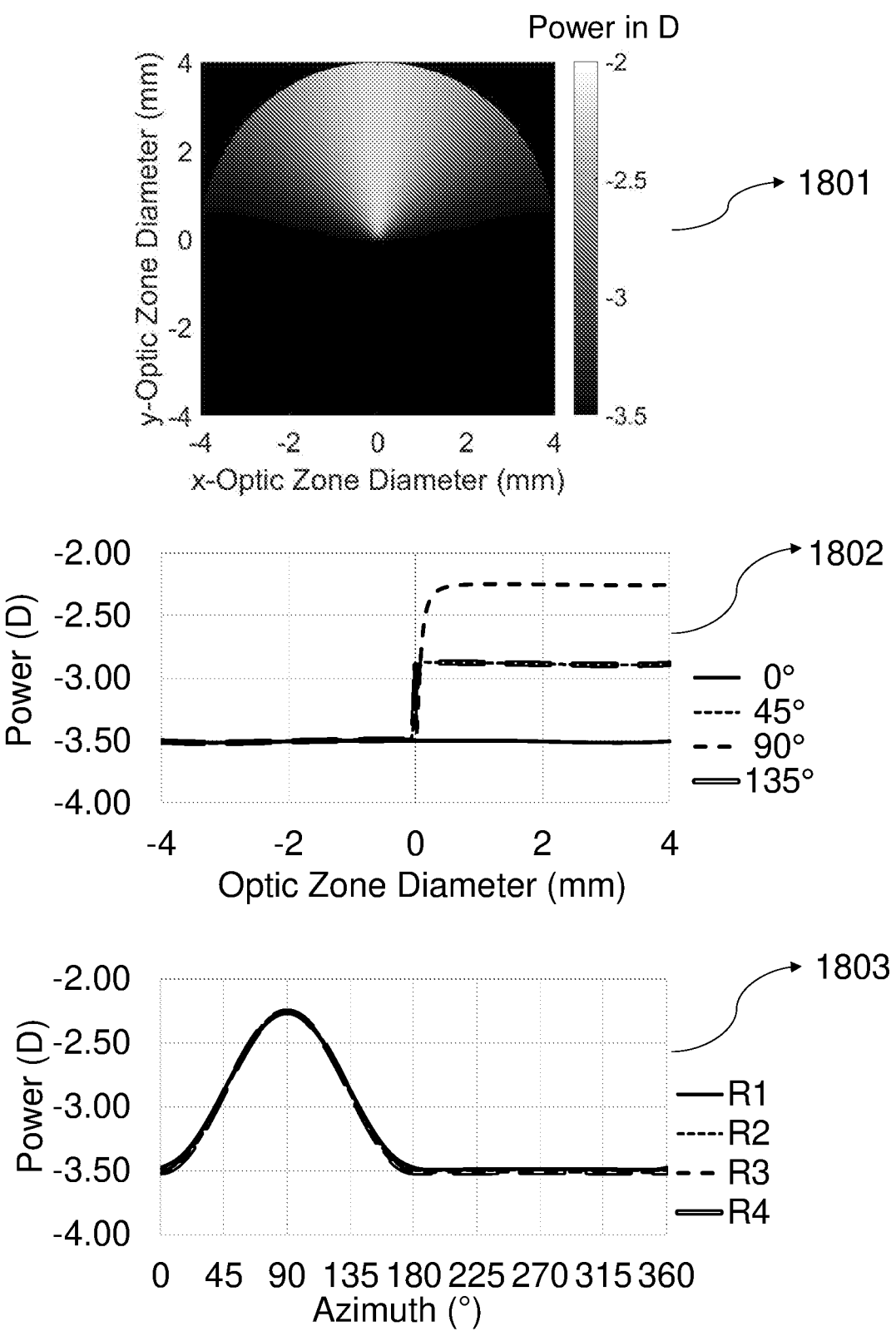
FIG. 18 illustrates the power distribution (i.e., power map, power as a function of optic zone diameter and power as a function of azimuth) within the optical zone of another contact lens embodiment of the present invention with a substantially radially invariant, meridionally and azimuthally variant power distribution (power: −3.5 DS/+1.25 D, Hemi-Area Lens).

FIG. 18 illustrates the power map distribution (1801) within the optical zone of an embodiment contact lens of the present disclosure, its corresponding power profiles as a function of optic zone diameter for four representative sample meridians 0°, 45°, 90° and 135° (1802), and its corresponding power profiles as a function of azimuth for four representative sample radial positions R1, R2, R3 and R4 (1803) with radial distances of 0.5, 1.5, 2.5 and 3.5 mm, respectively.

While the contact lens embodiment of the present invention has a radially invariant and azimuthally variant power distribution (power: −3.5 DS/+1.25 D, Hemi-Area Lens) in one hemi-area of the optic zone, in the other hemi-area of the optic zone it has a spherical power distribution (−3.5 DS).

As can be seen in 1802 and 1803, the power distribution in the hemi-area defined by the azimuthal angle of 0° to 180° varies between approximately −3.5 D, −2.9 D and −2.25 D for the 0°, 45°/135° and 90° meridians, respectively, resulting in a delta power of approximately 1.25 D. The power in the other hemi-area remains constant at approximately −3.5 DS.

Figure 19A:
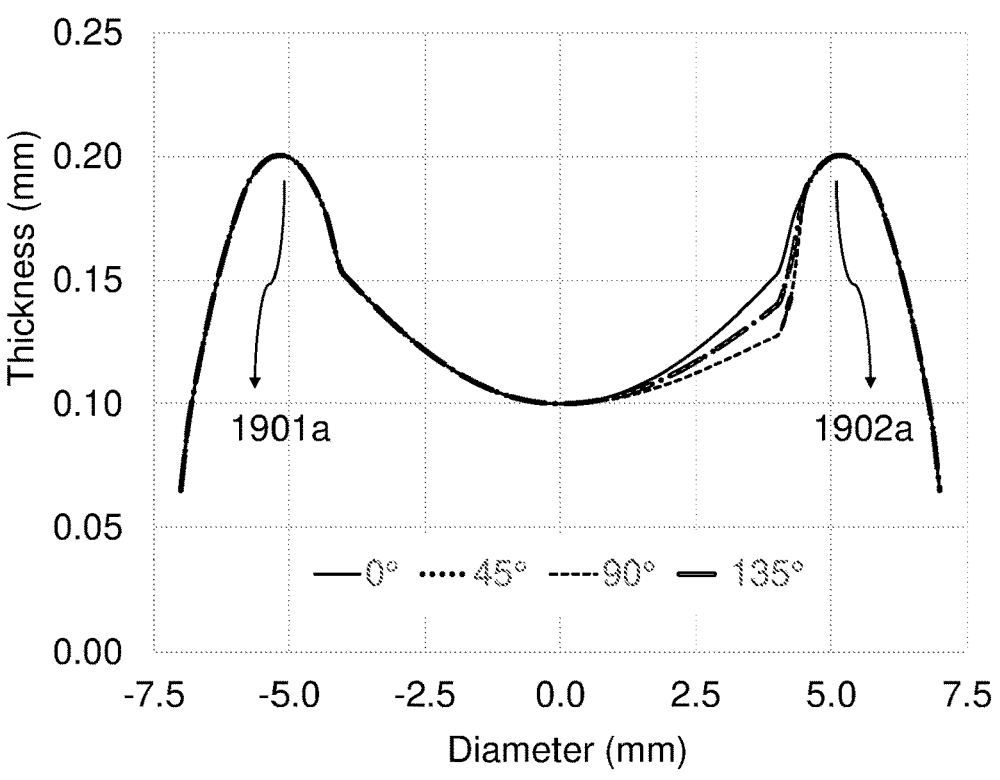
FIG. 19a illustrates the thickness distribution across the whole contact lens of the embodiment described in FIG. 18 with a substantially radially invariant, meridionally and azimuthally variant power distribution along four sample representative meridians, namely 0°, 45°, 90° and 135°.

FIG. 19*a* showcases the thickness profile of the Hemi-Area Lens example described in FIG. 18 with a radially invariant, meridionally and azimuthally variant power distribution along four representative sample meridians 0°, 45°, 90° and 135°. As can be seen in cross sections 1901*a* and 1902*a* of FIG. 19*a*, the non-optical zone of the lens has a substantially rotationally symmetric peripheral carrier zone.

This design facilitates the substantially free rotation on or around about the optical centre of the contact lens, due to the natural blink facilitated by the combined action of the upper and lower eyelids. This in turn leads to the stimulus imposed by the optical zone of the Hemi-Area lens design to vary with blink, resulting in a temporally and spatially varying stimulus to reduce the rate of progression in a myopic wearer; such that the efficacy to reduce the progression of eye growth remains substantially consistent over time.

Figure 19B:
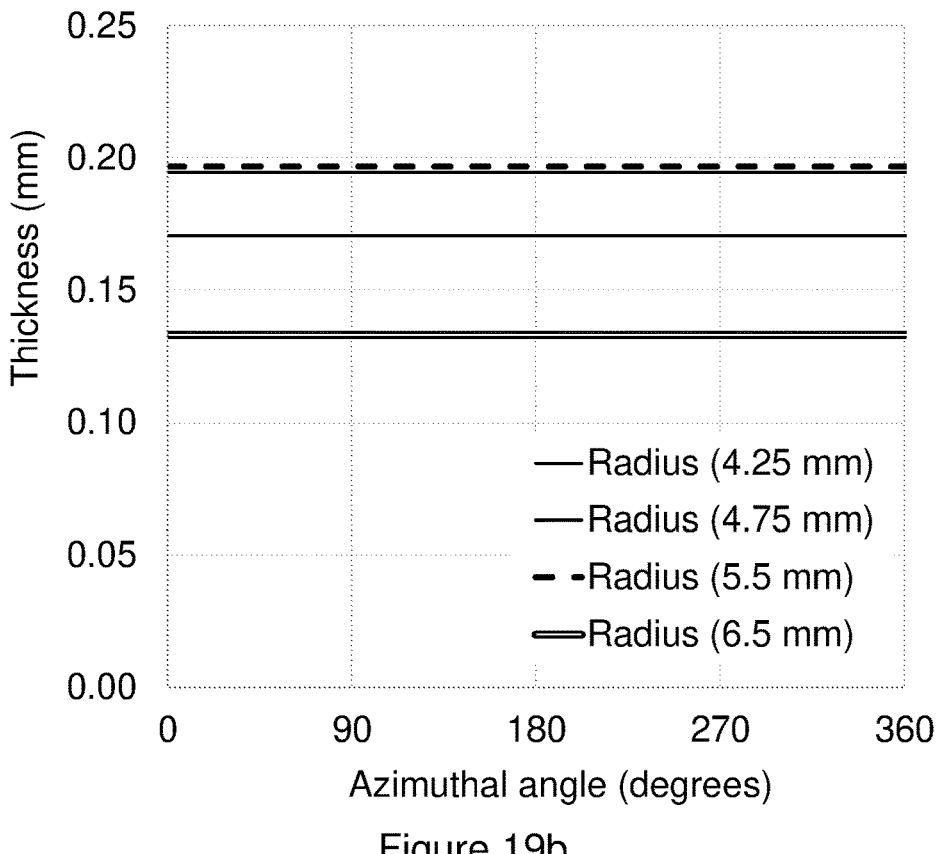
FIG. 19b illustrates the thickness distribution as a function of azimuthal angle of the contact lens described in FIG. 18 and FIG. 19a along four sample radial distances 4.25 mm, 4.75 mm, 5.5 mm, and 6.5 mm within the non-optical peripheral zone.

FIG. 19*b* illustrates the thickness distribution as a function of azimuthal angle of the contact lens described in FIG. 18 and FIG. 19*a* along four sample radial distances 4.25 mm, 4.75 mm, 5.5 mm, and 6.5 mm within the non-optical peripheral zone.

As can be seen from FIG. 19*b*, independent of radial distance the thickness of the contact lens is substantially invariant as a function of azimuthal angle with a peak-to-valley of <10 μm. Furthermore, the maximum difference in thickness between the different radii is about 0.06 mm.

Figure 20:
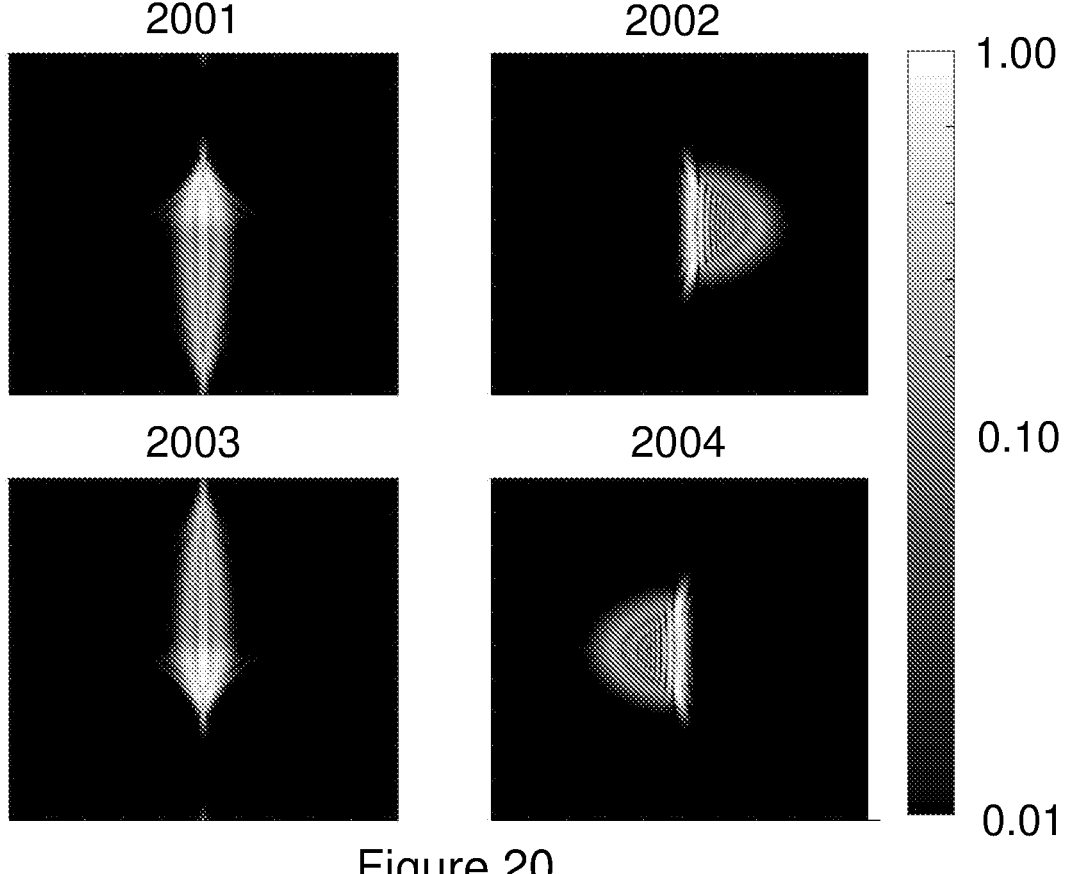
FIG. 20 illustrates the temporally and spatially varying signal due to contact lens rotation (i.e., 0°, 90°, 180° and) 270° depicted as on-axis point spread functions at the retinal plane, when the incoming light with a visible wavelength (589 nm) and a vergence of 0 D, is incident on a model eye with −4 DS of myopia and +1 DC×90° of astigmatism corrected with the exemplary contact lens embodiment described in FIGS. 18 and 19.

When the incoming light of a visible wavelength (589 nm) of vergence 0 D, is incident on the schematic model eye with a prescription of −4 DS/+1 DC×90 (Table 3), is corrected with the exemplary contact lens described in FIG. 18 and FIGs. 19*a* and *b*, the resultant on-axis temporally and spatially varying point spread functions at the retinal plane are illustrated in FIG. 20, wherein the lens had rotated on eye by 0° (2001), 90° (2002), 180° (2003) and 270° (2004) over time.

Figure 21A:
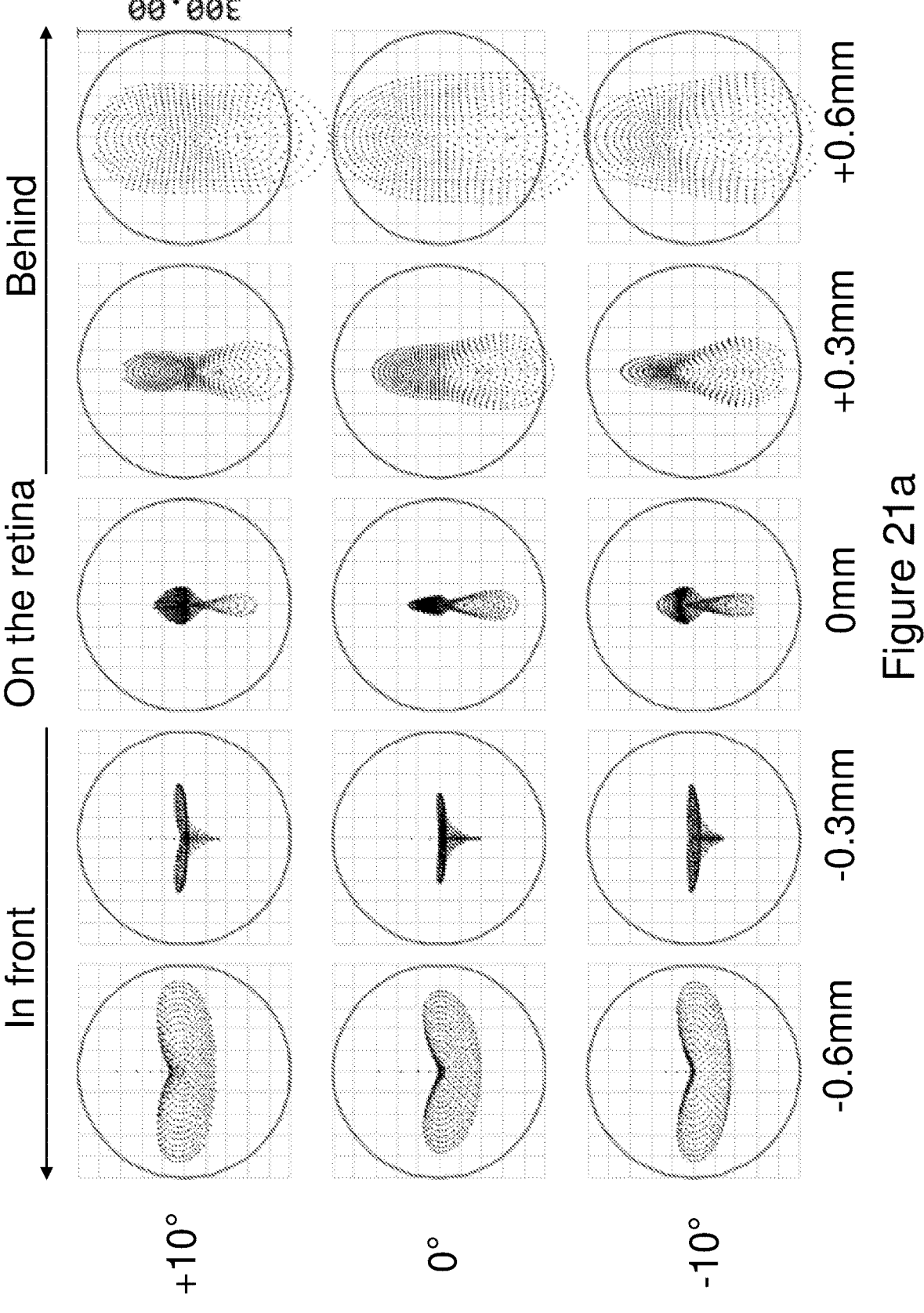
FIGS. 21a and 21b illustrate the temporally and spatially varying signal due to contact lens rotation (i.e., 0° and) 90° depicted as wide-view through-focus geometric spot analysis, when the incoming light with a visible wavelength (589 nm) and a vergence of 0 D, is incident on a model eye with −4 DS of myopia and +1DC×90° of astigmatism corrected with the contact lens embodiment described in FIGS. 18 and 19.
Figure 21B:
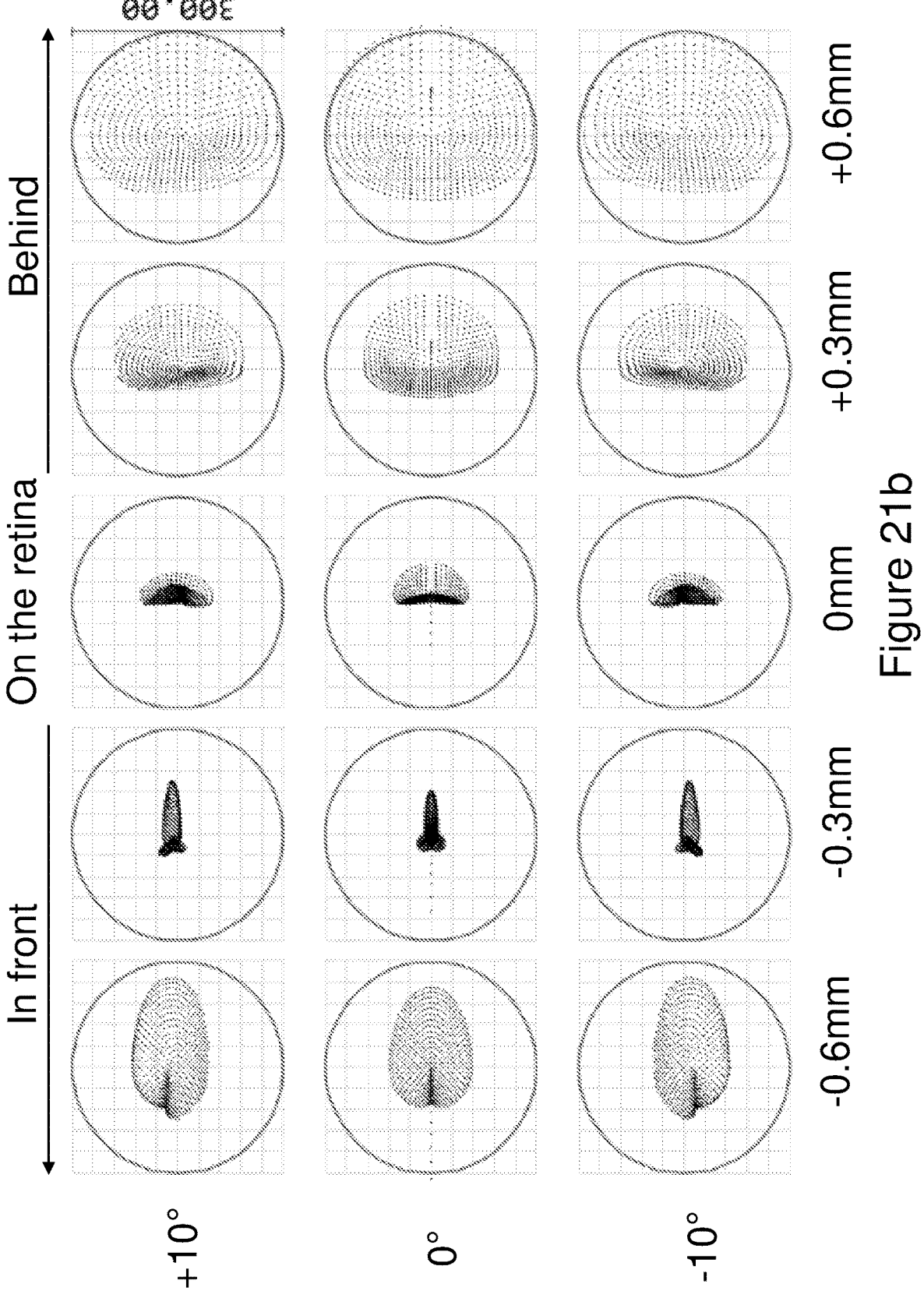

FIGS. 21*a* and 21*b* illustrate the wide-angle (i.e., +10° visual field), temporally and spatially-varying signal for two different azimuthal contact lens positions when worn on eye, i.e., wherein the meridian with the power of −3.5 D (as shown in 1802 along) 0° of the contact lens embodiment (FIGS. 18 and 19) is located at 0° and 90°, respectively.

The through-focus geometric spot diagrams of FIGS. 21*a* and 21*b* emulate the on-eye rotation of the said contact lens resulting in a spatially and temporally varying optical stop signal.

The through-focus geometric spot analysis about the retinal plane is computed at five locations, i.e., from −0.6 to +0.6 mm in 0.3 mm steps; wherein the retinal locations −0.6 mm and −0.3 mm are in front of the retina; the retinal location 0 mm is on the retina; and the retinal locations +0.3 mm and +0.6 mm are behind the retina.

Unlike seen in FIGS. 11*a* and 11*b* for the toric lens through-focus image montage where the blur patterns change noticeably more in size (i.e., focus) and direction between the two azimuthal contact lens locations, the patterns in FIGS. 21*a* and 21*b* for the exemplary Hemi-Area contact lens embodiment show a smaller change. This results in the visual performance being less affected by contact lens rotation with the Hemi-Area lens than with the toric lens.

Figure 22:
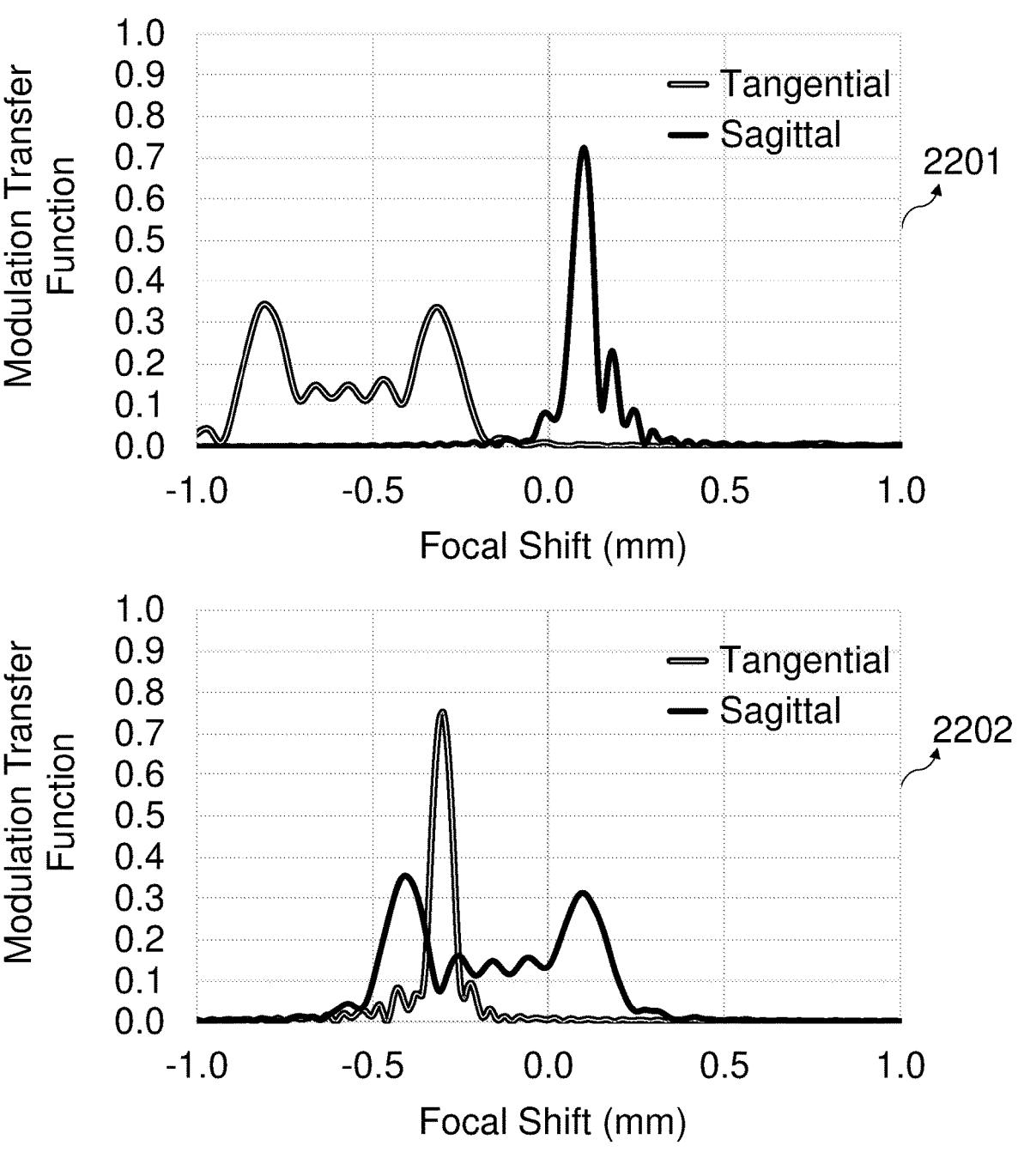
FIG. 22 illustrates the retinal signal (conoid of partial blur) depicted as on-axis, through-focus, modulation transfer function for the tangential and sagittal meridians, which were computed when the incoming light with a visible wavelength (589 nm) and a vergence of 0 D, is incident on a model eye with −4 DS of myopia and +1 DC×90° of astigmatism corrected with the contact lens embodiment described in FIGS. 18 and 19, wherein the meridian with the power of −3.5 D of the contact lens was located at 0° and 90°.

When the incoming light of a visible wavelength (589 nm) of vergence 0 D, is incident on the schematic model eye with a prescription of −4 DS/+1 DC×90° (Table 3), is corrected with the exemplary contact lens described in FIG. 18 and FIGS. 19a and b, the retinal signal depicted as on-axis, through-focus, modulation transfer function for the tangential and sagittal meridians is illustrated in FIG. 22.

To assess the difference in performance with contact lens rotation over time, the modulation transfer function was computed for two azimuthal contact lens locations, i.e., wherein the principal meridian (−3.5 D as shown in 1802 along) 0° of the contact lens when worn on eye was located at 0° (2201) and at 90° (2202).

In this example, the modulation transfer functions 2201 and 2202 show that the differences between the tangential and sagittal meridians (i.e., the peaks closest to retina) were approximately 0.4 mm in 2201 and in 2202. This difference in focal shift is smaller when compared to the 0.8 mm of the toric contact lens shown in FIG. 8, which again indicates that visual performance is less affected by contact lens rotation with the Hemi-Area lens than with the toric lens.

In this example, the depth of the conoid or interval of partial blur varies as a function of on-eye contact lens rotation which is caused due to the interactions between the delta power of the contact lens and the astigmatism of the eye. The expansion or collapsing of the depth of the conoid or interval of partial blur as a function of contact lens rotation is minimised when compared to the depth of conoid of Sturm of the toric contact lens example of FIG. 12.

FIG. 23 illustrates the power map distribution (2301) within the optical zone of an embodiment contact lens of the present disclosure, its corresponding power profiles as a function of optic zone diameter for four representative sample meridians 0°, 45°, 90° and 135° (2302), and its corresponding power profiles as a function of azimuth for four representative sample radial positions R1, R2, R3 and R4 (2303) with radial distances of 0.5, 1.5, 2.5 and 3.5 mm, respectively. The contact lens embodiment of the present invention has a radially invariant, meridionally and azimuthally variant power distribution (power: −1 DS/+1.5 D, Half-Frequency Cosine Lens (1)). As can be seen in 2302 and 2303, the power distribution in the area defined by the azimuthal angle of 0° to 180° varies between approximately −0.25 D, 0.25 D and 0.5 D for the 0°, 45°/135° and 90° meridians, respectively, and in the area defined by the azimuthal angle of 180° to 360° the power varies between approximately −0.25 D, −0.75 D and −1 D for the 0°, 45°/135° and 90° meridians, respectively, resulting in a delta power of approximately 1.5 D.

FIG. 24a showcases the thickness profile of the Half-Frequency Cosine Lens (1) example described in FIG. 23 with a radially invariant, meridionally and azimuthally variant power distribution along four representative sample meridians 0°, 45°, 90° and 135°. As can be seen in cross sections 2401a and 2402a of FIG. 24a, the non-optical zone of the lens has a substantially rotationally symmetric peripheral carrier zone. This design facilitates the substantially free rotation on or around about the optical centre of the contact lens, due to the natural blink facilitated by the combined action of the upper and lower eyelids. This in turn leads to the stimulus imposed by the optical zone of the Half-Frequency Cosine Lens (1) design to vary with blink, resulting in a temporally and spatially varying stimulus to reduce the rate of progression in a myopic wearer; such that the efficacy to reduce the progression of eye growth remains substantially consistent over time.

FIG. 24b illustrates the thickness distribution as a function of azimuthal angle of the contact lens described in FIG. 23 and FIG. 24a along four sample radial distances 4.25 mm, 4.75 mm, 5.5 mm, and 6.5 mm within the non-optical peripheral zone.

As can be seen from FIG. 24b, independent of radial distance the thickness of the contact lens is substantially invariant as a function of azimuthal angle with a peak-to-valley of <10 μm. Furthermore, the maximum difference in thickness between the different radii is about 0.06 mm.

When the incoming light of a visible wavelength (589 nm) of vergence 0 D, is incident on the schematic eye with −1 D of myopia, whose prescription is described in Table 2, is corrected with the exemplary contact lens described in FIG. 23 and FIGS. 24a and b, the resultant on-axis temporally and spatially varying point spread functions at the retinal plane are illustrated in FIG. 25, wherein the lens had rotated on eye by 0° (2501), 90° (2502), 180° (2503) and 270° (2504) over time.

FIGS. 26a and 26b illustrate the wide-angle (i.e., +10° visual field), temporally and spatially varying signal for two different azimuthal contact lens positions when worn on eye, i.e., wherein the meridian with the power of −0.25 D (as shown in 2302 along) 0° of the contact lens embodiment (FIG. 23 and FIGS. 24a and b) is located at 90° and 180°, respectively.

The through-focus geometric spot diagrams of FIGS. 26a and 26b emulate the on-eye rotation of the said contact lens resulting in a spatially and temporally varying optical stop signal. The through-focus geometric spot analysis about the retinal plane is computed at five locations, i.e., from −0.4 to +0.4 mm in 0.2 mm steps; wherein the retinal locations −0.4 mm and −0.2 mm are in front of the retina; the retinal location 0 mm is on the retina; and the retinal locations +0.2 mm and +0.4 mm are behind the retina.

Unlike seen in FIGS. 6a and 6b for the toric lens through-focus image montage where the blur patterns change in size (i.e., focus) and direction between the two azimuthal contact lens locations, the patterns in FIGS. 26a and 26b for the exemplary Half-Frequency Cosine Lens (1) embodiment only change in direction. This results in the visual performance being less affected by contact lens rotation with the Half-Frequency Cosine Lens (1) than with the toric lens.

When the incoming light of a visible wavelength (589 nm) of vergence 0 D, is incident on the schematic model eye with −1 D of myopia, whose prescription is described in Table 2, is corrected with the exemplary contact lens described in FIG. 23 and FIGS. 24a and b, the retinal signal depicted as on-axis, through-focus, modulation transfer function for the tangential and sagittal meridians is illustrated in FIG. 27. To assess the difference in performance with contact lens rotation over time, the modulation transfer function was computed for two azimuthal contact lens locations, i.e., wherein the principal meridian (−0.25 D as shown in 2302 along) 0° of the contact lens when worn on eye was located at 0° (2701) and at 90° (2702).

In this example, the modulation transfer functions 2701 and 2702 show that the difference between the tangential and sagittal meridians (i.e., the peaks closest to retina) was independent of the azimuthal contact lens location with the difference in focal shift being approximately 0.24 mm. This difference in focal shift is smaller when compared to the approximately 0.6 mm of the toric contact lens shown in FIG. 7, which indicates that visual performance is less affected by contact lens rotation with the Half-Frequency Cosine Lens (1) than with the toric lens. In this example, the depth of the conoid or interval of partial blur remains constant as a function of on-eye contact lens rotation.

FIG. 28 illustrates the power map distribution (2801) within the optical zone of an embodiment contact lens of the present disclosure, its corresponding power profiles as a function of optic zone diameter for four representative sample meridians 0°, 45°, 90° and 135° (2802), and its corresponding power profiles as a function of azimuth for four representative sample radial positions R1, R2, R3 and R4 (2803) with radial distances of 0.5, 1.5, 2.5 and 3.5 mm, respectively. The contact lens embodiment of the present invention has a radially invariant, meridionally and azimuthally variant power distribution (power: −3.5 DS/+1.25 D, Half-Frequency Cosine Lens (2)).

As can be seen in 2802 and 2803, the power distribution in the area defined by the azimuthal angle of 0° to 180° varies between approximately −2.9 D, −2.5 D and −2.25 D for the 0°, 45°/135° and 90° meridians, respectively, and in the area defined by the azimuthal angle of 180° to 360° the power varies between approximately −2.9 D, −3.3 D and −3.5 D for the 0°, 45°/135° and 90° meridians, respectively, resulting in a delta power of approximately 1.25 D.

FIG. 29*a* showcases the thickness profile of the Half-Frequency Cosine Lens (2) example described in FIG. 28 with a radially invariant, meridionally and azimuthally variant power distribution along four representative sample meridians 0°, 45°, 90° and 135°.

As can be seen in cross sections 2901*a* and 2902*a* of FIG. 29*a*, the non-optical zone of the lens has a substantially rotationally symmetric peripheral carrier zone. This design facilitates the substantially free rotation on or around about the optical centre of the contact lens, due to the natural blink facilitated by the combined action of the upper and lower eyelids. This in turn leads to the stimulus imposed by the optical zone of the Half-Frequency Cosine Lens (2) design to vary with blink, resulting in a temporally and spatially varying stimulus to reduce the rate of progression in a myopic wearer; such that the efficacy to reduce the progression of eye growth remains substantially consistent over time.

FIG. 29*b* illustrates the thickness distribution as a function of azimuthal angle of the contact lens described in FIG. 28 and FIG. 29*a* along four sample radial distances 4.5 mm, 5.25 mm, 5.75 mm, and 6.25 mm.

As can be seen from FIG. 29*b*, independent of radial distance the thickness of the contact lens is substantially invariant as a function of azimuthal angle with a peak-to-valley of <5 μm. Furthermore, the maximum difference in thickness between the different radii is about 0.04 mm.

When the incoming light of a visible wavelength (589 nm) of vergence 0 D, is incident on the schematic model eye with a prescription of −4 DS/+1 D×90 (Table 3), is corrected with the exemplary contact lens described in FIG. 28 and FIGS. 29*a* and *b*, the resultant on-axis temporally and spatially varying point spread functions at the retinal plane are illustrated in FIG. 30, wherein the lens had rotated on eye by 0° (3001), 90° (3002), 180° (3003) and 270° (3004) over time.

FIGS. 31*a* and 31*b* illustrate the wide-angle (i.e., +10° visual field), temporally and spatially varying signal for two different azimuthal contact lens positions when worn on eye, i.e., wherein the meridian with the power of −2.9 D (as shown in 2802 along) 0° of the contact lens embodiment (FIG. 28 and FIGS. 29*a* and *b*) is located at 0° and 90°, respectively.

The through-focus geometric spot diagrams of FIGS. 31A and 31B emulate the on-eye rotation of the said contact lens resulting in a spatially and temporally varying optical stop signal.

The through-focus geometric spot analysis about the retinal plane is computed at five locations, i.e., from −0.6 to +0.6 mm in 0.3 mm steps; wherein the retinal locations −0.6 mm and −0.3 mm are in front of the retina; the retinal location 0 mm is on the retina; and the retinal locations +0.3 mm and +0.6 mm are behind the retina.

Unlike seen in FIGS. 11*a* and 11*b* for the toric lens through-focus image montage where the blur patterns change noticeably more in size (i.e., focus) and direction between the two azimuthal contact lens locations, the patterns in FIGS. 31*a* and 31*b* for the exemplary Half-Frequency Cosine Lens (2) embodiment show a smaller change. This results in the visual performance being less affected by contact lens rotation with the Half-Frequency Cosine Lens (2) than with the toric lens.

When the incoming light of a visible wavelength (589 nm) of vergence 0 D, is incident on the schematic model eye with a prescription of −4 DS/+1 D×90° (Table 3), is corrected with the exemplary contact lens described in FIG. 28 and FIGS. 29*a* and *b*, the retinal signal depicted as on-axis, through-focus, modulation transfer function for the tangential and sagittal meridians is illustrated in FIG. 32.

To assess the difference in performance with contact lens rotation over time, the modulation transfer function was computed for two azimuthal contact lens locations, i.e., wherein the principal meridian (−2.9 D as shown in 2802 along) 0° of the contact lens when worn on eye was located at 0° (3201) and at 90° (3202).

In this example, the modulation transfer functions 3201 and 3202 show that the differences between the tangential and sagittal meridians (i.e., the peaks closest to retina) were approximately 0.2 mm in 2201 and approximately 0.6 in 2202. This difference in focal shift is smaller when compared to the 0.8 mm of the toric contact lens shown in FIG. 8, which indicates that visual performance is less affected by contact lens rotation with the Half-Frequency Cosine Lens (2) than with the toric prior art lens.

In this example, the depth of the conoid or interval of partial blur varies as a function of on-eye contact lens rotation which is caused due to the interactions between the delta power of the contact lens and the astigmatism of the eye. The expansion or collapsing of the depth of the conoid or interval of partial blur as a function of contact lens rotation is minimised when compared to the depth of conoid of Sturm of the toric contact lens example of FIG. 12.

FIG. 33 illustrates the power map distribution (3301) within the optical zone of an embodiment contact lens of the present disclosure, its corresponding power profiles as a function of optic zone diameter for four representative sample meridians 0°, 45°, 90° and 135° (3302), and its corresponding power profiles as a function of azimuth for four representative sample radial positions R1, R2, R3 and R4 (3303) with radial distances of 0.5, 1.5, 2.5 and 3.5 mm, respectively. The contact lens embodiment of the present invention has a radially invariant, meridionally and azimuthally variant power distribution (power: −1 DS/+1.5 D, Flipped-Half-Quasi Cosine Lens (1)).

As can be seen in 3302 and 3303, the power distribution in the area defined by the azimuthal angle of 0° to 180° varies between approximately −0.25 D, 0.12 D and 0.5 D for the 0°, 45°/135° and 90° meridians, respectively, and in the area defined by the azimuthal angle of 180° to 360° the power varies between approximately −0.25 D, −0.63 D and −1 D for the 0°, 45°/135° and 90° meridians, respectively, resulting in a delta power of approximately 1.5 D.

Unlike in the contact lens embodiment in FIG. 23 which has a power profile as a function of azimuth that follows a half-frequency cosine function, the example in FIG. 33 has a horizontal plateau in the power profile between the azimuthal angles of 170° to 190°.

FIG. 34*a* showcases the thickness profile of the Flipped-Half-Quasi Cosine Lens (1) example described in FIG. 23 with a radially invariant, meridionally and azimuthally variant power distribution along four representative sample meridians, namely 0°, 45°, 90° and 135°.

As can be seen in cross sections 3401*a* and 3402*a* of FIG. 34*a*, the non-optical zone of the lens has a substantially rotationally symmetric peripheral carrier zone with a peak thickness of approximately 0.18 mm.

In addition, FIG. 34*b* shows the thickness as a function of azimuthal angle along the peripheral carrier zone of a left contact lens at an average radial distance of about 5 mm for this exemplary contact lens, which will result in an assisted anti-clockwise (i.e., nasally downwards) rotation of the contact lens on eye.

The peripheral lens thickness changes in the form of a sawtooth profile, which has a total of about 6 teeth and wherein the amplitude of each sawtooth is about 0.02 mm, i.e., the thickness varies between approximately 0.18 and 0.2 mm.

The number of teeth can be increased by up to 20 to minimise potential discomfort. In some embodiments, sharp junctions within the sawtooth profile and between the sawtooth and the optic zone on the inside and the edge on the outside may also be blended.

Such a peripheral thickness profile can assist with the rotation on or around about the optical centre of the contact lens, due to the natural blink facilitated by the combined action of the upper and lower eyelids.

This in turn leads to the stimulus imposed by the optical zone of the Flipped-Half-Quasi Cosine Lens (1) design to vary with blink, resulting in a temporally and spatially varying optical signal or stimulus to reduce the rate of progression in a myopic wearer; such that the efficacy to reduce the progression of eye growth remains substantially consistent over time.

To support the naturally preferred rotation direction of the lens on eye, mirror imaged lenses may be worn in left and right eyes. When the incoming light of a visible wavelength (589 nm) of vergence 0 D, is incident on the schematic eye with −1 DS of myopia, whose prescription is described in Table 2, is corrected with the exemplary contact lens described in FIG. 33 and FIGS. 34*a* and *b*, the resultant on-axis temporally and spatially varying point spread functions at the retinal plane are illustrated in FIG. 35, wherein the lens had rotated on eye by 0° (3501), 90° (3502), 180° (3503) and 270° (3504) over time.

FIGS. 36*a* and 36*b* illustrate the wide-angle (i.e., +10° visual field), temporally and spatially varying signal for two different azimuthal contact lens positions when worn on eye, i.e., wherein the meridian with the power of −0.25 D (as shown in 3302 along) 0° of the contact lens embodiment (FIG. 33 and FIGS. 34*a* and *b*) is located at 0° and 270°, respectively.

The through-focus geometric spot diagrams of FIGS. 36*a* and 36*b* emulate the on-eye rotation of the said contact lens resulting in a spatially and temporally varying optical stop signal.

The through-focus geometric spot analysis about the retinal plane is computed at five locations, i.e., from −0.4 to +0.4 mm in 0.2 mm steps; wherein the retinal locations −0.4 mm and −0.2 mm are in front of the retina; the retinal location 0 mm is on the retina; and the retinal locations +0.2 mm and +0.4 mm are behind the retina.

Unlike seen in FIGS. 6*a* and 6*b* for the toric lens through-focus image montage where the blur patterns change in size (i.e., focus) and direction between the two azimuthal contact lens locations, the patterns in FIGS. 36*a* and 36*b* for the exemplary Flipped-Half-Quasi Cosine Lens (1) embodiment only change in direction.

This results in the visual performance being less affected by contact lens rotation with the Flipped-Half-Quasi Cosine Lens (1) than with the toric lens.

When the incoming light of a visible wavelength (589 nm) of vergence 0 D, is incident on the schematic model eye with −1 DS of myopia, whose prescription is described in Table 2, is corrected with the exemplary contact lens described in FIG. 33 and FIGS. 34*a* and *b*, the retinal signal depicted as on-axis, through-focus, modulation transfer function for the tangential and sagittal meridians is illustrated in FIG. 37.

To assess the difference in performance with contact lens rotation over time, the modulation transfer function was computed for two azimuthal contact lens locations, i.e., wherein the meridian with the power of −0.25 D (as shown in 3302 along) 0° of the contact lens when worn on eye was located at 0° (3701) and at 90° (3702). In this example, the modulation transfer functions 3701 and 3702 show that the difference between the tangential and sagittal meridians (i.e., the peaks closest to retina) was independent of the azimuthal contact lens location with the difference in focal shift being approximately 0.27 mm. This difference in focal shift is smaller when compared to the approximately 0.6 mm of the toric contact lens shown in FIG. 7, which indicates that visual performance is less affected by contact lens rotation with the Flipped-Half-Quasi Cosine Lens (1) than with the toric lens. In this example, the depth of the conoid or interval of partial blur remains constant as a function of on-eye contact lens rotation.

FIG. 38 illustrates the power map distribution (3801) within the optical zone of an embodiment contact lens of the present disclosure, its corresponding power profiles as a function of optic zone diameter for four representative sample meridians 0°, 45°, 90° and 135° (3802), and its corresponding power profiles as a function of azimuth for four representative sample radial positions R1, R2, R3 and R4 (3803) with radial distances of 0.5, 1.5, 2.5 and 3.5 mm, respectively.

The contact lens embodiment of the present invention has a radially invariant, meridionally and azimuthally variant power distribution (power: −3.5 DS/+1.25 D, Flipped-Half-Quasi Cosine Lens (2)).

As can be seen in 3802 and 3803, the power distribution in the area defined by the azimuthal angle of 0° to 180° varies between approximately −2.9 D, −2.5 D and −2.25 D for the 0°, 45°/135° and 90° meridians, respectively, and in the area defined by the azimuthal angle of 180° to 360° the power varies between approximately −2.9 D, −3.2 D and −3.5 D for the 0°, 45°/135° and 90° meridians, respectively, resulting in a delta power of approximately 1.25 D.

Unlike in the contact lens embodiment in FIG. 28 which has a power profile as a function of azimuth that follows a half-frequency cosine function, the example in FIG. 38 has a horizontal plateau in the power profile at the azimuthal angles of 0° and 180°.

FIG. 39*a* showcases the thickness profile of the Flipped-Half-Quasi Cosine Lens (2) example described in FIG. 38 with a radially invariant, meridionally and azimuthally variant power distribution along four representative sample meridians 0°, 45°, 90° and 135°.

As can be seen in cross sections 3901*a* and 3902*a* of FIG. 39*a*, the non-optical zone of the lens has a substantially rotationally symmetric peripheral carrier zone with a peak thickness of approximately 0.20 mm.

In addition, FIG. 39*b* shows the thickness along the peripheral carrier zone of a left contact lens at an average radial distance of approximately 5 mm for this exemplary contact lens, which will result in an assisted anti-clockwise (i.e., nasally downwards) rotation of the contact lens on eye.

The peripheral lens thickness changes in the form of a sawtooth profile, which has a total of about 12 teeth and wherein the amplitude of each sawtooth is about 0.02 mm, i.e., the thickness varies between approximately 0.19 to 0.21 mm. Suitable amplitudes of the sawtooth pattern may vary between 0.05 mm and 0.05 mm, with amplitudes generally being reduced towards the optic zone and the lens diameter.

The thickness variation is preferably added to the front peripheral zone to facilitate interaction with the moving eyelids. Such an azimuthal peripheral thickness profile can assist with the rotation on or around about the optical centre of the contact lens, due to the natural blink facilitated by the combined action of the upper and lower eyelids. This in turn leads to the stimulus imposed by the optical zone of the Flipped-Half-Quasi Cosine Lens (2) design to vary with blink, resulting in a temporally and spatially varying optical signal or stimulus to reduce the rate of progression in a myopic astigmatic wearer; such that the efficacy to reduce the progression of eye growth remains substantially consistent over time.

When the incoming light of a visible wavelength (589 nm) of vergence 0 D, is incident on the schematic model eye with a prescription of −4 DS/+1 DC×90 (Table 3), is corrected with the exemplary contact lens described in FIG. 38 and FIGS. 39*a* and *b*, the resultant on-axis temporally and spatially varying point spread functions at the retinal plane are illustrated in FIG. 40, wherein the lens had rotated on eye by 0° (4001), 90° (4002), 180° (4003) and 270° (4004) over time.

FIGS. 41*a* and 41*b* illustrate the wide-angle (i.e., +10° visual field), temporally and spatially varying signal for two different azimuthal contact lens positions when worn on eye, i.e., wherein the meridian with the power of −2.9 D (as shown in 3802 along) 0° of the contact lens embodiment (FIGS. 38 and 39) is located at 0° and 90°, respectively. The through-focus geometric spot diagrams of FIGS. 41*a* and 41*b* emulate the on-eye rotation of the said contact lens resulting in a spatially and temporally varying optical stop signal. The through-focus geometric spot analysis about the retinal plane is computed at five locations, i.e., from −0.6 to +0.6 mm in 0.3 mm steps; wherein the retinal locations −0.6 mm and −0.3 mm are in front of the retina;

the retinal location 0 mm is on the retina; and the retinal locations +0.3 mm and +0.6 mm are behind the retina. Unlike seen in FIGS. 11*a* and 11*b* for the toric lens through-focus image montage where the blur patterns change noticeably more in size (i.e., focus) and direction between the two azimuthal contact lens locations, the patterns in FIGS. 41*a* and 41*b* for the exemplary Flipped-Half-Quasi Cosine Lens (2) embodiment show a smaller change. This results in the visual performance being less affected by contact lens rotation with the Flipped-Half-Quasi Cosine Lens (2) than with the toric lens.

When the incoming light of a visible wavelength (589 nm) of vergence 0 D, is incident on the schematic model eye with a prescription of −4 DS/+1 DC×90° (Table 3), is corrected with the exemplary contact lens described in FIG. 38 and FIGS. 39*a* and *b*, the retinal signal depicted as on-axis, through-focus, modulation transfer function for the tangential and sagittal meridians is illustrated in FIG. 42.

To assess the difference in performance with contact lens rotation over time, the modulation transfer function was computed for two azimuthal contact lens locations, wherein the principal meridian (−2.9 D as shown in 3802 along) 0° of the contact lens when worn on eye was located at 0° (3801) and at 90° (3802).

In this example, the modulation transfer functions 3801 and 3802 show that the differences between the tangential and sagittal meridians (i.e., the peaks closest to retina) were approximately 0.2 mm in 4201 and approximately 0.7 in 4202. This difference in focal shift is smaller when compared to the 0.8 mm of the toric contact lens shown in FIG. 8, which indicates that visual performance is less affected by contact lens rotation with the Flipped-Half-Quasi Cosine Lens (2) than with the toric lens.

In this example, the depth of the conoid or interval of partial blur varies as a function of on-eye contact lens rotation which is caused due to the interactions between the delta power of the contact lens and the astigmatism of the eye. The expansion or collapsing of the depth of the conoid or interval of partial blur as a function of contact lens rotation is minimised when compared to the depth of conoid of Sturm of the toric contact lens example of FIG. 12.

FIG. 43 illustrates the power map distribution (4301) within the optical zone of an embodiment contact lens of the present disclosure, its corresponding power profiles as a function of optic zone diameter for four representative sample meridians 0°, 45°, 90° and 135° (4302), and its corresponding power profiles as a function of azimuth for four representative sample radial positions R1, R2, R3 and R4 (4303) with radial distances of 0.5, 1.5, 2.5 and 3.5 mm, respectively. The contact lens embodiment of the present invention has a radially, meridionally and azimuthally variant power distribution (power: −1 DS/+1.5 D, Flipped-Half-Quasi Cosine Lens (with negative spherical aberration) (1)).

As can be seen in 4302 and 4303, the power distribution in the area defined by the azimuthal angle of 0° to 180° varies between approximately −0.65 to −0.25 D, −0.25 to −0.1 D and 0.1 to 0.5 D for the 0°, 45°/135° and 90° meridians, respectively, and in the area defined by the azimuthal angle of 180° to 360° the power varies between approximately −0.65 to −0.25 D, −1 to −0.63 D and −1.4 to −1 D for the 0°, 45°/135° and 90° meridians, respectively, resulting in a delta power of approximately 1.5 D (at a radial distance of about 0.6 mm).

Unlike in the contact lens embodiment in FIG. 23 which has a power profile as a function of azimuth that follows a half-frequency cosine function, the example in FIG. 43 has a horizontal plateau in the power profile between the azimuthal angles of 170° to 190° and features some negative spherical aberration of approximately 0.5 D.

When the incoming light of a visible wavelength (589 nm) of vergence 0 D, is incident on the schematic eye with −1 D of myopia, whose prescription is described in Table 2, is corrected with the exemplary contact lens described in FIG. 43, the resultant on-axis temporally and spatially varying point spread functions at the retinal plane are illustrated in FIG. 44, wherein the lens had rotated on eye by 0° (4401), 90° (4402), 180° (4403) and 270° (4404) over time.

FIGS. 45*a* and 45*b* illustrate the wide-angle (i.e., +10° visual field), temporally and spatially varying signal for two different azimuthal contact lens positions when worn on eye, i.e., wherein the meridian that changes in power from +0.65 D mm in the periphery to −0.25 D in the centre (as shown in 4302 along) 0° of the contact lens embodiment (FIG. 43) is located at 0° and 270°, respectively. The through-focus geometric spot diagrams of FIGS. 45*a* and 45*b* emulate the on-eye rotation of the said contact lens resulting in a spatially and temporally varying optical stop signal.

The through-focus geometric spot analysis about the retinal plane is computed at five locations, i.e., from −0.4 to +0.4 mm in 0.2 mm steps; wherein the retinal locations −0.4 mm and −0.2 mm are in front of the retina; the retinal location 0 mm is on the retina; and the retinal locations +0.2 mm and +0.4 mm are behind the retina.

Unlike seen in FIGS. 6*a* and 6*b* for the toric lens through-focus image montage where the blur patterns change in size (i.e., focus) and direction between the two azimuthal contact lens locations, the patterns in FIGS. 45*a* and 45*b* for the exemplary Flipped-Half-Quasi Cosine Lens (with negative spherical aberration) (1) embodiment only change in direction. This results in the visual performance being less affected by contact lens rotation with the Flipped-Half-Quasi Cosine Lens (with negative spherical aberration) (1) than with the toric lens.

When the incoming light of a visible wavelength (589 nm) of vergence 0 D, is incident on the schematic model eye with −1 D of myopia, whose prescription is described in Table 2, is corrected with the exemplary contact lens described in FIG. 43, the retinal signal depicted as on-axis, through-focus, modulation transfer function for the tangential and sagittal meridians is illustrated in FIG. 46.

To assess the difference in performance with contact lens rotation over time, the modulation transfer function was computed for two azimuthal contact lens locations, i.e., wherein the principal meridian (the meridian that changes in power from +0.65 D mm in the periphery to −0.25 D in the centre, as shown in 4302 along) 0° of the contact lens when worn on eye was located at 0° (4601) and at 90° (4602).

In this example, the modulation transfer functions 4601 and 4602 show that the difference between the tangential and sagittal meridians (i.e., the peaks closest to retina) was independent of the azimuthal contact lens location with the difference in focal shift being approximately 0.3 mm. This difference in focal shift is smaller when compared to the approximately 0.6 mm of the toric contact lens shown in FIG. 7, which indicates that visual performance is less affected by contact lens rotation with the Flipped-Half-Quasi Cosine Lens (with negative spherical aberration) (1) than with the toric lens. In this example, the depth of the conoid or interval of partial blur remains constant as a function of on-eye contact lens rotation.

FIG. 47 illustrates the power map distribution (4701) within the optical zone of an embodiment contact lens of the present disclosure, its corresponding power profiles as a function of optic zone diameter for four representative sample meridians 0°, 45°, 90° and 135° (4702), and its corresponding power profiles as a function of azimuth for four representative sample radial positions R1, R2, R3 and R4 (4703) with radial distances of 0.5, 1.5, 2.5 and 3.5 mm, respectively. The contact lens embodiment of the present invention has a radially, meridionally and azimuthally variant power distribution (power: −3.5 DS/+1.25 D, Flipped-Half-Quasi Cosine Lens (with negative spherical aberration) (2)).

As can be seen in 4702 and 4703, the power distribution in the area defined by the azimuthal angle of 0° to 180° varies between approximately −3.3 to −2.9 D, −3 to −2.6 D and −2.6 to −2.25 D for the 0°, 45°/135° and 90° meridians, respectively, and in the area defined by the azimuthal angle of 180° to 360° the power varies between approximately −3.3 to −2.9 D, −3.6 to −3.2 D and −4 to −3.5 D for the 0°, 45°/135° and 90° meridians, respectively, resulting in a delta power of approximately 1.25 D (at a radial distance of about 0.6 mm).

Unlike in the contact lens embodiment in FIG. 28 which has a power profile as a function of azimuth that follows a half-frequency cosine function, the example in FIG. 47 has a horizontal plateau in the power profile between the azimuthal angles of 170° to 190° and features some negative spherical aberration of approximately 0.5 D.

When the incoming light of a visible wavelength (589 nm) of vergence 0 D, is incident on the schematic model eye with a prescription of −4 DS/+1 DC×90° (Table 3), is corrected with the exemplary contact lens described in FIG. 47, the resultant on-axis temporally and spatially varying point spread functions at the retinal plane are illustrated in FIG. 48, wherein the lens had rotated on eye by 0° (4801), 90° (4802), 180° (4803) and 270° (4804) over time.

FIGS. 49*a* and 49*b* illustrate the wide-angle (i.e., +10° visual field), temporally and spatially varying signal for two different azimuthal contact lens positions when worn on eye, wherein the meridian that changes in power from +3.25 D mm in the periphery to −2.9 D in the centre (as shown in 4702 along) 0° is located at 0° and 90°, respectively. The through-focus geometric spot diagrams of FIGS. 49*a* and 49*b* emulate the on-eye rotation of the said contact lens resulting in a spatially and temporally varying optical stop signal.

The through-focus geometric spot analysis about the retinal plane is computed at five locations, i.e., from −0.6 to +0.6 mm in 0.3 mm steps; wherein the retinal locations −0.6 mm and −0.3 mm are in front of the retina; the retinal location 0 mm is on the retina; and the retinal locations +0.3 mm and +0.6 mm are behind the retina.

Unlike seen in FIGS. 11*a* and 11*b* for the toric lens through-focus image montage where the blur patterns change noticeably more in size (i.e., focus) and direction between the two azimuthal contact lens locations, the patterns in FIGS. 49*a* and 49*b* for the exemplary Flipped-Half-Quasi Cosine Lens (with negative spherical aberration) (2) embodiment show a smaller change. This results in the visual performance being less affected by contact lens rotation with the Flipped-Half-Quasi Cosine Lens (with negative spherical aberration) (2) than with the toric lens.

When the incoming light of a visible wavelength (589 nm) of vergence 0 D, is incident on the schematic model eye with a prescription of −4 DS/+1 DC×90° (Table 3), is corrected with the exemplary contact lens described in FIG. 47, the retinal signal depicted as on-axis, through-focus, modulation transfer function for the tangential and sagittal meridians is illustrated in FIG. 50.

To assess the difference in performance with contact lens rotation over time, the modulation transfer function was computed for two azimuthal contact lens locations, i.e., wherein the meridian that changes in power from +3.25 D mm in the periphery to −2.9 D in the centre (as shown in 4702 along) 0° of the contact lens when worn on eye was located at 0° (5001) and at 90° (5002).

In this example, the modulation transfer functions 5001 and 5002 show that the differences between the tangential and sagittal meridians (i.e., the peaks closest to retina) were approximately 0.13 mm in 5001 and approximately 0.7 mm in 5002. This difference in focal shift is smaller when compared to the 0.8 mm of the toric contact lens shown in FIG. 8, which indicates that visual performance is less affected by contact lens rotation with the Flipped-Half-Quasi Cosine Lens (with negative spherical aberration) (2) than with the toric lens.

In this example, the depth of the conoid or interval of partial blur varies as a function of on-eye contact lens rotation which is caused due to the interactions between the delta power of the contact lens and the astigmatism of the eye.

The expansion or collapsing of the depth of the conoid or interval of partial blur as a function of contact lens rotation is minimised when compared to the depth of conoid of Sturm of the toric contact lens example of FIG. 12.

In certain embodiments, the blend zone or blending zone of the contact lens may be at least 0.05 mm, 0.1 mm, 0.15 mm, 0.25 mm, 0.35 or 0.5 mm in width. In certain embodiments, the blend zone or blending zone of the contact lens may be between 0.05 mm and 0.15 mm, 0.1 mm and 0.3 mm, or 0.25 mm and 0.5 mm in width. In some embodiments, the blending zone may be symmetrical and yet in some other embodiments, the blending zone may be asymmetrical, for example elliptical in shape.

In certain embodiments, a substantial portion of the optical zone of the contact lens made up with a meridionally and azimuthally variant power distribution function may be understood to mean at least 50%, 60%, 70%, 80%, 90%, 95% 98%, or 100% of the optical zone the contact lens.

In certain embodiments, a substantial portion of the optical zone of the contact lens made up with a meridionally and azimuthally variant power distribution function may be understood to mean between 50% and 70%, 60% and 80%, 60% and 90%, between 50% and 95%, between 80% to 95%, between 85% and 98% or between 50% and 100% of the optical zone of the contact lens.

In certain embodiments, the peripheral non-optical zone or carrier zone of the contact lens may be at least 2.25 mm, 2.5 mm, 2.75 mm, or 3 mm in width. In certain embodiments, the peripheral zone or carrier zone of the contact lens may be between 2.25 mm and 2.75 mm, 2.5 mm, and 3 mm, or 2 mm and 3.5 mm in width. In certain embodiments, the peripheral zone or the carrier zone of the contact lens is substantially symmetric with substantially similar thickness profiles across horizontal, vertical, and other oblique meridians.

In certain embodiments, the peripheral zone or the carrier zone of the contact lens is substantially symmetric with substantially similar thickness profiles across horizontal, vertical, and other oblique meridians may mean that the thickness profiles of the peripheral carrier zone across any of the meridians is within 1%, 3%, 5% or 10% variation of the thickness profile of any other meridian (for avoidance of doubt measured in the radial direction).

In certain embodiments, the peripheral zone or the non-optical carrier zone of the contact lens is substantially free of a ballast, an optical prism, a prism ballast, a slab-off, a truncation or combinations thereof.

In some embodiments, the meridionally and azimuthally variant power distribution power distribution of the contact lens can be located, formed, or placed on the anterior surface, posterior surface, or combinations thereof.

In certain other embodiments, the toric part of the contact lens located, formed, or placed on one of the two surfaces of the contact lens and the other surface may have other features for further reducing eye growth. For example, use of additional features like defocus, coma, or spherical aberration.

In certain embodiments, the shape of the optical zone, the blending zones and/or the peripheral carrier zone may be described by one or more of the following: a sphere, an asphere, an extended odd polynomial, an extended even polynomial, a conic section, a biconic section, a toric surface, or a Zernike polynomial.

As a person skilled in the art may appreciate, the present invention may be used in combination with any of the devices/methods that have the potential to influence the progression of myopia.

These may include, but are not limited to, spectacle lenses of various designs, colour filters, pharmaceutical agents, behavioural changes, and environmental conditions.

Prototype Contact Lenses: Design, Metrology and Clinical Data

Table 4 lists the refraction and prescription data for three prototype contact lenses (HA and F2 design) that were manufactured for the left eyes of two subjects (S #1 and S #2) to assess the visual performance and to gauge the amount of rotation of the lenses when worn on the eye over time.

TABLE 4

| Refraction and prescription data for the left eyes of S#1 and S#2. | | |
| --- | --- | --- |
| | S#1 | S#2 |
| Refraction (left eye) | −5.5 DS/+1 DC × 100° | −2 DS/+0.25 DC × 35° |
| Prescription HA# Lens | −5.5 DS/+1.5 D | −2 DS/+1.5 D |
| Prescription F2#Lens | −5.5 DS/+2 D | — |

Table 4 showcases HA Lens #1, HA Lens #2 and F2 Lens #1, which are exemplary embodiments of the invention, as disclosed herein. All three lenses provided clinically acceptable visual performance when compared to single vision correction.

FIG. 51 illustrates the azimuthal power profile of the HA Lens #1 for S #1 as measured and averaged across the 6 mm optic zone. HA Lens #1 is a variant of a contact lens embodiment described in FIG. 13. The measured power of −5.5 DS/+2 D is in line with the lens prescription (Table 4).

FIG. 52 illustrates the azimuthal power profile of the HA Lens #2 for S #2 as measured and averaged across the 6 mm optic zone. HA Lens #2 is a variant of a combination of contact lens embodiments described in FIGS. 13 and 47, which is a Hemi-Area Lens Design with negative spherical aberration. The measured averaged power of −2 DS/+2 D is in line with the lens prescription (Table 4) and the power of the spherical hemi-area was changed, i.e., it decreased from about −1.5 D to about −2.5 D between the azimuthal angles of 180° to 360°.

FIG. 53 illustrates the azimuthal power profile of the F2 Lens #1 for S #1 as measured and averaged across the 6 mm optic zone. F2 Lens #1 is a variant of a contact lens embodiment described in FIG. 23. The measured power of −5.5 DS/+1.5 D is in line with the lens prescription (Table 4).

FIG. 54 illustrates the measured thickness profiles of the vertical and horizontal meridians for one commercially available toric contact lenses (Control #1). For the avoidance of doubt, Control #1 is an example of the prior art lenses. The lens was a Biofinity Toric lens (CooperVision, US) (material: comfilcon A) with a cylinder power of −1.25 DC.

Thickness profiles were measured with Optimec is 830 (Optimec Ltd, UK). The thickness profiles of the contact lenses were obtained by using perpendiculars drawn from the tangents at each point on the back surface of the contact lens to the front surface of the contact lens. The peripheral prisms i.e., thickness difference between the two peripheral peaks of the meridians, of each lens were determined. In Control #1, the thickness differences were 197.5 µm and 28 µm for Meridians 1 (vertical) and 2 (horizontal), respectively. The peripheral prism along Meridian 1 has the purpose to stabilise a toric contact lens (prior art, commercially available).

FIG. 55 illustrates the measured thickness profiles of two perpendicular meridians of the HA Lens #1 prototype contact lenses, which is a variant of a contact lens embodiment described in FIG. 13. The peripheral prisms i.e., thickness difference between the two peripheral peaks of the meridians of each lens were determined. In HA Lens #1, the thickness difference was 2.6 µm and 30.3 µm for Meridians 1 and 2, respectively.

FIG. 56 illustrates the measured thickness profiles of two perpendicular meridians of the HA Lens #2 prototype contact lenses, which is a variant of a combination of contact lens embodiments described in FIGS. 13 and 47, i.e., a Hemi-Area Lens Design with negative spherical aberration. The peripheral prisms i.e., thickness difference between the two peripheral peaks of the meridians of each lens were determined. In HA Lens #2, the thickness difference was 10.7 µm and 34.4 µm for Meridians 1 and 2, respectively.

FIG. 57 illustrates the measured thickness profiles of two perpendicular meridians of the F2 Lens #1 prototype contact lenses, which is a variant of a contact lens embodiment described in FIG. 23. The peripheral prisms i.e., thickness difference between the two peripheral peaks of the meridians of each lens were determined. In F2 Lens #1, the thickness difference was 2.9 µm and 14.8 µm for Meridians 1 and 2, respectively. As expected from the design of the peripheral rotationally symmetric carrier zones of these three prototype contact lenses, the peripheral thickness differences across both meridians were minimal, providing peripheral carrier zones without rotational stabilisation.

The amount of rotation on eye of the prototype contact lenses F2 Lens #1 and HA Lens #2 and the Control #1 lens were measured using the device and measurement procedure explained in PCT/AU2020/051004 in FIGS. 35 and 36.

FIG. 58 shows the measured azimuthal position of the prototype contact lens F2 Lens #1 when worn by S #1 on the left eye. After about one hour of lens wear, the F2 Lens #1 rotated anti-clockwise (or nasally downwards) by about 450° (i.e., 1.25 revolutions).

FIG. 59 shows the measured azimuthal position of the prototype contact lens HA Lens #2 when worn by S #2 on the left eye. After about one hour of lens wear, the HA Lens #2 rotated anti-clockwise (or nasally downwards) by about 230° (i.e., 0.6 revolutions). Based on the measured data points, it is expected that the lens would perform one complete revolution within another hour of lens wear.

FIG. 60 shows the measured azimuthal position of the commercially available toric contact lens Control #1 which only showed small amounts of lens rotation over 30 minutes of lens wear.

In some embodiments, the contact lens may be configured with a specific fit that allows substantially free rotation of the contact lens on the myopic eye; wherein the substantially free rotation of the contact lens is gauged as a rotation of the contact lens by 360 degrees at least once, twice, thrice, four or five times per day and at least 15, 20, 25, 30 or 35 degrees within 1 hour of lens wear.

Few other exemplary embodiments are described in the following examples sets A and B.

Example Set "A"

A1—A contact lens for an eye, the contact lens comprising a front surface, a back surface, an optical centre, an optical axis, an optical zone around the optical centre, and a non-optical peripheral carrier zone about the optical zone; the optical zone comprising at least a power map, the power map characterised by a plurality of meridional power distributions across the optic zone and a plurality of azimuthal power distributions about the optical axis; wherein the power map, at least in part, provides a foveal correction for the eye, and at least in part, provides a conoid of partial blur at the retina of the eye; and the non-optical peripheral carrier zone comprising a plurality of azimuthal thickness distributions about the optical axis, wherein the azimuthal thickness distribution is configured to facilitate a specific fit on the eye.

A2—The contact lens of the claim example A1, wherein at least one of the meridional power distributions is at least partially variant along the optic zone and is substantially devoid of mirror symmetry along the optic zone;

A3—The contact lens of the claim example A2, wherein the at least one of the partially variant meridional power distribution is radially variant.

A4—The contact lens of the claim example A2, wherein the at least one of the partially variant meridional power distribution is radially invariant.

A5—The contact lens of one or more of the claim examples A1 to A4, wherein the at least one of the azimuthal power distributions is at least partially variant about the optical axis and is devoid of mirror symmetry about the optical axis;

A5—The contact lens of one or more of the claim examples A1 to A4, wherein the at least one of the azimuthal power distributions is defined using a cosine distribution with reduced frequency, that is, one-fourth (¼), or half (½) of a normal frequency; wherein the normal frequency is defined with two cosine cycles over 360° or 2π radians.

A6—The contact lens of the claim example A1, wherein only one of the pluralities of the meridional power distributions has mirror symmetry along the optic zone and none of the pluralities of the azimuthal power distributions has mirror symmetry about the optical axis.

A7—The contact lens of one or more of the claim examples A1 to A6, wherein the eye is a myopic eye with astigmatism≤0.75 DC; wherein the sign of astigmatism is defined in either positive or negative cylinder.

A8—The contact lens of one or more of the claim examples A1 to A6, wherein the eye is a myopic astigmatic eye with astigmatism >1 DC; wherein the sign of astigmatism is defined in either positive or negative cylinder.

A9—The contact lens of one or more of the claim examples A1 to A7, wherein the power map is centred about the optic centre and spans at least 40%, 50%, 60%, 70%, 80%, 90%, 95% or 100% of the optical zone, and the remainder of the optic zone is configured with substantially spherical correction for the myopic eye with astigmatism≤0.75 DC.

A10—The contact lens of one or more of the claim examples A1 to A6, and A8, wherein the power map is centred about the optic centre and spans at least 40%, 50%, 60%, 70%, 80%, 90%, 95% or 100% of the optical zone, and the remainder of the optic zone is configured with substantially astigmatic correction for the myopic astigmatic eye with astigmatism ≥1 DC.

A11—The contact lens of one or more of the claim examples A1 to A7, wherein the power map spans at least 3 mm, 4 mm, 5 mm, 6 mm, or 8 mm of the central region of the optical zone and the remainder of the optic zone is configured with substantially spherical correction for the myopic eye with astigmatism≤0.75 DC.

A12—The contact lens of one or more of the claim examples A1 to A6 and A8, wherein the power map spans at least 3 mm, 4 mm, 5 mm, 6 mm, or 8 mm of the central region of the optical zone and the remainder of the optic zone is configured with substantially spherical correction for the myopic astigmatic eye with astigmatism ≥1 DC.

A13—The contact lens of one or more of the claim examples A1 to A12, wherein the power map may be achieved using the anterior surface, the posterior surface, or both surfaces of the contact lens.

A14—The contact lens of one or more of the claim examples A1 to A13, wherein the difference between a maximum power and a minimum power within the meridionally varying power distributions across the optic zone, and the azimuthally varying power distributions about the optical axis, provides a delta power; wherein the delta power is at least +1.25 D, at least +1.5 D, at least +1.75 D, at least +2 D, at least +2.25 D, or at least +2.5 D.

A15—The contact lens of one or more of the claim examples A1 to A13, wherein the difference between a maximum power and a minimum power within, the meridionally varying across the optic zone or the azimuthally varying power distributions about the optical axis, provides a delta power; wherein the delta power is between +0.5D and +2.75 D, +0.75D and +2.5 D, +1D and +2.25 D, +1.25D and +2D, or +1.25D and +2.75 D.

A16—The contact lens of one or more of the claim examples A1 to A15, wherein the conoid of partial blur has a depth of at least 0.2 mm, 0.5 mm, 0.75 mm, or 1 mm, at the retina of the eye.

A17—The contact lens of one or more of the claim examples A1 to A16, wherein the conoid of partial blur spans at least sub-foveal, foveal, sub-macular, macular, or para macular regions of the retina of the eye.

A18—The contact lens of one or more of the claim examples A1 to A16, wherein the conoid of partial blur is at least within 2.5 degrees, 5 degrees, 7.5 degrees, 10 degrees, 15 degrees, 20 degrees, 25 degrees, 30 degrees, 35 degrees or 40 degrees field of the retina of the eye.

A19—The contact lens of one or more of the claim examples A1 to A18, wherein the conoid of partial blur is positioned on the retina such that it serves as a directional cue, or an optical stop signal, for the myopic eye with or without astigmatism.

A20—The contact lens of one or more of the claim examples A1 to A19, wherein the conoid of partial blur is not a regular conoid of Sturm and is irregular.

A21—The contact lens of one or more of the claim examples A1 to A20, wherein the conoid of partial blur includes a sagittal plane and a tangential plane; wherein tangential plane is located in front of the retina for at least one location within 40 degrees field of the retina of the eye.

A22—The contact lens of one or more of the claim examples A1 to A21, wherein sagittal plane is located in front of the retina for at least one location within 40 degrees field of the retina of the eye.

A23—The contact lens of one or more of the claim examples A1 to A22, wherein sagittal plane is located substantially close to the retina of the eye, for at least one location within 40 degrees field of the retina of the eye.

A24—The contact lens of one or more of the claim examples A1 to A23, wherein a blending zone is configured between the optic zone and the non-optical peripheral zone; and wherein the blending zone spans at least 0.125 mm, 0.25 mm, 0.5 mm, 0.75 mm, or 1 mm measured on a half diameter across the optical zone of the contact lens.

A25—The contact lens of one or more of the claim examples A1 to A24, wherein the plurality of azimuthal thickness distributions of the non-optical peripheral carrier zone is configured substantial invariant about the optical axis.

A26—The contact lens of one or more of the claim examples A1 to A25, wherein a difference between a thickest point and a thinnest point within the plurality of azimuthal distributions of the non-optical peripheral carrier zone about the optical axis provides a peak-to-valley thickness.

A27—The contact lens of one or more of the claim examples A1 to A26, wherein the substantial invariance means a variation such that a peak-to-valley thickness is between 5 µm and 45 µm, or between 10 µm and 45 µm or between 1 µm and 45 µm.

A28—The contact lens of one or more of the claim examples A1 to A26, wherein the substantial invariance means a variation such that a peak-to-valley thickness is no more than 5 µm, 10 µm, 15 µm, 20 µm, 25 µm, 30 µm, 35 µm, 40 µm, or 45 µm.

A29—The contact lens of one or more of the claim examples A1 to A28, wherein the plurality of azimuthal thickness distributions are defined with a desired width spanning a range of arbitrary radial distances in the non-optical peripheral carrier zone, wherein the desired width is between 3.5 mm and 7.2 mm, 4 mm and 7.5 mm, 4.5 mm and 6.5 mm, 4.25 mm and 7 mm, or 4.5 mm and 7.1 mm, of the non-optical peripheral carrier zone.

A30—The contact lens of one or more of the claim examples A1 to A24, wherein the non-optical peripheral carrier zone comprises thickness distributions defined within a selected region along one or more half-meridians configured substantially invariant; wherein the substantial invariance means a variation in thickness distribution along any half-meridian is less than 3%, 5% or 8% of any other half-meridians.

A31—The contact lens of one or more of the claim examples A1 to A24, wherein the non-optical peripheral carrier zone comprises thickness distributions defined within a selected region along one or more half-meridians are configured substantially invariant; wherein the substantial invariance in the thickness distribution is such that a thickest point across any one of the half-meridians is within a maximum variation of 5 µm, 10 µm, 15 µm, 20 µm, 25 µm, 30 µm, 35 µm, 40 µm, or 45 µm of the thickest point of any other half-meridian within the non-optical peripheral carrier zone.

A32—The contact lens of one or more of the claim examples A1 to A24, A30, or A31, wherein the selected region along one or more arbitrary half-meridians is between 3.5 mm and 7.2 mm, 4 mm and 7.1 mm, 3.75 mm and 7 mm, or 4 mm and 7.2 mm, of the non-optical peripheral carrier zone.

A33—The contact lens of one or more of the claim examples A1 to A32, wherein the specific fit offers a temporally and spatially varying directional cue, or optical stop signal, for the myopic eye to substantially control eye growth of the myopic eye.

A34—The contact lens of one or more of the claim examples A1 to A33, wherein the specific fit allows a substantially free rotation on the myopic eye; wherein the substantially free rotation is gauged as a rotation of the contact lens by 180 degrees at least thrice per 8 hours of lens wear, and at least 15 degrees within 1 hour of lens wear.

A35—The contact lens of one or more of the claim examples A1 to A34, wherein the specific fit is configured with at least one rotation assisting feature; wherein the at least one rotation assisting feature is represented using a periodic function with a periodicity.

A36—The contact lens of the claim example A35, wherein the periodic function is a saw-tooth profile, a sinusoidal profile, a sum of sinusoidal profiles, or a quasi-sinusoidal profile.

A37—The contact lens of the claim example A35, wherein the periodicity of the periodic function is no less than 6 defined over 0 to 2Tr radians, and the rate of thickness change is different for the increase than for the decrease.

A38—The contact lens of one or more of the claim examples A1 to A37, wherein the maximum thickness variation within the at least one rotation assisting feature is between 10 μm to 45 μm.

A39—The contact lens of one or more of the claim examples A1 to A38, wherein the at least one rotation assisting feature of the contact lens allows for increased rotation of the contact lens on the myopic eye, gauged as a rotation of the contact lens by 180 degrees at least thrice per 4 hours of lens wear, and at least 15 degrees within 30 minutes of lens wear.

A40—The contact lens of one or more of the claim examples A1 to A39, wherein the at least one rotation assisting feature is configured to increase rotation on the eye and in combination with the at least partially variant meridional and azimuthal power distribution, offers a temporally and spatially varying stop signal for the myopic eye such that the efficacy of the directional signal remains substantially consistent over time.

A41—The contact lens of one or more of the claim examples A1 to A40, wherein the power map in conjunction with the specific fit provides the eye with a conoid of partial blur that is temporally and spatially variant; wherein the spatial variance includes at least sub-foveal, foveal, sub-macular, macular, or para macular regions of the retina of the eye; and wherein the temporal variance provides a therapeutic benefit for the eye that remains substantially consistent over time.

A42—The contact lens of one or more of the claim examples A1 to A40, wherein the power map in conjunction with the specific fit provides the eye with a conoid of partial blur that is temporally and spatially variant; wherein the spatial variance includes 2.5 degrees, 5 degrees, 7.5 degrees, 10 degrees, 15 degrees, 20 degrees, 25 degrees, 30 degrees, 35 degrees or 40 degrees field of the retina of the eye; and wherein the temporal variance is provided by a rotation of the contact lens by 180 degrees at least thrice per 8 hours of lens wear, and at least 15 degrees within 1 hour of lens wear facilitating a therapeutic benefit for the eye that remains substantially consistent over time.

A43—The contact lens of one or more of the claim examples A41 to A42, wherein the therapeutic benefit for the eye means myopia control, myopia management, slowing the rate of myopia progression, of the eye.

A44—The contact lens of one or more of the claim examples A1 to A43, wherein the visual performance with the contact lens is substantially similar to that of a single vision contact lens for the eye.

A45—The contact lens of one or more of the claim examples A1 to A44, wherein the at least one rotation assisting feature is selected to allow for a desired lens rotation providing a desired visual performance while maintaining the desired the spatially and temporally varying optical stop signal for the myopic eye such that the efficacy of the directional signal remains substantially consistent over time.

Example Set "B"

B1—A contact lens pair, one contact lens for a right, one contact lens for a left, myopic eye with or without astigmatism, each contact lens comprising, a front surface, a back surface, an optical centre, an optical axis, an optical zone around the optical centre, and a non-optical peripheral carrier zone about the optical zone; the optical zone comprising at least a power map characterised by a plurality of meridional power distributions across the optic zone, and a plurality of azimuthal power distributions about the optical axis; wherein the at least one of the meridional power distributions is at least partially variant and is devoid of mirror symmetry; wherein the at least one of the azimuthal power distributions is at least partially variant and is devoid of mirror symmetry; wherein the power map, at least in part, provides adequate correction for the myopic eye, and at least in part, provides a regional conoid of partial blur serving as a directional cue, or an optical stop signal, at the retina of the myopic eye; and the non-optical peripheral carrier zone comprising a plurality of azimuthal thickness distributions about the optical axis, wherein at least one of the azimuthal thickness distributions is configured to be substantially invariant to facilitate a specific fit on the myopic eye.

B2—The contact lens pair of the claim example B1, wherein the plurality of meridional power distributions across the optic zone, and a plurality of azimuthal power distributions about the optical axis, for the right and left myopic eyes are substantially different.

B3—The contact lens pair of one or more of the claim examples B1 to B2, wherein the power map of each of the contact lenses is at least 40%, 50%, 60%, 70%, 80%, 90%, 95% or 100% of the optical zone, and the remainder of the optic zone is configured with substantially spherical correction for the myopic eye without astigmatism.

B4—The contact lens pair of one or more of the claim examples B1 to B2, wherein the power map of each of the contact lenses is at least 40%, 50%, 60%, 70%, 80%, 90%, 95% or 100% of the optical zone, and the remainder of the optic zone is configured with substantially astigmatic correction for the myopic eye with astigmatism.

B5—The contact lens pair of one or more of the claim examples B1 to B4, wherein the power map of each of the contact lenses spans at least 3 mm, 4 mm, 5 mm, 6 mm, or 8 mm of the central region of the optical zone.

B6—The contact lens pair of one or more of the claim examples B1 to B5, wherein the power map of each of the contact lenses may be achieved using the anterior surface, the posterior surface or both surfaces of the contact lens.

B7—The contact lens pair of one or more of the claim examples B1 to B6, wherein the at least one partially variant meridional power distribution of each of the contact lenses may be further configured to be radially variant.

B8—The contact lens pair of one or more of the claim examples B1 to B6, wherein the at least one partially variant meridional power distribution of each of the contact lenses may be further configured to be radially invariant.

B9—The contact lens pair of one or more of the claim examples B1 to B8, wherein the delta power within the at least partially variant meridional power distributions across the optic zone of each of the contact lenses is +1.25 D, at least +1.5 D, at least +1.75 D, or at least +2 D.

B10—The contact lens pair of one or more of the claim examples B1 to B9, wherein the delta power within the at least partially variant azimuthal power distributions about the optical axis of each of the contact lenses is at least +1.25 D, at least +1.5 D, at least +1.75 D, or at least +2 D.

B11—The contact lens pair of one or more of the claim examples B1 to B10, wherein a blending zone is configured between the optic zone and the non-optical peripheral zone of each of the contact lenses; and wherein the blending zone spans at least 0.125 mm, 0.25 mm, 0.5 mm, 0.75 mm, or 1 mm measured on a semi-diameter across the optical centre of each of the contact lenses.

B12—The contact lens pair of one or more of the claim examples B1 to B11, wherein the plurality of azimuthal thickness distributions of the non-optical peripheral carrier zone is configured substantial invariant about the optical axis of each of the contact lenses.

B13—The contact lens pair of one or more of the claim examples B1 to B12, wherein a difference between a thickest point and a thinnest point within the plurality of azimuthal distributions of the non-optical peripheral carrier zone about the optical axis provides a peak-to-valley thickness for each of the contact lenses.

B14—The contact lens pair of one or more of the claim examples B1 to B13, wherein the substantial invariance means a variation such that a peak-to-valley thickness is between 5 μm and 45 μm, or between 10 μm and 45 μm or between 1 μm and 45 μm for each of the contact lenses.

B15—The contact lens pair of one or more of the claim examples B1 to B14, wherein the substantial invariance means a variation such that a peak-to-valley thickness is no more than 5 μm, 10 μm, 15 μm, 20 μm, 25 μm, 30 μm, 35 μm, 40 μm, or 45 μm for each of the contact lenses.

B16—The contact lens pair of one or more of the claim examples B1 to B15, wherein the plurality of azimuthal thickness distributions are defined with a desired width spanning a range of arbitrary radial distances in the non-optical peripheral carrier zone, wherein the desired width is between 3.5 mm and 7.2 mm, 4 mm and 7.5 mm, 4.5 mm and 6.5 mm, 4.25 mm and 7 mm, or 4.5 mm and 7.1 mm, of the non-optical peripheral carrier zone for each of the contact lenses.

B17—The contact lens pair of one or more of the claim examples B1 to B16, wherein the non-optical peripheral carrier zone comprises thickness distributions defined within a selected region along one or more half-meridians configured substantially invariant; wherein the substantial invariance means a variation in thickness distribution along any half-meridian is less than 3%, 5% or 8% of any other half-meridians, across the optic zone of each of the contact lenses.

B18—The contact lens pair of one or more of the claim examples B1 to B17, wherein the substantial invariance in the azimuthal thickness distribution of each of the contact lenses means a peak-to-valley that is between 5 μm and 40 μm.

B19—The contact lens pair of one or more of the claim examples B1 to B18, wherein the substantial invariance in the azimuthal thickness distribution of each of the contact lenses is configured such that a thickest point within the non-optical peripheral carrier zone across any one of the half-meridians is within a maximum variation of 30 μm of the thickest peripheral point of any other half-meridian.

B20—The contact lens pair of one or more of the claim examples B1 to B19, wherein the specific fit of each of the contact lenses offers a temporally and spatially varying stop signal for the myopic eye to substantially control eye growth of the myopic eye.

B21—The contact lens pair of one or more of the claim examples B1 to B20, wherein the specific fit of each of the contact lenses allows a substantially free rotation on the myopic eye; wherein the substantially free rotation is gauged as a rotation of the contact lens by 180 degrees at least thrice per 8 hours of lens wear, and at least 15 degrees within 1 hour of lens wear.

B22—The contact lens pair of one or more of the claim examples B1 to B22, wherein the specific fit of each of the contact lenses including the azimuthal thickness distribution is configured with at least one rotation assisting feature; wherein the at least one rotation assisting feature is represented using a periodic function with a periodicity.

B23—The contact lens pair of the claim example B22, wherein the periodic function of each of the contact lenses is a saw-tooth profile, a sinusoidal profile, a sum of sinusoidal profiles, or a quasi-sinusoidal profile.

B24—The contact lens pair of the claim examples B22 and B23, wherein the periodicity of the periodic function of each of the contact lenses is no less than 6 and the rate of thickness change is different for the increase than for the decrease.

B25—The contact lens pair of the claim examples B22 to B24, wherein the maximum thickness variation within the at least one rotation assisting feature of each of the contact lenses is between 10 μm to 40 μm.

B26—The contact lens pair of one or more of the claim examples B1 to B25, wherein the at least one rotation assisting feature of each of the contact lenses allows for increased rotation of the contact lens on the myopic eye, gauged as a rotation of the contact lens by 180 degrees at least thrice per 4 hours of lens wear, and at least 15 degrees within 30 minutes of lens wear.

B27—The contact lens pair of one or more of the claim examples B1 to B26, wherein the at least one rotation assisting feature of each of the contact lenses is configured to increase rotation on the eye and in combination with the at least partially variant meridional and azimuthal power distribution, offers a temporally and spatially varying stop signal for the myopic eye such that the efficacy of the directional signal remains substantially consistent over time.

B28—The contact lens pair of one or more of the claim examples B1 to B28, wherein the at least one rotation assisting feature of each of the contact lenses is configured differently between the right myopic eye and the left myopic eye.

B29—The contact lens pair of one or more of the claim examples B1 to B28, wherein the at least one rotation assisting feature of each of the contact lenses is configured mirror symmetrically, about the nose, between the right myopic eye and the left myopic eye.

B30—The contact lens pair of one or more of the claim examples B1 to B29, wherein the at least one rotation assisting feature of each of the contact lenses is configured mirror asymmetrically, about the nose, between the right myopic eye and the left myopic eye.

B31—The contact lens pair of one or more of the claim examples B1 to B30, wherein the at least one rotation assisting feature of each of the contact lenses is configured mirror asymmetrically, about the nose, between the right myopic eye and the left myopic eye such that each rotation assisting feature is selected to allow for different magnitudes of lens rotation between the right and left myopic eyes providing further increase in the spatially and temporally varying optical stop signal for the myopic eye such that the efficacy of the directional signal remains substantially consistent over time.

B32—The contact lens pair of one or more of the claim examples B1 to B31, wherein the at least one rotation assisting feature of each of the contact lenses is configured mirror asymmetrically, about the nose, between the right myopic eye and the left myopic eye such that each rotation assisting feature is selected to allow for different magnitudes of lens rotation between the right and left myopic eyes providing desirable visual performance while maintaining the spatially and temporally varying optical stop signal for the myopic eye such that the efficacy of the directional signal remains substantially consistent over time.

B33—The contact lens pair of one or more of the claim examples B1 to B32, wherein the plurality of meridional power distributions across the optic zone, and a plurality of azimuthal power distributions about the optical axis of each of the contact lenses is selected to allow for desirable visual performance while maintaining the spatially and temporally varying optical stop signal for the myopic eye such that the efficacy of the directional signal remains substantially consistent over time.

B34—The contact lens pair of one or more of the claim examples B1 to B33 can be combined with one or more claim limitations described in one or more the claim examples A1 to A45 of Set A.

The invention claimed is:

1. A contact lens for a myopic eye, the contact lens comprising:
   a front surface;
   a back surface;
   an optical center;
   an optical axis;
   an optical zone about the optical center, the optical zone comprising a power map characterised by a plurality of meridional power distributions across the optical zone, and a plurality of azimuthal power distributions about the optical axis; and
   a non-optical peripheral carrier zone about the optical zone, the non-optical peripheral carrier zone comprising a plurality of azimuthal thickness distributions about the optical axis;
   wherein at least one of the azimuthal power distributions is partially variant and is devoid of mirror symmetry; and wherein at least one of the meridional power distributions is partially variant and is devoid of mirror symmetry;
   wherein the power map, at least in part, provides a foveal correction for the eye, and at least in part, provides a conoid of partial blur, serving as a directional cue, or an optical signal, at the retina of the myopic eye for at least one of slowing, retarding, or reducing myopia progression;
   wherein the contact lens is configured to substantially freely rotate when on the eye under the influence of a blink action of an eyelid of the eye, including a configuration of the non-optical peripheral carrier zone comprising at least one of the azimuthal thickness distributions being substantially invariant to facilitate the substantially free rotation of the contact lens on the eye or comprising at least one rotation assisting feature; and wherein due to the configuration of the non-optical peripheral carrier zone, the contact lens substantially freely rotates on the eye in different orientations of more than 180 degrees.

2. The contact lens of the claim 1, wherein only one of the pluralities of the meridional power distributions has mirror symmetry along the optical zone and none of the pluralities of the azimuthal power distributions has mirror symmetry about the optical axis.

3. The contact lens of claim 1, wherein the power map is at least 40% of the optical zone, and the remainder of the optical zone is configured substantially with a spherical correction for the myopic eye without astigmatism.

4. The contact lens of claim 1, wherein the power map is at least 40% of the optical zone, and the remainder of the optical zone is configured substantially with an astigmatic correction for the myopic eye with astigmatism.

5. The contact lens of claim 1, wherein the power map spans at least 3 mm of the central region of the optical zone.

6. The contact lens of claim 1, wherein the power map is achieved using the front surface, the back surface or both the front and back surfaces of the contact lens.

7. The contact lens of claim 1, wherein the at least one of the partially variant meridional power distributions is further configured to be radially variant.

8. The contact lens of claim 7, wherein the radial power variation in the at least one of the partially variant meridional power distributions is between 0 and −1D.

9. The contact lens of claim 1, wherein at least one of the partially variant meridional distributions includes a radial spoke with an invariant power distribution.

10. The contact lens of claim 1, wherein the difference between a maximum power and a minimum power within the meridionally varying power distributions across the optical zone, and the azimuthally varying power distributions about the optical axis, provides a delta power; wherein the delta power is at least +1.25 D.

11. The contact lens of claim 1, wherein the conoid of partial blur has a depth of at least 0.5 mm at the retina of the eye; wherein the conoid of partial blur spans at least a para-macular region of the retina of the eye; and wherein the para-macular region includes at least 20-degree field on the retina of the myopic eye.

12. The contact lens of claim 1, wherein the conoid of partial blur is irregular and not a regular conoid of Sturm; wherein the conoid of partial blur includes a sagittal plane and a tangential plane; wherein the tangential plane is located in front of the retina for at least one location within 20 degrees field of the retina of the eye; and wherein the sagittal plane is located substantially close to the retina of the eye, for at least one location within 20 degrees field of the retina of the eye.

13. The contact lens of claim 1, wherein the plurality of azimuthal thickness distributions are defined with a desired width spanning a range of arbitrary radial distances in the non-optical peripheral carrier zone, wherein the desired width is between 3.5 mm and 7.2 mm of the non-optical peripheral carrier zone.

14. The contact lens of claim 1, wherein the substantially free rotation is gauged as the rotation of the contact lens by 180 degrees at least thrice per 8 hours of lens wear, and at least 15 degrees within 1 hour of lens wear.

15. The contact lens of claim 1, wherein the configuration of the contact lens to substantially freely rotate when on the eye comprises the at least one rotation assisting feature which allows for a desired lens rotation providing a desired visual performance while maintaining the desired spatially and temporally varying optical stop signal for the myopic eye such that the efficacy of the directional signal remains substantially consistent over time.

16. The contact lens of claim 1, wherein the power map in conjunction with the substantially free rotation of the contact lens offers a temporally and spatially varying directional cue, or optical stop signal, for the myopic eye to substantially control eye growth of the myopic eye consistently over time.

17. The contact lens of claim 1, wherein the visual performance with the contact lens is substantially similar to that of a single vision contact lens for the myopic eye.

18. The contact lens of claim 1, wherein the at least one of the azimuthal power distributions is defined using a cosine distribution with reduced frequency, that is, half (½) of a normal frequency; wherein the normal frequency is defined with two cosine cycles over 360° or 2π radians.

19. The contact lens of claim 1, wherein the plurality of azimuthal thickness distributions are substantially invariant to facilitate the substantially free rotation of the contact lens.

20. The contact lens of claim 19, wherein the substantial invariance means a variation such that a peak-to-valley thickness is no more than 40 μm; wherein the peak-to-valley thickness is defined as a difference between a thickest point and a thinnest point within the plurality of azimuthal distributions of the non-optical peripheral carrier zone about the optical axis.

21. The contact lens of claim 1, wherein at least one azimuthal thickness distribution of the plurality of azimuthal thickness distributions is substantially variant to facilitate the substantially free rotation of the contact lens.

22. The contact lens of claim 21, wherein at least one of the azimuthal thickness distributions is configured with at least one rotation assisting; wherein the at least one rotation assisting feature is represented using a periodic function with a periodicity; wherein the periodic function is a sawtooth profile, or a sinusoidal profile, or a sum of sinusoidal profiles, or a quasi-sinusoidal profile; and wherein the periodicity of the periodic function is no less than 6 defined over 0 to 2π radians, and the rate of thickness change is different for the increase than for the decrease; and wherein the maximum thickness variation within the at least one rotation assisting feature is between 10 μm to 40 μm.

23. A contact lens for a myopic eye, the contact lens comprising:

a front surface;

a back surface;

an optical center;

an optical axis;

an optical zone about the optical center, the optical zone comprising a power map characterised by a plurality of meridional power distributions across the optical zone, and a plurality of azimuthal power distributions about the optical axis; and a non-optical peripheral carrier zone about the optical zone, the non-optical peripheral carrier zone comprising a plurality of azimuthal thickness distributions about the optical axis;

wherein at least one of the azimuthal power distributions is partially variant and is devoid of mirror symmetry; and wherein at least one of the meridional power distributions is partially variant and is devoid of mirror symmetry;

wherein the power map, at least in part, provides a foveal correction for the eye, and at least in part, provides a conoid of partial blur, serving as a directional cue, or an optical signal, at the retina of the myopic eye for at least one of slowing, retarding, or reducing myopia progression;

wherein the non-optical peripheral carrier zone is configured to facilitate on-eye lens rotation, the configuration of the non-optical peripheral carrier zone comprising at least one of the azimuthal thickness distributions being substantially invariant to facilitate substantially free rotation of the contact lens on the eye or comprising at least one rotation assisting feature; and wherein the conoid of partial blur has a depth of at least 0.5 mm at the retina of the eye; wherein the conoid of partial blur spans at least a para-macular region of the retina of the eye; and wherein the para-macular region includes at least 20-degree field on the retina of the myopic eye.

24. A contact lens for a myopic eye, the contact lens comprising:

a front surface;

a back surface;

an optical center;

an optical axis;

an optical zone about the optical center, the optical zone comprising a power map characterised by a plurality of meridional power distributions across the optical zone, and a plurality of azimuthal power distributions about the optical axis; and a non-optical peripheral carrier zone about the optical zone, the non-optical peripheral carrier zone comprising a plurality of azimuthal thickness distributions about the optical axis;

wherein at least one of the azimuthal power distributions is partially variant and is devoid of mirror symmetry; and wherein at least one of the meridional power distributions is partially variant and is devoid of mirror symmetry;

wherein the power map, at least in part, provides a foveal correction for the eye, and at least in part, provides a conoid of partial blur, serving as a directional cue, or an optical signal, at the retina of the myopic eye for at least one of slowing, retarding, or reducing myopia progression;

wherein the non-optical peripheral carrier zone is configured to facilitate on-eye lens rotation, the configuration of the non-optical peripheral carrier zone comprising at least one of the azimuthal thickness distributions being substantially invariant to facilitate substantially free rotation of the contact lens on the eye or comprising at least one rotation assisting feature; and wherein at least one of the azimuthal thickness distributions is substantially invariant to facilitate substantially free rotation of the contact lens and wherein the substantially free rotation is gauged as a rotation of the contact lens by 180 degrees at least thrice per 8 hours of lens wear, and at least 15 degrees within 1 hour of lens wear.

25. A contact lens for a myopic eye, the contact lens comprising:

a front surface;

a back surface;

an optical center;

an optical axis;

an optical zone about the optical center, the optical zone comprising a power map characterised by a plurality of meridional power distributions across the optical zone, and a plurality of azimuthal power distributions about the optical axis; and a non-optical peripheral carrier zone about the optical zone, the non-optical peripheral carrier zone comprising a plurality of azimuthal thickness distributions about the optical axis;

wherein at least one of the azimuthal power distributions is partially variant and is devoid of mirror symmetry; and wherein at least one of the meridional power distributions is partially variant and is devoid of mirror symmetry;

wherein the power map, at least in part, provides a foveal correction for the eye, and at least in part, provides a conoid of partial blur, serving as a directional cue, or an optical signal, at the retina of the myopic eye for at least one of slowing, retarding, or reducing myopia progression;

wherein the non-optical peripheral carrier zone is configured to facilitate on-eye lens rotation, the configuration of the non-optical peripheral carrier zone comprising at least one of the azimuthal thickness distributions being substantially invariant to facilitate substantially free rotation of the contact lens on the eye or comprising at least one rotation assisting feature; and wherein the at least one rotation assisting feature is selected to allow for a desired lens rotation providing a desired visual performance while maintaining the desired spatially and temporally varying optical stop signal for the myopic eye such that the efficacy of the directional signal remains substantially consistent over time.

\* \* \* \* \*